US011768909B2

(12) United States Patent
Ekerling

(10) Patent No.: US 11,768,909 B2
(45) Date of Patent: Sep. 26, 2023

(54) SYSTEMS AND METHODS FOR PROVIDING ACCESSIBLE SEARCH RESULTS

(71) Applicant: accessiBe Ltd., Bnei Brak (IL)

(72) Inventor: Shir Ekerling, Raanana (IL)

(73) Assignee: accessiBe Ltd., Bnei Brak (IL)

( * ) Notice: Subject to any disclaimer, the term of this patent is extended or adjusted under 35 U.S.C. 154(b) by 0 days.

(21) Appl. No.: 17/843,615

(22) Filed: Jun. 17, 2022

(65) Prior Publication Data

US 2022/0365999 A1 Nov. 17, 2022

Related U.S. Application Data

(63) Continuation of application No. PCT/IB2022/054401, filed on May 11, 2022.

(Continued)

(51) Int. Cl.

*G06F 7/02* (2006.01)
*G06F 16/00* (2019.01)

(Continued)

(52) U.S. Cl.

CPC .......... *G06F 16/9577* (2019.01); *G06F 3/013* (2013.01); *G06F 3/0481* (2013.01);

(Continued)

(58) Field of Classification Search

CPC .. G06F 16/9577; G06F 16/958; G06F 16/957; G06F 16/951; G06F 16/9538;

(Continued)

(56) References Cited

U.S. PATENT DOCUMENTS

| | | | |
|---|---|---|---|
| 5,601,432 | A | 2/1997 | Bergman |
| 5,890,905 | A | 4/1999 | Bergman |

(Continued)

OTHER PUBLICATIONS

Web Content Accessibility Guidelines 2.1, W3C World Wide Web Consortium Recommendation (2018) available at: https://www.w3.org/TR/WCAG21/.

(Continued)

*Primary Examiner* — Bruce M Moser
(74) *Attorney, Agent, or Firm* — Finnegan, Henderson, Farabow, Garrett & Dunner, L.L.P.

(57) ABSTRACT

A non-transitory computer readable medium containing instructions that when executed by a processor provides search results to client-side computing devices. The method of providing search results includes receiving information categorizing a plurality of websites; storing in at least one data structure the information categorizing the websites; receiving information indicating a level of accessibility for each of the websites; storing in the at least one data structure the information indicating the level of accessibility; receiving a search query from a particular client-side computing device; performing a look up in the data structure for websites associated with the search query; and presenting on the particular client-side computing device website search results, wherein the website search results include links to websites matching the search query and wherein the website search results are presented in a preferential manner that takes into account the level of accessibility of the websites.

19 Claims, 43 Drawing Sheets

3610

Related U.S. Application Data

(60) Provisional application No. 63/231,761, filed on Aug. 11, 2021, provisional application No. 63/196,253, filed on Jun. 3, 2021, provisional application No. 63/189,166, filed on May 16, 2021, provisional application No. 63/187,425, filed on May 12, 2021, provisional application No. 63/187,427, filed on May 12, 2021, provisional application No. 63/187,429, filed on May 12, 2021, provisional application No. 63/187,431, filed on May 12, 2021, provisional application No. 63/187,426, filed on May 12, 2021, provisional application No. 63/187,428, filed on May 12, 2021.

(51) Int. Cl.

| | |
|---|---|
| ***G06F 16/957*** | (2019.01) |
| ***G06F 3/0482*** | (2013.01) |
| ***G06F 16/958*** | (2019.01) |
| ***G06F 40/109*** | (2020.01) |
| ***G06F 40/186*** | (2020.01) |
| ***G06F 40/197*** | (2020.01) |
| ***G06F 40/106*** | (2020.01) |
| ***G06F 40/151*** | (2020.01) |
| ***H04L 67/306*** | (2022.01) |
| ***G06F 8/34*** | (2018.01) |
| ***G06F 40/14*** | (2020.01) |
| ***G06F 16/951*** | (2019.01) |
| ***G06F 16/9538*** | (2019.01) |
| ***G06F 3/01*** | (2006.01) |
| ***G06F 3/0481*** | (2022.01) |
| ***G06F 3/0484*** | (2022.01) |
| ***H04L 67/30*** | (2022.01) |
| ***G06F 16/9535*** | (2019.01) |
| *G06F 3/04847* | (2022.01) |
| *G09B 21/00* | (2006.01) |

(52) U.S. Cl.
CPC .......... *G06F 3/0482* (2013.01); *G06F 3/0484* (2013.01); *G06F 8/34* (2013.01); *G06F 16/951* (2019.01); *G06F 16/957* (2019.01); *G06F 16/958* (2019.01); *G06F 16/9535* (2019.01); *G06F 16/9538* (2019.01); *G06F 16/986* (2019.01); *G06F 40/106* (2020.01); *G06F 40/109* (2020.01); *G06F 40/14* (2020.01); *G06F 40/151* (2020.01); *G06F 40/186* (2020.01); *G06F 40/197* (2020.01); *H04L 67/30* (2013.01); *H04L 67/306* (2013.01); *G06F 3/04847* (2013.01); *G09B 21/005* (2013.01); *G09B 21/006* (2013.01); *G09B 21/008* (2013.01)

(58) Field of Classification Search
CPC .... G06F 40/109; G06F 40/186; G06F 40/197; G06F 40/106; G06F 40/151; G06F 40/14; G06F 3/013; G06F 3/0481; G06F 3/0482; G06F 3/0484; G06F 8/34; H04L 67/30; H04L 67/306; G09B 21/005; G09B 21/006; G09B 21/008
See application file for complete search history.

(56) References Cited

U.S. PATENT DOCUMENTS

| | | | | |
|---|---|---|---|---|
| 6,591,008 | B1 | 7/2003 | Surve et al. | |
| 6,714,963 | B1 | 3/2004 | Levine et al. | |
| 7,111,243 | B1 | 9/2006 | Ballard et al. | |
| 7,162,526 | B2 * | 1/2007 | Dutta | H04L 67/59 715/208 |
| 7,194,411 | B2 | 3/2007 | Slotznick et al. | |
| 7,216,298 | B1 | 5/2007 | Ballard et al. | |
| 8,095,366 | B2 | 1/2012 | Johnson et al. | |
| 8,132,109 | B2 | 3/2012 | Bockus et al. | |
| 8,255,827 | B2 | 8/2012 | Malik | |
| 8,260,903 | B2 | 9/2012 | Ganesh et al. | |
| 8,924,335 | B1 | 12/2014 | Trefler et al. | |
| 8,954,950 | B2 | 2/2015 | Ionfrida et al. | |
| 9,152,392 | B2 | 10/2015 | Petro et al. | |
| 9,253,229 | B1 | 2/2016 | Strothmann et al. | |
| 9,370,299 | B2 | 6/2016 | Haine et al. | |
| 9,690,452 | B2 | 6/2017 | Seliger et al. | |
| 9,747,384 | B1 | 8/2017 | Rao et al. | |
| 10,051,331 | B1 | 8/2018 | Shintani et al. | |
| 10,141,006 | B1 | 11/2018 | Burciu | |
| 10,423,709 | B1 | 9/2019 | Bradley et al. | |
| 10,444,934 | B2 | 10/2019 | Bradley et al. | |
| 10,530,872 | B1 | 1/2020 | Beach | |
| 10,614,152 | B2 | 4/2020 | Livingston | |
| 10,642,468 | B2 | 5/2020 | Guido et al. | |
| 10,656,955 | B1 | 5/2020 | Nguyen et al. | |
| 10,762,280 | B2 | 9/2020 | Bradley et al. | |
| 10,896,286 | B2 | 1/2021 | Bradley et al. | |
| 10,928,978 | B2 | 2/2021 | Bradley et al. | |
| 10,997,361 | B1 | 5/2021 | Bradley et al. | |
| 11,029,815 | B1 | 6/2021 | Bradley et al. | |
| 11,045,340 | B2 | 6/2021 | Sharma | |
| 11,061,532 | B2 | 7/2021 | Bradley et al. | |
| 11,163,946 | B2 | 11/2021 | Waller et al. | |
| 11,178,267 | B1 | 11/2021 | Delaney et al. | |
| 11,270,603 | B1 | 3/2022 | Bansal et al. | |
| 11,372,965 | B2 | 6/2022 | Chhabra et al. | |
| 11,461,430 | B1 | 10/2022 | Kristoffersen et al. | |
| 11,482,133 | B2 | 10/2022 | O'Reilly et al. | |
| 2002/0152255 | A1 | 10/2002 | Smith et al. | |
| 2003/0061299 | A1 | 3/2003 | Brown et al. | |
| 2003/0061309 | A1 | 3/2003 | Brown et al. | |
| 2004/0148568 | A1 | 7/2004 | Springer et al. | |
| 2004/0205605 | A1 | 10/2004 | Adler et al. | |
| 2004/0218451 | A1 | 11/2004 | Said et al. | |
| 2005/0108642 | A1 | 5/2005 | Sinclair, II | |
| 2005/0165649 | A1 | 7/2005 | Mahaffey et al. | |
| 2005/0204295 | A1 | 9/2005 | Voorhees et al. | |
| 2006/0139312 | A1 | 6/2006 | Sinclair, II et al. | |
| 2006/0155780 | A1 | 7/2006 | Sakairi et al. | |
| 2006/0290712 | A1 | 12/2006 | Hong et al. | |
| 2007/0055938 | A1 * | 3/2007 | Herring | G06F 16/9577 715/729 |
| 2007/0202945 | A1 | 8/2007 | Stopford et al. | |
| 2008/0155411 | A1 | 6/2008 | Christensen | |
| 2009/0007026 | A1 | 1/2009 | Scott | |
| 2009/0113287 | A1 | 4/2009 | Yee | |
| 2010/0077305 | A1 | 3/2010 | Hamilton et al. | |
| 2010/0131455 | A1 | 5/2010 | Logan et al. | |
| 2010/0199215 | A1 | 8/2010 | Seymour et al. | |
| 2011/0072257 | A1 * | 3/2011 | Milchtaich | G06F 9/451 707/706 |
| 2011/0252150 | A1 | 10/2011 | Chandrabasu et al. | |
| 2012/0327009 | A1 | 12/2012 | Fleizach | |
| 2013/0104029 | A1 | 4/2013 | Hendry et al. | |
| 2014/0035945 | A1 | 2/2014 | Anglin et al. | |
| 2014/0063070 | A1 | 3/2014 | Leventhal et al. | |
| 2014/0180846 | A1 | 6/2014 | Meron | |
| 2014/0181115 | A1 | 6/2014 | Chen et al. | |
| 2014/0282285 | A1 | 9/2014 | Sadhvani et al. | |
| 2014/0337466 | A1 | 11/2014 | Li et al. | |
| 2014/0344665 | A1 | 11/2014 | Fernández Albaladejo et al. | |
| 2014/0351687 | A1 * | 11/2014 | Hall | G06F 16/957 715/234 |
| 2014/0372181 | A1 * | 12/2014 | Hosoda | G06Q 10/0637 705/7.36 |
| 2015/0106686 | A1 | 4/2015 | Blitzstein | |
| 2015/0223731 | A1 | 8/2015 | Sahin | |
| 2015/0286832 | A1 * | 10/2015 | Gibson | G06F 16/381 726/28 |
| 2015/0287043 | A1 | 10/2015 | Michaelis et al. | |
| 2016/0357713 | A1 | 12/2016 | Tocchini et al. | |

(56) References Cited

U.S. PATENT DOCUMENTS

2017/0177166 A1 6/2017 Kockan
2017/0220761 A1* 8/2017 Toupin .................. G16H 20/10
2017/0358256 A1 12/2017 Ross et al.
2017/0371975 A1 12/2017 Chen et al.
2018/0025089 A1 1/2018 Chin et al.
2018/0088762 A1 3/2018 Hausler et al.
2018/0253216 A1 9/2018 Beene
2019/0121633 A1 4/2019 Chen et al.
2020/0042652 A1 2/2020 Goenka et al.
2020/0082023 A1 3/2020 Chang et al.
2020/0334411 A1 10/2020 Patel et al.
2020/0371669 A1 11/2020 Bradley et al.
2020/0372539 A1 11/2020 Shenfeld et al.
2021/0042026 A1* 2/2021 Anbalagan .............. G10L 13/00
2021/0065584 A1 3/2021 O'Reilly et al.
2021/0157474 A1 5/2021 Bradley et al.
2021/0160557 A1 5/2021 Speed et al.
2021/0279228 A1 9/2021 Seeman
2021/0342522 A1 11/2021 Khorana et al.
2022/0083406 A1* 3/2022 Shushan ............. G06F 16/9532
2022/0121723 A1* 4/2022 Page .................. G06F 11/0784
2022/0129123 A1 4/2022 Nair et al.
2022/0231999 A1* 7/2022 Dasgupta .............. H04L 63/102
2022/0255917 A1* 8/2022 Ford ..................... H04L 63/102
2022/0255974 A1* 8/2022 Berliner .................. H04L 51/58
2022/0262487 A1 8/2022 Aragones et al.
2022/0277036 A1 9/2022 Dhiman et al.
2022/0300524 A1 9/2022 Banerjee et al.

OTHER PUBLICATIONS

International Search Report and Written Opinion for PCT International Application No. PCT/IB2022/54401 filed May 11, 2022; pp. 1-19; dated Nov. 30, 2022.

* cited by examiner

2212

2214

| Display parameter | Before | After |
|---|---|---|
| Stop animation command | ON | OFF |
| Saturation parameter | Normal | Low |

| Display parameter | Before | After |
|---|---|---|
| Content scaling parameter | Normal | High |
| Stop animation command | ON | OFF |
| Saturation parameter | Normal | High |
| Moving window | ON | OFF |

3112 3114 3116 3118

SYSTEMS AND METHODS FOR PROVIDING ACCESSIBLE SEARCH RESULTS

CROSS-REFERENCE TO RELATED APPLICATIONS

This application is a continuation of PCT International Application No. PCT/IB2022/054401, filed May 11, 2022, which is based on and claims benefit of priority of U.S. Provisional Patent Application No. 63/187,425, filed May 12, 2021, U.S. Provisional Patent Application No. 63/187,426, filed May 12, 2021, U.S. Provisional Patent Application No. 63/187,427, filed May 12, 2021, U.S. Provisional Patent Application No. 63/187,428, filed May 12, 2021, U.S. Provisional Patent Application No. 63/187,429, filed May 12, 2021. U.S. Provisional Patent Application No. 63/187,431, filed May 12, 2021, U.S. Provisional Patent Application No. 63/189,166, filed May 16, 2021, U.S. Provisional Patent Application No. 63/196,253, filed Jun. 3, 2021, and U.S. Provisional Patent Application No. 63/231,761, filed Aug. 11, 2021, the contents of all of which are incorporated herein by reference in their entireties.

TECHNICAL FIELD

The present disclosure relates generally to systems, methods, and computer-readable media for altering website presentations. More specifically, the disclosed systems, methods, and computer-readable media relates to altering website presentations to make them accessible for people with disabilities.

BACKGROUND

In a world striving for inclusivity regardless of abilities or disabilities, it is valuable for the internet to serve all people, whatever their hardware, software, language, location, or ability. This way, all people can exercise and enjoy their rights to freedom of expression and other fundamental human rights. Accordingly, websites and web tools should be properly designed and coded, so that people with disabilities can use them. Currently, many websites and web tools are developed with accessibility barriers that make them difficult or impossible for some to use. Making the web accessible benefits individuals, businesses, and society as a whole. International web standards define what is needed for accessibility. An example web standard is the Web Content Accessibility Guidelines (WCAG) 2.1, which is incorporated herein by reference.

Aspects of this disclosure describe providing web accessibility for people with disabilities using an accessibility graphical user interface (GUI) incorporated within websites. In particular, various embodiments of this disclosure improve the functionality of computers by increasing web accessibility and improving computing processes in prior systems through unconventional functionalities of GUIs. Further, various embodiments of this disclosure may allow for the selection of a specific web accessibility profile that addresses a particular disability of a user.

SUMMARY

Embodiments consistent with the present disclosure provide systems, methods, and non-transitory computer-readable storage media for altering website presentations to make the websites accessible.

Some disclosed embodiments may include systems, methods and non-transitory computer readable media for enabling users to alter website presentations based on selected web accessibility profiles. These embodiments may involve displaying an accessibility graphical user interface (GUI) for a website, wherein the accessibility GUI includes a plurality of web accessibility profiles associated with differing disabilities; receiving a selection of one of the plurality of web accessibility profiles; identifying a first predefined adjustment to a first website display parameter associated with the selected web accessibility profile; initiating a first change in the first website display parameter based on the identified first predefined adjustment to thereby address a first aspect of the disability associated with the selected web accessibility profile; identifying a second predefined adjustment to a second website display parameter associated with the selected web accessibility profile; initiating a second change in the second website display parameter based on the identified second predefined adjustment to thereby address a second aspect of the disability associated with the selected web accessibility profile; and wherein initiating the first change and the second change is configured to transform a presentation of the website to conform with needs of a user having the disability associated with the selected web accessibility profile.

Some disclosed embodiments may include systems, methods and non-transitory computer readable media for enabling users to switch between web accessibility profiles. These embodiments may involve receiving a command to open an accessibility graphical user-interface (GUI) for a website, wherein the website is associated with a set of display parameter having initial values; displaying the accessibility GUI for the website, wherein the accessibility GUI includes indications of a plurality of web accessibility profiles, each web accessibility profile being associated with a differing disability; receiving a first input via the accessibility GUI indicative of a selection of a specific web accessibility profile associated with a specific disability; based on the first input, implementing a first website display change corresponding to the specific accessibility profile, wherein the first website display change alters a plurality of the initial values of the set of display parameters to address the specific disability; receiving a second input via the accessibility GUI; and based on the second input, implementing a second website display change, wherein the second website display change causes an adjustment to the altered values of the set of display parameters.

Some disclosed embodiments may include systems, methods and non-transitory computer readable media for causing disability-related changes in website presentations across multiple browsing sessions. These embodiments may involve during a first website browsing session having an associated set of default values for display parameters, receiving a web accessibility profile selection associated with a particular disability, the web accessibility profile selection having an associated set of disability profile values for the display parameters, the disability profile values differing from the default values; based on the web accessibility profile selection, changing the default values for the display parameters to the disability profile values to thereby cause, during the first website browsing session, the website to be accessible to a user with the particular disability; causing to be stored in memory in association with the user, the web accessibility profile selection; during a second website browsing session of the user, performing a lookup in memory of the web accessibility profile selection of the user; and applying the web accessibility profile selection during the second website browsing session to thereby cause the second website browsing session to be accessible to the user with the particular disability.

Some disclosed embodiments may include systems, methods and non-transitory computer readable media for enabling a user to customize a web accessibility profile. These embodiments may involve displaying an accessibility graphical user interface (GUI) for modifying a plurality of display parameters of a website, wherein the accessibility GUI presents a plurality of web accessibility profiles associated with differing disabilities; receiving initial input via the accessibility GUI indicative of a selection of a specific web accessibility profile; based on the initial input, implementing a plurality of predefined changes in a group of display parameters of the website to address a disability associated with the specific web accessibility profile; presenting via the accessibility GUI, information indicative of the plurality of implemented changes in the plurality of display parameters associated with the specific web accessibility profile; receiving additional input via the accessibility GUI, indicative of a selection of at least one alteration to at least one of the plurality of predefined changes; and in response to the additional input, overriding at least one of the plurality of predefined changes to thereby enable customization of the selected web accessibility profile.

Some disclosed embodiments may include systems, methods and non-transitory computer readable media for altering default website display parameters to conform with an epilepsy-safe profile. These embodiments may involve obtaining an indication that a user of a website has epilepsy; and based on the obtained indication, implementing a predefined template to alter multiple website default display parameters to conform with needs of the epileptic user, wherein implementing the predefined template includes: executing a stop animation command in website code on a user session basis to limit movement on a display; and adjusting a value of at least one web display parameter; wherein executing the stop animation command and adjusting the value of the at least one web display parameter is configured to impact presentation of content on a computing device of the user with the epileptic disability without impacting presentation of content on other computing devices of other simultaneous viewers of the website.

Some disclosed embodiments may include systems, methods and non-transitory computer readable media for altering default website display parameters to conform with a visual impairment profile. These embodiments may involve obtaining an indication that a user of a website is visually impaired; and based on the obtained indication, implementing a predefined template to alter multiple default website display parameters to conform with needs of the visually impaired user, wherein implementing the predefined template includes at least two of: adjusting a content scaling parameter in website code on a user session basis to increase content scaling; adjusting a font type parameter in the website code on a user session basis to cause a readability increase; adjusting a saturation parameter in the website code on a user session basis to increase display intensity; adjusting a font size parameter in the website code on a user session basis to increase font scaling; adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background; wherein implementing the predefined template is configured to impact presentation of content on a computing device of the visually impaired user without impacting presentation of content on other computing devices of other simultaneous users of the website.

Some disclosed embodiments may include systems, methods and non-transitory computer readable media for altering default website display parameters to conform with a cognitive disability profile. These embodiments may involve obtaining an indication that a user of a website has a cognitive disability; and based on the obtained indication, implementing a predefined template to alter multiple website default display parameters to conform with needs of the cognitively disabled user, wherein implementing the predefined template includes at least two of: executing a highlighting titles command in website code on a user session basis to highlight titles depicted on the website; executing a highlighting actionable objects command in website code on a user session basis to highlight actionable objects depicted on the website; adjusting a content scaling parameter in website code on a user session basis to increase content scaling; and executing a stop animation command in website code on a user session basis to limit movement on a display; wherein implementing the predefined template is configured to impact presentation of content on a computing device of the user with the cognitive disability without impacting on other computing devices display to other simultaneous viewers of the website.

Some disclosed embodiments may include systems, methods and non-transitory computer readable media for alternating default display parameters to conform with a neurodevelopmental disorder profile. These embodiments may involve obtaining an indication that a user of a website has a neurodevelopmental disorder; and based on the obtained indication, implementing a predefined template to alter multiple website default display parameters to conform with needs of the user with the neurodevelopmental disorder, wherein the predefined template includes: adjusting a content scaling parameter in website code on a user session basis to increase content scaling; executing a stop animation command in the website code on a user session basis to limit movement on a display; and at least one of: adjusting a saturation parameter in the website code on a user session basis to increase display intensity; adjusting a font type parameter in the website code on a user session basis to cause a readability increase; adjusting a font size parameter in the website code on a user session basis to modify font scaling; adjusting a line height parameter in the website code on a user session basis to increase spaces between text lines; adjusting a letter spacing parameter in the website code on a user session basis to modify spaces between letters text; and adjusting text color parameter in the website code on a user session basis to modify a contrast between text and background; wherein implementing the predefined template is configured to impact presentation of content on a computing device of the user with the neurodevelopmental disorder without impacting presentation of content on other computing devices of other simultaneous viewers of the website.

Some disclosed embodiments may include systems, methods and non-transitory computer readable media for altering website code to conform with a screen reader profile. These embodiments may involve obtaining an indication of screen reader usage to navigate and consume website content on a specific device; and based on the obtained indication, implementing a predefined template to make multiple changes to the website code to conform with accessibility needs, wherein implementing the predefined template includes:

identifying in the website code a plurality of elements corresponding to multiple objects displayed on the website; determining accessibility information for at least some of the multiple objects displayed on the website; and updating the website code based on the determined accessibility information; wherein updating the website code changes an audible presentation of the website via the screen reader on the specific device without impacting simultaneous display of the website content on other computing devices.

Some disclosed embodiments may include systems, methods and non-transitory computer readable media for providing search results to client-side computing devices. These embodiments may involve receiving information categorizing a plurality of websites; storing in at least one data structure the information categorizing the plurality of websites; receiving information indicating a level of accessibility for each of the plurality of websites; storing in the at least one data structure the information indicating the level of accessibility; receiving a search query from a particular client-side computing device; performing a look up in the data structure for websites associated with the search query; and presenting on the particular client-side computing device website search results, wherein the website search results include links to websites matching the search query and wherein the website search results are presented in a preferential manner that takes into account the level of accessibility of the plurality of websites.

The foregoing summary and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
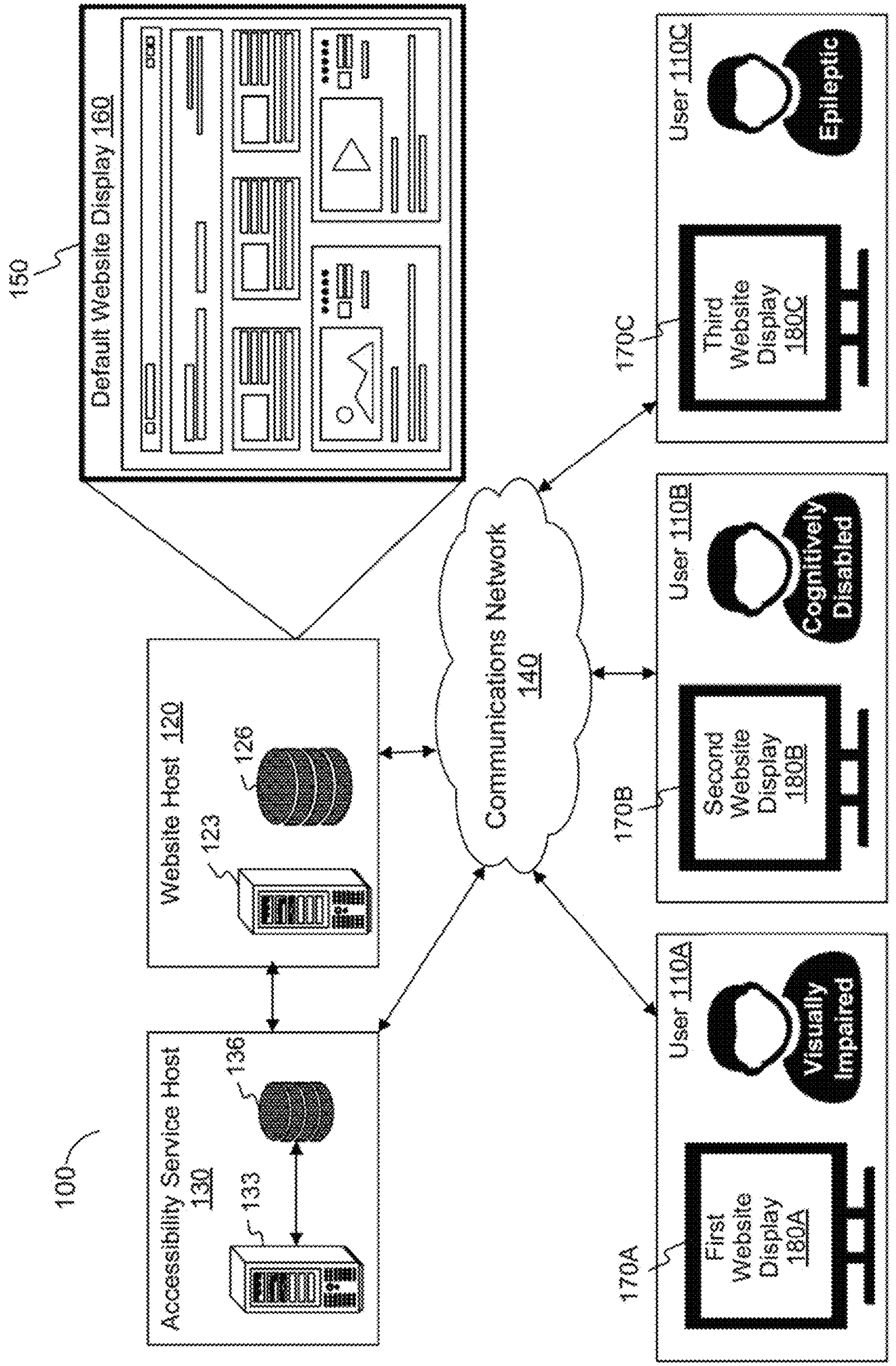
FIG. 1 is a block diagram illustrating a system that enables users to personalize the presentation of websites to address accessibility needs, consistent with some embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," "including," and other similar forms are intended to be equivalent in meaning and be open ended in that an item or items following any one of these words is not meant to be an exhaustive listing of such item or items, or meant to be limited to only the listed item or items. It should also be noted that, as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A or B, or A and B. As a second example, if it is stated that a component can include at least one of A, B, or C, then, unless specifically stated otherwise or infeasible, the component can include A, B, or C, or A and B, or A and C, or B and C, or A, B, and C.

This disclosure employs open-ended permissive language, indicating for example, that some embodiments "may" employ, involve, or include specific features. The use of the term "may", and other open-ended terminology is intended to indicate that although not every embodiment may employ the specific disclosed feature, at least one embodiment employs the specific disclosed feature.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Various embodiments are described herein with reference to a system, method, device, or computer-readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via, for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer-readable medium containing instructions that, when executed by at least one processor, cause the at least one processor to perform operations for executing a web accessibility method. Non-transitory computer-readable media may include any medium capable of storing data in any memory in a way that may be read by any computing device with a processor to carry out methods or any other instructions stored in the memory. The non-transitory computer-readable medium may be implemented as hardware, firmware, software, or any combination thereof. Moreover, the software may preferably be implemented as an application program tangibly embodied on a program storage unit or computer-readable medium consisting of parts, or of certain devices or a combination of devices. The application program may be uploaded to, and executed by, a machine having any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program or any combination thereof which may be executed by a CPU, whether or not such a computer or processor is explicitly described. In addition, various other peripheral units may be connected to the computer platform, such as an additional data storage unit and a printing unit. Furthermore, a non-transitory computer-readable medium may be any computer-readable medium except for a transitory propagating signal.

Some disclosed embodiments may involve "at least one processor," which may include any physical device or group of devices having electric circuitry that performs a logic operation on an input or on inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The term memory as used in this context and other contexts may include a Random Access Memory (RAM), a Read-Only Memory (ROM), a hard disk, an optical disk, a magnetic medium, a flash memory, other permanent, fixed, or volatile memory, or any other mechanism capable of storing instructions. Memory may include one or more separate storage devices collocated or disbursed, capable of storing data structures, instructions, or any other data. Memory may further include a memory portion containing instructions for the processor to execute. The memory may also be used as a working scratch pad for the processors or as a temporary storage In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, a data structure may be owned or operated by the same or different entities. Thus, the term "data structure" as used herein in the singular is inclusive of plural data structures.

Some embodiments disclosed herein may involve a network. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LET™ (BLE), Wi-Fi, near field communications (NFC), or other suitable communication methods that provide a medium for exchanging data and/or information between separate entities.

In connection with some embodiments, machine learning/artificial intelligence models may be trained using training examples. The models may employ learning algorithms. Some non-limiting examples of such learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Disclosed embodiments may involve altering a display of a website to address disabilities of users. The term website may refer to any public, private, or semi-private web property including a collection of content to be presented to the public or to a limited audience. The web properties may be provided to users via one or more servers that implements the basic World Wide Web standards for the coding and transmission of HTML data. It will be understood to one skilled in the art that the web properties may be stored in a single server associated with a single geographic or a physical location but may also be stored in multiple geographically distributed servers that may be interconnected via one or more communications systems. Examples of such web properties include web sites, mobile websites, web pages within a larger website (e.g., profile pages on a social networking website, ecommerce product pages, etc.), vertical information portals, distributed applications, and other digital data sources accessible by any device via a wired or wireless network connection, including RSS feeds, blogs and vlogs, electronic newsletters, or blast emails.

Embodiments disclosed herein may include displaying a website exhibiting various website display parameters. The website display parameters or simply display parameters) may include properties whose values provide constraints on a presentation of a website or a webpage on a screen associated with a computing device of the user. Examples of website display parameters may include content scaling, readable font, highlight titles, highlight links, text magnifier, font size, line height, letter spacing, align center, align left, align right, contrast, monochrome, saturation, text colors, title colors, background color, mute sounds, hide images, read mode, reading guide, stop animation, highlight hover, and cursor appearance. Consistent with the present disclosure, a website may have an associated set of default values for the display parameters. The set of default values for the display parameters may be defined in a code associated with the website. For example, the set of default values may indicate that a first title on the website has a font size of 14 pt and a second title on the website has a font size of 18 pt. In additional embodiments, a website may include a plurality of sets of default values for the display parameters for the same content. A selection of one of the plurality of sets of default values may depend on the type of computing device used for displaying the website. For example, the first title on the website may have a font size of 14 pt when displayed on desktop computers and font size of 8 pt when displayed on mobile devices, such as, smartphones.

Disclosed embodiments may include implementing one or more changes in web display parameters to address a disability of a user. Consistent with the present disclosure, implementing changes in a web display parameter may include modifying values of that website display parameter in the website code. For example, in order to address a visual impairment of a user, the font size of all the titles on the website may be changed from a font size of 14 pt to a font size of 22 pt. The implementation of the change may take place in a code of the website. The term website code, as used above, may include software, firmware, and/or micro-code, and may refer to programs, routines, functions, classes, data structures, and/or objects. The website code may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, website code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®. Consistent with the present disclosure, the website code may be updated or revised for implementing one or more changes in web display parameters to address a disability of a user. In some embodiments, the changes to the website code may be local, i.e., the changes may affect the presentation of the website on the user's computing device and may not affect the presentation of the website on other users' computing devices.

Disclosed embodiments may involve providing an accessibility GUI (graphical user interface) for implementing changes in the website presentation. An accessibility GUI generally refers to an interface which allows users to customize website display parameters through graphical elements (e.g., icons, menus, scroll bars, windows, transitional animations, dialogue boxes, and more). In one embodiment, the disclosed methods may involve receiving input via the accessibility GUI indicative of a selection for adjusting one or more website display parameters. The received input may include any type of data inputted by a user using an input device, such as a keyboard, a mouse, a touch pad, a touch screen, a joystick, a microphone, an image sensor, and/or any other device connectable to the computing device. In some examples, the received input may be in the form of at least one of: text, sounds, speech, hand gestures, body gestures, or tactile information. Consistent with the present disclosure, the accessibility GUI may be presented by default whenever a website is uploaded and may be closed upon receiving an input. Alternatively, the accessibility GUI may be presented upon receiving an indication that the user of the website may have a disability. In a first example, the indication may include clicking on an accessibility icon shown at the bottom of the website. In a second example, the indication may include retrieving stored information suggesting that the user of the website may have a disability.

In some embodiments, the input received via the accessibility GUI may be indicative of a selection of a specific web accessibility profile. As used herein, a web accessibility profile (or simply an accessibility profile) may include any type of data that may be used to determine a particular disability associated with a user. The selection of a web accessibility profile may trigger a bundle of predefined changes in a group of display parameters. Example web accessibility profiles may include a seizure safe profile, a vision impaired profile, a cognitive disability profile, a neurodevelopmental disorder profile, a screen reader profile, an elderly profile, a multi-disability profile, and/or any other grouping of predefined changes designed to address a condition. Consistent with the present disclosure, the web accessibility profile selection may have an associated set of disability profile values for the web display parameters. In some embodiments, the disability profile values may be different from the default values of the web display parameters. Upon receiving the user's selection, the method may include implementing a predefined template to alter one or more default website display parameters to conform with the needs of the specific disability of the website user. For example, upon selection of a visual impaired profile, disclosed embodiments may include implementing a predefined template associated with a visual impaired profile to alter the website display parameter "font size parameter" associated with all the titles to have a value of 20 pt, and to adjust the alter website display parameter "saturation parameter" to increase display intensity.

One implementation of the disclosed embodiment may include alternating default display parameters to conform with a visual impairment profile. The visual impairment profile may be designed for disabilities such as degrading eyesight, tunnel vision, cataract, glaucoma, and others. Visual disabilities range from mild or moderate vision loss in one or both eyes ("low vision") to substantial and uncorrectable vision loss in both eyes ("blindness"). For example, some website users have reduced or lack of sensitivity to certain colors ("color blindness"), or increased sensitivity to bright colors. These variations in perception of colors and brightness can be independent of the visual acuity. To address the particular visual disabilities of website users, the accessibility GUI may enable website users to change the presentation of web content into forms that are more usable for their particular needs. Changes to presentation may include, for example, enlarging or reducing text size and images, customizing settings for fonts, colors, and spacing, text-to-speech synthesis of the content, providing audio descriptions of video in multimedia, reading text using refreshable Braille, and/or any other visual, audible, or tactile alteration. In one embodiment, upon selection of the visual impairment profile, the disclosed software may alter a plurality of web display parameters to ensure that the presentation of web content is adapted to visually impaired users.

Another implementation of the disclosed embodiment may include alternating default display parameters to conform with a seizure-safe profile. Seizure disorders include different types of epilepsy and migraines, which may be in reaction to visual flickering or audio signals at certain frequencies or patterns. A seizure-safe profile is designed to eliminate the risk of seizures that result from flashing or blinking animations and risky color combinations. In one embodiment, upon selection of the seizure-safe profile, the disclosed software may limit the movement on the display to prevent blinking animation or to alter animations on the website such that they do not change at a rate greater than three frames per second.

Other implementations of the disclosed embodiment may include alternating default display parameters to conform with a cognitive disability profile and alternating default display parameters to conform with a neurodevelopmental disorder profile. The cognitive disability profile may be designed to help users with cognitive disabilities such as autism, dyslexia, CVA, and others, to focus on essential elements more easily. The neurodevelopmental disorder profile may be designed to reduce distractions and noise. In general, cognitive, learning, and neurological disabilities involve neurodiversity and neurological disorders, as well as behavioral and mental health disorders that are not necessarily neurological. They may affect any part of the nervous system and impact how well people hear, move, see, speak, and understand information. Cognitive and neurological disabilities do not necessarily affect the intelligence of a person. People with cognitive, learning, and neurological disabilities may require different types of web browsing methods, depending on their particular needs. In some examples, the accessibility GUI may enable website users to use text-to-speech software to hear the information while reading it visually or to use captions to read the information while hearing it. In other examples, the accessibility GUI may enable website users to use tools that resize text and spacing or customize colors to assist reading. In other examples, the accessibility GUI may enable website users to use grammar and spelling tools to support writing. In one embodiment, upon selection of the cognitive disability profile, the disclosed software may highlight titles and actionable objects on the website; and upon selection of the neurodevelopmental disorder profile, the disclosed software may execute a stop animation command in the website code to limit the movement on the display.

Other implementations may include alternating website code to conform with a screen reader profile. Websites are visual representations of coding structure and elements. Whatever depicted on a screen has been executed by the website code. As a result, most visually abled users can overlook the website code itself. In contrast, blind users, for example, consume and navigate websites using a screen reader. A screen reader may be software application that translates textual and graphical information displayed on a screen and re-present it to a user using synthesized speech. Screen readers are a form of assistive technology (AT) potentially useful to the blind, visually impaired, color blind, low vision, dyslexic, illiterate or learning disabled, often in combination with other ATs such as screen magnifiers and tools for manipulating font type, font size, contrast, and the like. Typically, a screen reader may avoid the visual screen and goes straight to the code to essentially examine and then relay back to the user what is being represented on the screen.

Therefore, a website code should properly reflect what is being viewed on the website. However, there are different ways to code certain elements (such as a menu or drop-downs) that will all look the same to a visually abled user. For a blind person who can't recognize a globally recognized structure of an element, they could get misled about a website's content. For example, many times images on websites are used to symbolize a category on a website or to reveal a new sale that has been launched. So visually abled users will be able to read text such as "Children's clothes" or "30% off kitchen supplies" on the image but users that use screen readers may just hear "graphic".

Consistent with the present disclosure, upon selection of the blind-users profile, the disclosed software may alter the website code to ensure that the presentation of web content is adapted to users that uses screen readers. Disclosed embodiments may involve using AI to scan a website and understand all of the elements on a page. The determined contextual information may reflect the purpose of every element, the way it's coded, and also how the end-user is meant to perceive it. Thereafter, the website code may be updated to ensure that the screen reader will understand what a blind user needs to know. In one implementation, Accessible Rich Internet Applications (ARIA) attributes may be automatically added for context and behavior-related adjustments to optimize elements in the most comprehensive and efficient way. Examples of added ARIA attributes may include describing main menus, header structure, and recognition of important icons. In another implementation, alternative text may be added automatically to images using image recognition technology to add elaborate and accurate descriptions to all images. In yet another implementation, screen reader text may be automatically added to help the screen reader describe certain actions and areas based on the context of a website.

Other implementations may include alternating default display parameters or providing additional content to conform with an audio impairment profile. Auditory disabilities range from mild or moderate hearing loss in one or both ears ("hard of hearing") to substantial and uncorrectable hearing loss in both ears ("deafness"). Some people with auditory disabilities can hear sounds but sometimes not sufficiently to understand all speech, especially when there is background noise. This can include people using hearing aids. While multimedia on the Web provides many opportunities for people with auditory disabilities, it also poses challenges when content or web players are not designed to be accessible. For example, while video content can be used to communicate information visually, audio content may require alternatives, such as transcripts and captions, so that it is accessible for people with auditory disabilities. In one embodiment, upon selection of the audio impairment profile, the disclosed software may provide transcripts and captions of audio content, adjust the text size and colors of captions, provide options to stop, pause, adjust the volume of audio content (independently of the system volume), and generate high-quality foreground audio that is clearly distinguishable from any background noise.

Other implementations of the disclosed embodiment may include alternating default display parameters or providing additional content to conform with a physical impairment profile. Physical disabilities (sometimes called "motor disabilities") include weakness and limitations of muscular control (such as involuntary movements including tremors, lack of coordination, or paralysis), limitations of sensation, joint disorders (such as arthritis), pain that impedes movement, and missing limbs. Some people with physical disabilities rely on keyboard support to activate functionality provided on web pages. They may need more time to type, click, or carry out other interactions, and they may type single keystrokes in sequence rather than typing simultaneous keystrokes ("chording") to activate commands. Such keystrokes may include commands for special characters, shortcut keys, and to active menu items. In addition, people with physical disabilities may have trouble clicking small areas and are more likely to make mistakes in typing and clicking. In one embodiment, upon selection of the physical impairment profile, the disclosed software may provide important design aspects such as larger clickable areas, extended time to complete tasks, and error correction options for forms. Moreover, the software may provide visible indicators of the current focus, and mechanisms to skip over blocks, such as over page headers, navigation bars, and more.

The foregoing list of profiles associated with disabilities is only exemplary. The disclosed systems, methods and computer readable media may be designed to alternate one or more default web display parameters based on a selection of other accessibility profiles.

Reference is now made to FIG. 1, which shows an example of a system 100 for enabling users 110 to personalize the accessibly display of websites. System 100 may be computer-based and may include at least some of computer system components, desktop computers, workstations, tablets, handheld computing devices, memory devices, and internal networks connecting the components. System 100 may include or be connected to various network computing resources (e.g., servers, routers, switches, network connections, storage devices, etc.) for supporting services provided by system 100. For example, system 100 may include or be connected to a website host 120 communicating with an accessibility service host 130 over communications network 140 that facilitates communications and data exchange between different system components and the different entities associated with system 100. In one embodiment, website host 120 may host a website 150 associated with a default website display 160. However, the display of website 150 may be altered when displayed by a plurality of computing devices 170 (e.g., 170A, 170B, and 170C) to different users 110 associated with different disabilities. For example, user 110A may be visually impaired and default website display 160 of website 150 may be altered to a first website display 180A that conforms with the needs of a user having visually impairment; user 110B may be cognitive disabled and default website display 160 of website 150 may be altered to a second website display 1808 that conforms with the needs of a user having cognitive disability; and user 110C may be epileptic and default website display 160 of website 150 may be altered to a third website display 180C that conforms with the needs of a user having epilepsy.

As shown, website host 120 may be associated with a server 123 coupled to one or more physical or virtual storage devices such as a data structure 126. Data associated with website 150 may be stored in data structure 126 and may be accessed using server 123. Data structure 126 may utilize a volatile or non-volatile, magnetic, semiconductor, tape, optical, removable, non-removable, other type of storage device or tangible or non-transitory computer-readable medium, or any medium or mechanism for storing information related to website 150. Data structure 126 may be part of server 123 or separate from server 123. When data structure 126 is not part of server 123, server 123 may exchange data with data structure 126 via a communication link. Data structure 126 may include one or more memory devices that store data and instructions used to perform one or more features of the disclosed embodiments. In one embodiment, data structure 126 may include any of a plurality of suitable data structures, ranging from small data structures hosted on a workstation to large data structures distributed among data centers. Data structure 126 may also include any combination of one or more data structures controlled by memory controller devices (e.g., servers) or software.

Altering the display of website 150 to address the accessibility needs of users may be accomplished by accessibility service host 130. In the illustrated example, accessibility service host 130 may be associated with a server 133 coupled to one or more physical or virtual storage devices such as a data structure 136. The operational and details described above with reference to server 123 and data structure 126 apply to server 133 and data structure 136.

According to embodiments of the present disclosure, communications network 140 may be any type of network (including infrastructure) that supports exchanges of information, and/or facilitates the exchange of information between the components of system 100. For example, communications network 140 may be the Internet, the world-wide-web (WWW), a private data network, a virtual private network using a public network, a Wi-Fi network, a local area network (LAN), a wide area network (WAN), a metro area network (MAN), and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

According to embodiments of the present disclosure, website 150 may be displayed on computing device 170. The computing device may include processing circuitry communicatively connected to a network interface and to a memory, wherein the memory contains instructions that, when executed by the processing circuitry, configure the computing device to execute a web accessibility method. Computing devices referenced herein may include all possible types of devices capable of exchanging data in a communications network such as the Internet. In some examples, the communication device may include a smartphone, a tablet, a smartwatch, a personal digital assistant, a desktop computer, a laptop computer, an IoT device, a dedicated terminal, and any other device that enables display of digital content conveyed via the communications network. In some cases, the computing device may include or be connected to a display device such as an LED display, a touchscreen display, an augmented reality (AR) device, a virtual reality (VR) device.

The components and arrangements of system 100 shown in FIG. 1 are intended to be exemplary only and are not intended to limit the disclosed embodiments, as the system components used to implement the disclosed processes and features may vary.

Figure 2:
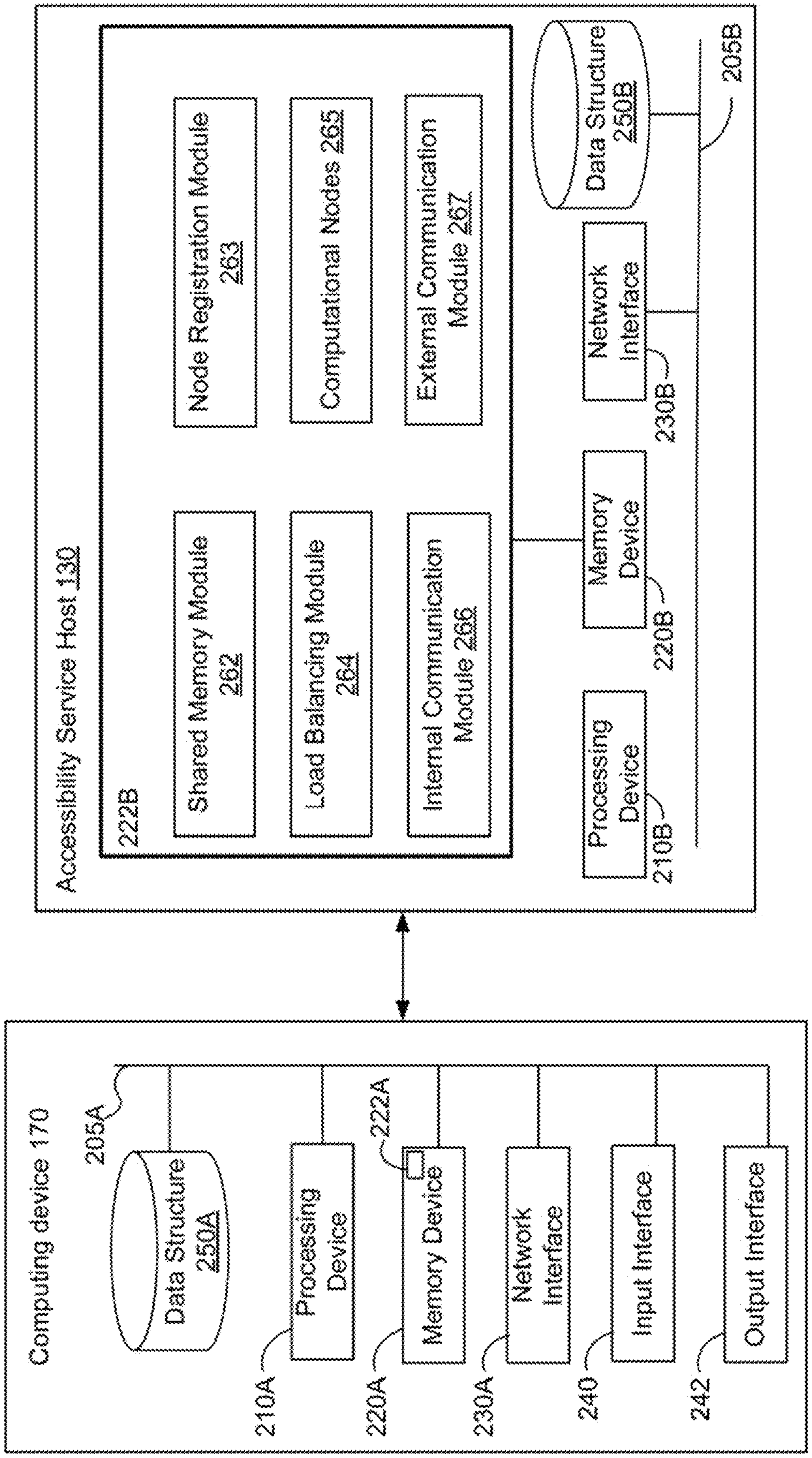
FIG. 2 is a block diagram of exemplary computing device and exemplary server, consistent with some embodiments of the present disclosure.

FIG. 2 is a block diagram of an exemplary computing device 170 and data structure 136 that are used for altering website presentations consistent with some embodiments. Computing device 170 may include a bus 205A (or other communication mechanism) interconnecting subsystems and components for transferring information within computing device 170. For example, bus 205A may interconnect a processing device 210A, a memory device 220A including a memory portion 222A, a network interface 230A, an input interface 240, and a data structure 250A.

In some embodiments, a processing device 210 (e.g., processing device 210A and processing device 210B) may include at least one processor configured to execute computer programs, applications, methods, processes, or other software to perform embodiments described in the present disclosure. A processing device may be at least one processor, as defined earlier, which may, for example, include a microprocessor such as one manufactured by Intel™. For example, the processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

In some embodiments, a memory device 220 (e.g., memory device 220A and memory device 220B) may include memory as describe previously. A memory portion 222 that may contain instructions that when executed by processing device 210, perform one or more of the methods described in more detail herein. A memory device 220 may be further used as a working scratch pad for processing device 210, a temporary storage, and others, as the case may be. Memory 220 may be a volatile memory such as, but not limited to, random access memory (RAM), or non-volatile memory (NVM), such as, but not limited to, flash memory. Processing device 210 and/or memory 220 may also include machine-readable media for storing software. The term "software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, a network interface 230 (e.g., network interface 230A and network interface 230B) may be used for providing connectivity between the different components of system 100. Network interface 230 may provide two-way data communications to a network, such as communications network 140. In one embodiment, network interface 230 may include an Integrated Services Digital Network (ISDN) card, cellular modem, satellite modem, or a modem to provide a data communication connection over the Internet. As another example, network interface 230 may include a Wireless Local Area Network (WLAN) card. In another embodiment, network interface 230 may include an Ethernet port connected to radio frequency receivers and transmitters and/or optical (e.g., infrared) receivers and transmitters. The specific design and implementation of network interface 230 may depend on the communications network or networks over which computing device 170 is intended to operate. For example, in some embodiments, computing device 170 may include network interface 230 designed to operate over a GSM network, a GPRS network, an EDGE network, a Wi-Fi or WiMAX network, and a Bluetooth network. In any such implementation, network interface 230 may be configured to send and receive electrical, electromagnetic, or optical signals that carry digital data streams or digital signals representing various types of information. In some embodiments, an input interface 240 may be used by computing device 170 to receive input from a variety of input devices, for example, a keyboard, a mouse, a touch pad, a touch screen, one or more buttons, a joystick, a microphone, an image sensor, and any other device configured to detect physical or virtual input. The received input may be in the form of at least one of: text, sounds, speech, hand gestures, body gestures, tactile information, and any other type of physically or virtually input generated by the user. Consistent with one embodiment, input interface 240 may be an integrated circuit that may act as a bridge between processing device 210 and any of the input devices listed above.

In some embodiments, a data structure 250 (e.g., data structure 250A and data structure 250B) may be used for the purpose of storing single data type column-oriented data structures, data elements associated with the data structures, or any other data structures. The terms data structure and database, consistent with the present disclosure, may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, entity-relationship model, a graph, a hypergraph, a matrix, a tensor, and so forth. The data in the data structure may be stored in contiguous or non-contiguous memory. Moreover, a data structure does not require information to be co-located. In some examples, the data stored in data structure 250 may include an accessibility profile associated with one or more website users. While illustrated in FIG. 2 as a single device, it is to be understood that data structure 250A or data structure 250B may include multiple devices either collocated or distributed.

In addition, as illustrated in FIG. 2, accessibility service host 130 may include a bus 205B interconnecting a processing device 2108, a memory device 220B including a memory portion 222B, a network interface 230B, and a data structure 250B. Memory portion 222B may contain software modules to execute processes consistent with the present disclosure. In particular, memory device 220B may include a shared memory module 262, a node registration module 263, a load balancing module 264, one or more computational nodes 265, an internal communication module 266, an external communication module 267, and a database access module (not shown). Modules 262-267 may contain software instructions for execution by at least one processor (e.g., processing device 210B) associated with server 136. Shared memory module 262, node registration module 263, load balancing module 264, computational module 265, and external communication module 267 may cooperate to perform various operations consistent with the present disclosure.

Shared memory module 262 may allow information sharing between accessibility service host 130 and other components of system 100. In some embodiments, shared memory module 262 may be configured to enable processing device to access, retrieve, and store data. For example, using shared memory module 262, processing device 210B may perform at least one of: executing software programs stored on memory device 220B, data structure 250A, or data structure 250B; storing information in memory device 220B, data structure 250A, or data structure 250B; or retrieving information from memory device 220B, data structure 250A, or data structure 2508.

Node registration module 263 may be configured to track the availability of one or more computational nodes 265. In some examples, node registration module 263 may be implemented as: a software program, such as a software program executed by one or more computational nodes 265, a hardware solution, or a combined software and hardware solution. In some implementations, node registration module 263 may communicate with one or more computational nodes 265, for example, using internal communication module 266. In some examples, one or more computational nodes 265 may notify node registration module 263 of their status, for example, by sending messages: at startup, at shutdown, at constant intervals, at selected times, in response to queries received from node registration module 263, or at any other determined times. In some examples, node registration module 263 may query about the status of one or more computational nodes 265, for example, by sending messages: at startup, at constant intervals, at selected times, or at any other determined times.

Load balancing module 264 may be configured to divide the workload among one or more computational nodes 265. In some examples, load balancing module 264 may be implemented as: a software program, such as a software program executed by one or more of the computational nodes 265, a hardware solution, or a combined software and hardware solution. In some implementations, load balancing module 264 may interact with node registration module 263 in order to obtain information regarding the availability of one or more computational nodes 265. In some implementations, load balancing module 264 may communicate with one or more computational nodes 265, for example, using internal communication module 266. In some examples, one or more computational nodes 265 may notify load balancing module 264 of their status, for example, by sending messages: at startup, at shutdown, at constant intervals, at selected times, in response to queries received from load balancing module 264, or at any other determined times. In some examples, load balancing module 264 may query about the status of one or more computational nodes 265, for example, by sending messages: at startup, at constant intervals, at pre-selected times, or at any other determined times.

Internal communication module 266 may be configured to receive and/or to transmit information from one or more components of remote server 136. For example, control signals and/or synchronization signals may be sent and/or received through internal communication module 266. In one embodiment, input information for computer programs, output information of computer programs, and/or intermediate information of computer programs may be sent and/or received through internal communication module 266. In another embodiment, information received though internal communication module 266 may be stored in memory device 220B, in data structure 250B, or other memory device in system 100. For example, information retrieved from data structure 212A may be transmitted using internal communication module 266. In another example, input data may be received using internal communication module 266 and stored in data structure 212B.

External communication module 267 may be configured to receive and/or to transmit information from one or more components of system 100. For example, control signals may be sent and/or received through external communication module 267. In one embodiment, information received through external communication module 267 may be stored in memory device 220B, in data structures 250A and 250B, and on any memory device in the system 100. In another embodiment, information retrieved from data structure 250B may be transmitted using external communication module 267 to computing device 170.

Aspects of this disclosure may provide a technical solution to the challenging technical problem of providing accessible experiences to web users with disabilities. The technical solution may be implemented in hardware, in software (including in one or more signal processing and/or application specific integrated circuits), in firmware, or in any combination thereof, executable by one or more processors, alone, or in various combinations with each other. Specifically, disclosed embodiments include methods, systems, devices, and computer-readable media. For ease of discussion, system 100 is described above, however, a personal skilled in the art would recognize that the disclosed details may equally apply to methods, devices, and computer-readable media. Specifically, some aspects of disclosed embodiments may be implemented as operations or program codes in a non-transitory computer-readable medium. The operations or program codes can be executed by at least one processor. Non-transitory computer-readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities. In some embodiments, the disclosed methods may be implemented by processing device 210 of computing device 170, server 123, and/or server 133. In other embodiments, the non-transitory computer-readable medium may be implemented as part the memory portion 222 of memory 220 that may contain the instructions to be executed by processing device 210. The instructions may cause processing device 210 corresponding to the at least one processor to perform operations consistent with the disclosed embodiments.

Figure 3:
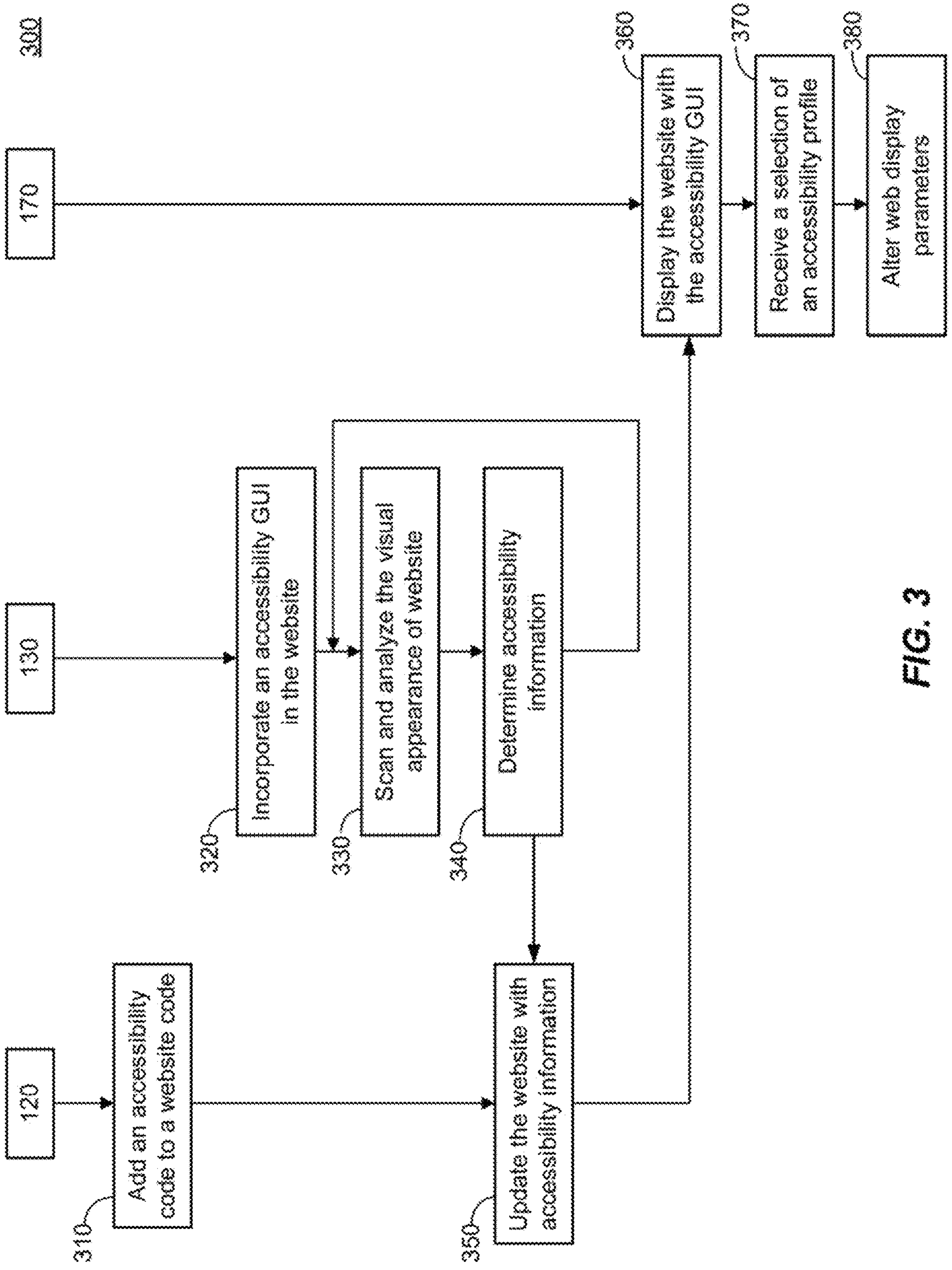
FIG. 3 is a flowchart of an example process for making a website accessible and maintaining its accessibility, consistent with some embodiments of the present disclosure.

FIG. 3 is a flowchart of an exemplary process 300 for making websites accessible for users 110 with different disabilities, according to some embodiments of the present disclosure. In some embodiments, process may be executed by different components of system 100. For example, some steps of process 300 may be implemented by a processing device within website host 120, a processing device within accessibility service host 130, and a processing device within computing device 170. For purposes of illustration, in the following description, reference is made to certain components of system 100. It will be appreciated, however, that other implementations are possible and that any combination of components or devices may be utilized to implement the steps of the exemplary process. It will also be readily appreciated that the illustrated process can be altered to modify the order of steps, delete steps, or further include additional steps, such as steps directed to optional embodiments.

Process 300 begins when processing device 210 (e.g., a processor of website host 120) adds an accessibility code to a code of website 150 (step 310). In some embodiments, the code of website 150 may be a JavaScript code and the added accessibly code may be less than a single line of code. Upon adding the accessibility code, processing device 210 (e.g., a processor of accessibility service host 130) may enable an accessibility GUI to be incorporated in website 150 (step 320). Such incorporation causes the accessibility GUI to be displayed by any computing device 170 when website 150 is opened. In addition, processing device 210 may scan and analyze the visual appearance of website 150 and its website code (step 330). Thereafter and based on the analysis of the visual appearance of website 150 and its website code, processing device 210 may determine accessibility information (step 340). Process 300 may include rescanning the website every period of time to keep it up to date. For example, processing device 210 may scan and analyze the visual appearance of website 150 and its website code every 24 hours to make sure that all new content that was uploaded to the website is accessible.

Process 300 may continue when processing device 210 (e.g., a processor of website host 120) may use the determined accessibility information to update the website with accessibility information (step 350). In one embodiment, the accessibility information may include descriptive information of images depicted on the website. The descriptive information may be audibly presented to visually impaired users that have difficulty seeing images depicted on the website. In another embodiment, the accessibility information may include identification of first elements used as titles but untagged as titles and second elements used as actionable objects but untagged as actionable objects. This enables highlighting titles and actionable objects to impact presentation of content on a computing device of a user with a cognitive disability. Upon updating the website code, the website may be compliant and certified according to accessibility guidelines. Thereafter, computing device 170 may be used to access and display website 150 that includes the accessibility GUI (step 360). As will be described later in greater detail, processing device 210 may receive a selection of an accessibility profile (step 370) and adapt the presentation of website 150 to conform with a disability of the user (step 380). In one embodiment, adapting the presentation of website 150 may include audibly presenting descriptive information of images depicted on the website to visually impaired users. In another embodiment, adapting the presentation of website 150 may include altering one or more web display parameters.

Consistent with the present disclosure, a processing device of system 100 may use machine learning/artificial intelligence (as described earlier) to analyze the visual appearance of website 150 and its website code.

Figure 4A:
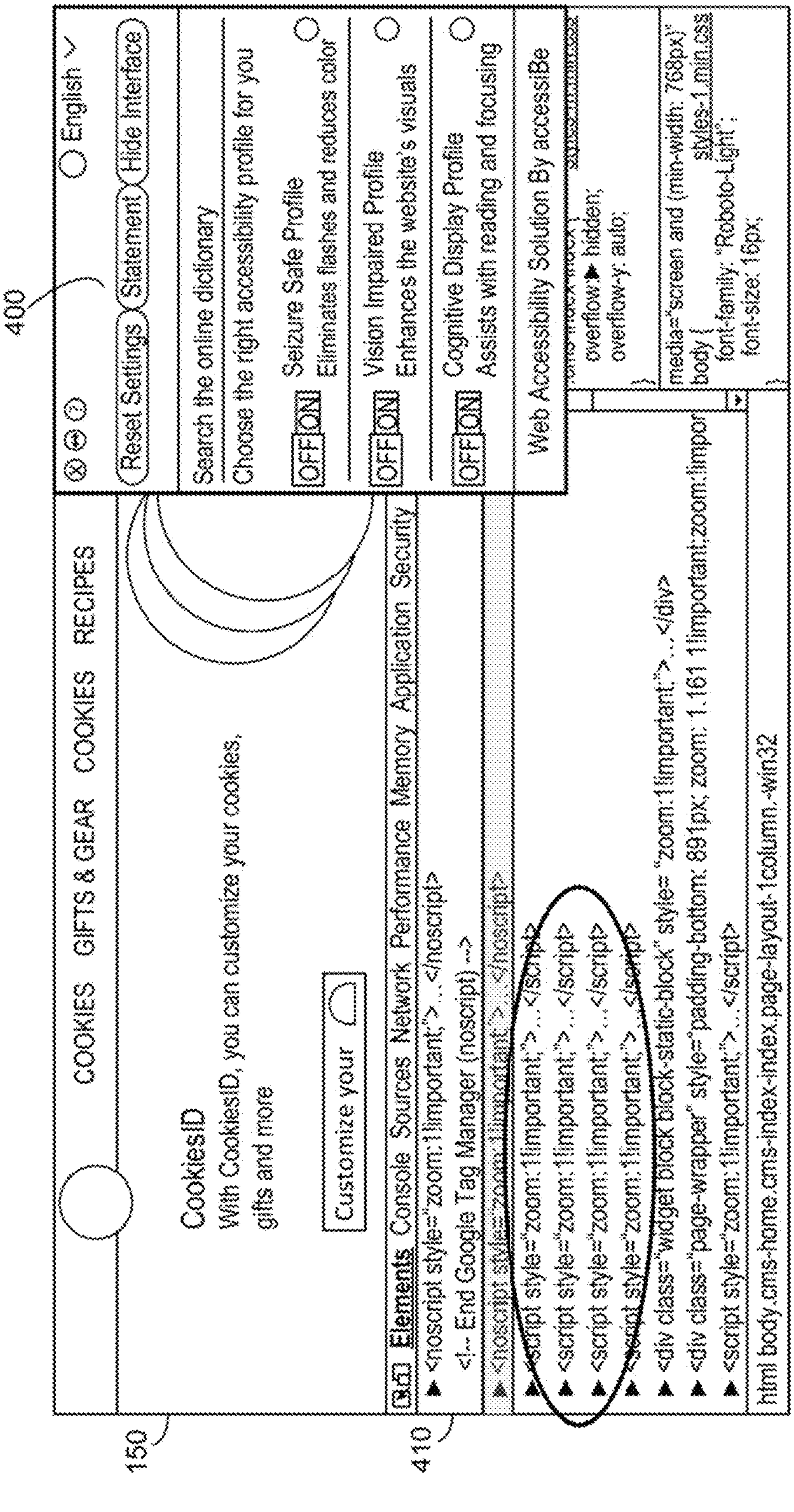
FIGS. 4A and 4B are exemplary illustrations of a website code revision for making a website accessible, consistent with some embodiments of the present disclosure.
Figure 4B:
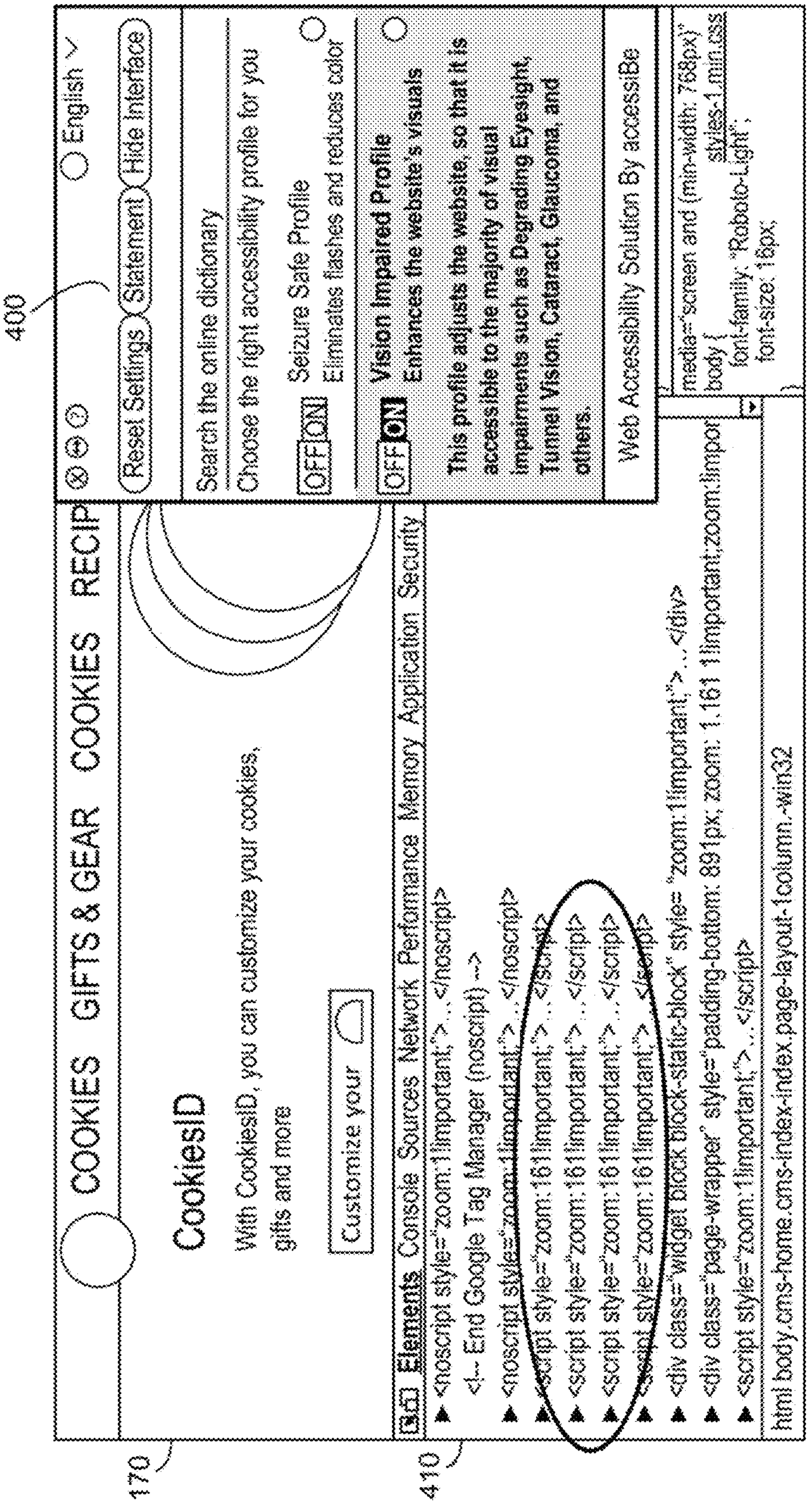

FIGS. 4A and 4B are exemplary illustrations of a website code revision for making a website accessible for a visually impaired user. FIG. 4A depicts website 150 before user 110A selected a vision impaired profile in accessibility GUI 400. The upper half of FIG. 4A depicts a first presentation of website 150 and the lower part of FIG. 4A depicts a first presentation of the website code 410. As shown, the original code indicates that certain text depicted on website 150 is associated with script style of "zoom:1!important." For example, text such as: "CookiesID." The script style of "zoom:1!important" corresponds with values of content scaling parameter and font type parameter which are reasonable for users without visual impairment but may cause difficulty for a visually impaired user.

FIG. 4B depicts website 150 after user 110A selected the vision impaired profile in accessibility GUI 400. The upper half of FIG. 4B depicts a second presentation of website 150 and the lower part of FIG. 4B depicts a second presentation of the website code 410. As shown, the revised code indicates that the script style associated with the same text on the website is now "zoom:1.61!important." These changes are designed for a visually impaired user and are in compliance with the Web Content Accessibility Guidelines. One skilled in the art would recognize that these changes are only exemplary and other changes may be implemented once a user selects the vision impaired profile in accessibility GUI 400. Moreover, additional or other changes associated with other web display parameters may be implemented once a user 110 selects a different profile from accessibility GUI 400.

Some discussed embodiments involve a graphical user interface for enabling selection of a web accessibility profile from a group of profiles. The selection may be associated with predefined adjustments to website display parameters associated with the web accessibility profile. Further, the selection may trigger a bundle of predefined changes in the website display parameters based on the predefined adjustments. The predefined changes may transform a presentation of the website to conform with needs of the user having a disability associated with the selected web accessibility profile.

Some disclosed embodiments enable users to alter website presentations based on selected web accessibility profiles. Enabling may refer to empowering, facilitating, implementing, permitting, approving, letting, making possible, providing the means for, or any way of causing operation. A user may refer to a person or computer that uses a computing device or accesses a website in any manner. A website presentation may refer to an appearance, delivery, demonstration, display, production, arrangement, or any other representation of a website, as discussed more fully in other portions of this disclosure. Altering website presentations may refer to changing, developing, alternating, modifying, or using any other way to make website presentations different. Non-limiting examples of altering a website presentation may include changing a display of a website presentation, changing an order of the website presentation, moving the website presentation to different positions, removing the website presentation, adding content to the website presentation, changing a font size of some or all of the website presentation, changing a color of some or all of the website presentation, changing website display parameters associated with the website presentation, and changing website code associated with the website presentation. For example, the website presentation may be altered in any of the above fashions either entirely or partially. In some embodiments, users may be enabled to alter website presentations based on selected web accessibility profiles. Thus, a user may be able to alter website presentations conditioned on, contingent on, or any other way of depending on selected web accessibility profiles. The web accessibility profiles may be selected by picking, electing, preferring, naming, or in another way choosing the web accessibility profiles. For example, the user may select a web accessibility profile, as discussed more fully in other portions of this disclosure, by user input. The user may use an input device such as a mouse to click on the web accessibility profile displayed on an accessibility graphical user interface for a website. For example, the user may be enabled, via a user interface, to select the web accessibility profile from a group of web accessibility profiles. This selection may occur in a variety of ways. For example, the user may click an item from a pull-down menu, may enter a number corresponding to an item in a list, may check a check box corresponding to a profile, and may enter the profile name by text. The selection may trigger a bundle of predefined changes in a group of website display parameters.

Some disclosed embodiments include displaying an accessibility graphical user interface (GUI) for a website, wherein the accessibility GUI includes a plurality of web accessibility profiles associated with differing disabilities. Displaying an accessibility GUI may refer to demonstrating, exhibiting, presenting, arranging, laying out, showing, featuring, illustrating, or any other way of putting into view the accessibility GUI. Non-limiting examples of displaying the accessibility GUI may include displaying the accessibility GUI for a website by overlaying the accessibility GUI on the website on a desktop or laptop computer screen, virtually displaying the accessibility GUI, displaying the accessibility GUI on a different desktop or laptop computer screen, displaying the accessibility GUI on a mobile device, displaying the accessibility GUI on a tablet, and/or displaying the accessibility GUI on an accessibility device. The accessibility GUI and the website are discussed more fully in other portions of this disclosure. A non-limiting example of an accessibility GUI is a menu, and a non-limiting example of a website is a web page within a larger website (e.g., profile pages on a social networking website). Web accessibility profile is discussed more fully in other portions of this disclosure and an example of a web accessibility profile is a vision impaired profile as discussed more fully in other portions of this disclosure. For example, the accessibility GUI for a web page regarding news may be displayed as a menu pane on a left side of the web page. The accessibility GUI may contain a plurality of web accessibility profiles associated with differing disabilities (e.g., the visual impairment profile, a seizure safe profile, a cognitive display profile) for the user to choose when viewing the display of the webpage. In some examples, the web accessibility profile may be associated with one or more differing disabilities.

Figure 5:
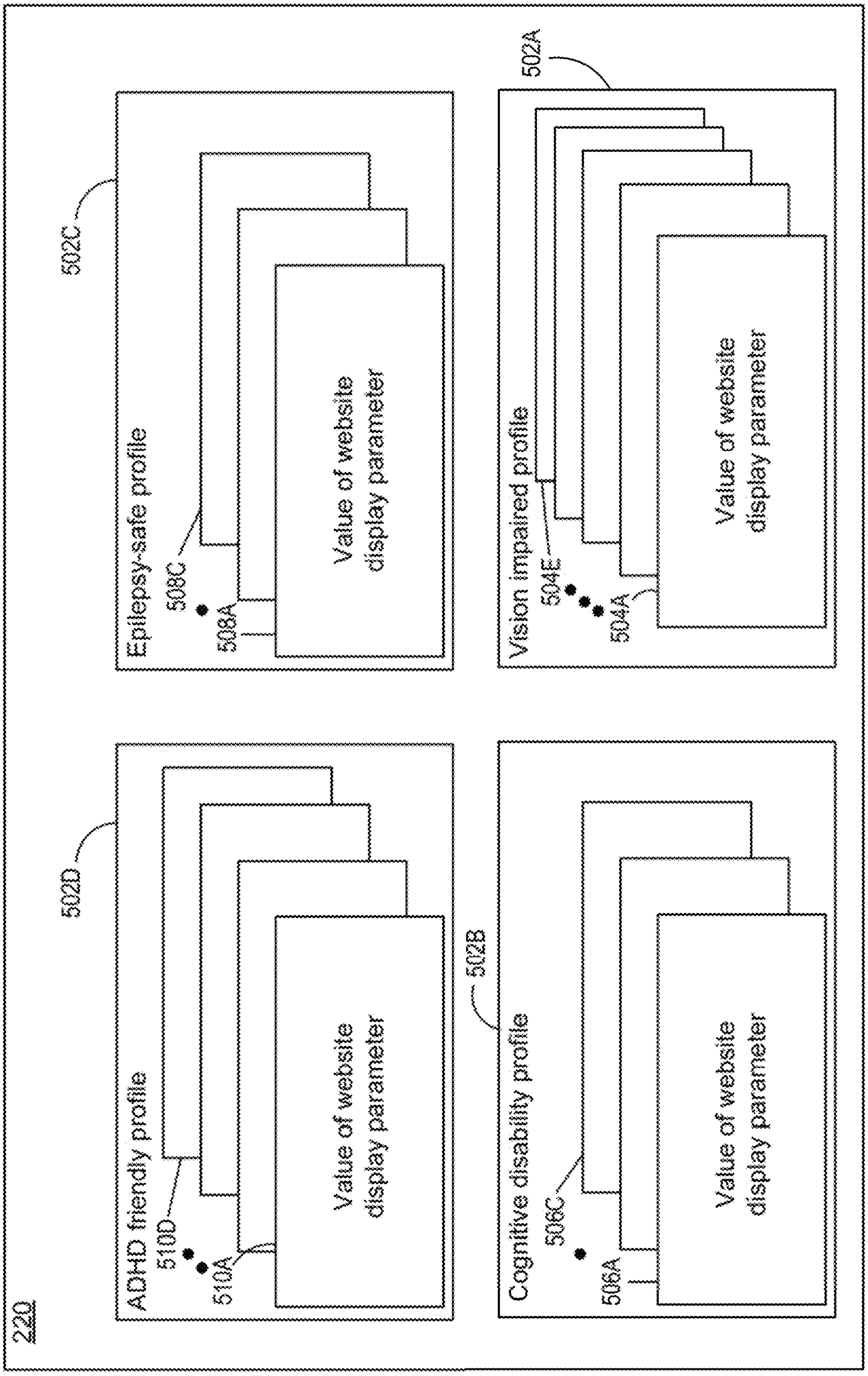
FIG. 5 illustrates an exemplary plurality of web accessibility profiles, consistent with some embodiments of the present disclosure.

By way of example, FIG. 5 illustrates memory device 220. Memory device 220 may store and/or contain a plurality of web accessibility profiles 502. For example, the plurality of web accessibility profiles 502 may include vision impaired profile 502A, cognitive disability profile 502B, epilepsy-safe profile 502C, and ADHD friendly profile 502D. Each web accessibility profile may, by default or by a user input, contain and/or be associated with website display parameters. Vision impaired profile 502A may include website display parameters 504A through 504E. For example, website display parameter 504A may be a content scaling parameter. As another example, website display parameter 504B may be a saturation parameter. Cognitive disability profile 502B may include website display parameters 506A through 506C. For example, website display parameter 506A may be a highlight titles parameter. As another example, website display parameter 506B may be a highlight actionable objects parameter. Epilepsy-safe profile 502C may include website display parameters 508A through 508C. For example, website display parameter 508A may be a saturation parameter. As another example, website display parameter 508B may be a stop animation parameter. ADHD friendly profile 502D may include website display parameters 510A through 510D. For example, website display parameter 510A may be a content scaling parameter. As another example, website display parameter 510B may be a stop animation parameter.

Figure 6:
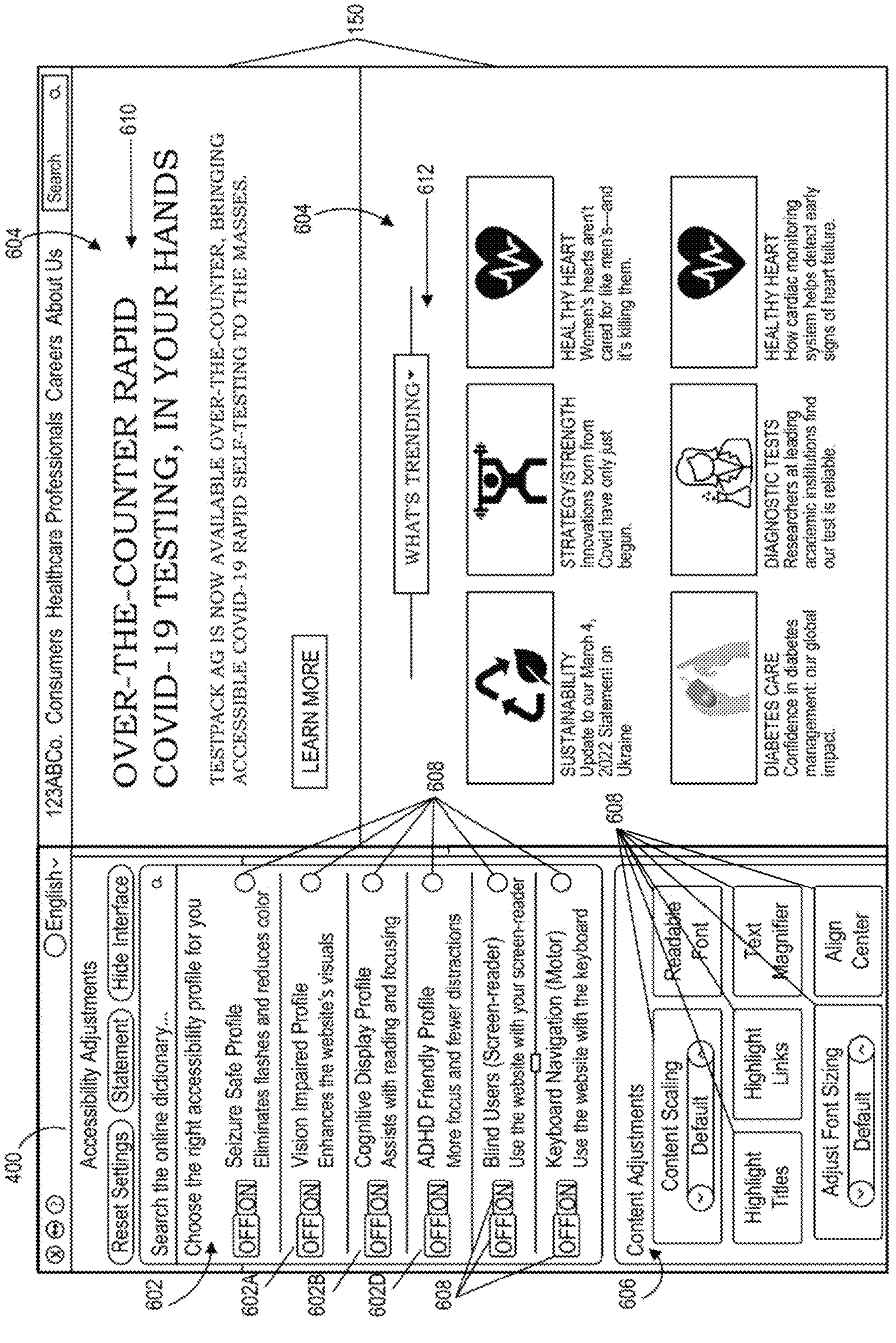
FIG. 6 illustrates an exemplary display of an accessibility graphical user interface for a website, consistent with some embodiments of the present disclosure.

By way of example, FIG. 6 illustrates website 150 that may be displayed as website presentation 604. FIG. 6 also illustrates a display of accessibility GUI 400 for website 150. The display of accessibility GUI 400 contains the plurality of web accessibility profiles 602. For example, accessibility GUI 400 is displayed as a menu on a left side of website 150. As illustrated in FIG. 6, the plurality of web accessibility profiles 602 may include, for example, vision impaired profile 602A, cognitive display profile 602B, seizure safe profile 602C, and ADHD friendly profile 602D. Each of the plurality of web accessibility profiles 602 may be associated with differing disabilities. For example, vision impaired profile 602 may be associated users with disabilities such as degrading eyesight, tunnel vision, cataract, glaucoma, and other sight limiting disabilities. For example, cognitive display profile 602B may be associated with users with cognitive disabilities such as autism, dyslexia, CVA, and others. For example, seizure safe profile 602C may be associated with users with disabilities including different types of epilepsy and migraines. For example, ADHD friendly profile 602D may be associated with users with disabilities related to distractions and/or focus deprivation.

Some disclosed embodiments involve receiving a selection of one of the plurality of web accessibility profiles. Receiving a selection may refer to collecting, gaining, obtaining, or any other way of coming into possession of a choice, selection, election, or any other similar input indicative of a selection or choice of a web accessibility profile from among a plurality of web accessibility profiles. For example, receiving a selection may include receiving an input via an accessibility GUI such as a menu pane on a left side of a web page. The received input may include any type of data inputted by a user using an input device, such as a keyboard, a mouse, a touch pad, a touch screen, a joystick, a microphone, an image sensor, and/or any other device connectable to a computing device. In some examples, the received input may be in the form of at least one of: text, sounds, speech, hand gestures, body gestures, or tactile information. In another example, receiving the selection may be in the form of a predetermined selection. For example, depending on a type of website or web page, a specific web accessibility profile may be predetermined and/or automatically selected by the computer. For example, the user may input the selection of one of the plurality of web accessibility profiles by entering the text "VISION IMPAIRED PROFILE" with the keyboard. In another example, the user may input the selection of one of the plurality of web accessibility profiles by using the mouse to click an "ON" button on the accessibility GUI corresponding to the vision impaired profile or any other web accessibility profile. Alternatively, the user may input a deselection of one of the plurality of web accessibility profiles by using the mouse to click an "OFF" button on the accessibility GUI corresponding to the vision impaired profile or any other web accessibility profile. In another example, the user may speak into the microphone "VISION IMPAIRED PROFILE" connected to the computing device that will then translate and/or synthesize the sound bit into an electrical current and/or signal. The user may also select more than one of the plurality of web accessibility profiles if they so desire to.

By way of example, FIG. 6 illustrates website 150 in the form of website presentation 604 and a display of accessibility GUI 400 in the form of a menu pane on a left side of website 150. Accessibility GUI 400 contains two windowpanes, "Accessibility Adjustments" and "Content Adjustments" 606. Windowpanes of accessibility GUI 400 contain graphical elements 608 in the form of buttons, "ON" and "OFF" toggle buttons, and other buttons including "Content Scaling," "Highlight Titles," "Highlight Links," "Adjust Font Sizing," "Align Center," "Text Magnifier," and "Readable Font." User 110 may select one of a plurality of web accessibility profiles 602 within the display of accessibility GUI 400. For example, user 110 may use an input device such as a mouse to select graphical element 608 button corresponding to vision impaired profile 602A. Alternatively, user 110 may use the mouse to select graphical element 608 "ON" button corresponding to vision impaired profile 602A.

Some disclosed embodiments involve identifying a first predefined adjustment to a first website display parameter associated with the selected web accessibility profile. Identifying a predefined adjustment may refer to detecting, retrieving, recalling, verifying, determining, establishing, finding, or a predefined adjustment for a website display parameter. For example, a predefined adjustment associated with a selected profile may be identified in a database or in a source code. The predefined adjustment may refer to a decided, determined, or prescribed alteration, modification, or any other act or process of changing the website display parameter. In some examples, the predefined adjustment may be defined by or in a predefined template. The predefined template may be associated with the needs of a specific disability of a website user. Non-limiting examples of the predefined adjustment may include specifying or changing values or one or more of a magnification of a website, a font size of content of the website, a color scheme or schema of the website, orientation of the website, position of the website, saturation of a display of the website, volume of audio content related to the website age, image sizes on the website, or spacing on the website. Further non-limiting examples of the predefined adjustment may include synthesizing content of the website from text-to-speech and vice versa, providing audio or textual descriptions of videos of the website, preventing a display of blinking animation of the website, and/or altering the display of blinking animation of the website. In some examples, the predefined adjustment of a website display parameter may be associated with the selected web accessibility profile or more than one selected web accessibility profiles. Website display parameter is discussed more fully in other portions of this disclosure and examples of the website display parameter may include font size, font type, and/or letter spacing.

For example, a selection of one of the plurality of web accessibility profiles may result from a user input using a mouse to click on an "ON" button on an accessibility GUI (e.g., a menu pane on a left side of a website). Following this example, the selected web accessibility profile may be a vision impaired profile. Further, an identified predefined adjustment may be a change in website display parameters including the font type, font size, and letter spacing of a main header on the website. These website display parameters may, in some examples, be associated with the selected web accessibility profile, vision impaired profile.

By way of example, FIG. 6 illustrates accessibility GUI 400 and one windowpane within accessibility GUI 400 is "Content Adjustments" 606. As described above, "Content Adjustments" 606 may include graphical elements 608 corresponding to predefined adjustments to website display parameters 504A-E, 506A-C, 508A-C, and 510A-D. In some examples, predefined adjustments and/or website display parameters 504A-E, 506A-C, 508A-C, and 510A-D may be associated with a selected web accessibility profile from a plurality of web accessibility profiles 602. For example, the selected web accessibility profile 602 may be vision impaired profile 602A. Further, identified first predefined adjustments associated with vision impaired profile 602A may include changing the font of main header 610 on website 150 to a readable font and adjusting the font sizing of main header 610 by user 110 selecting corresponding graphical elements 608 to each, respectively. Alternatively, first predefined adjustments may be identified automatically. A computing device may automatically identify first predefined adjustments.

Some disclosed embodiments involve initiating a first change in the first website display parameter based on the identified first predefined adjustment to thereby address a first aspect of the disability associated with the selected web accessibility profile. Initiating a change in a website display parameter may refer to beginning, implementing, instituting, starting, or any other way of causing or facilitating a revision, adjustment, modification, deletion, addition, correction, and/or refinement to the website display parameter. An example of initiating a change in the website display parameter may involve accessing a website's code which may include software, firmware, and/or microcode, and may refer to programs, routines, functions, classes, data structures, and/or objects. The website code may include descriptive text, such as HyperText Markup Language or extensible markup language that is parsed upon initiating a first change. In another example, the website code may be in the form of assembly code or object code generated from source code by a compiler. Whatever form the website code is in, the website code itself, upon initiating the first change, may be updated, changed, or revised to address a disability of a user. Non-limiting examples of changing the website display parameter may include increasing or decreasing a font size of content on a website, a change of a font type of content on the website, or an increase or decrease of letter spacing of content on the website. The change of the website display parameter may be based on an identified, selected, or generated predefined adjustment. The change in the website display parameter may be initiated to address a first aspect of the disability. Addressing an aspect of a disability may refer to a directing efforts, commands, or attention to a feature, characteristic, or manner of a disability to alleviate or help ease the related features and/or characteristics of the disability. A disability may refer to an ailment, a disorder, an impairment, an injury, an affliction, an inability, an incapacity, an incompetency, or any other physical, mental, cognitive, or developmental condition that impairs, interferes with, or limits a person's ability. Non-limiting examples of disabilities may include a visual impairment, a seizure disorder, a cognitive disability, a neurodevelopmental disorder, and an audio impairment.

Further, the change of the website display parameter may be based on the predefined adjustment to address an aspect of a disability associated with a selected web accessibility profile. The change of the website display parameter may be automatic or based on a user input or an input indicative of a connected accessibility device. For example, the change of the website display parameter may be automatic and associated with or based on the type of website accessed by the user, the time the website is accessed by the user, or the geographic location or IP address of the user when accessing the website. Non-limiting examples of types of websites include news-type websites, sports websites, article websites, scholarly websites, and gaming websites. Non-limiting examples of the website is accessed may be in the morning of the day, the afternoon of the day, or during the night.

For example, a user may select a vision impaired profile as the web accessibility profile. The vision impaired profile may be associated with website display parameters, for example, font type, font size, and letter spacing of a main header on a website. In some examples, predefined adjustments may be changes in the associated website display parameters and the changes may include changing the font type of the main header on the website, increasing the font size of the main header on the website, and/or increasing letter spacing of the main header on the website. The changes to the associated website display parameters may address aspects of a disability associated with the vision impaired profile. For example, the user may be visually impaired and find it difficult to navigate and read the website. By changing the font type of the header to an easier-to-read font type, increasing the font size of the main header, and increasing letter spacing of the main header, the user may be able to more easily and/or clearly navigate and read the website. Thus, the changes to the associated website display parameters may address aspects of the user's disability.

Figure 7:
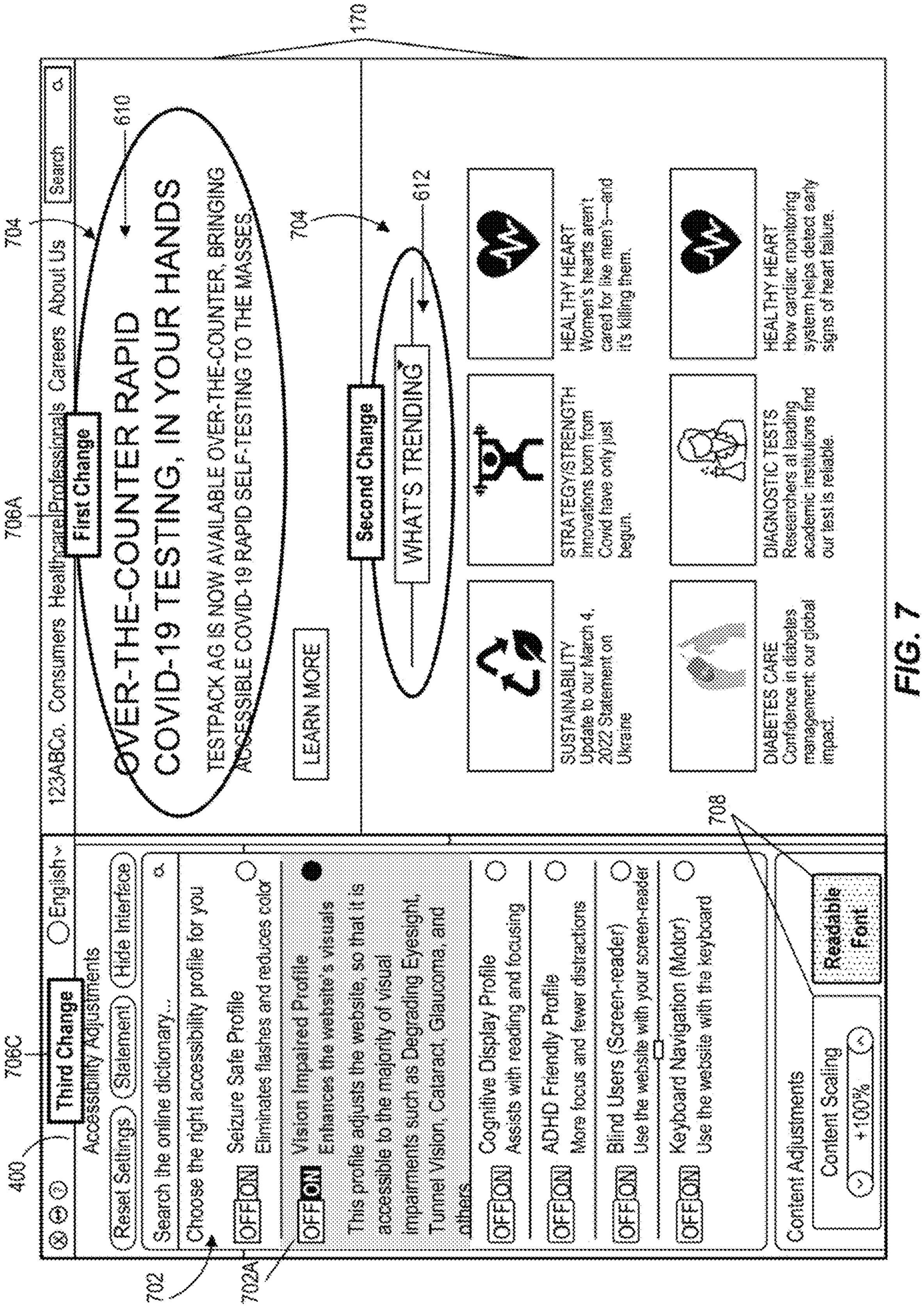
FIG. 7 illustrates an exemplary transformation of a display of a website, consistent with some embodiments of the present disclosure.

By way of example, FIG. 7 illustrates website 150 in the form of transformed website presentation 704 and a display of accessibility GUI 400 in the form of a menu pane on a left side of website 150. FIG. 7 illustrates a selection of vision impaired profile 702A. As discussed above, identified first predefined adjustments to changing font type 504A and adjusting font sizing 504B may include changing font type 504A of main header 610 on website 150 to a readable font and increasing font sizing 504B of main header 610. When comparing first header 610 in FIG. 6 with first header 610 in FIG. 7, it becomes clear that first change 706A has been initiated in first predefined adjustments—including changing font type 504A of main header 610 and increasing font sizing 504B of main header 610. By initiating first change 706A, user's 110 disability, such as a visual impairment, may be addressed. By changing font type 504A of main header 610 to a readable font and adjusting font sizing 504B of main header 610, user 110 may more easily and/or clearly navigate and read website 150.

Some disclosed embodiments involve identifying a second predefined adjustment to a second website display parameter associated with the selected web accessibility profile. Some disclosed embodiments further include initiating a second change in the second website display parameter based on the identified second predefined adjustment to thereby address a second aspect of the disability associated with the selected web accessibility profile. In some embodiments, the operations further include identifying a third predefined adjustment to a third website display parameter associated with the selected web accessibility profile and initiating a third change in the third website display parameter based on the identified third predefined adjustment to thereby address a third aspect of the disability associated with the selected web accessibility profile. As discussed above, first identified predefined adjustments may be changes in first website display parameters, associated with a web accessibility profile, including changing a font type of a main header on a website, increasing a font size of the main header on the website, and increasing letter spacing of the main header on the website. The web accessibility profile may be the vision impaired profile. In addition to identifying first predefined adjustments to first website display parameters associated with the vision impaired profile, second predefined adjustments to second website display parameters associated with the vision impaired profile may be identified. For example, second predefined adjustments may be changes in second website display parameters, associated with the vision impaired profile, including changing a font type of a sub header on the website, increasing a font size of the sub header on the website, and increasing letter spacing of the sub header on the website. Advantageously, more than one predefined adjustment to website display parameters may be identified that may be associated with the selected web accessibility profile. Thus, more than one change may be initiated to address more than one aspects of the disability associated with the selected web accessibility profile. In some examples, more than one web accessibility profile may be selected, so that multiple predefined adjustments to multiple website display parameters may be identified. After identifying multiple predefined adjustments, multiple changes may be initiated to the identified multiple predefined adjustments to address multiple aspects of multiple disabilities associated with the more than one web accessibility profiles. This may be ideal if the user selects both a vision impaired profile and an ADHD friendly profile, as some users may have more than one disability.

By way of example, FIG. 7 illustrates website 150 in the form of transformed website presentation 704 and a display of accessibility GUI 400 in the form of a menu pane on a left side of website 150. FIG. 7 illustrates the condition when a vision impaired profile 702A is selected by the user. In this example, the first predefined adjustments may include changing first website display parameters 504A and 504B, which may initiate first change 706A to main header 610 by changing font type 504A and adjusting font sizing 504B may include changing font type 504A of main header 610 on website 150 to a readable font and increasing font sizing 504B of main header 610. In addition, in this example, second predefined adjustments may include changing second website display parameters 504C and 504D associated with vision impaired profile 702A. Second website display parameter 504C may include changing font type 504C of sub header 612 on website 150 to a more readable font and adjusting font sizing 504D of sub header 612. Once second website display parameters 504C and 504D are identified, second change 706B may be initiated based on identified second website display parameters 504C and 504D. When comparing sub header 612 in FIG. 6 with sub header 612 in FIG. 7, it becomes clear that second change 706B includes changing font type 504C of sub header 612 and increasing font sizing 504D of sub header 612. By initiating second change 706B, user's 110 disability, such as the visual impairment, may be additionally addressed. By changing font type 504C of sub header 612 to a readable font and increasing font sizing 504D of main header 612, user 110 may more easily and/or clearly navigate and read website 150. In addition to the above, third predefined adjustments to third website display parameters 504E associated with vision impaired profile 702A may also be identified. Third website display parameter 504E may include content scaling of website 150. Once third website display parameter 504E is identified, third change 706C may be initiated based on identified third website display parameters 504E.

In some embodiments, the first display parameter and the second display parameter are selected from a group including: content scaling, readable font, highlight titles, highlight links, text magnifier, font size, line height, letter spacing, align center, align left, align right, contrast, monochrome, saturation, text colors, title colors, background color, mute sounds, hide images, read mode, reading guide, stop animation, highlight hover, and cursor appearance. Content scaling may refer to adjusting, increasing, or decreasing content on a website. Non-limiting examples of content scaling may include adjusting a website's aspect ratio, increasing a website's screen size, and decreasing a website's screen size. Content scaling may be done automatically. The processor may scale the content of the website by accessing a meta viewport tag included in the <head> of the HyperText Markup Language of the website. A readable font may refer to an arrangement of typefaces and/or words to make written content flow or able to be read or interpreted in an easy and/or accessible manner. Non-limiting examples of a readable font may include Times New Roman, Verdana, Arial, Tahoma, Calibri, and Helvetica. Highlight titles may refer to accents, emphases, features, bringing out, calling attention to, or underlining titles. Title may refer to a header on the website or any other descriptive name, word, characters, or combinations thereof. An example of a highlight may include a colored overlay applied to one or more titles. The colored overlay may be in any color. Links may include an identifier attached to an element in a system to indicate or permit connection with other similarly identified elements, especially one in a computer file. Links may also be highlighted. Text magnifier may refer to an object that makes objects, including text, look larger or smaller. For example, the text magnifier may be associated with and/or connected with a user input device such as a mouse. Thus, anywhere the user points the mouse on the website, that part of the website would be magnified to help the user read and/or navigate the website. Font size may refer to how large and/or small characters appear. Non-limiting examples of font size may include 8 points (pt), 10 pt, 12 pt, and 14 pt. 1 inch contains approximately 72 (72.272) pts. Thus, the font size of 72 would be about one inch tall. Line height may refer to a distance between lines of text. Non-limiting examples of line height may include 0.5×, 1×, 1.5×, 2×, and 3×. Letter spacing may refer to a distance of horizontal whitespace between letters or characters in a block of text. Aligning center, left, or right may refer to the appearance and/or orientation of edges of a paragraph or block of text. Non-limiting examples of alignment may include left-aligned text, centered text, right-aligned text, and justified text. Contrast may refer to the difference in light between font and a background of the website. Monochrome may refer to a visual art characteristic in which an image on the website or the website itself is composed of varying shades of the same color. Non-limiting examples may include grayscale, a hue of sepia, and a hue of cyan. Saturation may refer to an intensity of a color on the website. Text may refer to an object that may be read. Background may refer to an area that fills a screen of the website. The text and background may be colored. Mute sounds may refer to deadening, muffling, or softening one or more sounds. Hiding images may include putting and/or keeping out of sight or concealing from view one or more images. A read mode may refer to adjusting the website according to a screen size. Non-limiting examples of read mode may include a horizontal read mode and a vertical read mode. A reading guide may refer to an assisted or navigated reading process. Stopping animation may include bringing an animation, event, action, or process of the website to an end. Non-limiting examples of stopping animation may include preventing a blinking animation and altering an animation's rate of change. The highlight hover display parameter may allow a user to point to an area on a website using an input device such as a mouse and then highlighting that area. A cursor appearance may refer to a shape that indicates where anything that is typed and/or pointed to by the user will appear on a display of a computer screen. In some embodiments, the website may have an associated set of default values for the website display parameters discussed above.

By way of example, FIG. 6 illustrates a display of accessibility GUI 400 for website 150. Accessibility GUI 400 is split into two windowpanes, "Accessibility Adjustments" and "Content Adjustments" 606. Website display parameters may be represented by corresponding graphical elements 608. In some embodiments, first website display parameters 504A and 504B and second website display parameters 504C and 504D for vision impaired profile 602A may be selected from a group. "Content Adjustments" 606 is an example of such group and, in one example, includes "Content Scaling," "Readable Font," "Highlight Titles," "Highlight Links," "Adjust Font Sizing," "Align Center," and "Text Magnifier," which all correspond to their own graphical elements 608 in the form of user clickable buttons.

In some embodiments, at least one of the first predefined adjustment and the second predefined adjustment are determined based on previously collected data. Data may be included or accessed in a data structure. As discussed elsewhere in this disclosure, data structures may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. Previously collected data may refer to data that was already gathered. This data may include a selection of a particular accessibility profile, selection of a specific font type or font size, or any other website display parameters. In some embodiments, the previously collected data may be associated with a specific user that selected the web accessibility profile. Advantageously, the previously collected data may be collected by the network when a specific user first uses and/or logs into the network. Upon using and/or logging into the network, the specific user may select a web accessibility profile vision impaired profile. Thus, the previously collected data may be stored in an associated memory and/or saved to the specific user's profile to avoid redundant collections of the same data. For examples, at least one of a first predefined adjustment and a second predefined adjustment may be determined based on previously collected data and therefore may be linked to the user's profile vision impaired profile. Depending on the user profile, different first predefined adjustments and different second predefined adjustments may be determined based on different previously collected data. In some embodiments, the previously collected data may be associated with multiple users having the disability associated with the selected web accessibility profile. For example, a processor may collect data over time from multiple computing devices used by multiple users with the same disability and web accessibility profile. This collected data may be stored in a shared memory. This previously collected data may be used to determine better or more accurate adjustments to website display parameters to increase the efficiency and/or accuracy of displaying and modifying websites for users with the disability.

In some embodiments, at least one of the first predefined adjustment and the second predefined adjustment are determined based on a Web Content Accessibility Guideline. Web Content Accessibility Guideline may refer to recommendations for making web content more accessible, primarily for people with disabilities. An example of Web Content Accessibility Guidelines includes WCAG 2.1. For example, at least one of the first predefined adjustment and the second predefined adjustments may be changes according to WCAG 2.1. For example, at least one of the first predefined adjustment and the second predefined adjustment may be a change according to WCAG standard 1.3.4 to ensure that web content can be displayed in the preferred orientation (e.g., portrait, landscape) of a user, a change according to WCAG standard 1.3.6 to help identify the user, or a change according to WCAG standard 1.4.10 to support low vision users by enabling easier readability and tracking through responsive design. In some embodiments, the first predefined adjustment may be associated with a binary value, and the second predefined adjustment may be associated with a range value. Binary value may refer to two values, numbers expressed in the base-2 numeral system, the binary numeral system, or a method of mathematical expression which uses only two symbols. Non-limiting examples of binary values include “0” (zero) and “1” (one). A range value may refer to a number or set of numbers that vary or extend between specified limits or more than two values in between a maximum and a minimum. A non-limiting example of a range value may be a font size between 8 pt and 72 pt. For example, the first predefined adjustment may be associated with a binary value of either “0” or “1.” “0” may indicate that the first predefined adjustment, changing the magnification of the website, is “OFF.” “1” may indicate that the first predefined adjustment, changing the magnification of the website, is “ON.” For example, the second predefined adjustment may be associated with a range value between 8 pt and 72 pt for the font size. The second predefined adjustment may be changing the font size from 8 pt to 16 pt.

In some embodiments, initiating the first change and the second change transform a presentation of the website to conform with needs of a user having the disability associated with the selected web accessibility profile. Transforming a presentation of the website may refer to changing, developing, alternating, modifying, or adjusting in any other way the website’s appearance, delivery, demonstration, display, arrangement, or any other representation of the website, as discussed more fully in other portions of this disclosure. Non-limiting examples of transforming the presentation of the website may include changing a display of the website presentation, changing an order of the website presentation, moving the website presentation in different positions, removing the website presentation, adding content to the website presentation, changing the font size of the website presentation, changing the color of the website presentation, changing website display parameters associated with the website presentation, and changing website code associated with the website presentation. In some embodiments, the transformation of the presentation of the website may be cause the website to conform with needs of a user having a disability associated with a selected web accessibility profile. Conforming with needs of a user having a disability may refer to accommodating, complying, harmonizing, reconciling, or tailoring the website to the requirements, necessities, wants, or demands associated with the user’s disability. For example, the selected web accessibility profile may be a vision impaired profile. A user who selects this profile may have a disability including being visually impaired and finding it difficult to navigate and/or read the website and its presentation. Thus, the user may have needs relating to clarity of reading of the website and easier navigation of the website. In this case, transformation of the presentation of the website to conform with the user’s disability may include making a first change in a first website display parameter based on an identified first predefined adjustment and making a second change in a second website display parameter based on an identified second predefined adjustment. For example, the transformation of the presentation of the website may include one or more of changing a font type, increasing a font size, and/or increasing letter spacing of a main header and sub header of the website.

By way of example, FIG. 6 illustrates website 150 in the form of presentation 604. FIG. 7 illustrates website 150 transformed into presentation 704. Website 150 may be transformed from presentation 604 to presentation 704 after initiating first change 706A and second change 706B. Website 150 may transform from presentation 604 to presentation 704 to conform with needs of user 110 having a disability associated with a selected web accessibility profile. For example, the selected web accessibility profile may be vision impaired profile 702A selected from a plurality of web accessibility profiles 702 as indicated in accessibility GUI 400. A user who selects this profile 702A may have a disability including being visually impaired and find it difficult to navigate and/or read website 150 and its presentation 604. Consistent with the above example, website’s 150 transformation from presentation 604 to presentation 704 may include first change 706A in first website display parameters 504A and 504B (e.g., changing a font type to a readable font type and increasing a font size of a main website header) based on an identified first predefined adjustment. Transformation of website 150 may also include second change 706B in second website display parameters 504C and 504D (e.g., changing a font type to a readable font type and increasing a font size of a sub header) based on an identified second predefined adjustment.

There are several well-known disabilities, such as, attention deficit hyperactivity disorder, learning disabilities, mobility disabilities, medical disabilities, psychiatric disabilities, traumatic brain injury, post-traumatic stress disorder, visual impairments, deaf and hard of hearing, concussion, and autism spectrum disorders. The disclosed embodiments provide web accessibility profiles associated with these disabilities. In some embodiments, the plurality of web accessibility profiles may include more than two profiles. In some embodiments, the plurality of web accessibility profiles include at least two of: an epilepsy-safe profile, a vision impaired profile, a cognitive disability profile, and an ADHD friendly profile. An epilepsy-safe profile, as discussed more fully in other portions of this disclosure, may refer to a profile designed to eliminate the risk of seizures that result from flashing or blinking animations and risky color combinations. This profile is especially advantageous for users with seizure disorders, including different types of epilepsy and migraines, which may be in reaction to visual flickering or audio signals at certain frequencies or patterns. A vision impaired profile, as discussed more fully in other portions of this disclosure, may refer to a profile designed for users with disabilities such as degrading eyesight, tunnel vision, cataract, glaucoma, and sight limiting disabilities. A cognitive disability profile, as discussed more fully in other portions of this disclosure, may refer to a profile designed to help users with cognitive disabilities such as autism, dyslexia, CVA, and others, to focus on essential elements more easily. An ADHD friendly profile, as discussed more fully in other portions of this disclosure, may refer to a profile designed to help users with ADHD and neurodevelopmental disorders browse, read, and focus on essential elements more easily.

By way of example, FIG. 6 illustrates accessibility GUI 400 and lists a plurality of web accessibility profiles 602. Web accessibility profiles may include “visual impairment profile" 602A, "cognitive disability profile" 602B, "Seizure Safe Profile" 602C, and "ADHD Friendly Profile" 602D. In some embodiments, the plurality of web accessibility profiles 602 may include the one, two, or all of the above-mentioned web accessibility profiles.

In some embodiments, the transformed presentation may differ from a default website presentation. Default website presentation may refer to an original or starting presentation of a website. Thus, in some embodiments, the transformed presentation of the website may be different in at least one aspect, from the default website presentation. A non-limiting example of the default website presentation may be its native programmed presentation. For example, the default website presentation of ESPN.com may include the website and related pop-up advertisements and images and instant play videos. The transformed presentation of ESPN.com may include the website but not the related pop-up advertisements, images, nor instant play videos for easier accessibility.

In some embodiments, the operations are executed in a browser session upon receiving a script from a remote server. A browser session may refer to any action or series of actions by a user on a website within a time frame. Non-limiting examples of actions during a browser session may include search engines searches, filling out forms to receive content, scrolling on the website page, adding items to a virtual shopping cart, or simply viewing the website page itself. For example, the browser session may begin once the user first accesses the website and may end at a time when the user exits and/or leaves the website. Script may refer to a program or sequence of instructions that is interpreted or carried out by another program, which may be executed by a processor. Non-limiting examples of script languages may include Perl, Rexx, JavaScript, and Tcl/Tk. A server may refer to a piece of computer hardware or software that provides functionality for other programs or devices. Non-limiting examples of a server may include a web server, an application server, a communications server, a name server, an application programming interface, a database server, a file server, a game server, a media server, and a proxy server. Servers may be centralized, remote, and local. A remote server may include a computer that is remotely located having a web server software, database, and other resources to handle remote requests sent by the user of the website. For example, the remote server, during the browser session, may send a local script (that may be processed on the user's computing device) to invoke a remote script on the remote server for processing information. A non-limiting example of executing the operations in the browser session upon receiving the script from the remote server may include JavaScript Remote Scripting (JSRS). JSRS may use HyperText Markup Language, a document object model, a transport layer, and a data format. The document object model may be manipulated through JavaScript to dynamically display and interact with the website. In some embodiments, a script tag or an iframe may be used instead of a transport layer.

Some embodiments involve displaying in the accessibility GUI graphical elements for customizing the selected web accessibility profile; upon initiating the first and second changes, receiving input indicative of a desired change in at least one of the first and second website display parameters; and adjusting the at least one of the first and second website display parameters based on the input to implement the desired change. Graphical elements may refer to objects that show relationships, hierarchy, and emphasis virtually. Non-limiting examples may include icons, menus, scroll bars, windows, transitional animations, and dialogue boxes. Customizing a selected web accessibility profile may include changing, modifying, adjusting, correcting, reshaping, revising, reworking, tweaking, varying, or altering a web accessibility profile. For example, an accessibility GUI may be in the form of a menu pane on a left side of a website. The accessibility GUI pane may include graphical elements such as an "Accessibility Adjustments" window pane, "ON" and "OFF" buttons/toggles, a "Reset Settings" button, a "Statement" button, a "Hide Interface" button, a query window "Search the online dictionary . . . ," circular icons adjacent to each web accessibility profile to indicate a selection of one or more than one of the web accessibility profiles, a "Content Adjustments" window pane, a "Content Scaling" window pane with a button to increase or decrease content scaling of the website, an "Adjust Font Sizing" window pane with a button to increase or decrease the font size of the website, and one or more buttons labeled "Highlight Titles," "Highlight Links," "Readable Font," "Text Magnifier," and "Align Center." Although some exemplary graphical elements have been described above, it is contemplated that the accessibility GUI may include one or more additional or alternative graphical elements that may allow a user to adjust, change, or modify one or more website display parameters. The one or more graphical elements may allow a user to customize the one or more selected web accessibility profiles.

In some embodiments, after a user selects a web accessibility profile one or more display parameters such as a first website display parameter and a second website display parameter may be changed from their default values. Subsequently, input indicative of a desired change in at least one of the first change and the second change may be received. In response, the first and/or the second display parameter may be further modified based on the received input. Advantageously, this may allow users to further change and/or modify the website. For example, the first change may be a change of a font type from Calibri to Anal and the second change may be a change from a font size of 8 pt to a font size of 10 pt. After these changes have been made, input may be received for changing and/or adjusting the at least one of the first and second website display parameters. For example, an input may be received to change the font type from the font type Arial to the font type Times New Roman. Additionally, or alternatively, an input may be received to change the font size from the font size of 10 pt to the font size of 12 pt. Thus, even after selecting a web accessibility profile, the user may modify the changes to website display parameters to further fine tune the display of the website.

In some embodiments, upon initiating the first and second changes associated with a first selected web accessibility profile, a selection of a second web accessibility profile different from the first selected web accessibility profile may be received; reverting values of the first and second website display parameters to default values; and initiating at least one additional change to transform the presentation of the website to conform with needs of a user having the disability associated with the second web accessibility profile. A user may enter input on a computing device to select a second web accessibility profile. For example, the user may use a keyboard and/or mouse associated with the computing device to select from a graphical user interface and/or display a graphical element corresponding to the second web accessibility profile. For example, a first selected web accessibility profile may be a vision impaired profile. Another selection of a second web accessibility profile may be received that may be different than the first selected web accessibility profile. For example, the second web accessibility profile may be received of an ADHD Friendly Profile. Reverting values of the first and second website display parameters may include returning or changing the first and second website display parameter values to a previous or default state and/or values. Default values may refer to values and/or parameters preselected and/or predetermined by a computer program or other mechanism when no alternative is specified by a user or programmer. Advantageously, when a different web accessibility profile is selected, the first and second website display parameters, may be reverted to default website display parameters. In some embodiments, the default website display parameters may be associated with or correspond to the different web accessibility profile. Further, at least one additional change may be made to transform a presentation of the website to conform with needs of the user having a disability associated with the second web accessibility profile. For example, if the second web accessibility profile is the ADHD Friendly Profile the at least one additional change made may be removing advertisements, images, or other distractors from the presentation of the website. Some embodiments involve initiating the at least one additional change to transform the presentation of the website to conform with needs of the user having disabilities associated with both the first selected web accessibility profile and the second web accessibility profile. For example, the at least one additional change to transform the presentation of the website may be made to conform with needs of the user having disabilities associated with both the vision impaired profile and the ADHD Friendly Profile. This may be advantageous for users who have more than one disability.

In some embodiments, the web accessibility profile selection may be stored to thereby enable accessibility of the user during a future browsing session without reselection of the web accessibility profile. Web accessibility profiles may be stored in a memory. Memory, as discussed more fully in other portions of this disclosure, may include a RAM, a ROM, a hard desk, or any other mechanism capable of storing instructions. A future browsing session may refer to a browser session at a future time and not the first or current browsing session at the first or current time. Advantageously, a user's selection of a web accessibility profile may be saved and/or stored for future retrieval during future browsing sessions so that the user does not need to select his or her web accessibility profile every browsing session. For example, the selection may be stored in a memory, in a database, in a table, in a relational table, or in a linked list. The selection, no matter how it is stored, may be associated with a user identifier. The user identifier may include an IP address, a name of the user, and the type of disability or disabilities. In a future browsing session, previous selections may be retrieved by a processor. For example, the user may enter, via a computing device, a user identifier. This user identifier is then compared to previously stored selection's user identifiers to determine a match. Once a match is made, the previously stored selection, with a matching user identifier to the one entered, may be selected.

According to another embodiment of the present disclosure, a method for enabling users to alter website presentations based on selected web accessibility profiles may be provided. Such an exemplary method includes displaying an accessibility GUI for a website, wherein the accessibility GUI may include a plurality of web accessibility profiles associated with differing disabilities. Such a method further includes receiving a selection of one of the plurality of web accessibility profiles. The exemplary method additionally includes identifying a first predefined adjustment to a first website display parameter associated with the selected web accessibility profile. Such a method further includes initiating a first change in the first website display parameter based on the identified first predefined adjustment to thereby address a first aspect of the disability associated with the selected web accessibility profile. The method additionally includes identifying a second predefined adjustment to a second website display parameter associated with the selected web accessibility profile. Moreover, such an exemplary method includes initiating a second change in the second website display parameter based on the identified second predefined adjustment to thereby address a second aspect of the disability associated with the selected web accessibility profile. In some embodiments, initiating the first change and the second change transforms a presentation of the website to conform with needs of a user having the disability associated with the selected web accessibility profile.

Figure 8:
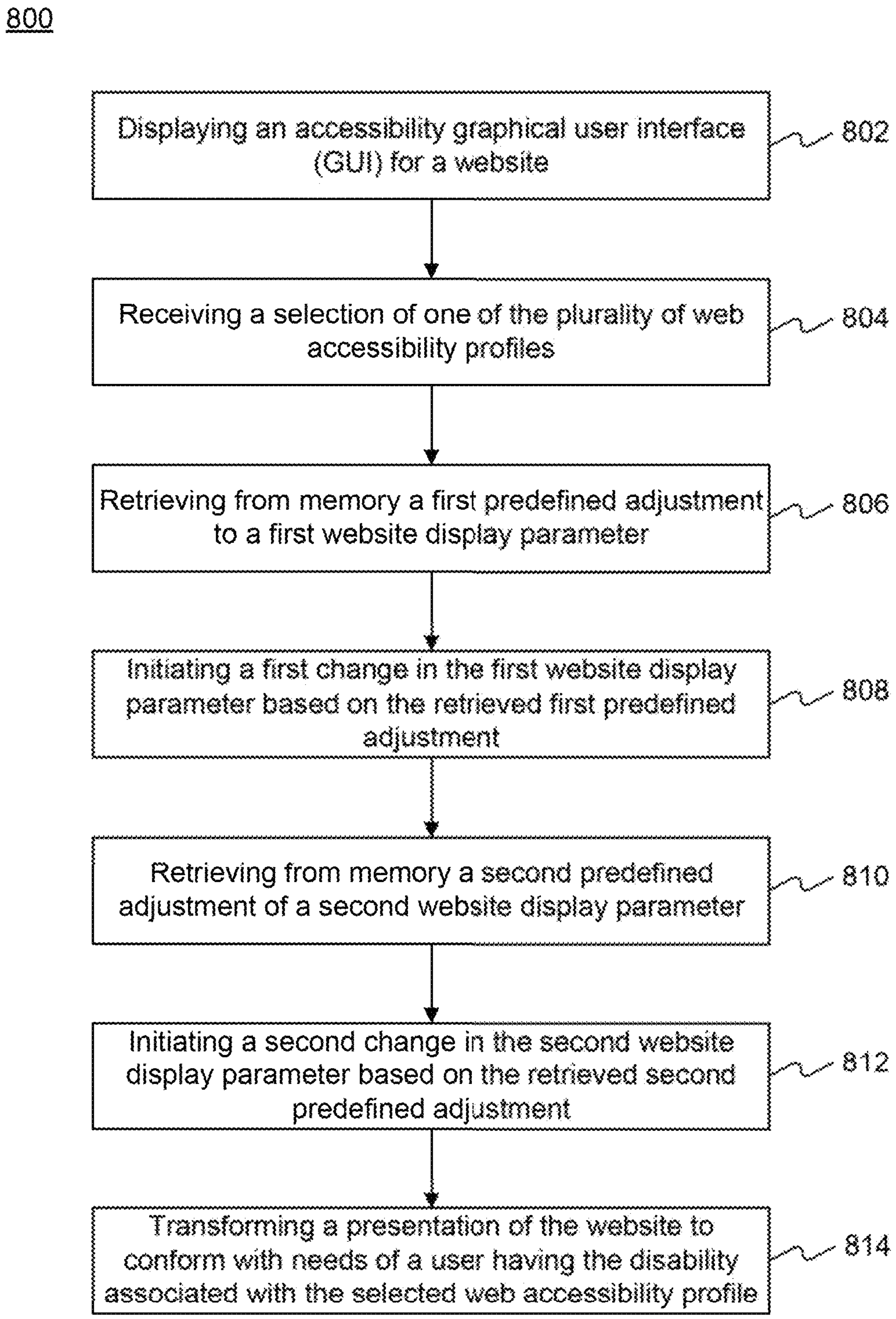
FIG. 8 illustrates an exemplary method for enabling users to alter website presentations based on selected web accessibility profiles, consistent with some embodiments of the present disclosure.

By way of example, FIG. 8 illustrates an exemplary method 800 for enabling users 110 to alter website 150 presentations 604 based on selected web accessibility profiles. The steps of the disclosed method 800 may be modified in any manner, including by reordering steps and/or inserting or deleting steps. Method 800 includes a step 802 of displaying accessibility graphical user interface (GUI) 400 for website 150, wherein accessibility GUI 400 includes a plurality of web accessibility profiles 602 associated with differing disabilities. Method 800 includes a step 804 of receiving a selection of one of the plurality of web accessibility profiles 602. Method 800 includes a step 806 of retrieving a first predefined adjustment to first website display parameters 504A and 504B associated with the selected web accessibility profile. Method 800 includes a step 808 of initiating first change 706A in first website display parameters 504A and 504B based on the retrieved first predefined adjustment to thereby address a first aspect of the disability associated with the selected web accessibility profile. Method 800 includes a step 810 of retrieving a second predefined adjustment to second website display parameters 504C and 504D associated with the selected web accessibility profile. Method 800 includes a step 812 of initiating second change 706B in second website display parameters 504C and 504D based on the retrieved second predefined adjustment to thereby address a second aspect of the disability associated with the selected web accessibility profile. Method 800 includes a step 814 wherein initiating first change 706A and second change 706B transforms presentation 604 of the website 150 to presentation 704 to conform with needs of user 110 having the disability associated with the selected web accessibility profile.

In some embodiments, a selected web accessibility profile may be a vision impairment profile. When the selected web accessibility profile is the vision impairment profile, a first website display parameter may be a content scaling parameter and a second website display parameter may be a saturation parameter. This profile may require changes to one or more website display parameters such as changing the font type, changing the font size, or changing spacing. In some embodiments, content scaling and saturation may be changed. Content scaling, as discussed more fully in other portions of this disclosure, may refer to adjusting, increasing, or decreasing content on a website. A saturation parameter, as discussed more fully in other portions of this disclosure, may refer to an intensity of a color on a website. In some embodiments, the method further includes adjusting the content scaling parameter in a website code to increase content scaling and adjusting the saturation parameter in the website code to increase display intensity. Website code, as discussed more fully in other portions of this disclosure, may refer to programs, routines, functions, classes, data structures, and/or objects. The website code may include descriptive text, such as HyperText Markup Language or extensible markup language. For example, if the user selects the vision impaired profile, the user may have a visual disability such as degrading eyesight. Thus, to help users with visual impairments, the content scaling parameter may be adjusted, by accessing and altering the website's code, to increase content scaling of the website from 1× to 1.5× so the user may more easily see the website's content. Likewise, the saturation parameter may be adjusted, by accessing and altering the website's code, to increase display intensity from 1 to 10 of the website so the user may more easily and clearly see the website's content.

In some embodiments, a selected web accessibility profile may be a cognitive disability profile. When the selected web accessibility profile is the cognitive disability profile, a first website display parameter may be a highlight titles parameter and a second website display parameter may be a highlight actionable objects parameter. This profile may require changes to one or more website display parameters such as changing the font type, changing the font size, or changing spacing. In some embodiments, highlight titles and highlight actionable objects may be performed. Highlight titles, as discussed more fully in other portions of this disclosure, may refer to accents, emphases, features, bringing out, calling attention to, or underlining titles. Title may refer to a header on the website or any other descriptive name, word, characters, or combinations thereof. An example of a highlight may include a colored overlay applied to one or more titles. The colored overlay may be in any color. Actionable objects may refer to objects that a user may interact with. In some embodiments, the method may further include detecting titles and actionable objects associated with the website and highlighting on a user session basis the detected titles and actionable objects. For example, if the user selects the web accessibility profile cognitive disability profile, the user may have a cognitive disability such as autism, dyslexia, or CVA. Thus, to help users with cognitive impairments, highlight titles may be detected on the website and highlighted with a yellow color. Additionally, or alternatively, actionable objects may be detected on the website and highlighted with a green color. Advantageously, the user may more easily navigate and access the website's content.

In some embodiments, a selected web accessibility profile may be an epilepsy-safe profile. When the selected web accessibility profile is the epilepsy-safe profile, a first website display parameter may be a saturation parameter and a second website display parameter may be a stop animation parameter. This profile may require changes to one or more website display parameters such as changing the font type, changing the font size, or changing spacing. In some embodiments, animations may be stopped and saturation may be changed. A saturation parameter, as discussed more fully in other portions of this disclosure, may refer to an intensity of a color on a website. A stop animation parameter may refer to an animation, event, action, or process of the website to an end. Non-limiting examples of stop animation may include preventing a blinking animation and altering an animation's rate of change. In some embodiments, the method further includes adjusting the saturation parameter in a website code to decrease display intensity and executing a command in the website code to limit movement on a display. Website code, as discussed more fully in other portions of this disclosure, may refer to programs, routines, functions, classes, data structures, and/or objects. The website code may include descriptive text, such as HyperText Markup Language or extensible markup language. For example, if the user selects the web accessibility profile epilepsy-safe profile, the user may have a disability or disorder related to seizures, including different types of epilepsy and migraines which may be a reaction to visual flickering or audio signals at certain frequencies or patterns. Thus, to help users with these impairments, the saturation parameter may be adjusted, by accessing and altering the website's code, to decrease display intensity of the website so the user may more easily see the website's content. Likewise, the stop animation parameter may execute a command in the website code to limit movement on the display of the website to prevent triggering a seizure, migraine, or other form of epilepsy of the user. In another example, limiting movement on the display may be in the form of preventing blinking animation or altering animation on the website such that they do not change at a rate greater than three frames per second. Advantageously, these limitations of movement may also help prevent trigging a seizure, migraine, or other form of epilepsy of the user.

In some embodiments, a selected web accessibility profile may be an ADHD friendly profile. When the selected web accessibility profile is the ADHD friendly profile, a first website display parameter may be a content scaling parameter and a second website display parameter may be a stop animation parameter. This profile may require changes to one or more website display parameters such as changing the font type, changing the font size, or changing spacing. In some embodiments, content scaling may be changed, and animations may be stopped. Content scaling, as discussed more fully in other portions of this disclosure, may refer to adjusting, increasing, or decreasing content on a website. A stop animation parameter may refer to a command, code, or rule that causes an animation, event, action, or process of the website to end or to be altered. Non-limiting examples of stop animation may include preventing a blinking animation and altering an animation's rate of change. In some embodiments, the method further includes adjusting the content scaling parameter in a website code to increase content scaling and executing a command in the website code to limit movement on a display. For example, if the user selects the web accessibility profile ADHD Friendly Profile, the user may have a disability related to distractions by noise or movement and find it more difficult to browse, read, and focus on essential elements. Thus, to help users with ADHD, the content scaling parameter may be adjusted, by accessing and altering the website's code, to increase content scaling of the website so the user may more easily see the website's content. Likewise, the stop animation parameter may execute a command in the website code to limit movement on the display of the website to help the user focus and read the website. In another example, limiting movement on the display may be in the form of preventing blinking animation or altering animation on the website such that they do not change at a rate greater than three frames per second. Advantageously, these limitations of movement may also help the user focus. According to another embodiment of the present disclosure, a system for enabling users to alter website presentations based on selected web accessibility profiles may be provided. Consistent with disclosed embodiments, the system includes a memory configured to store values of various website display parameters associated with a plurality of web accessibility profiles. The system may also include at least one processor. The system may display an accessibility GUI for a website, wherein the accessibility GUI may include a plurality of web accessibility profiles associated with differing disabilities. The system may receive a selection of one of the plurality of web accessibility profiles. The system may identify a first predefined adjustment to a first website display parameter associated with the selected web accessibility profile. The system may initiate a first change in the first website display parameter based on the identified first predefined adjustment to thereby address a first aspect of the disability associated with the selected web accessibility profile. The system may identify a second predefined adjustment to a second website display parameter associated with the selected web accessibility profile. The system may initiate a second change in the second website display parameter based on the identified second predefined adjustment to thereby address a second aspect of the disability associated with the selected web accessibility profile. In some embodiments, initiate the first change and the second change transforms a presentation of the website to conform with needs of a user having the disability associated with the selected web accessibility profile.

Some embodiments may enable a user to selectively activate or modify one or more web accessibility profiles. By way of one example, this capability may be useful in situations where multiple users may be using the same device (e.g., at different times), and each user may require different accessibility options. For example, the device may belong to an institution such as a library, or residence and may be available to multiple different users, each with a different disability. This capability may additionally be useful in situations when a user wishes to further customize an accessibility profile to suit the individual needs of the user. Disclosed embodiments may allow each user to selectively activate and/or modify (e.g., customize) one of multiple available web accessibility profiles, according to individual need. The following description discloses embodiments that may facilitate this functionality.

Figure 10A:
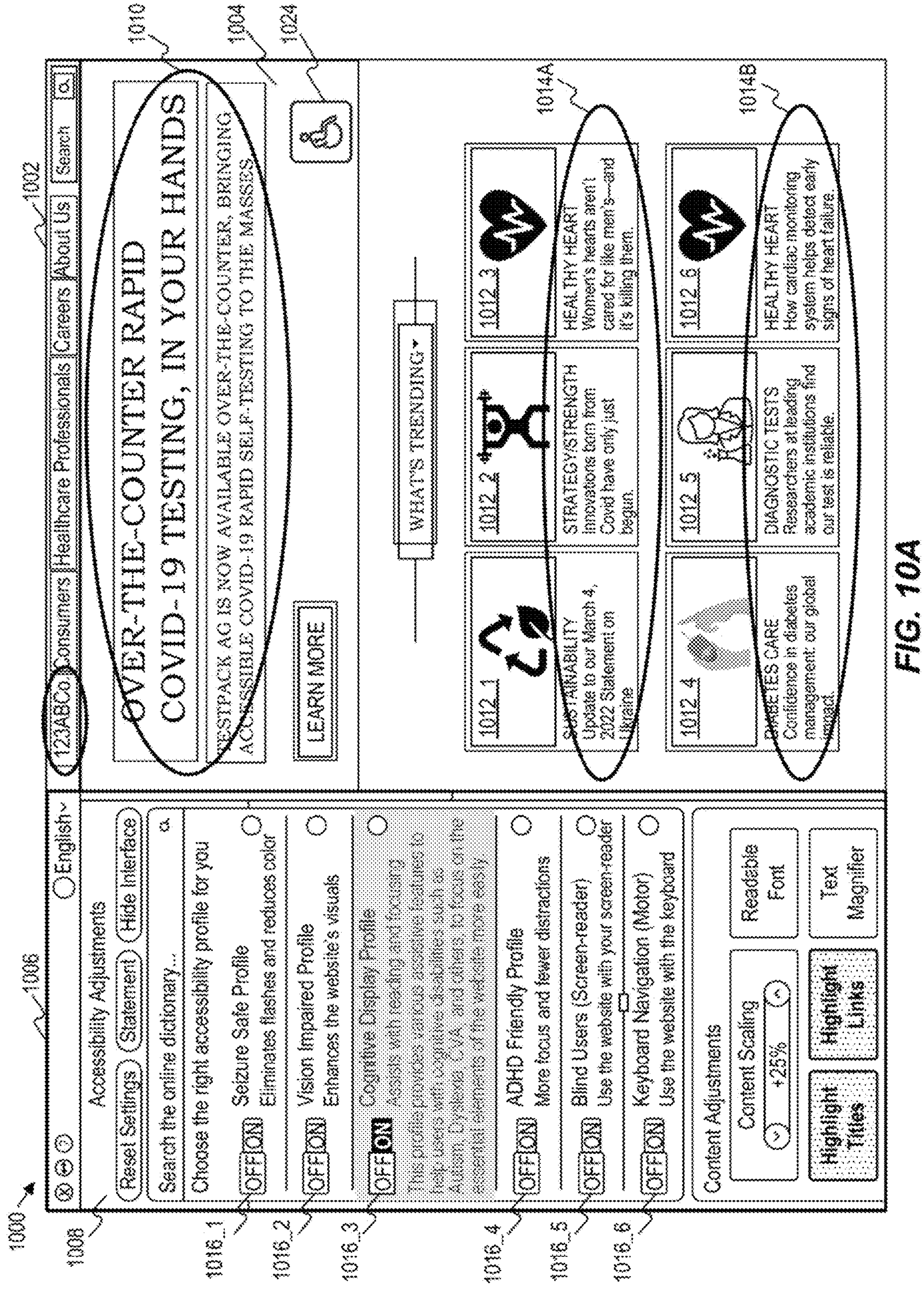
FIGS. 10A-10C, together, illustrates an exemplary implementation for at least one processor implementing a first and second website display change altering a plurality of initial values of a set of display parameters to address a specific disability, consistent with disclosed embodiments.
Figure 10B:
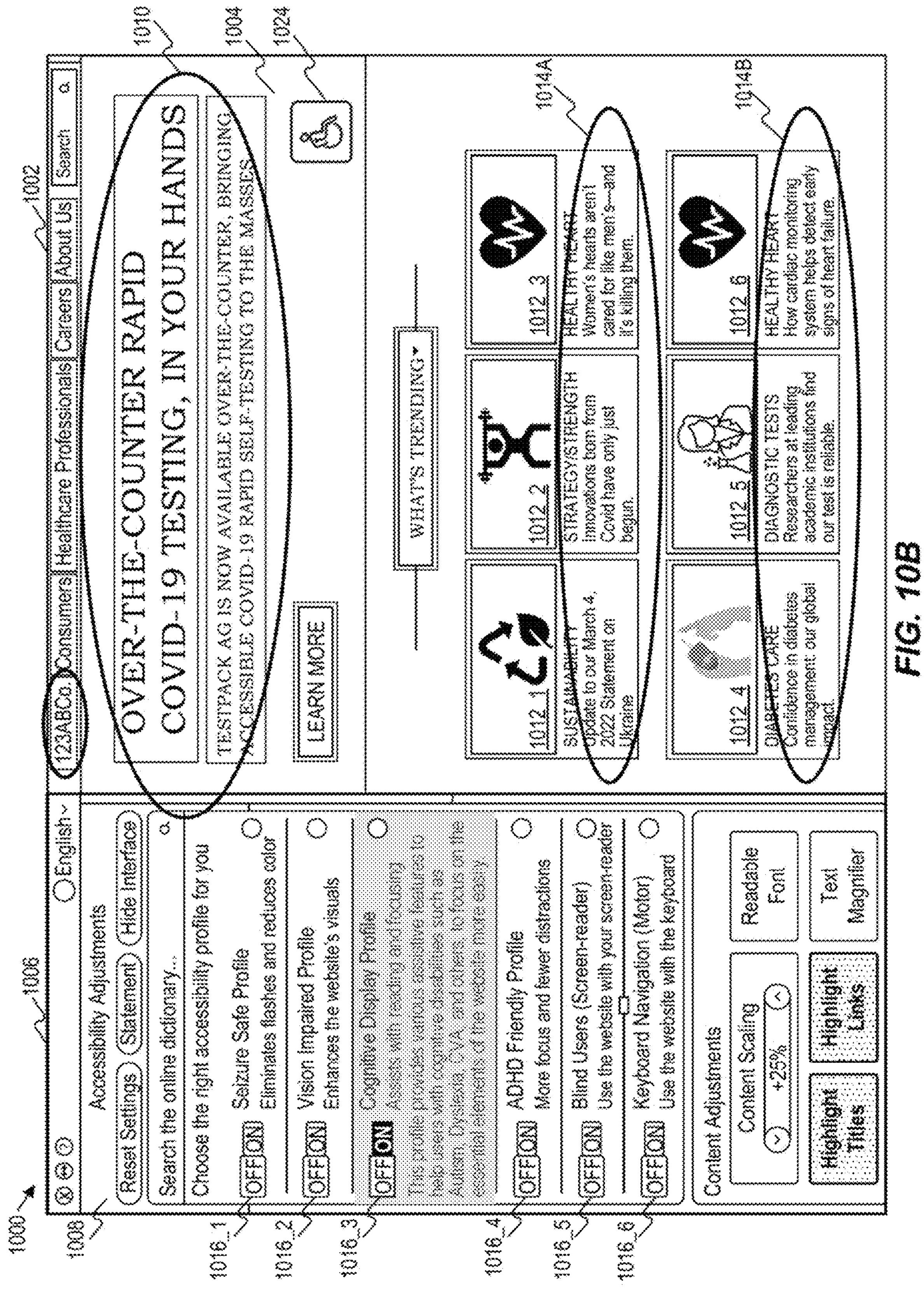
Figure 10C:
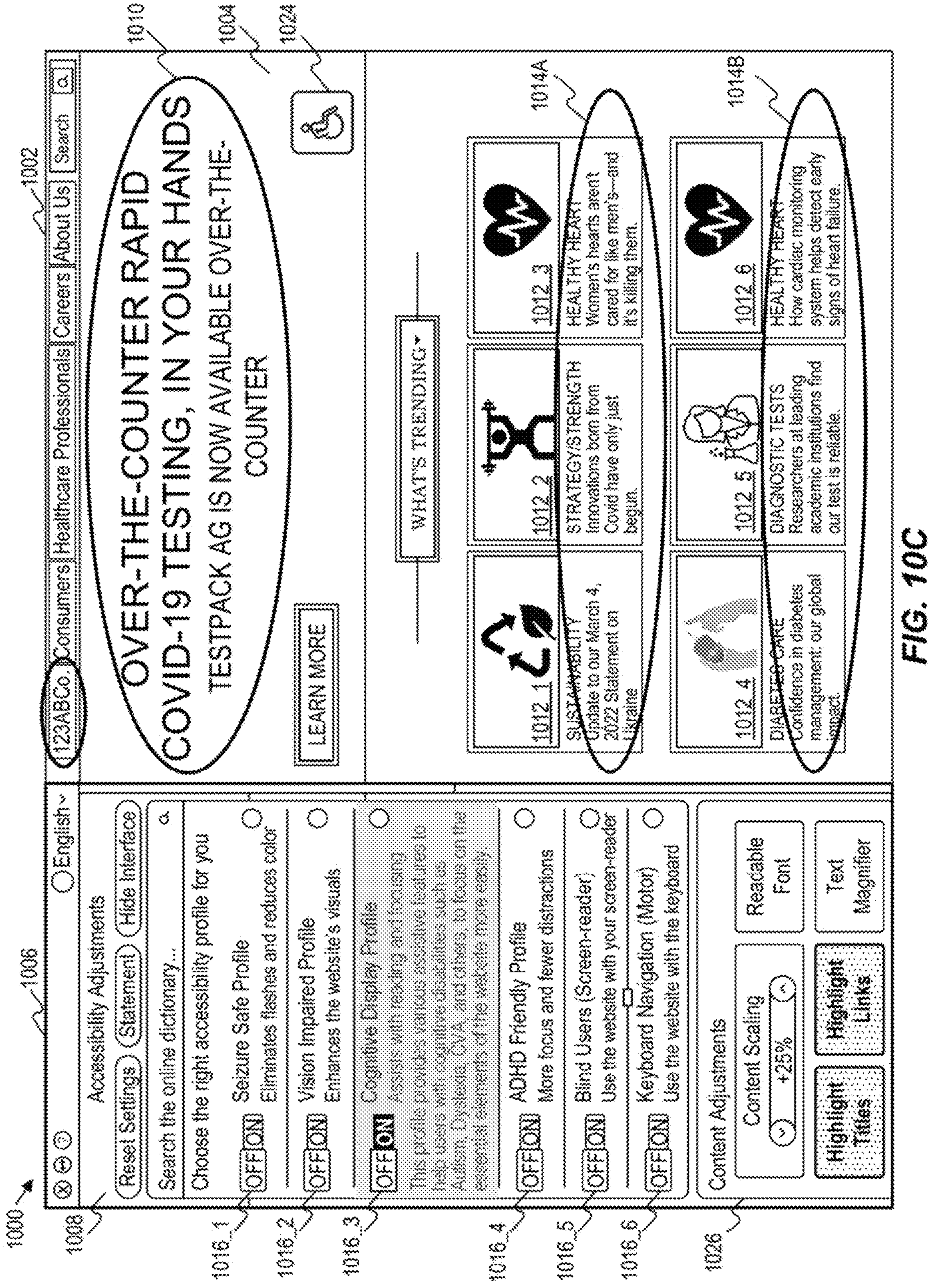
Figure 11:
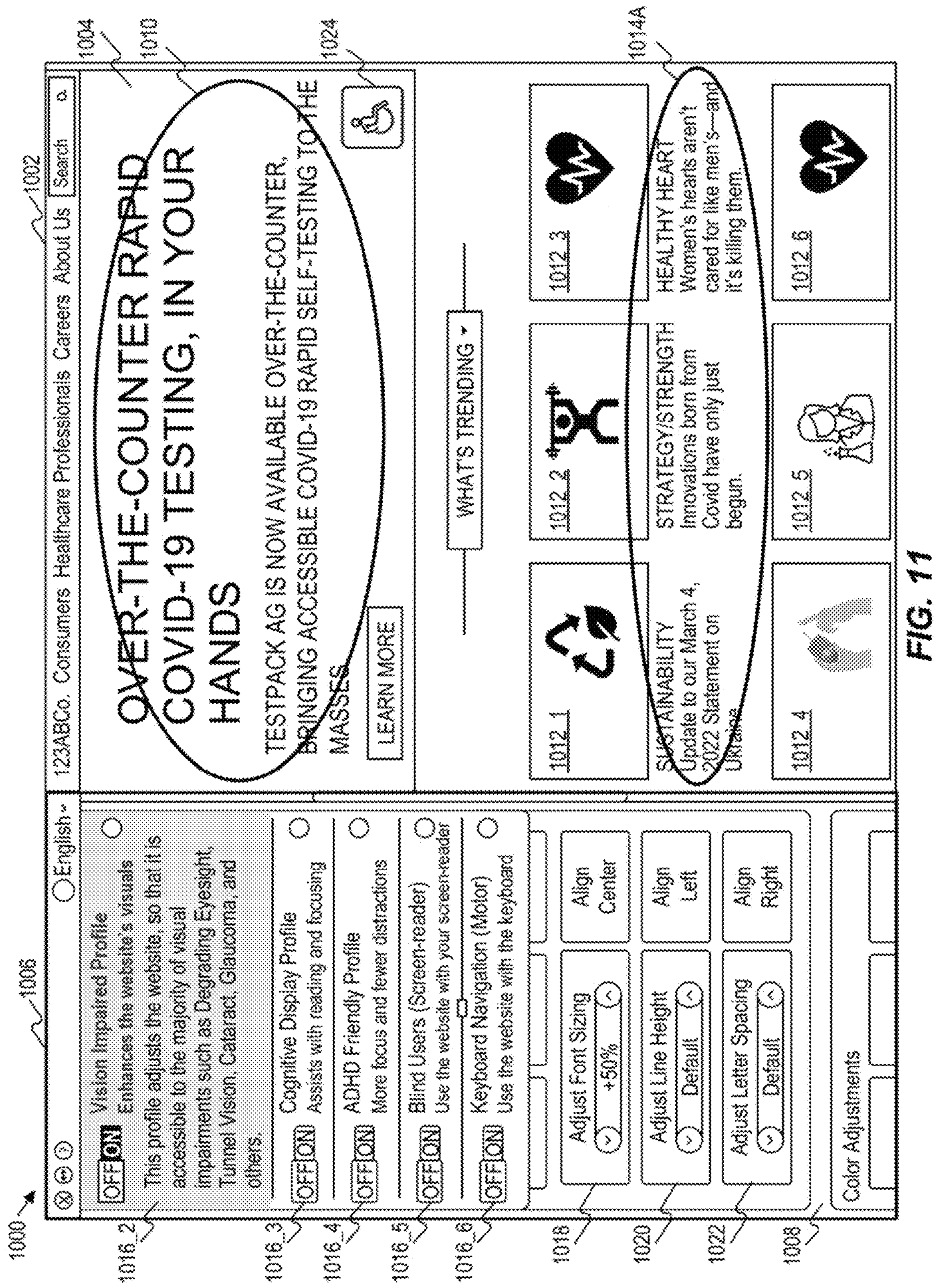
FIG. 11 illustrates an exemplary implementation for at least one processor implementing a website display change altering a plurality of initial values of a set of display parameters to address another specific disability, consistent with disclosed embodiments.

In some instances, the description that follows refers to FIGS. 10A-10C and 11. FIGS. 10A-10C, which illustrate an exemplary implementation of a first and second website display change altering a plurality of initial values of a set of display parameters to address a specific disability, consistent with disclosed embodiments. FIG. 11 illustrates an exemplary implementation of a website display change altering a plurality of initial values of a set of display parameters to address another specific disability, consistent with disclosed embodiments.

Some embodiments involve a non-transitory computer readable medium containing instructions that when executed by at least one processor cause the at least one processor to perform operations for enabling users to switch between web accessibility profiles. The term "web accessibility profiles" may be understood as describe earlier. The Web accessibility profiles may be switched by users either through manual selection or automatically through the use of cookies.

Some embodiments involve the at least one processor performing an operation of receiving a command to open an accessibility graphical user-interface (GUI) for a website exhibiting a set of display parameter having initial values. The term "receiving" may refer to acquiring, obtaining, retrieving, or otherwise gaining access to information. The at least one processor may obtain information synchronously, e.g., by polling a memory buffer, queue or stack, or asynchronously, e.g., via an interrupt event. The term "command" may refer to an instruction (e.g., a program code instruction), a value (e.g., assigned to a variable, parameter, or attribute), a setting, a flag (e.g., software and/or hardware via a pin of a chip), or any other information indicating to the at least one processor to perform a specific action. For example, the command may cause the at least one processor to read and/or write data to and from memory, execute one or more arithmetic and/or logical operations, and send and receive data, e.g., to and from one or more peripheral devices. The term "open" may refer to accessing (e.g., reading and/or writing from memory), retrieving, invoking, executing one or more program code instructions, or performing any other action needed to render content, e.g., for the accessibility GUI. The terms "GUI", "website" and "display parameter" may be understood as described earlier. The term "initial values" may refer to one or more settings, attributes or characteristics that may be defined or established in advance, for example as one or more default settings corresponding to typical, standard, or recommended use. For example, the initial values may facilitate and/or simplify the rendering of a website on a computer display for non-disabled users by defining default alignment, position, orientation, and size settings for displaying images, and font settings for displaying text.

At least one processor may render the content for the website on a computer display. The website may display an indicator (e.g., a button, graphic, icon) associated with opening the accessibility GUI for the website (e.g., by displaying the accessibility GUI adjacent to the website). The indicator may be associated with an event listener configured to notify the at least one processor when a user has selected the indicator, e.g., as a command to open the accessibility GUI. On receiving the command to open the accessibility GUI for the website (e.g., after the user selected the indicator), the at least one processor may perform one or more read/write, arithmetic and/or logical operations needed for rendering the content for the accessibility GUI (e.g., opening the accessibility GUI), for example by retrieving source code and/or content from an accessibility server and executing the source code to render the content for the accessibility GUI. The website may be associated with one or more default display settings (e.g., initial values for display parameters), such as a default font size, font style, background color, and default display characteristics. The accessibility GUI for the website may facilitate in modifying one or more of the default display settings for the website, e.g., to accommodate the disabled user who selected the indicator to open the accessibility GUI.

FIGS. 10A-10C, together, illustrate one exemplary implementation of an interface 1000 for opening an accessibility graphical user-interface (GUI) for a website associated with a set of display parameter having initial values. Interface 1000 includes a section 1002 for displaying a website 1004, and another section 1006 for displaying an accessibility GUI 1008. Processing device 210A of FIG. 2 (e.g., at least one processor) may receive a command (e.g., from cognitively impaired user 110B using computing device 170B of FIG. 1) to open accessibility GUI 1008 for website 1004. Processing device 210A may retrieve accessibility GUI 1008, e.g., from accessibility service host 130 via communications network 140. Website 1004 may be associated with a set of display parameters having initial values, such as to produce the rendition of website 1004 illustrated in FIG. 10A. For example, the initial values for the display parameters for website 1004 may cause a browser configured with device 170B to display a header 1010 of website 1004 using a 16-point Times New Roman font, and to display plain white buttons 1012-1 to 1012_6 with accompanying text 1014A-1014B, e.g., formatted using a 10-point font, as depicted in FIG. 10A.

Some embodiments may involve the performance of an operation of displaying the accessibility GUI for the website, wherein the accessibility GUI includes indications of a plurality of web accessibility profiles, each web accessibility profile being associated with a differing disability. The term "displaying" may refer to presenting, exhibiting, or otherwise rendering visual content via a computer interface, such as a computer display. For example, the at least one processor may receive source code (e.g., HTML, CSS, and JavaScript instructions) associated with the accessibility GUI and execute the source code to render visual content for the accessibility GUI on a computer screen. The accessibility GUI may be displayed in a new browser window (e.g., different than the browser window for the website), within the browser window for the website (e.g., inside a frame or drop-down list), inside a pop-up window, as a picture-in-picture (PIP) or using any other suitable interface for displaying the accessibility GUI. The term "indications" may refer to one or more labels, images, motifs, tokens, buttons, or other symbols configured to identify or designate the plurality of web accessibility profiles. The term "web accessibility profiles" may be understood as describe herein above. The term "disability" may refer to a physiological, neurological, psychological, or other health condition that may limit a person with the health condition from performing certain activities which may be relatively simple to perform by individuals who do not have the health condition.

Thus, on receiving the command, at least one processor may display the accessibility GUI for the website. The accessibility GUI may include one or more buttons, tags, or labels (e.g., indications) for multiple different web accessibility profiles, each corresponding to a different disability. The indications may allow a user with a disability to select the corresponding web accessibility profile, for example by clicking the button for the web accessibility profile, to assist the user in navigating the website. For example, one web accessibility profile may correspond to a cognitive disability and may allow modifying the format for displaying content, such as by replacing text of the webpage with images. Another web accessibility profile may correspond to visual impairment and may allow modifying the size and spacing of text displayed for the webpage, and/or invoking a screen reader to announce elements of the webpage.

In some exemplary embodiments, the plurality of web accessibility profiles includes at least two of: an epilepsy-safe profile, a vision impaired profile, a cognitive disability profile, and an ADHD friendly profile. However, this list is not intended to limit the possible web accessibility profiles provided by the accessibility GUI. In some embodiments, the accessibility GUI may include sub-profiles for sub-categories of disabilities. For example, visual impairment may include multiple sub-categories of disability (e.g., mild to total vision loss, or color blindness), and each sub-category for visual impairment may have a corresponding sub-category web accessibility profile allowing user with a specific disability sub-category to modify the rendering of content according to individual need. For example, mild vision loss (e.g., a sub-category of visual impairment) may have a sub-category accessibility profile to enlarge the display of text, whereas total vision loss (e.g., another sub-category of visual impairment) may have a sub-category accessibility profile to invoke a screen reader.

FIG. 10A illustrates a non-limiting exemplary implementation of accessibility GUI 1008 displayed for website 1004, consistent with some disclosed embodiments. Processing device 210A (FIG. 2) of device 170 may display accessibility GUI 1008 via output interface 242. The accessibility GUI 1008 ay be displayed in section 1006 of interface 1000, adjacent to website 1004 displayed in section 1002. Multiple indications (e.g., buttons 1016_1 to 1016_6) of a plurality of web accessibility profiles may be included in accessibility GUI 1008, each web accessibility profile being associated with a differing disability. For example, button 1016_1 may correspond to a Seizure Safe Profile (e.g., epilepsy safe profile) for individuals suffering from seizures or epilepsy, button 1016_2 may correspond to a visual impairment profile for individuals suffering from vision impairment, button 1016_3 may correspond to a cognitive disability profile for individuals suffering from cognitive disabilities, button 1016_4 may correspond to an ADHD Friendly Profile for individuals suffering from ADHD, button 1016_5 may correspond to a Blind Users Profile for individuals suffering from severe vision impairment, and button 1016_6 may correspond to a Keyboard Navigation Profile for individuals suffering from motor impairment. Additional indicators may be provided for additional disabilities. These examples are intended for illustrative purposes only, and do not limit the invention to any specific implementations.

Some embodiments involve receiving a first input via the accessibility GUI indicative of a selection of a specific web accessibility profile associated with a specific disability. The term "receiving" may be understood as described herein above. The term "input" may include any type of data provided by a user via an input device. Examples of an input device may include a keyboard, a mouse, a touch pad, a touch screen, a joystick, a microphone, an image sensor, and/or any other device that conveys signals (directly or indirectly) to the computing device. Received input may be formatted as at least one of: text, symbols, a selection of a web element, sounds, speech, hand gestures, body gestures, or tactile information. In some embodiments, the at least one processor may receive at least a portion of the first input as a notification, for example as an interrupt event from a peripheral input device used by the user to make a selection. The at least one processor may access a buffer associated with the peripheral device to receive additional input, e.g., information associated with the selection.

For example, a user who is cognitively impaired may select an option of the accessibility GUI for the web accessibility profile corresponding to cognitive impairment, e.g., from a menu. The selection may occur, for example, via a touch sensitive screen or through a mouse click. An event listener associated with the selected option may detect the selection and send a notification to the at least one processor. The at least one processor may probe the state of the option (e.g., a button with an ON/OFF toggle setting) and determine that the option has been selected (e.g., the state of the button is ON), thereby receiving the first input via the accessibility GUI. The first input may thus indicate to the at least one processor that the first user has selected the web accessibility profile for cognitive impairment, which is associated with cognitive disability.

FIG. 10A illustrates an exemplary implementation for receiving a first input via the accessibility GUI indicative of a selection of a specific web accessibility profile associated with a specific disability, consistent with some disclosed embodiments. For example, processing device 210A (FIG. 2) of computing device 170B (FIG. 1) may receive a first input, e.g., from user 110B, indicating the selection of button 1016_3 corresponding to the cognitive impairment web accessibility profile associated with a cognitive disability. User 1108 may make the selection via input interface 240, such as by selecting button 1016_3. An event listener associated with button 1016_3 may detect the selection of button 1016_3 (e.g., switched to ON) via interface 240, for example as a mouse click, keyboard press, joystick maneuver, touch via a touch-sensitive screen, voice command, head, hand or foot gesture, or any other suitable input means. The event listener may send a notification of the selection to processing device 210A, which may determine the selection of the cognitive impairment web accessibility profile, thereby receiving the first input via accessibility GUI 1008.

Some embodiments involve, based on the first input, implementing a first website display change corresponding to the specific accessibility profile. The term "website display change" may refer to modifying, replacing, substituting, or otherwise altering a rendering of one or more visual elements of the website. For example, the website display change may switch the rendering of an element of the website from a default display setting (e.g., recommended for non-disabled users) to a setting defined for one of the web accessibility profiles for a specific disability. The change may be implemented via any suitable output medium, such as but not limited to a visual medium (e.g., a display screen) an audio medium (e.g., a speaker), a tactile medium (e.g., a vibrating motor), and any other output medium configured to convey information to the user. Thus, based on the first input (e.g., the selection of the specific web accessibility profile), the at least one processor may modify or alter the rendering of one or more display elements of the website, to thereby implement the website display change. For example, according to the initial values for the display parameters for the website, a header may be displayed as black text against a white background, and navigation buttons may be displayed with a plain format and accompanying text below. Displayed thus (e.g., according to the initial values), a user with cognitive disability may have difficulty distinguishing the header from other text or knowing which navigation button to press. On determining the selection of the web accessibility profile for cognitive impairment, the at least one processor may modify, enhance, or augment the display of the webpage, for example by changing the color of the header and by adding one or more graphic images to facilitate the navigation of the website by individuals who are cognitively impaired.

FIGS. 10A-10B illustrate an example of implementing, based on the first input, a first website display change corresponding to the specific accessibility profile, consistent with some disclosed embodiments. FIG. 10A may correspond to an original, unmodified rendering of webpage 1004, e.g., displayed according to the initial values for the set of display parameters for website 1004. According to the initial values (e.g., before the first website display change is implemented) navigation buttons 1012_1 to 1012_6 are displayed using a plain white format with accompanying text. In addition, the text for header 1010 is displayed in black against a white background using a Times New Roman 16-point font. Turning to FIG. 10B, on determining the selection of the cognitive impairment web accessibility profile of accessibility GUI 1008 (e.g., corresponding to setting button 1016_3 to ON), processing device 210A (FIG. 2) may implement the first website display change by modifying the display of webpage 1004 according to one or more display parameter values store in advance for the cognitive impairment web accessibility profile, such as at memory device 220A. For example, processing device 210A may modify the display of buttons 1012_1 to 1012_6 by adding descriptive graphic images that complement text 1014A-1014B.

Some embodiments may involve implementing the first website display change, wherein the first website display change alters a plurality of the initial values of the set of display parameters to address the specific disability. The term "alter a plurality of initial values" may refer to substituting, replacing, or otherwise changing at least one of the initial values (e.g., a plurality of the predefined, recommended, or default settings) defined for the website. The term "address" may refer to targeting, handling, facilitating, or otherwise assisting with one or more aspects related to the specific disability, for example to facilitate the navigation of the website by an individual having the specific disability. Thus, in some embodiments, to implement the first website display change, the at least one processor may modify (e.g., alter) one or more different default or predefined display settings (e.g., initial values of the set of display parameters) for the website. For example, if the initial values for the display parameters cause one or more navigation buttons to be displayed using a plain white format and accompanying text, the first website display change may augment the display of the navigation buttons with one or more descriptive images, allowing cognitively impaired individuals to understand the context or purpose for each navigation button. Similarly, if the initial values for the display parameters cause a header to be displayed using black text against a white background, the first website display change may modify the background color for the header to yellow, to assist in distinguishing the header from other text of the website. Modifying at least one of the display parameters thus may facilitate individuals with cognitive disabilities to navigate the website with greater ease. In this manner, the first website display change may address cognitive disability. The foregoing are simply a few examples for illustrative purposes. Any modification to default display parameters to address a specific disability may qualify as addressing the specific disability.

FIGS. 10A-10B, together, illustrates an exemplary implementation for at least one processor implementing the first website display change, wherein the first website display change alters a plurality of the initial values of the set of display parameters to address the specific disability, consistent with some disclosed embodiments. For example, turning to FIG. 10A, the initial values for the display parameters for website 1004 may cause navigation buttons 1012_1 to 1012_6 to be displayed with a plain white format with accompanying text, e.g., according to a default display setting recommended for non-disabled users. Similarly, the text for header 1010 may be displayed black against a white background a Times New Roman 16-point font. User 110B, having a cognitive disability, may have difficulty distinguishing header 1010 from other text on webpage 1004, and may have further difficulty comprehending the context for each of navigation buttons 1012_1 to 1012_6. These difficulties may hinder the ability of user 110B to navigate website 1004. To address this, user 110B may select the cognitive disability profile as described above. In response to the selection (e.g., the first input), processing device 210A (FIG. 2) may alter the background color for header 1010 to yellow, allowing header 1010 to be clearly distinguished from other text displayed on webpage 1004. Additionally, processing device 210A may add descriptive images to one or more of navigation buttons 1012_1 to 1012_6 that complement text 1014A-1014B, allowing user 110B to understand the context for each of navigation buttons 1012_1 to 1012_6, despite difficulty in reading comprehension. Due to these changes, user 110B may be able to navigate website 1004 more efficiently and access relevant information and services. In this manner, the first website display change implemented by processing device 210A may address the cognitive disability (e.g., the specific disability) of user 1108.

Some embodiments may involve receiving a second input via the accessibility GUI. The term "receiving," and "input" may be understood as described earlier. As one example, the user may wish to further customize the display of the website to accommodate specific needs or preferences (e.g., a cognitively impaired user may drill down into one or more sub-categories of the cognitive disability profile). As another example, the computing device may belong to an institution (e.g., public library, or hostel) that may serve many different users. After the first user with a first disability (e.g., cognitive impairment) has finished using the computing device, a second user with a second disability (e.g., visual impairment) may wish to use the same computing device and switch the web accessibility profile to accommodate the second disability. The second input may be provided using any suitable technique, such as by reciting a voice command into a microphone, performing a head, hand, or foot gesture, or selecting a graphic web element of the accessibility GUI via a mouse, keyboard, touch sensitive screen, or any other selection technique. An event listener may detect the selection and send a notification to the at least one processor. The at least one processor may determine that the option has been selected, thereby receiving the second input via the accessibility GUI. Returning to the first example, the second input may indicate to the at least one processor that the user (e.g., the cognitively impaired user) has selected to further modify the display of the website, e.g., within a sub-category of the cognitive disability profile. Returning to the second example, the second input may indicate to the at least one processor that a second user (e.g., visually impaired user) has selected to switch to a different web accessibility profile associated with vision disability.

FIGS. 10C and 11 illustrate exemplary implementations for at least one processor receiving a second input via the accessibility GUI, consistent with some disclosed embodiments. FIG. 10C illustrates an exemplary implementation of the first example. Processing device 210A (FIG. 2) of computing device 170A (FIG. 1) may receive the second input that user 110B has selected a sub-category associated with the cognitive impairment web accessibility profile. For example, user 110B may make the selection by touching a button on a touch-sensitive screen. An event listener associated with the button may notify processing device 210A of the selection (e.g., switched to ON). In this manner, processing device 210A may receive the second input from user 110B via accessibility GUI 1008.

FIG. 11 illustrates an exemplary implementation of the second example. Processing device 210A (FIG. 2) of computing device 170A (FIG. 1) may receive the second input that user 110A has selected the visual impairment web accessibility profile associated with visual disability. For example, user 110A may make the selection by reciting a voice command into a microphone configured with input interface 240. An event listener associated with button 1016_2 may detect the selection of button 1016_2 (e.g., switched to ON) via the voice command, and may notify processing device 210A, accordingly. In this manner, processing device 210A may receive the second input from user 110A via accessibility GUI 1008.

Some embodiments may involve, based on the second input, implementing a second website display change, wherein the second website display change causes an adjustment to the altered values of the set of display parameters. The term "causes an adjustment" may refer to an action that modifies, alters, reconfigures, or otherwise redefines a value. Thus, causing an adjustment to the altered values may refer to modifying (again) the values for the set of display parameters, for example, by modifying the values that were altered above for the first website display change. In other words, the first input may cause a first alteration changing the initial values for the display parameters. The second input may cause a second alteration of the first altered values, further changing the values for the set of display parameters, e.g., to customize the first alteration for the first disability, or to implement a different profile for a second disability.

Returning to the first example (e.g., customizing the first alteration for the first disability), the at least one processor may make additional changes to the header (e.g., after changing the background color in the first alteration) such as by increasing the font size, changing the font type, and simplifying the text, thereby causing an adjustment to the altered values of the set of display parameters. Returning to the second example (e.g., implementing a different profile corresponding to a second disability) the at least one processor may undo or reverse one or more of the modifications implemented in response to the first input, for example if the modifications do not address the second disability. Accordingly, the at least one processor may remove the descriptive images previously added to the navigation buttons, since these might not assist a visually impaired user, yet cause increased overhead when loading the webpage. Instead, the at least one processor may trigger a speech synthesizer to vocalize the descriptive text under each navigation button.

FIG. 10C illustrates an exemplary implementation for at least one processor implementing a second website display change based on the second input, causing an adjustment to the altered values of the set of display parameters, consistent with disclosed embodiments, e.g., the first example. One receiving a notification (e.g., the second input) that user 110B (FIG. 1) selected a sub-category of the cognitive disability profile (button 1016_3), processing device 210A may retrieve (e.g., from memory device 220A) one or more settings recommended for a specific type of cognitive impairment corresponding to user 110B. Processing device 210A may apply the one or more setting to customize the display of webpage 1104 depicted in FIG. 10B (e.g., the after the first alteration accommodating cognitively impaired users in general) to accommodate the specific needs of user 110B, as depicted in FIG. 10C. For example, processing device 210A may increase the font size of header 1010 from 16 points to 20 points, change the font type from Times New Roman to Anal, and limit the length of the text displayed to make header 1010 more readable.

FIG. 11 illustrates an exemplary implementation for at least one processor implementing a second website display change based on the second input, causing an adjustment to the altered values of the set of display parameters, consistent with disclosed embodiments, e.g., the second example. One receiving a notification (e.g., the second input) that user 110A (FIG. 1) selected the visual impairment profile (button 1016_2), processing device 210A may retrieve (e.g., from memory device 220A) one or more settings recommended for visually impaired users. Processing device 210A may apply the settings to modify the display of website 1004 from the display depicted in FIG. 10B accommodating users with cognitive disabilities, to the display depicted in FIG. 11 to accommodate users with visual impairment. For example, processing device 210A may increase the font size of header 1010 from 16 points to 20 points and may change the font type from Times New Roman to Arial, which may be simpler to read. Processing device 210A may additionally increase the font size (e.g., from 10-points to 14-points) for text 1014A accompanying navigation buttons 1012_1 to 1012_3. The larger font size may improve legibility for visually impaired users. In addition, processing device 210A may remove the graphic images from navigation buttons 1012_1 to 1012_6.

According to some embodiments, the second input is configured to cause the website to revert to the initial values of the set of display parameters. The term "revert" may be understood as return or reset, e.g., to a former state. For example, the at least one processor may reset the values for the set of display parameters, which were modified after receiving the first input, back to the original (e.g., initial) values assigned to the set of display parameters before the first input was received. Continuing with the second example given above, the navigation buttons were initially displayed using a plain white format with accompanying text below. Upon receiving the first input (e.g., from the cognitively disabled user), the at least one processor added one or more descriptive images to the navigation buttons to assist the cognitively disabled user to navigate the website. However, the images may not be of much help to the visually disabled user, who may be better assisted by a screen reader vocalizing the text. Thus, on receiving the second input (e.g., from the visually disabled user), the at least one processor may reset the values for the display parameters for the navigation buttons to restore the original (e.g., initial) values, for example by removing the descriptive images that were added after receiving the first input. Consequently, the navigation buttons may be displayed again according to the initial values, e.g., using the plain white format with accompanying text below.

FIGS. 10A-10B and 11 illustrate an exemplary implementation for a second input causing the website to revert to the initial values of the set of display parameters. FIG. 10A shows navigation buttons 1012_1 to 1012_6 displayed according to the initial values of the set of display parameters for website 1004. Accordingly, buttons 1012_1 to 1012_6 are displayed using a plain white format, with descriptive text below. FIG. 10B illustrates navigation buttons 1012_1 to 1012_6 after the first input was received from cognitively disabled user 1108 and processing device 210A (FIG. 2) altered some initial values of the display parameters. Accordingly, in FIG. 10B navigation buttons 1012_1 to 1012_6 are displayed with images describing the context or purpose of navigation buttons 1012_1 to 1012_6. FIG. 11 illustrates navigation buttons 1012_1 to 1012_6 after the second input was received and processing device 210A has reverted the values of display parameters to the initial values. Accordingly, navigation buttons 1012_1 to 1012_6 are again displayed using a plain white format, with descriptive text below.

According to some embodiments, the second input is configured to activate an alternative web accessibility profile different from the specific accessibility profile. The term "alternate" may refer to other, alternative, or distinct, e.g., from the specific accessibility profile. For example, if the first input activated the web accessibility profile for cognitively disabled users (e.g., the specific accessibility profile), the second input may activate the web accessibility profile for visually disabled users (e.g., the alternative web accessibility profile), which is different than the web accessibility profile for cognitively disabled users.

FIGS. 10A-10B and 11 illustrate an exemplary implementation of the second input activating an alternative web accessibility profile, different from the specific accessibility profile. FIG. 10B illustrates the activation (e.g., via the first input) of the cognitive disability profile (corresponding to button 1016_3) addressing cognitive disabilities. Accordingly, navigation buttons 1012_1 to 1012_6 are displayed with accompanying graphic images. FIG. 11 illustrates the activation (e.g., by the second input) of the visual impairment profile (corresponding to button 1016_2) addressing visual disabilities. Navigation buttons 1012_1 to 1012_6 are displayed according to the original (e.g., initial) plain white setting. However, descriptive text 1014A under navigation buttons 1012_1 to 1012_3 is displayed using a larger and clearer font (e.g., 14 pt. Arial instead of 10 pt. Times New Roman), e.g., to address the needs of visually disabled users.

According to some embodiments, the second input is configured to customize the specific accessibility profile. The term "customize" may be understood as modifying or changing in a specific manner, e.g., to suit a particular or individual purpose. Thus, the second input may make further changes to one or more display parameters in a manner to personalize the display for the user. For example, if the user is vision impaired, the first input may select the visual impairment profile. However, this profile may accommodate a wide range of users, from mildly impaired to blind. For example, a mildly impaired user may be assisted with a larger font for displaying text, whereas a blind user may be assisted by a screen reader. Thus, the second input may correspond to a sub-category for visually impaired and make additional modifications that individualize or personalize the rendering of the webpage according to the needs of the user.

FIG. 10C illustrates an exemplary implementation of a second input for customizing the specific accessibility profile. After selecting the cognitive disability profile corresponding to button 1016_3 (e.g., the first input), accessibility GUI 1008 may display additional display options, such as Content Adjustments 1026, including options for content scaling, readable font, text magnifier, and highlighting links and titles. The options of Content Adjustments 1026 may relate to one or more sub-categories for accommodating users with cognitive impairment. User 110B may personalize the display of website 1004 according to individual need, such as by changing the font size and type for heading 1010 and limiting the amount of text displayed. In this manner, the second input may enable user 110A to further customize the display of website 1004.

Similarly, FIG. 11 illustrates an exemplary implementation of a second input for customizing the specific accessibility profile. After selecting the visual impairment profile corresponding to button 1016_2 (e.g., the first input), accessibility GUI 1008 may display additional display options, for example one or more dials, fields, or sliding bars to adjust the font size 1018, line height 1020, and letter spacing 1022. The additional display options may relate to one or more sub-categories of vision impairment, for example by recommending one set of options for mild vision loss, and a separate set of options for severe vision loss. User 110A may have only mild visual disability and may not need as many accessibility modifications as a blind user. Accordingly, user 110A may personalize the display of website 1004, such as by increasing the font size for text 1014A-1014B just enough to suit the individual needs of user 110A. In this manner, the second input may enable user 110A to further customize the display of website 1004.

According to some embodiments, the first website display change alters a plurality of display parameters in the set of display parameters, the altered display parameters conforming to the specific accessibility profile. The term "a plurality of display parameters in the set of display parameters" may refer to a subset, e.g., some or all, of the set of display parameter for the website. For example, some display parameters for a website may relate to text (e.g., font size, color, line height), page layout (e.g., positioning of frames and headers, margins), graphics (e.g., size, resolution), as well as defining optional content, e.g., that may be displayed (or hidden) only on certain devices. For this website, the first website display change may thus alter some or all of the parameters defined for any of the text, page layout, graphic and optional content (e.g., a plurality of the display parameters). The term "conforming" may refer to complying with or accommodating, e.g., according to one or more recommended or required criteria, standards, or regulations. Thus, the modifications made to the display parameters (e.g., altered display parameters) may accommodate or comply with one or more recommended standards set by the specific accessibility profile, e.g., to address the corresponding disability. For example, for users with cognitive impairment, the cognitive disability profile for a website may define display parameters relating to text (e.g., min font size and line height), graphics (e.g., options to show or hide), and audio voice options (e.g., via a screen reader and voice recognition software). A first user with only mild cognitive impairment may select the cognitive disability profile (e.g., the specific accessibility profile) and adjust only the display of the navigation buttons (e.g., a plurality of display parameters in the set of display parameters) by adding descriptive images. Altering the display parameters thus may meet one or more criteria set by the cognitive disability profile for users with mild cognitive impairment, thereby conforming to the specific accessibility profile.

FIG. 10B illustrates an exemplary implementation of a website display change altering a plurality of the set of display parameters, in a manner to conform to the specific accessibility profile, consistent with disclosed embodiments. For example, to address one or more needs of users with cognitive disabilities, cognitive Display Profile 1012_3 may define multiple display parameters for website 1004, such as relating to text (e.g., style, size, and highlight), graphics (e.g., to substitute or complement text), and voice audio options, and any other parameter relating to using website 1004. Upon receiving the first input from user 1108 (FIG. 1) indicating the selection of cognitive disability profile 1012_3, processing device 210A may implement the first website display change, e.g., by adding descriptive images to navigation buttons 1012_1 to 1012_6 and adding a highlighting background to header 1010, in accordance with criterion defined by cognitive disability profile 1012_3. In this manner, the display parameters altered in the first website display change may conform to the specific accessibility profile.

In some embodiments the second website display change includes an adjustment to at least one of the plurality of display parameters. Returning to the example above, after the first website display change is completed, a second user with medium cognitive impairment may also select the cognitive disability profile. The second website display change may increase the font size of header 1010 from 14 to 20 points and change the font style to Arial, e.g., to conform with recommended accommodations for users with medium cognitive impairment. FIG. 10C illustrates an exemplary implementation for the second website display change adjusting at least one of the plurality of display parameters, consistent with disclosed embodiments. On receiving the second input, e.g., from user 110B via device 170B (FIG. 1), processing device 210A (FIG. 2) may increase the font for display header 1010 to 20 points and change the font type to Arial, thereby adjusting at least one of the plurality of display parameters.

According to some embodiments, the second website display change includes an adjustment to at least one additional display parameter other than a display parameter in the set of display parameters. Thus, the second website display change may adjust a new display parameter other than the set of display parameters defined for the webpage. Returning to the example above, after the first website display change is completed (e.g., for the user with mild cognitive impairment), a second user with medium cognitive impairment may also select the cognitive disability profile. Whereas the first website display change did not invoke an audio voice option, the second website display change may invoke the audio voice option, e.g., to conform with recommended accommodations for users with medium cognitive impairment. However, the audio voice option is not defined for the website (e.g., it is other than a display parameter in the set of display parameters).

FIG. 100 illustrates an exemplary implementation for the second website display change adjusting at least one additional display parameter other than the set of display parameters, consistent with disclosed embodiments. On receiving the second input, e.g., from user 110B via device 170B (FIG. 1), processing device 210A (FIG. 2) may enable an audio voice option by invoking a microphone and voice recognition software configured with input interface 240 and a speaker and screen reader configured with output interface 242. By vocalizing content displayed via website 1004, the at least one processor may adjust at least one display parameter of the website (e.g., by converting it to an audio signal) other than one of the display parameters in the set of display parameters. However, the audio voice option may not be defined in the set of display parameters for website 1004.

According to some embodiments, the second website display change includes an adjustment to all of the display parameters in the set of display parameters and an adjustment to at least one additional display parameter other than a display parameter in the set of display parameters. For example, the set of display parameters defined for a website (e.g., associated with the website) may include default settings for text and graphics, but may not define a minimum window size. The second website display change (e.g., corresponding to visual impairment profile) may adjust all of the default text, graphics, and additionally may enlarge the window size displaying the webpage, e.g., to conform with a recommended minimum window size for the visual impairment profile. FIG. 11 illustrates an exemplary implementation for a second website display change adjusting all of the display parameters in the set associated with a webpage, as well as a parameter not included in the set of display parameters. While webpage 1004 may be associated with display parameters for text and page layout (e.g., the set of display parameters), webpage 1004 may not have a minimum window size defined for rendering content. Nonetheless, on receiving the second input (e.g., selection of visual impairment profile 1016_2), processor 210A (FIG. 2) may adjust the settings for any text, e.g., by increasing the font size, and hiding text 1014B, thereby adjusting all the display parameters in the set of display parameters. In addition, processor 210A may increase the size of the window displaying webpage 1004, e.g., to conform with a minimum size recommendation for users who are visually impaired, even though window size is a display parameter other than (e.g., not included in) the set of display parameters associated with webpage 1004.

According to some embodiments, at least one value of the plurality of display parameters is determined based on previously collected data. The term "previously collected data" may refer to data gathered and stored for a specific user or situation, a specific group of users or situations, or from a general group of users or situations. The previously collected data may be stored in memory, and analyzed, for example via a pattern recognition or learning algorithm to reveal an inclination or preference for certain display parameter settings over others. For example, FIG. 11 illustrates an exemplary implementation of determining at least one value of the plurality of display parameters based on previously collected data, consistent with disclosed embodiments. For example, based on previous uses of accessibility GUI 1008, processor 210A may determine a pattern among users with mild visual impairment preferring a font size of 16 points, versus users with heavier visual impairment who prefer a font size of 20 points. Processor 210A may adjust the font size (e.g., at least one display parameter) based on this history, e.g., by increasing the font size to 16 points for users with mild visual impairment, and to 20 points for users with heavy visual impairment.

According to some embodiments, a command includes a selection of a graphical element displayed on the website. For example, before opening the accessibility GUI, a website may display an image, e.g., embedded with a button, to allow a user to open the accessibility GUI by clicking (e.g., selecting) the image. Some embodiments may provide a voice command option alongside, or in place of the graphical display element. FIGS. 10A-10B, and 11 illustrate an exemplary embodiment for a command that includes a selection of a graphical element displayed on a website, consistent with disclosed embodiments. Website 1004 may display a button 2024 depicting a graphic symbol associated with accessibility. Clicking on button 2024 may cause processing device 210A to open (e.g., display) accessibility GUI 1008.

According to some embodiments, the second input from the accessibility GUI is indicative of a selection of a second web accessibility profile, and the operations further include receiving a third input via the accessibility GUI indicative of a selection of a third web accessibility profile, and based on the third input, implementing at least a third website display change to address a disability associated with the third web accessibility profile. For example, turning to FIG. 10A, a first user having a cognitive disability may select cognitive disability profile 1016_3 (e.g., the first input). After processor 210A (FIG. 2) implements the first display change to website 1004 on output interface 242 (e.g., corresponding to the first input to accommodate cognitive impairment), a user who is visually disabled may select visual impairment profile 1016_2 (e.g., the second input). After processor 210A implements the second display change to website 1004 on output interface 242 (e.g., corresponding to the second input to accommodate visual impairment), a third user who is epileptic may select Seizure Safe Profile 1016_1 (e.g., the third input). Processor 210A of computing device 170C may implement the third display change to website 1004 on output interface 242, corresponding to the third input to accommodate users who are prone to seizures. In this manner, processor 210A may implement multiple website display changes, each addressing a different disability.

According to some embodiments, the second input from the accessibility GUI is indicative of a selection of a second web accessibility profile, and the operations further include receiving a third input via the accessibility GUI indicative of a reselection of the specific web accessibility profile, and based on the third input, implementing at least a third change to address the specific disability associated with the specific web accessibility profile. For example, turning to FIGS. 10A-10B and 11, a first user having a cognitive disability may select cognitive disability profile 1016_3 (e.g., the specific web accessibility profile). After processor 210A (FIG. 2) implements the first display change (e.g., by displaying graphic images inside navigation buttons 1012_1-1012_6, shown in FIG. 10B), a second user who is visually disabled may select visual impairment profile 1016_2 (e.g., the second input). After processor 210A implements the second display change (e.g., by hiding graphic images inside navigation buttons 1012_1-1012_6 and vocalizing accompanying text 1014A and 1014B via a screen reader) a third user who is also cognitively impaired may reselect (e.g., again, for the second time) cognitive disability profile 1016_3 (e.g., the third input indicative of a reselection of the specific web accessibility profile). Processor 210A of computing device 170C may implement the third display change, e.g., by re-displaying graphic images inside navigation buttons 1012_1-1012_6 (FIG. 10B), to accommodate users who are cognitively disabled.

According to some embodiments, the set of display parameters of the website include at least two of: content scaling, readable font, highlight titles, highlight links, text magnifier, font size, line height, letter spacing, align center, align left, align right, contrast, monochrome, saturation, text colors, title colors, background color, mute sounds, hide images, read mode, reading guide, stop animation, highlight hover, and cursor appearance. The display parameter "content scaling" may refer to adjusting the size of text, icons, images, navigation elements and any other displayed elements in a manner to facilitate reading and use. The display parameter "readable font" may refer to a style of text. The style may correspond to an assortment or set of type or characters. The font may be readable if it is intended for reading by a user and/or if it is required to comply with regulatory efforts to assist people with disabilities. The display parameters "highlight titles" and "highlight links" may refer to enhancing the visual display of titles and links, e.g., by changing the color of the titles and links. Or adding a colored background. The display parameter "text magnifier" may refer to a feature that allows users to enlarge (e.g., zoom in) or otherwise enhance the visibility of displayed text content. The display parameters "font size," "line height", and "letter spacing" may refer to sizes (e.g., in pixels) for displaying text content. The display parameters "align center, align left, align right" may refer to how text is arranged or adjusted (e.g., against a margin) on a webpage. The display parameters "monochrome, saturation, text colors, title colors, background color" may refer to one or more Red Blue or Green (RBG) color values assigned to one or more display pixels, e.g., of output interface 242 (FIG. 2). The display parameter "hide images" may remove one or more graphic images from being displayed. For example, FIG. 11 illustrates the hiding of the graphic images displayed with navigation buttons 1012_1 to 1012_6 of FIG. 10B. The display parameter "read mode" may refer to a feature that simplifies reading of a webpage, e.g., by removing advertisements and other distracting content, and by enabling bookmarking, highlighting and other annotations that may facilitate reading. The display parameter "reading guide"

may include annotations, symbols and other markings that may facilitate reading. The display parameter "stop animation" may terminate an animated graphic image displayed on a website, e.g., to accommodate a user susceptible to seizures. The display parameter "highlight hover" may cause the color of display element, or the background color to change when a cursor is positioned over the display element. The display parameter "cursor appearance" may refer to the visual characteristics (e.g., size, color, shape) of a graphic indicator marking the focus on a webpage. The display parameter "mute sounds" may refer to an audio setting, e.g., to prevent emission of an audio signal. For example, when a video is displayed accompanied by an audio recording, the mute sounds display parameter may silence the audio recording. In some embodiments, the muted audio may be replaced with subtitles.

Figure 9:
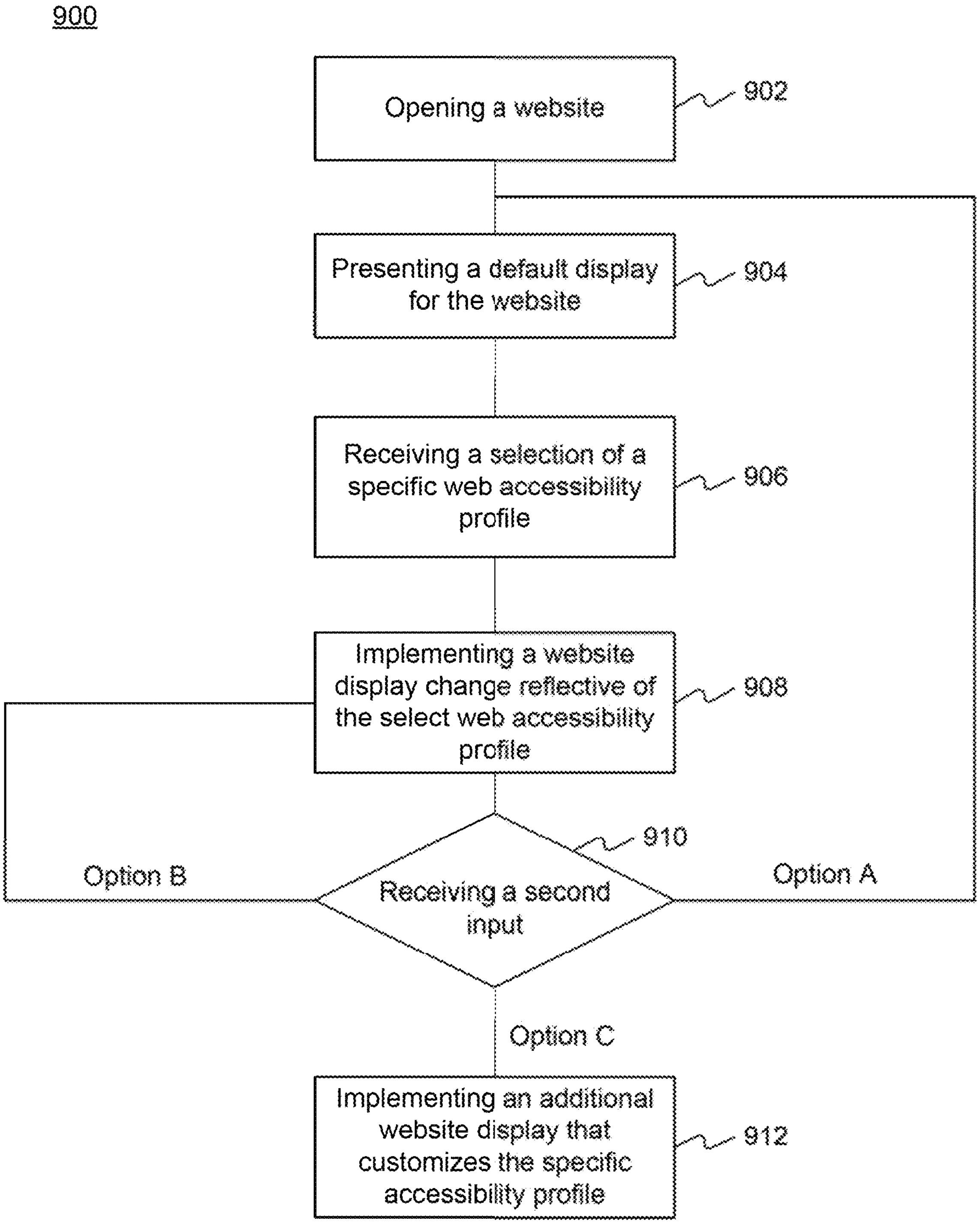
FIG. 9 illustrates a block diagram of an example process 900 for enabling users to switch between web accessibility profiles, consistent with disclosed embodiments.
Figure 12:
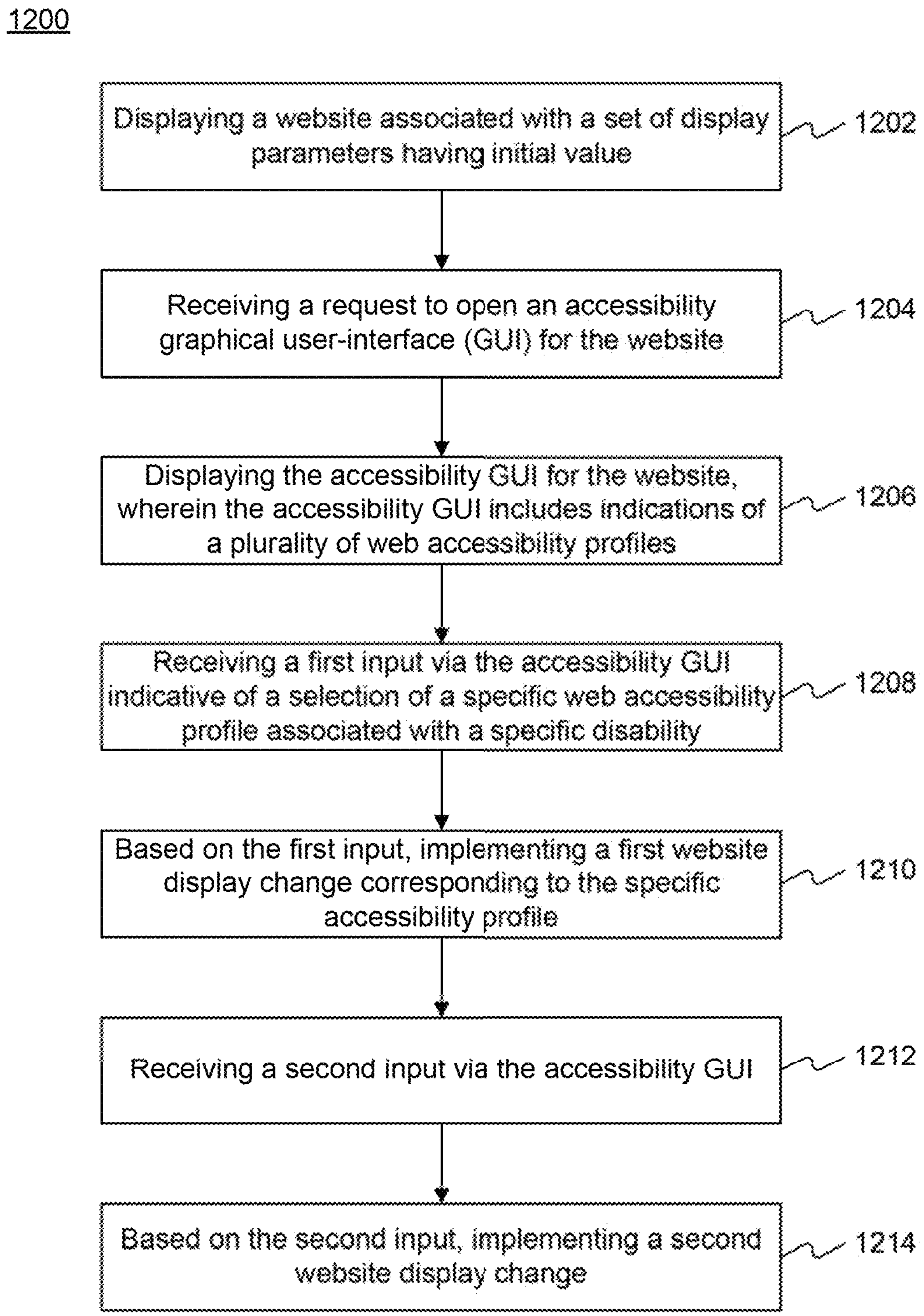
FIG. 12 illustrates a block diagram of an example process for enabling users to switch between web accessibility profiles, consistent with disclosed embodiments.

FIGS. 9 and 12 illustrate block diagrams of example processes for enabling users to switch between web accessibility profiles, consistent with embodiments of the present disclosure. While the block diagrams may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIGS. 9 and 12.

FIG. 9 illustrates a block diagram of an example process 900 for enabling users to switch between web accessibility profiles, consistent with embodiments of the present disclosure. In some embodiments, the process 900 may be performed by at least one processor (e.g., processing device 210A of computing device 170, shown in FIG. 2) to perform operations or functions described herein. In some embodiments, some aspects of process 900 may be implemented as software (e.g., program codes or instructions) that are stored in a memory (e.g., memory device 220A of computing device 170, shown in FIG. 2) or a non-transitory computer readable medium. In some embodiments, some aspects of the process 900 may be implemented as hardware (e.g., a specific-purpose circuit). In some embodiments, the process 900 may be implemented as a combination of software and hardware.

FIG. 9 includes process blocks 902 to 912. At block 902, the at least one processor may open a website. For example, processing device 210A of computing device 170 (FIG. 2) may open website 1004 (FIG. 6) for display via output interface 242.

At block 904, a default display for the website is presented. For example, turning to FIG. 10A, processing device 210A of computing device 170 (FIG. 2) may present a default display for website 1004, such as by using a default font type (e.g., Time New Roman) and font size (e.g., 14) for header 1010, and by displaying navigation buttons 1012_1 to 1012_6 with a plain white format.

At block 906, a selection of a specific web accessibility profile is received. For example, turning to FIG. 10A, processing device 210A (FIG. 2) may receive a first input, e.g., from an event listener associated with indication 1016_3, that user 110B (FIG. 1) has selected the cognitive disability profile corresponding to indication 1016_3.

At block 908, a website display change reflective of the select web accessibility profile is implemented. For example, turning to FIG. 10B, processing device 210A (FIG. 2) may implement a website display change to website 1004, such as by adding descriptive images to navigation buttons 1012_1 to 1012_6, thereby changing the plain white (e.g., default) display. The added descriptive images may facilitate a cognitively impaired user to navigate website 1004, thereby reflecting the selection of the cognitive disability profile configured to assist cognitively impaired users who may have difficulty reading text.

At block 910, a second input is received. For example, turning to FIG. 10C, processing device 210A (FIG. 2) may receive a second input, e.g., from an event listener assigned to indication 1016_3, that user 110B (FIG. 1) has made a second selection of the cognitive disability profile corresponding to indication 1016_3, for example by selecting a sub-category of the cognitive disability profile corresponding to the display format for header 1010.

At block 910 an additional website display that customizes the specific accessibility profile is implemented. For example, turning to FIG. 10C, processing device 210A (FIG. 2) may, based on the second selection of indication 1016_3 for the cognitive disability profile (e.g., the second input), implement an additional website display change corresponding to header 1010, e.g., by increasing the font size for header 1010 from 16 to 20, changing the font type from Times New Roman to Arial, and reducing the number of words displayed. These additional changes may customize (e.g., personalize) the cognitive disability profile for a specific cognitively disabled user who may be capable of reading only short sequences of text formatted with a large Arial font.

FIG. 12 illustrates a block diagram of an example process 1200 for enabling users to switch between web accessibility profiles, consistent with embodiments of the present disclosure. In some embodiments, the process 1200 may be performed by at least one processor (e.g., processing device 210A of computing device 170, shown in FIG. 2) to perform operations or functions described herein. In some embodiments, some aspects of process 1200 may be implemented as software (e.g., program codes or instructions) that are stored in a memory (e.g., memory device 220A of computing device 170, shown in FIG. 2) or a non-transitory computer readable medium. In some embodiments, some aspects of the process 1200 may be implemented as hardware (e.g., a specific-purpose circuit). In some embodiments, the process 1200 may be implemented as a combination of software and hardware.

At block 1202, a website associated with a set of display parameters having initial values is displayed. For example, processing device 210A of computing device 170 (FIG. 2) may display website 1004 (FIG. 10A) on output interface 242. Website 1004 may be associated with one or more default display settings (a set of display parameters having initial values), such as font sizes and styles suitable for non-disabled users.

At block 1204, a request (e.g., a command) is received to open an accessibility graphical user-interface (GUI) for the website. According to some embodiments, the website may be associated with a set of display parameter having initial values. For example, processing device 210A (FIG. 2) may receive a request, e.g., from user 110B to open accessibility GUI 1008 for website 1004, e.g., by clicking on button 1024. Website 1004 may be associated with multiple default display parameter settings, e.g., for rendering content on output interface 242 for non-disabled users.

At block 1206 the accessibility GUI for the website is displayed, wherein the accessibility GUI includes indications of a plurality of web accessibility profiles. Some embodiments may involve each web accessibility profile being associated with a differing disability. For example, turning to FIG. 10A, processing device 210A (FIG. 2) may display accessibility GUI 1008, e.g., inside section 1006 of interface 1000. Accessibility GUI 1008 may include indications 1016_1 to 1016_6 of multiple web accessibility profiles, such as a Seizure Safe Profile, and a visual impairment profile. In some embodiments, each of the accessibility profiles corresponding to indications 1016_1 to 1016_6 is associated with a different (e.g., distinct) disability.

At block 1208, a first input is received via the accessibility GUI indicative of a selection of a specific web accessibility profile associated with a specific disability. For example, turning to FIG. 10A, processing device 210A (FIG. 2) may receive a first input, e.g., from an event listener associated with indication 1016_3, that user 110B (FIG. 1) selected the cognitive disability profile corresponding to indication 1016_3, where the cognitive disability profile is associated with cognitive disabilities.

At block 1210, based on the first input, a first website display change corresponding to the specific accessibility profile is implemented. According to some embodiments, the first website display change alters a plurality of the initial values of the set of display parameters to address the specific disability. For example, turning to FIG. 10B, processing device 210A (FIG. 2) may, based on the selection of indication 1016_3 for the cognitive disability profile (e.g., the first input), implement one or more adjustments to the display of website 1004, for example by adding descriptive images to navigation buttons 1012_1 to 1012_6. The addition of the descriptive images may change (e.g., alter) the default settings for webpage 1004 (e.g., the initial values for the display parameters) that defined the display for navigation buttons 1012_1 to 1012_6 having a plain white format. The addition of the descriptive images may address the difficulty that cognitively disabled users may experience when reading text.

At block 1212, a second input is received via the accessibility GUI. For example, turning to FIG. 11, processing device 210A (FIG. 2) may receive a second input, e.g., from an event listener assigned to indication 1016_2, that user 110A (FIG. 1) selected the visual impairment profile corresponding to indication 1016_2.

At block 1214, based on the second input, a second website display change is implemented. According to some embodiments, the second website display change causes an adjustment to the altered values of the set of display parameters. For example, turning to FIG. 11, processing device 210A (FIG. 2) may, based on the selection of indication 1016_2 for the visual impairment profile (e.g., the second input), implement one or more adjustments to the display of website 1004, for example by removing the descriptive images added to navigation buttons 1012_1 to 1012_6 in FIG. 10B. Removing the descriptive images may alter adjustments made previously to the display parameters, e.g., during the first website display change. Additionally, processing device 210A may increase the font size for header 1010 and text 1014A.

In some embodiments, when the selected web accessibility profile is a vision impairment profile, and the set of display parameters includes a content scaling parameter and a saturation parameter, implementing the first website display change includes adjusting the content scaling parameter in a website code to increase content scaling and adjusting the saturation parameter in the website code to increase display intensity, and implementing the second website display change includes further adjusting at least one of the content scaling parameter and the saturation parameter to comply with the second input. For example, turning to FIG. 11, user 110A (FIG. 1) who is visually impaired may select the visual impairment profile by clicking on indicator 1016_2 (e.g., the first input). Website 1004 may have default settings defined for the content scaling and saturation display parameters, e.g., 100% and 75% respectively. Processing device 210A (FIG. 2) may implement the first display change for website 1004 by changing the source code (e.g., HTML, CSS, JavaScript) for website 1004 to increase the scale for displaying content, such as text and graphics to 110%, and increase the color saturation for displayed content to 90%. However, user 110A may find that this adjustment is not adequate and select additional options of accessibility GUI 1008 that further increase the scale for displaying content to 120% and increase the color saturation to 100%.

In some embodiments, when the selected web accessibility profile is a cognitive disability profile, and the set of display parameters includes a highlight titles parameter and a highlight actionable objects parameter, implementing the first website display change includes highlighting the detected titles and actionable objects, and implementing the second website display change includes further adjusting at least one of the highlight titles parameter and the highlight actionable objects parameter to comply with the second input. For example, turning to FIG. 10B, user 110B (FIG. 1) who is cognitively impaired may select the cognitive disability profile by clicking on indicator 1016_3 (e.g., the first input). Website 1004 may have default settings for displaying titles (e.g., heading 1010) and actionable objects (e.g., navigation buttons 1012_1 to 1012_6). For example, heading 1010 may be displayed with black letters against a white background, and buttons 1012_1 to 1012_6 may be displayed with a plain white format. Processing device 210A (FIG. 2) may implement a first display change for website 1004 by changing the source code (e.g., HTML, CSS, JavaScript) for website 1004 to add a yellow background color to heading 1010 (e.g., highlighting the title) and to buttons 1012_1 to 1012_6 (e.g., highlighting the actionable objects). However, user 110B may find that this adjustment is not adequate, and select additional options of accessibility GUI 1008, for example to add a 3D bevel to heading 1010 and buttons 1012_1 to 1012_6 that further adjust the highlighting of the title and actionable objects.

In some embodiments, when the selected web accessibility profile is an epilepsy-safe profile, the set of display parameters includes a saturation parameter and a stop animation parameter, implementing the first website display change includes adjusting the saturation parameter in a website code to decrease display intensity and executing a command in the website code to limit movement on a display, and implementing the second website display change includes further adjusting at least one of the saturation parameter and the stop animation parameter to comply with the second input. For example, turning to FIG. 10A, user 110C (FIG. 1) who has epilepsy may select the Seizure Safe Profile by clicking on indicator 1016_1 (e.g., the first input). Website 1004 may have default settings defined for color saturation (e.g., 75%), and a stop animation parameter for delaying the playing of video content after loading website 1004. Processing device 210A (FIG. 2) may implement a first display change for website 1004 by adjusting the source code (e.g., HTML, CSS, JavaScript) for website 1004 to reduce the color saturation to 70% and by executing one or more source code instructions (e.g., JavaScript) that cause the playing of the video to be delayed for 10 seconds after loading website 1004. However, user 110C may find that this adjustment is not adequate and select additional options of accessibility GUI 1008 (e.g., the second input). Processing device 210A may respond to the second input by further reducing the color saturation to 65%, and/or executing a source code instruction to delay the playing of the video indefinitely, to comply with the second input.

In some embodiments, when the selected web accessibility profile is an ADHD friendly profile, the set of display parameters includes a content scaling parameter and a stop animation parameter, implementing the first website display change includes adjusting the content scaling parameter in a website code to increase content scaling and executing a command in the website code to limit movement on a display, and implementing the second website display change includes further adjusting at least one of the content scaling parameter and the stop animation parameter to comply with the second input. For example, turning to FIG. 10A, a user who has ADHD may select the ADHD Friendly Profile by clicking on indicator 10164 (e.g., the first input). Website 1004 may have default settings defined for content scaling (e.g., 100%), and a stop animation parameter to delay playing video content after loading website 1004. Processing device 210A (FIG. 2) may implement a first display change for website 1004 by adjusting the source code (e.g., HTML, CSS, JavaScript) for website 1004 to increase the content scaling to 110%, and by executing one or more source code instructions to delay the playing of the video for 20 seconds after loading webpage 1104. However, the user may find that this adjustment is not adequate and select additional options of accessibility GUI 1008 (e.g., the second input). Processing device 210A may respond to the second input by further increasing the content scaling the color saturation to 65%, and delaying the playing of the video indefinitely, to comply with the second input.

Some embodiments involve systems, methods, and computer readable media for providing an accessibility GUI that, following a selection of a single profile established by a user, can migrate across multiple browsing sessions of that user. This may save the user considerable time in not having to select a profile for each session. The user may select a profile once and the profile may follow the user.

Some embodiments also involve systems, methods, and non-transitory computer readable media that perform operations for causing disability-related changes in website presentations across multiple browsing sessions.

A disability-related change may refer to any change in a website's display that may make it easier for an internet user who suffers from a disability to navigate a website. Disability-related changes may include, for example, one or more of content adjustments, including font sizing and text alignment adjustments; color adjustments, such as saturation and contrast adjustments; and/or orientation adjustments, including muting sound and stopping website animations. These changes may apply across multiple browsing sessions. A browsing session may refer to a time period during which an internet user peruses one or more websites. A browsing session may extend over any range of time, from as short as a few seconds to as long as multiple hours at a time. An internet user may also leave his or her computing device (e.g., a computer or mobile phone) and may return to his or her computing device to browse the internet later in the day. Thus, it may be desirable to keep any disability-related changes consistent across multiple browsing sessions.

The internet is comprised of a vast array of websites, which display a variety of content that may include inanimate and animate content such as photos, graphics, charts, and videos. Some websites may also include an audio component. Internet users who suffer from a disability may be unable to easily access portions of these websites. Some disclosed embodiments describe various profiles that streamline how users interact with these websites depending on the user's disability.

It may be also desirable to store a user's preferences across multiple browsing sessions, so that the user does not have to re-enter his or her disability preferences each time the user opens an internet browser or wants to use a different website. Some disclosed embodiments describe various web accessibility profiles based on a user's disability, and systems and methods of storing that information across various browsing sessions.

Some embodiments involve receiving, during a first website browsing session having an associated set of default values for display parameters, a web accessibility profile selection associated with a particular disability, the web accessibility profile selection having an associated set of disability profile values for the display parameters, the disability profile values differing from the default values. The first website browsing session may refer to a time period during which a user accesses a website after entering their login information or selecting a profile from the list of available profiles. This time period may precede other time periods during which the user may access the same website or different websites. The first browsing session may also refer to a time period during which a user downloads the accessibility interface. Or the first browsing session may refer to any browsing session that precedes a second browsing session. A user may access the internet multiple times in a day or across a multiple-day period. Thus, after a user selects an accessibility profile in a first browsing session, the user may return for a second browsing session. The second browsing session may refer to any subsequent browsing session that a user engages in after closing out of the first browsing session. Or the second browsing session may refer to any subsequent initiated browsing session in instances where a user may be running multiple browsing sessions in parallel. To save a user time when accessing various websites, it may be desirable to save a user's accessibility profile so that they do not have to enter their login information each time they want to access the internet.

Across the internet, different websites may display content with varying display parameters. The website display parameters (or simply display parameters) may include properties whose values provide constraints on a presentation of a website or a webpage on a screen associated with a computing device of the user. Examples of website display parameters may include content scaling, readable font, highlight titles, highlight links, text magnifier, font size, line height, letter spacing, align center, align left, align right, contrast, monochrome, saturation, text colors, title colors, background color, mute sounds, hide images, read mode, reading guide, stop animation, highlight hover, and/or cursor appearance.

Default values may refer to values of the one or more display parameters used to display content on a website before an accessibility profile is selected or when no alternative is specified by a user or by a programmer who created the website. The default values may be defined in a code associated with the website. For example, a default value for a website parameter may include the size of the font that is automatically displayed on the website. As another example, a default value for a website parameter may include the size of the window that is automatically displayed on the website. In another example, a default value for a website parameter may include the color theme that is automatically applied to the website. By way of example, the set of default values may indicate that a first title on the website has a font size of 14 pt. and a second title on the website has a font size of 18 pt. In another example, the set of default values may indicate that a website has a default color scheme, comprising text colors, title colors, and background colors. Here, the default values may indicate that the default text title is black, the title colors are black, and the background colors are white. In yet another example, the default values may indicate that a website contains sound or animated content.

An accessibility profile may include any type of data that may be used to adjust one or more website parameters to enable a user having a particular disability to access a website. In some embodiments, the values of the one or more website parameters stored in the accessibility profile may be different from the default values of the web display parameters. The values of the one or more website display parameters stored in the accessibility profile may constitute disability profile values. A user may suffer from a disability such as visual impairment, cognitive impairment, epilepsy, ADHD, or another disability that inhibits a user's ability to access a particular website. After an accessibility profile is selected, one or more display parameter default values may be modified based on the selected accessibility profile. A first website browsing session having an associated set of default values for display parameters may refer to, but is not limited to, the time period wherein a user is accessing the internet but has not yet selected a disability profile. Here, the website that the user is accessing may be displayed unaltered. In one example, a website may have text that is displayed at 12 pt and may include background animation.

Receiving a web accessibility profile selection associated with a particular disability may refer to a user using a computing device, such as a computer, consisting of an input device such as a mouse or touchpad and a keyboard, or a mobile device, to select an accessibility profile in a graphic user interface consisting of multiple accessibility profiles. If the user is accessing a website on a computer, the user may select the web accessibility profile by moving a cursor and clicking on a particular selection and/or may use a keyboard to select the profile via typing in commands. If the user is accessing a website on his or her mobile device, he or she may access the website by selecting a profile using a finger and/or voice command. Thus, receiving a web accessibility profile selection may include receiving a signal, data, alarm, alert, or any other sign in response to a user's selection of the accessibility profile using, for example, his or her computing device.

The disability profile values may differ from the default display parameters and may be based on website content. Thus, for example, disability profile values may include values for content scaling, title size, font size, line height, letter spacing, and/or text alignment. The disability profile values may specify values for one or more of the display parameters discussed above. For example, the disability profile values may include color adjustments, including one or more of saturation adjustments (e.g., displaying the website at a high or low color saturation), contrast adjustments (e.g., high contrast, dark contrast, or light contrast), adjusting to a monochrome color scheme, or adjusting the appearance of text, title, and/or background colors. As another example, the disability profiles may include orientation adjustments, including one or more of muting sounds, hiding images, stopping animations, implementing a reading guide or mask, or adjusting cursor size.

In one example, a user may select a profile that may make it easier for a visually impaired person to navigate a website. Such a profile may be comprised of content adjustments, including one or more of increasing content scaling and adjusting the font so that it is more readable, and color adjustments, such as increasing color saturation.

In some embodiments, the web accessibility profile selection is associated with at least a first predefined value of a first display parameter addressing a first aspect of the particular disability of the user and a second predefined value of a second display parameter addressing a second aspect of the particular disability of the user. Depending on a website user's disability, more than one display parameters may be adjusted based on selection of a web accessibility profile. For example, based on a user's disability, a certain display parameter may have a predefined value that may be different from a default value of that display parameter. A predefined value may refer to a stored display parameter value within a memory device associated with a user's computing device or a server.

In one example, a user may select a visually impaired profile wherein a first predefined value of a first display parameter addressing a first aspect of the disability may be increased color saturation and a second predefined value of a second display parameter addressing a second aspect of the particular disability may be increasing content scaling. Users who suffer from visual impairment may have more difficulty discerning website elements from one another. To address this user's disability, it may be desirable to increase display parameters such as color saturation and content scaling to make website elements brighter, more colorful, and larger, in order to aid the user in navigating a website.

In another example, a user may select an epilepsy-safe profile wherein a first predefined value of a first display parameter addressing a first aspect of the disability may be reduced color saturation, and a second predefined value of a second display parameter addressing a second aspect of the particular disability may be stopping animations. Users who suffer from epileptic seizures may be more sensitive to high-intensity color combinations, i.e., high-saturation and contrast color combinations, and flashing or blinking animations. To address this user's disability, it may be desirable to reduce the risk of high-contrast color combinations by reducing color saturation and by stopping all animations on the website.

Some embodiments involve changing, based on the web accessibility profile selection, the default values for the display parameters to the disability profile values to thereby cause, during the first website browsing session, the website to be accessible to a user with the particular disability. Different websites on the internet may have different default display parameters, such as default content scaling, font size, line height, letter spacing, text alignment, color contrast and saturation, animations, and/or cursor size. Depending on which accessibility profile a user selects, the default values of one or more display parameters may be changed to make the website accessible to the user with a disability associated with the selected accessibility profile. Different display parameter values may be associated with different accessibility profiles. In one example, a user may select a visually impaired profile, which may automatically adjust the default content scaling and color saturation display parameter values. In another example, a user may select an epilepsy-safe profile, which may automatically adjust the default color saturation display parameter value and may also stop on-screen animations. Changing the default values of one or more display parameters may make a website more accessible to a user with a particular disability because the website default values are replaced with adjusted display parameters based on a user's disability. For example, for a user with visual impairment, the value associated with a content size display parameter for images, photos, or graphics, may be increased by 100% from a default value to enable display of the content to the user in a magnified or zoomed manner. As another example, display parameters such as saturation or contrast may take values that are larger than their respective default values. When the saturation is increased, website elements appear brighter. When the contrast is increased, the difference in brightness between foreground and background colors is increased. In one example, hue numbers, which govern how saturated a color is in a website display, range from 0 to 255. Color saturation may also be determined by how much white or gray is present in a color. In this example, a high color saturation website display may be comprised of website elements wherein all displayed colors have hue numbers of 255. By contrast, accessibility profiles that aim to reduce color saturation, such as the epilepsy-safe profile, may reduce the default display hue number for saturation, for example to 50 or less.

In some embodiments, display parameter values associated with particular accessibility profiles may be stored in the memory of either the user's computing device via the hard drive, RAM, and/or ROM, in the browser via cookies, or in a memory device or database associated with a server. The modified display parameters that are associated with a particular accessibility profile may replace the default website display parameters. A user may wish to further modify display parameters at subsequent browsing sessions and may do so by selecting a different accessibility profile or choose to adjust individual display parameters such as content scaling via the accessibility GUI.

Some embodiments involve causing the web accessibility profile selection to be stored in memory in association with the user. Storing the web accessibility profile selection may refer to any method of saving, filing, or placing in a storage device the values of one or more display parameters associated with the web accessibility profile selected by the user. When an accessibility profile selection is stored, the display parameters associated with the accessibility profile may be stored so that when a user returns to his or her computer device for a second or subsequent browsing session, the default website displayed parameters may be automatically replaced with the display parameters associated with the previously selected accessibility profile. Methods of storing the web accessibility profile selection may include web storage, private clouds, public and hybrid cloud storage, cookies, and on a local backup drive. Web storage may refer to any method of storing client-side data that allows for greater storage capacity than cookies. A private cloud may refer to a cloud computing environment in which all hardware and software resources are dedicated exclusively to, and accessible only by, a single customer. Cloud computing may refer to the on-demand availability of computer system resources, such as data storage and computing power, without direct active management by the user. In contrast to private cloud storage, public cloud storage may be accessible by more than one user and may be offered based on a subscription service. A hybrid cloud is a type of data center infrastructure that combines private and public cloud elements, i.e., on-premises storage and cloud storage. In some embodiments, the web accessibility profile may be stored in a private cloud, a public cloud, and/or a hybrid cloud. The web accessibility profile selection may be stored in association with the user based on a user's log-in information, subscription information, and/or any other means of verifying a user's identity. Thus, for example, a user's log-in information, subscription information, and/or any other identifying information of the user may be linked to the web accessibility profile. Depending on the method of storage, a single user's accessibility profile may be stored, or a plurality of users' accessibility profiles. For example, a single user's accessibility profile may be stored in the user's computing device, web browser, or browser cookie. However, multiple users' accessibility profiles may be stored in a remote server via the cloud because that method of data storage has greater storage capability than an individual user's web browser, hard drive, RAM, and/or ROM.

Figure 13:
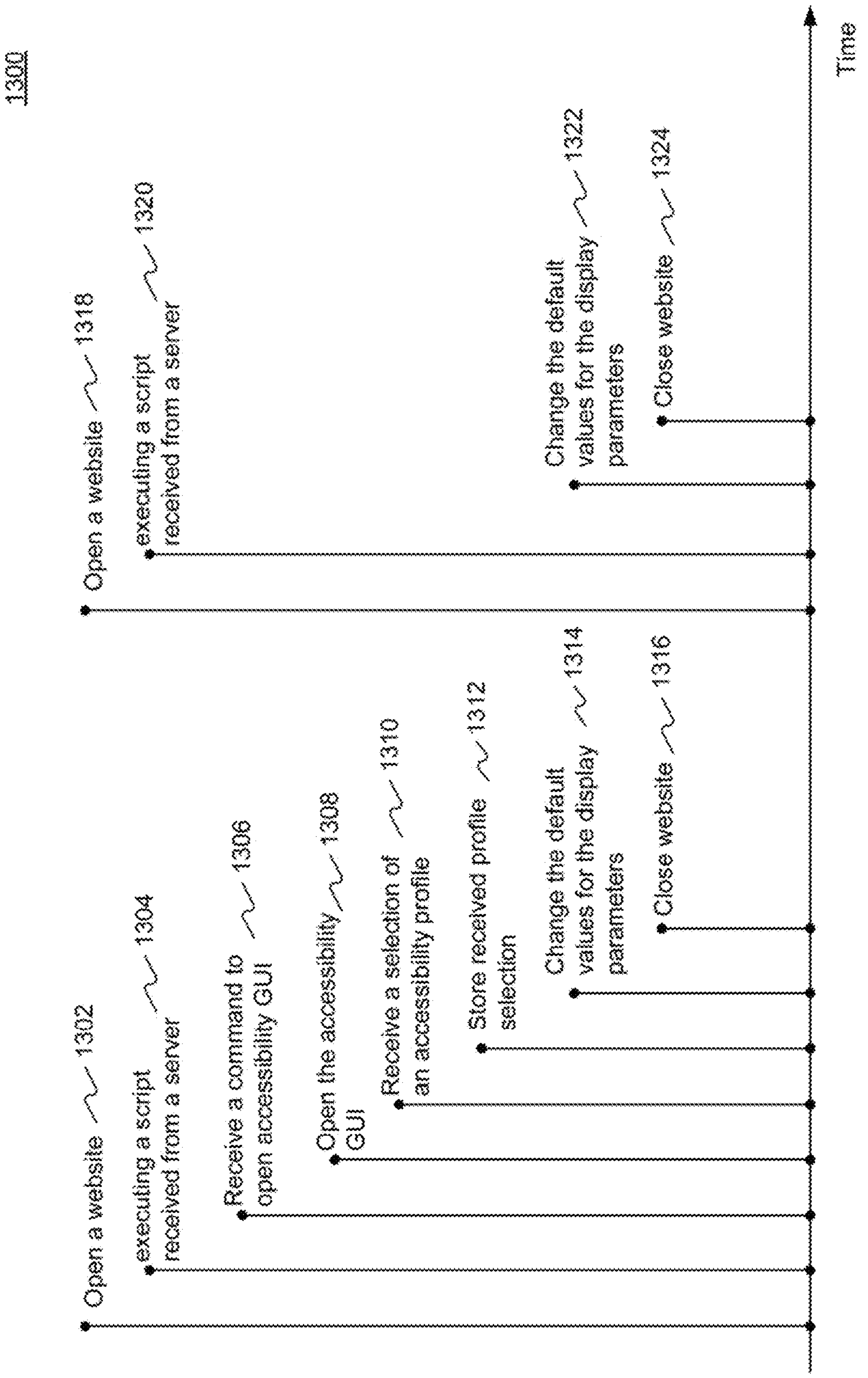
FIG. 13 illustrates an exemplary timeline consistent with some disclosed embodiments.

By way of example, FIG. 13 illustrates a timeline 1300 between a first browsing session and a second browsing session, wherein a user opens a website 1302, which executes a script received from a server. The computing device, which may be a computer, mobile phone, or tablet, may receive a command 1306 to open the accessibility graphic user interface (GUI). The accessibility GUI may be a downloadable browser extension that provides users with a plurality of predefined accessibility profiles to choose from, wherein each accessibility profile may alter one or more website display parameters, and also provides users with the option to individually customize website display parameters to optimize their internet browsing experience.

In step 1308, an internet user may open the accessibility GUI. In step 1310, the user may select a predefined accessibility profile based on the user's disability using the accessibility GUI. The user may select an accessibility profile by selecting it with a cursor, or, in the scenario that the user is blind, with a keyboard command with the assistance of a screen reader. After the user selects an accessibility profile, that profile may be stored at step 1312. One or more display parameters may be modified based on the selected predefined accessibility profile. The default values for the display parameters, i.e., how the website content was displayed before the user selected an accessibility profile, are replaced at step 1314 with the modified parameters that are part of the accessibility profile that the user selected. The user may then close the website at step 1316, thus ending the first browsing session.

In some embodiments, the memory is associated with a computing device used by the user to access the website. The accessibility profile selection may be stored in a hard drive, RAM, and/or ROM associated with a computing device being used by the user to access the website. The computing device may include, for example, a phone, a tablet, a laptop computer, a desktop computer, a smartphone, a smart watch, smart glasses, or any other computational device used by the user to access the website. A user's accessibility profile selection may also be stored in a web cookie associated with a user's computing device and the user's chosen web browser. When a user visits a website using his or her computing device, the server transfers a small packet of data into the computing device's browser. This cookie is designed to store information about the user, including a record of website visits and activity. In some embodiments, such information about the user may include a user's web accessibility profile selection.

In some embodiments, the memory may be associated with a remote server configured to store web accessibility profiles of multiple users. Whereas cookies or other web storage may be desirable for single users, additional storage may be needed to store multiple accessibility profiles. A remote server may be able to store the accessibility profile data of multiple users. A remote server is a server that is dedicated to handle users that are not on the local area network but need remote access. Users typically access a remote server via the internet. A remote server differs from a computation device because instead of being stored on a local device, data is stored on a server outside the local area network that a plurality of users may have access to. Examples of remote servers include Dropbox, Microsoft One Drive, and Google Drive. Accessibility profile data may also be stored on a network of servers, such as the cloud. A cloud is a pooled, centralized server resource that may be hosted and delivered over a network, such as the internet, and accessed on demand by multiple users at once. The remote server may be either a private server or public remote server and may store a user's accessibility profile in a variety of different data structures, such as an array, a linked list, a stack, a queue, a hash table, a tree, a heap, or a graph.

Some embodiments involve performing, during a second website browsing session of the user, a lookup in memory of the web accessibility profile selection of the user. Performing a lookup may refer to any algorithm or method used to retrieve previously stored accessibility profile information, stored via cookies, public and/or hybrid clouds, private clouds, web storage, and/or local backup drives. Examples of search algorithms may include a linear search, a binary search, a jump search, an interpolation search, and exponential search, a sub-list search, and/or a Fibonacci search. The lookup algorithm selects the particular user's accessibility profile and retrieves it from the data structure in which it is stored, either locally via hard drive, ROM, or RAM, or remotely via an individual server or the cloud. To perform the lookup, the algorithm may retrieve a user's ID and password or a user's computer ID (including an IP address and/or MAC address) from the data structure in which it is stored. For example, an internet user selects an accessibility profile from the accessibility GUI during a first browsing session. When the same user logs onto his or her computing device prior to the second browsing session, the lookup algorithm may retrieve the user's ID, which may be comprised of a username and password. The user ID may be associated with the accessibility profile selected during the first browsing session and may be automatically applied to the second browsing session.

Some embodiments involve determining, during the second website browsing session and prior to applying the web accessibility profile selection, whether a user associated with the second website browsing session is a same user that made the web accessibility profile selection during the first website browsing session. Determining whether a user associated with the second website browsing session is a same user that made the web accessibility profile selection during the first website browsing session may be based on a profile associated with the browser, may be based on a profile associated with the operating system, may be based on user actions prior to the second browsing session, and/or may be based on user log-in service to a service or email account. The determination may be based on a profile associated with the internet browser. The determination may also be made based on a profile associated with the particular operating system. For example, Windows or Mac computers provide users with an option to select a user profile, wherein each user profile contains the user's saved documents, files, and/or customized browsing settings. The determination may also be based on a log-in to a service or email account. For example, a user may enter log-in information associated with the accessibility GUI and may use his or her email to do so. Thus, the determination of whether the user is the same user may be based on log-in and email information.

In some embodiments, to determine whether the user between the first and second browsing sessions is the same user, the username and password information entered by the user during the second browsing session may be compared with similar information entered during the first browsing session. If the information matches, it may be determined that the user is the same and the selected accessibility profile selected during the first browsing session may be retrieved and automatically applied during the second browsing session. In another example, the e-mail login information entered by the user during the second browsing session may be compared with similar information entered during the first browsing session. If the entered information, i.e., username and password information, is the same between browsing sessions, then the accessibility profile may be automatically applied during the second browsing session.

Figure 14:
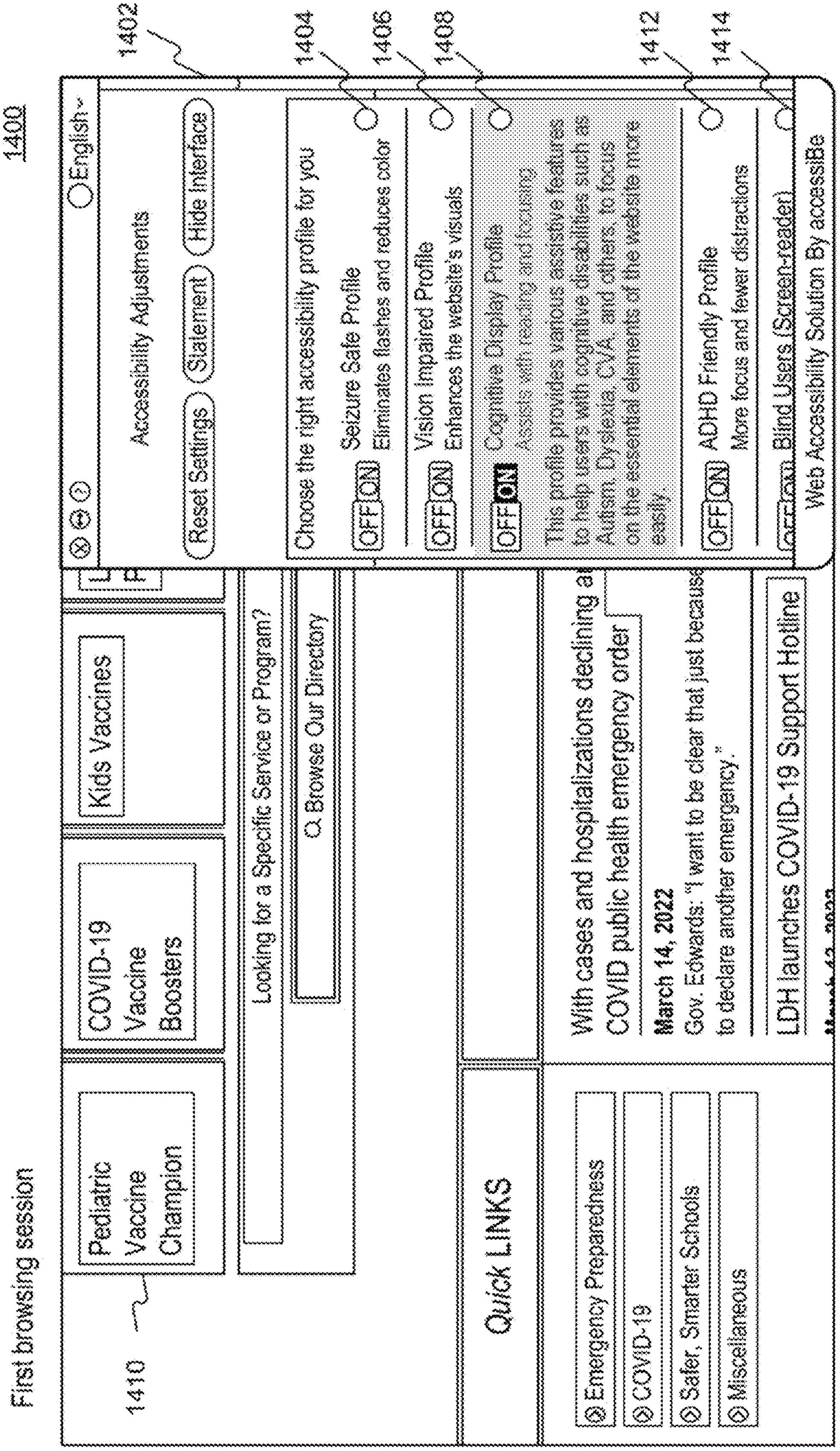
FIG. 14 is an exemplary screen shot of a first browsing session consistent with some disclosed embodiments.

By way of example, FIG. 14 illustrates a graphical user interface (GUI) and wherein a user may select from a variety of different predefined accessibility profiles in a first browsing session 1400. In first browsing session 1400, the website may be also modified based on the accessibility profile the user selected. A user may select the available accessibility adjustments via graphic user interface 1402. In addition to having the option to select an accessibility profile, a user may also have the option to reset the website display settings to the default display settings and also may have the option to hide the interface. A user may reset settings if they are borrowing someone else's computing device, such as a computer, mobile phone, or tablet, to use the accessibility GUI. A user may also reset settings if they accidentally adjust settings not to their liking or they select a profile that they do not like. As illustrated in the exemplary embodiment of FIG. 14, accessibility GUI may contain five different accessibility profiles that a user may select. A user may select an epilepsy-safe profile (seizure-safe profile) 1404, which may eliminate flashes and reduce color contrast. Users who suffer from epilepsy or other seizure disorders are more sensitive to light and sudden movements than other users, so it is desirable to eliminate flashes and blinking lights and to minimize movement. The epilepsy-safe profile may also limit the movement on a website to prevent blinking animations. The user may also have the ability to turn the epilepsy-safe profile 1404 on and off.

By way of another example, a user may select a vision-impaired profile 1406, which may enhance a website's visuals. Users who suffer from degrading eyesight, tunnel vision, cataracts, glaucoma, or any other eye or vision condition may select the vision-impaired profile 1406. The vision-impaired profile 1406 may increase the size of website elements, and also may increase brightness and contrast between website elements. The user may have the ability to turn the visually impaired profile 1406 on and off.

By way of another example, a user may select a cognitive disability profile 1408, which may assist with reading and focusing. Users who suffer from cognitive disabilities such as autism, dyslexia, a cerebrovascular accident (CVA), and/or any cognitive condition may select the cognitive disability profile 1408. Cognitive disability profile 1408 may increase the scale of text and headers and also may highlight text and links. In first browsing session 1400, a user may select the cognitive disability profile disability profile 1408. Here, the key features of a website, such as header 1410, are highlighted. The user may have the ability to turn the cognitive disability profile 1408 on and off.

By way of another example, a user may select neurodevelopmental disorder profile (ADHD Friendly Profile) 1412, which may provide more focus and fewer distractions. Users who suffer from neurodevelopmental disabilities such as ADHD may select neurodevelopmental disorder profile 1412. Neurodevelopmental disorder profile 1412 may significantly reduce distractions to help people with ADHD and other neurodevelopmental disorders browse, read, and focus on the essential elements of a website more easily. In doing so, neurodevelopmental disorder profile 1412 may provide users with a reading mask. A reading mask may refer to an apparatus used to help users focus on specific text. Specifically, the reading mask may only highlight certain text at a time, and other text may appear darker to the user. Depending on the content displayed on the website, the reading mask may be wider or narrower. The reading mask may follow the user's cursor when browsing a website. When the user selects the ADHD-friendly profile, website text may also appear larger to the user. The user may have the ability to turn the ADHD-friendly profile 1412 on and off.

By way of another example, a user may select screen-reader profile 1414, which may allow a blind user to navigate a website using a screen reader. The screen-reader profile may adjust the website to be compatible with screen readers such as JAWS, NVDA, VoiceOver, and TalkBack. Blind users may install screen readers prior to using the accessibility GUI, and the GUI may prompt automatically to screen readers.

By way of another example, a user may select a keyboard navigation profile, which may allow motor-impaired persons to operate a website using a keyboard in lieu of a cursor. Users may be able to operate a website by using the keyboard Tab, Shift+Tab, and Enter keys. Users may also use shortcuts such as "M" to access menus, "H" to access headings, "F" to access forms, "B" to access buttons, and "G" to access graphics, i.e., jump to specific elements.

Some embodiments involve, upon determining that the first and second website browsing sessions are associated with the same user, applying the web accessibility profile selection without user intervention. During a first website browsing session, a user may select an accessibility profile via the accessibility GUI. The accessibility profile selection may be stored in association with that user. In some embodiments, it may be desirable to prevent unnecessary user intervention, i.e., a user should not have to re-enter his or her preferred accessibility profile in each browsing session. After determining the user in the second browsing session is the same as the first browsing session, the accessibility profile stored in association with that user may be applied automatically. For example, a user opens his or her laptop computer and logs onto the internet. After opening the browser, the user is prompted to select a profile associated with the user's email address. After the user selects a profile, the processor associated with the accessibility GUI recognizes that the selected profile matches the profile that the user selected during the first browsing session. The processor thus determines that the users between the first browsing session and the second browsing session are the same, and accordingly, applies the same accessibility profile that the user selected during the first browsing session.

Some embodiments involve, upon determining that the first and second website browsing session are associated with different users, applying the associated set of default values for display parameters. Different users may share the same computer, or a user may desire to log onto the internet at a work computer or computer that they do not typically use, such as a computer at a library or internet café. Here, different users may access the computer at different times, i.e., the same user may not always be using the computer. Thus, it may be desirable to replace the display parameters values that a selected accessibility profile modifies with default display parameter values if the two users are not the same between browsing sessions.

Display parameter values may refer to a website's content scaling, titles, titles, font size, line height, letter spacing, and/or text alignment. Specifically, default display parameter values may refer to how the website content was displayed before the user selected an accessibility profile. In one example, a user is browsing the internet on a shared computer using an accessibility profile that he or she selected based the user's disability. Based on the accessibility profile that the user selected, website display parameters are adjusted accordingly. The user logs off the shared computer, and another user, for example, the user's family member, logs onto the shared computer. The second user selects the appropriate user profile at login. The processor may recognize that the two users between the first and second sessions are not the same user, and instead of displaying website content based on the accessibility profile the first user selected, the processor may display website content at the website's default display parameters, pending input from the second user.

Some disclosed embodiments involve applying the web accessibility profile selection during the second website browsing session to thereby cause the second website browsing session to be accessible to the user with the particular disability. The first browsing session may, for example, refer to the first time a user accesses a website after entering their login information or selecting a profile from the list of available profiles. The first browsing session may also refer to the first time that a user interacts with the accessibility interface or may refer to any browsing session that precedes a second browsing session. The second browsing session may refer to any subsequent browsing session that a user engages in after closing out of the first browsing session. To save a user time when accessing various websites, it may be desirable to save a user's accessibility profile so that they do not have to enter their login information each time they want to access the internet. In the second browsing session, the accessibility profile that the user selected during the first browsing session is automatically applied. For example, in a first browsing session, a user selects the epilepsy-safe profile. During the second browsing session, the epilepsy-safe accessibility profile may be automatically applied. Additionally, the same epilepsy-safe profile may be applied to any subsequent browsing session unless a user customizes a feature of the epilepsy-safe profile, such as slowing animations and decreasing color saturations. From that point forward, the newly customized version of the epilepsy-safe profile may be applied.

Returning to FIG. 13, a user may reopen the Internet browser during a second browsing session 1318. In doing so, the website may execute a script received from a server at step 1320. At step 1322, the default values for the display parameters may be automatically changed to the display parameter values that the user selected during the first browsing session. At step 1324, the user may close a website, thus ending the second browsing session. The accessibility profile settings from the first browsing session may still be stored across subsequent browsing sessions until a user modifies them.

Figure 15:
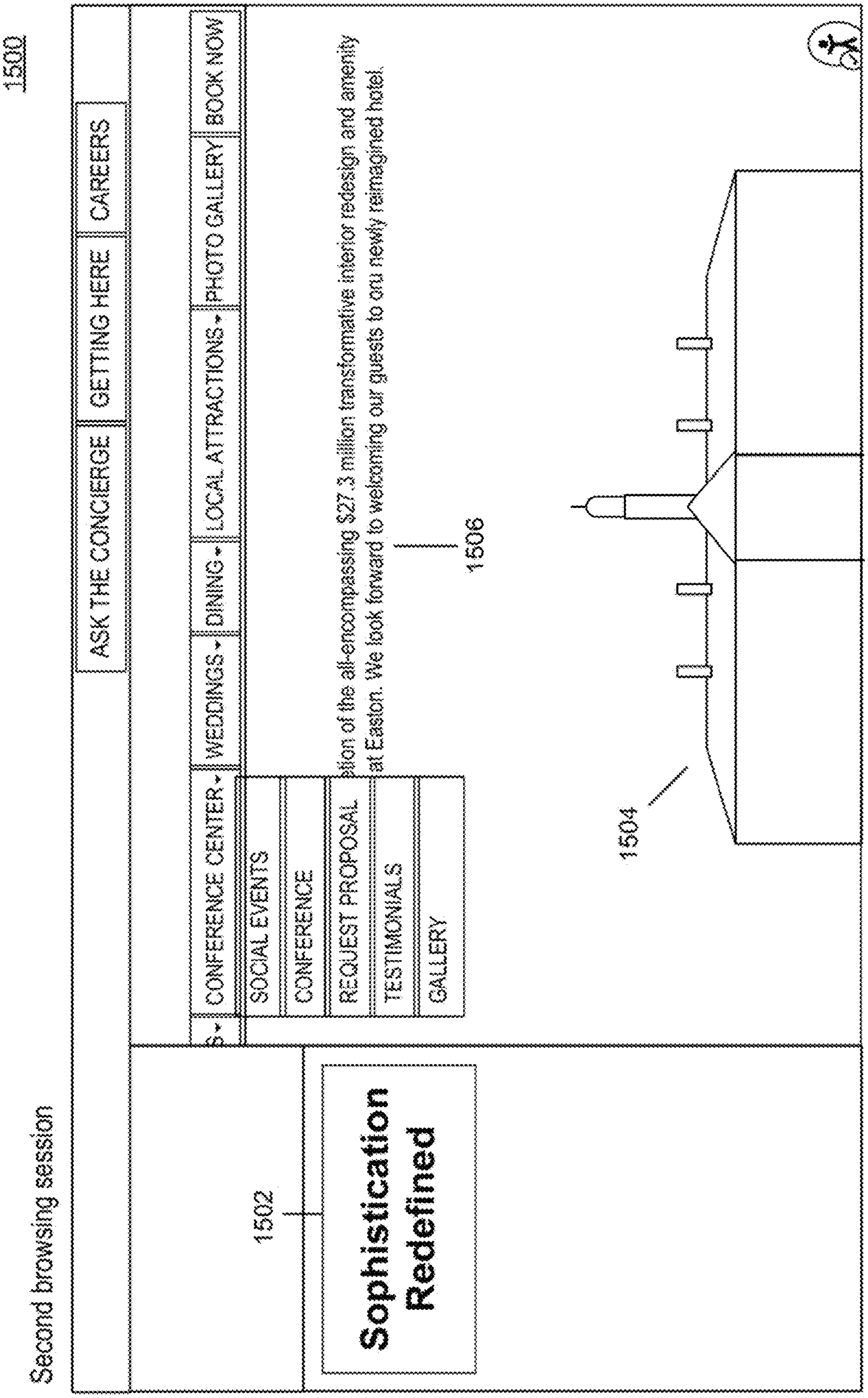
FIG. 15 is an exemplary screen shot of a second browsing session, consistent with some disclosed embodiments.

FIG. 15 depicts an exemplary illustration of a second browsing session 1500, wherein the accessibility profile selected from the first browsing session is saved in the second browsing session. Here, header text 1502 is highlighted because the user in FIG. 14 selected the cognitive disability profile. The processor associated with the accessibility interface scans and analyzes the visual appearance of the website as well as the website's code. When a user selects the cognitive display profile, titles and links are highlighted, and content scaling is increased by at least 5%. Background image 1504 and background text 1506 are not highlighted because the processor associated with the accessibility interface has determined that such website elements are not headers or links, and thus not critical to navigating the website based on the selected accessibility profile.

In some embodiments, during the second website browsing session, a display of the website is automatically modified to conform with the particular disability of the user without manually receiving a selection of the web accessibility profile during the second website browsing session. To avoid unnecessarily inhibiting a user's internet browsing experience, it is desirable to save the user's accessibility profile preference between browsing sessions. Accordingly, the display of a website may be automatically modified to conform with a previously entered accessibility profile without requiring the user to reenter their login information or accessibility preferences. Such modifications may be based on a website's display parameters, including a website's content scaling, font, titles, links, line height, line spacing, text alignment, color scheme, color contrast and saturation, text colors, title colors, background colors, and/or animations.

For example, a user may select a visually impaired profile from the accessibility interface during a first browsing session. When the user logs onto his or her computational device (which may be a computer or mobile device) for a second browsing session, the visually impaired profile that the user selected during the first browsing session may be automatically applied. In this example, display parameters that are modified based on the visually impaired profile, which includes creating readable font, increasing content scaling, and increasing saturation, are automatically applied to the website during the second browsing session. In accordance with some disclosed embodiments, a user does not need to manually select the accessibility profile he or she selected during the first browsing session during the second browsing session.

In some embodiments, the first website browsing session and the second website browsing session involve the same website. A user may select an accessibility profile during a first browsing session, such as the epilepsy-safe profile, and return to his or her computing device for a second browsing session. In one example, the user may return to the same website that he or she visited during the first browsing session for the second browsing session. Here, the display of the website during the second browsing session may be automatically modified to conform with the epilepsy-safe profile that the user selected during the first browsing session without the user having to manually select the same accessibility profile during the second browsing session. Display parameters that may be modified based on an epilepsy-safe profile may be reducing color saturation and stopping animations. These display parameters may be automatically modified without user input during the second browsing session.

In some embodiments, applying the web accessibility profile selection during the first website browsing session changes a first visual presentation displayed on the website, and applying the web accessibility profile selection during the second website browsing session changes a second visual presentation displayed on the website. Even though the website that the user navigates between the first and second browsing sessions is the same, the displayed content between sessions may differ. Visual presentation may refer to how different display parameters, for example, a website's content scaling, font, titles, links, line height, line spacing, text alignment, color scheme, color contrast and saturation, text colors, title colors, background colors, and/or animations are arranged on a particular website. For example, even though the website between the first and second browsing session remains the same, different text and other visual elements may be presented in a different way. In this example, when a user first visits a website, the website may only display text and no animated content. Such a website may be a news outlet website that initially displays text content, such as headers and then displays video content as the user scrolls down further. Here, when the user scrolls through the website, the website may display less text and more animated content. Furthermore, depending on the accessibility profile that a user selects during the first browsing session, different display parameters may be modified. In one example, the user may select an epilepsy-safe profile during the first browsing session, which reduces color saturation and stops animations. Here, the first visual presentation on the displayed website may refer to reducing color saturation for the website's background, and the second visual presentation on the displayed website may refer to stopping animations when the user scrolls further down the website.

In another example, a user may select a neurodevelopmental disorder profile during a first browsing session, wherein content scaling is increased, color saturation is increased, animations are stopped, and a reading mask is implemented. A reading mask may highlight certain portions of a webpage while darkening other portions of a webpage to assist a website user in focusing on only a small portion of a website at a time. The processor as part of the accessibility interface may scan the website and the website code to determine what portions of the website are text and what portions are images to aid in determining how wide the reading mask should be. Websites that are comprised of predominately text, such as a website dedicated to news or scholarly publications, may have a narrower reading mask so that the user can focus on a small amount of text at a time. On the other hand, websites that have more photos, graphics, or animate content, such as an online shopping website, may have a wider reading mask because the images may take up more space on the website. In this example, wherein the user selects a neurodevelopmental disorder profile during a first browsing session, the selected website may be a website, comprising mostly text. Here, the reading mask may be narrow to allow the user to focus on a smaller portion of text at a time, and the color saturation may be increased to allow the user to discern website elements more easily. Either the reading mask or the increased color saturation may be the first visual presentation of the website that is modified. During the second website session, the user may visit an online shopping website comprised of images and animate content. Here, the selected neurodevelopmental disability profile may stop animations on a webpage to assist a user in navigating a website. In this example, stopping animations is the second visual presentation that is modified.

In yet another example, a user may select a visually impaired profile wherein content scaling is increased and font size may also be increased. In this example, the first website that the user visits may be a news website that displays articles for users to read. When the selects the visually impaired profile, the size of the displayed texts automatically increases by 100% during the first browsing session. The user may return to the same website during the second browsing session and select a second article to read, either via scrolling down the website or by clicking a hyperlink for the article on the website. Here, the text of the second article automatically increases in size to address the user's disability. The second article may or may not be available to the user the first time.

In some embodiments, the first website browsing session and the second browsing session involve differing websites. A user may select an accessibility profile during a first browsing session, and that accessibility profile selection is stored for subsequent browsing sessions. The user may then return to his or her computing device for a second browsing session and may desire to visit a different website from the website that the user visited. For example, a user may visit a news website during a first browsing session and a shopping website during a second browsing session. The two websites may have varying display parameters, i.e., the first website may be comprised of predominately text content and minimal graphic or animate content, whereas the second website may have the opposite.

In some embodiments, applying the web accessibility profile selection during the first website browsing session changes a first visual presentation of the first website, and applying the web accessibility profile selection during the second website browsing session changes a second visual presentation of the second website. Visual presentation may refer to how different display parameters, such as a website's content scaling, font, titles, links, line height, line spacing, text alignment, color scheme, color contrast and saturation, text colors, title colors, background colors, and/or animations are arranged on a particular website. Visual presentation of various website elements, such as text and graphics, may differ between two different websites. For example, a scholarly publication website that primarily presents text content may have a different visual presentation than an online shopping website that may be comprised of various photos, graphics, and/or even animations.

In one example, a user may visit a first website dedicated to scholarly publications during a first browsing session. The website may only display text and no animated content. The user may visit a second website that is dedicated to online shopping during a second browsing session. Unlike the first website in the first browsing session wherein the displayed content, i.e., the visual presentation, was primarily comprised of text content, the second website may be comprised of minimal text and more photos, graphics, or animated content. Depending on the accessibility profile that a user selects during a first browsing session, the visual presentation of the website may change, i.e., different display parameters are modified between sessions.

In one example, the user may select an epilepsy-safe profile during the first browsing session, which reduces color saturation and stops animations. Here, the first visual presentation on the first website may refer to reducing color saturation for the website's background, which may affect the displayed text color and background color of any images. The epilepsy-safe profile also stops animation on the webpage, but because in this example the first website primarily involves scholarly publications, the website may not be modified. However, the second website in this example, which is dedicated to online shopping, may include animations, i.e., a second visual presentation, as well as photos and graphics showing what the website sells. The second website may contain animations, which were not present on the first website. Therefore, the epilepsy-safe profile may change the second visual presentation on the second website, the animations.

In another example, a user may select a neurodevelopmental disorder profile during a first browsing session, wherein content scaling is increased, color saturation is increased, animations are stopped, and a reading mask is implemented. Wherein the user selects a neurodevelopmental disorder profile during a first browsing session, the first website may be a website dedicated to scholarly publications, comprising mostly text. Here, the reading mask may be narrow to allow the user to focus on a smaller portion of text at a time, and the color saturation may be increased to allow the user to discern website elements more easily. Either the reading mask or the increased color saturation may be the first visual presentation of the website that is modified. During the second website session, the user may visit an online shopping website comprised of images and animate content. Here, the selected neurodevelopmental disability profile may stop animations on a webpage to assist a user in navigating a website. In this example, stopping animations is the second visual presentation that is modified.

Some embodiments involve, during the first website browsing session, receiving a profile customization selection to personalize a presentation of the website and thereby address specific accessibility needs of the user, and applying the web accessibility profile selection and the profile customization selection during the second website browsing session.

While previously described embodiments in the specification involve selecting one of a set group of accessibility profiles with predefined display setting changes, some embodiments involve selecting one of these accessibility profiles and further customizing it. In doing so, a user, after selecting one of a plurality of accessibility profiles, may select one of a plurality of further content adjustments. These content adjustments may include adjusting content scaling, font sizing, line height, and letter spacing. A user may also elect to highlight titles, links, may magnify text, select a more readable font (i.e., one that is bold), and may align the website text center, left, or right. A user may also elect to make a plurality of further color adjustments. These color adjustments may include adjusting the contrast, e.g., high contrast, dark contrast, or light contrast, adjusting the color saturation, e.g., high saturation or low saturation, and may also adjust whether the website is displayed in monochrome. A user may also adjust the individual text, title, and background colors to his or her liking. A user may also elect to make a plurality of further orientation adjustments, which may refer to any website adjustments that are not content (e.g., text size and content scaling) or color (e.g., saturation or contrast) adjustments. The orientation adjustments may include muting sounds, hiding images, toggling a reading guide, stopping animations, toggling a reading mask, or adjusting the size of the cursor. A reading guide replaces the user's cursor with a long bar that is meant to underline text in a sentence. A user may make the individual customizations in the accessibility interface. As with the accessibility profiles themselves, a user's selected individual customizations may be stored in the user's computing device, such as in the hard drive, RAM, and/or ROM. The user's selected customizations may also be stored in the user's browser via cookies or may be stored in a data structure on a remote server consistent with embodiments disclosed in this specification. Any adjustment is automatically saved between a first and second browsing session.

For example, a user may select a cognitive disability profile that, by default, increases content scaling, highlights titles and links, and stops animations. However, a user may also choose to customize the selected accessibility profile by adjusting the font sizing, selecting a more readable font, i.e., a font that is bold and stands out more to the reader, or may adjust color saturation or contrast settings.

In some embodiments, the profile customization selection may be configured to cause a supplemental change in a display parameter included in a group of display parameters associated with the web accessibility profile. Each accessibility profile may be comprised of adjustments to one or more display parameters. In some embodiments, a user may further adjust content, color, and orientation via the accessibility interface after selecting an accessibility profile. Some disclosed embodiments may permit the user to adjust one or more display parameters that may have already been modified based on the selected accessibility profile.

In one example, a user may select an accessibility profile from a list of profiles, such as the visually impaired profile. The visually impaired profile may be comprised of various predefined content and color adjustments, but no orientation adjustments. For example, the content adjustments may be comprised of increasing content scaling by 100% and selecting a readable font, by default. The color adjustments are comprised of increasing the saturation by default. The described embodiments permit the user to make further content and color adjustments. In this example, a user may desire to make further content adjustments, such as increasing or decreasing the content scaling, highlighting titles and links, adjusting font sizing, adjusting line height, magnifying text, or adjusting alignment. Regarding color adjustments, a user may choose to increase contrast in addition to the high saturation that was increased by default.

In some embodiments, the profile customization selection may be configured to cause a supplemental change in a display parameter excluded from a group of display parameters associated with the selected web accessibility profile. Each accessibility profile may be comprised of adjustments to one or more display parameters. In some embodiments, a user may further adjust content, color, and orientation via the accessibility interface after selecting an accessibility profile. Some disclosed embodiments may permit the user to adjust one or display parameters that may not have already been modified based on the selected accessibility profile.

In one example, a user may select an accessibility profile from a list of profiles, such as the cognitive disability profile. The cognitive disability profile is comprised of various predefined content and orientation adjustments, but no color adjustments. Specifically, the content adjustments may be comprised of increasing content scaling by 25% and highlighting titles and links, by default. The orientation adjustments may be comprised of stopping animations, by default. The described embodiments permit the user to make further content and orientation adjustments, but also permit a user to make adjustments to display parameters typically excluded from a group of display parameters associated with the selected web accessibility profile. In this example, a user may therefore make color adjustments as needed, in addition to any desired content and orientation adjustments. Here, a user may choose to increase or decrease color saturation or contrast, may elect to display a website in monochrome, or may adjust text, title, and/or background colors.

Some disclosed embodiments involve a method for causing disability-related changes in website presentations across multiple browsing sessions. The method may include, during a first website browsing session having an associated set of default values for display parameters, receiving a web accessibility profile selection associated with a particular disability, the web accessibility profile selection having an associated set of disability profile values for the display parameters, the disability profile values differing from the default values. The method may also include, based on the web accessibility profile selection, changing the default values for the display parameters to the disability profile values to thereby cause, during the first website browsing session, the website to be accessible to a user with the particular disability. The method may also include causing to be stored in memory in association with the user, the web accessibility profile selection. The method may also include, during a second website browsing session of the user, performing a lookup in memory of the web accessibility profile selection of the user; and applying the web accessibility profile selection during the second website browsing session to thereby cause the second website browsing session to be accessible to the user with the particular disability.

Users may select an accessibility profile in a first browsing session and return to their computing device later for a second browsing session. It is desirable to keep a user's selecting settings uniform between subsequent browsing sessions. In some embodiments, a web accessibility profile selected during a first website browsing session is a vision impairment profile, and during the second website browsing session, content scaling and display intensity may be increased to address the user's accessibility needs. Content scaling and display intensity may also be increased during the first website browsing session. Visually impaired website users may have difficulty discerning different website elements from one another. Therefore, it may be desirable to increase the display intensity, by adjusting the color saturation and contrast, of different website elements so that a user may be able to navigate between different website elements more easily. Additionally, increasing the size of the displayed website content may assist a visually impaired user in navigating a website.

For example, a user may select an accessibility profile in a first browsing session, in which website elements, such as pictures, text, videos, and/or other content, are presented unaltered before selection of the accessibility profile. After the visually impaired accessibility profile is selected, one or more website elements may be displayed at a size larger than they were originally, and the website elements may also be displayed at a higher intensity (e.g., at a high color saturation and contrast) so as to make it easier to discern between two website elements. When the user returns to his or her device for a second browsing session, it may be desirable to maintain the settings that the user entered during the first browsing session. Thus, during the second browsing session, content scaling and website element display intensity may be automatically increased to address the user's accessibility needs.

In some embodiments, a web accessibility profile selected during a first website browsing session is a cognitive disability profile, and the second website browsing session may include automatically highlighting titles and actionable objects to address accessibility needs of the user. Website users who suffer from cognitive disabilities may have difficulty focusing on the essential elements of a website, such as, main headers, interactive tabs, and/or search bars. Therefore, it may be desirable to automatically highlight titles and actionable objects to assist such a user in navigating the website. Highlighting titles and actionable objects such as a search bar or website tabs may ensure that the essential elements of a website become more noticeable and less important elements, such as background photos, advertisements, or smaller text, are not as much of a distraction. The processor associated with the accessibility GUI may scan the website and the website's source code to determine what content is text, headings, images, graphics, videos, and/or animations. Within the cognitive disability profile, movement of background elements may also be paused so as to reduce distractions. When the user returns to his or her device for a second browsing session, it may be desirable to maintain the settings that the user entered during the first browsing session. Therefore, during the second or subsequent browsing session, titles and actionable objects may be automatically highlighted to address the user's accessibility needs.

In some embodiments, a web accessibility profile selected during a first website browsing session is an epilepsy-safe profile, and the second website browsing session may include automatically decreasing display intensity and limiting animation movement on a display to address accessibility needs of the user. Website users who suffer from epilepsy may be more sensitive to certain rates of flashing lights or contrasting light and dark patterns than other users. Therefore, it may be desirable to decrease display intensity (i.e., color saturation and/or contrast) between website elements so as to avoid triggering an epileptic seizure. For example, in a first browsing session, website elements, such as pictures, text, videos, and/or other website content, may be presented unaltered before selection of an accessibility profile. After the epilepsy-safe accessibility profile is selected, color intensity may be reduced so that two website elements, for example, two photos, appear less saturated to the user and there is less contrast. Additionally, animate content, such as an embedded video playing in the background of a website, may appear inanimate or stationary to further reduce contrast between website elements to an epileptic user. When the user returns to his or her device for a second browsing session, it may be desirable to maintain the settings that the user entered during the first browsing session. Thus, during a second or subsequent browsing session, display intensity and animation movement may be automatically limited to address the user's accessibility needs.

In some embodiments, a web accessibility profile selected during a first website browsing session is a neurodevelopmental disorder profile, and the second website browsing session may include automatically increasing content scaling and limiting animation movement to address accessibility needs of the user. Content scaling may also be automatically increased, and animation movement limited during the first browsing session. The neurodevelopmental disorder accessibility profile reduces distractions and provides more focus to certain website elements, which may be helpful to website users who suffer from ADHD or other similar neurodevelopmental disorders. In one example, a website user may wish to read an article. The neurodevelopmental disorder accessibility profile may aid the website user in reading the article by only highlighting a few lines of text at a time as the user moves through the article. The text that the user is not currently reading may appear less bright than the relevant text. In some embodiments, the function of highlighting certain text and not highlighting other text may be referred to as a reading mask. The portion of text that is highlighted by the reading mask may differ between browsing sessions. When the user returns to his or her device for a second browsing session, it is desirable to maintain the settings that the user entered during the first browsing session. Here, display intensity (i.e., color saturation and contrast) and animation movement are automatically limited to address the user's accessibility needs.

Figure 16:
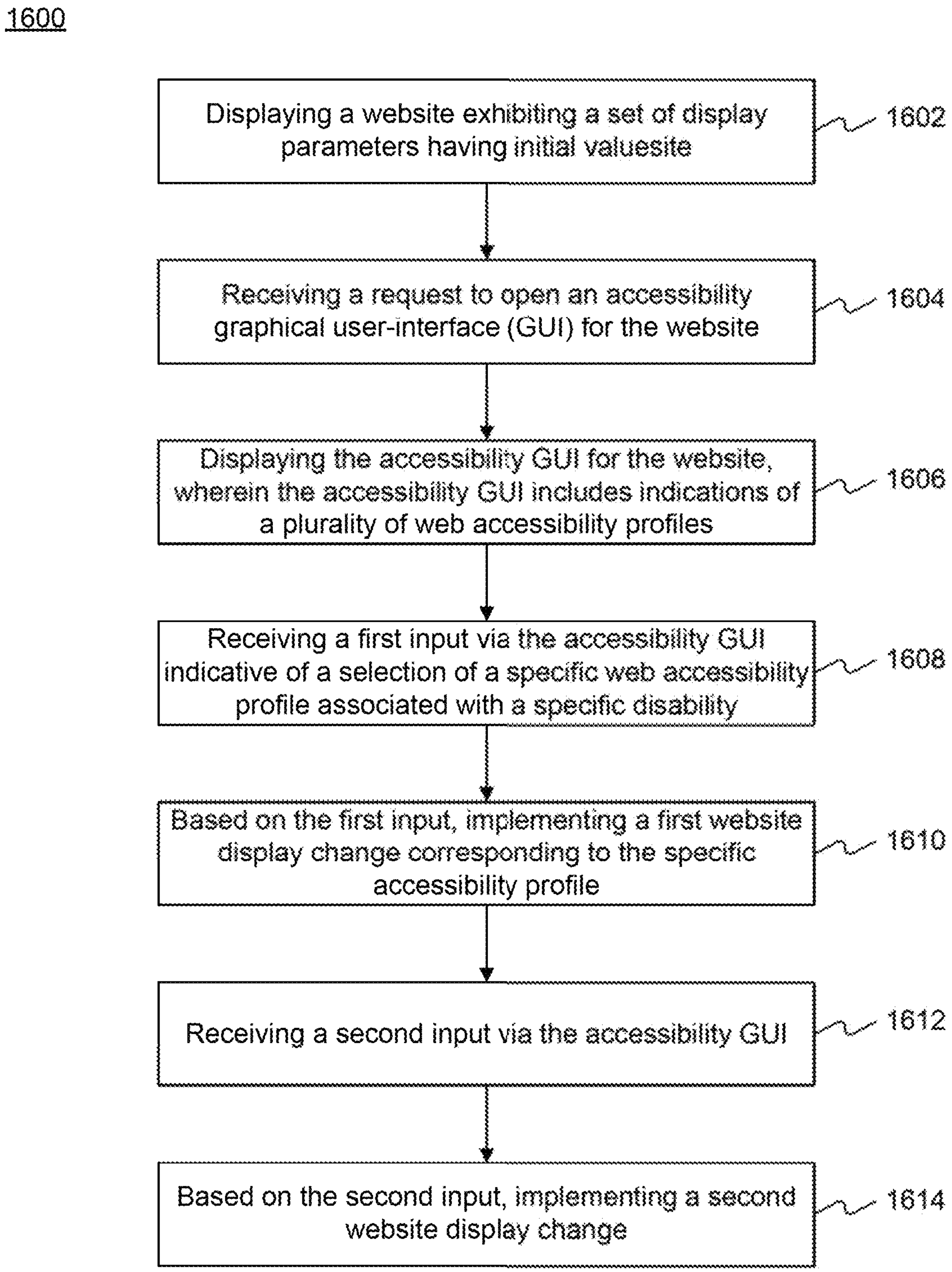
FIG. 16 is a flowchart illustrating an exemplary method of selecting an accessibility profile in a first browsing session and storing the user's preferences across subsequent browsing sessions consistent with some disclosed embodiments.

By way of example, FIG. 16 is a flowchart illustrating an exemplary method 1600 for changing an accessibility profile that impacts multiple sessions. Method 1600 may be performed by one or more processors (e.g., 210A, 210B) associated with computing device 170 (as depicted in FIG. 2). The steps of the disclosed method 1600 may be modified in any manner, including by reordering steps and/or inserting or deleting steps. Method 1600 may include a step 1602 of displaying a website with a set of display parameters having initial values. Method 1600 may also include a step 1604 of receiving a request to open an accessibility graphical user-interface (GUI) for the website. Method 1600 may also include a step 1606 of displaying the accessibility GUI for the website, wherein the accessibility GUI includes indications of a plurality of web accessibility profiles. Each accessibility profile has an associated set of disability profile values for the display parameters, wherein the disability profile values differ from the default values. Method 1600 may also include step 1608 of receiving a first input via the accessibility GUI indicative of a selection of a specific web accessibility profile associated with a specific disability. Method 1600 may also include a step 1610 of implementing a first website display change corresponding to the specific accessibility profile based on the first input. The website display changes cause the website to be accessible to a user with the particular disability. The selected accessibility profile may be applied during a first browsing session and a second browsing session. Method 1600 may also include a step 1612 of receiving a second input via the accessibility GUI. This second input may be related to selecting another predefined accessibility profile, or may further adjust content, color, and/or orientation settings. Method 1600 may also include step 1614 of implementing a second website display change, based on the second input. Here, the new or customized accessibility profile, i.e., the selected profile after the second input, may be applied to subsequent browsing sessions.

Some disclosed embodiments may include a system for enabling a user to customize a web accessibility profile. The system may include a memory configured to store values of various website display parameters associated with a plurality of web accessibility profiles; and at least one processor configured to: during a first website browsing session having an associated set of default values for display parameters, receive a web accessibility profile selection associated with a particular disability, the web accessibility profile selection having an associated set of disability profile values for the display parameters, the disability profile values differing from the default values; based on the web accessibility profile selection, change the default values for the display parameters to the disability profile values to thereby cause, during the first website browsing session, the website to be accessible to a user with the particular disability; cause to be stored in memory in association with the user, the web accessibility profile selection; during a second website browsing session of the user, perform a lookup in memory of the web accessibility profile selection of the user; and apply the web accessibility profile selection during the second website browsing session to thereby cause the second website browsing session to be accessible to the user with the particular disability.

Customizing a website for a disabled user may involve modifying a multitude of parameter settings, which may be inconvenient for some users. To alleviate at least some of the inconvenience, a specific web accessibility profile corresponding to a specific disability may be associated with one or more predefined parameter settings for the website, for example to address needs typically associated with the specific disability. When a user selects the specific web accessibility profile (e.g., via an accessibility GUI), one or more changes may be automatically made to a website corresponding to the one or more predefined display settings, e.g., to adapt the website to accommodate typical needs of users having the specific disability. However, some disabled users may have needs that diverge from the typical needs associated with the specific disability. Such users may benefit from an accessibility GUI that allows users to further customize a website, for example by changing or overriding one or more of the predefined settings. The accessibility GUI may thereby balance between efficiency (e.g., provided by the predefined settings) and customization (e.g., provided by the capability to change or override one or more predefined settings).

For example, a cognitive display profile associated with cognitive disability may include predefined display settings to increase the content scaling by 25% and highlight titles and links. However, a specific cognitively impaired user may require the content scaling to be increased by 40%. Thus, the accessibility GUI may implement the predefined settings upon selection of the cognitive display profile (e.g., automatically) by a specific user, while allowing the specific user to further personalize the website, such as by changing additional display parameters, and/or overriding one or more of the predefined changes already implemented. The personalized settings may be stored for subsequent use by the specific user or a user with similar needs to the specific user, e.g., to save time and effort the next time the user, initiates a browsing session.

As another example, typical users with ADHD (e.g., a specific disability) may benefit from modifications to a website that halt the rendering of video content and block pop-up windows. Accordingly, an ADHD accessibility profile may be associated with predefined changes to website display parameters to halt the playing of video content and block the display of pop-up windows, e.g., to accommodate typical needs of users with ADHD. However, a specific user with ADHD (e.g., a non-typical user) may require the blocking of pop-up windows but may tolerate the rendering of video content. The specific user may request to change or override the display setting halting of the video content via the accessibility GUI. After defining the display settings for the specific user, the display settings may be stored for implementing during a subsequent browsing session by the specific user. For example, the next time the specific user with ADHD initiates a browsing session, pop-up windows may be blocked, e.g., implementing one of the predefined settings, but video content may be played, e.g., overriding another predefined setting.

The description that follows relates to displaying an accessibility graphical user interface (GUI) for modifying a plurality of display parameters of a website. The accessibility GUI may present a plurality of web accessibility profiles, each associated with differing disabilities. An initial input may be received via the accessibility GUI indicative of a selection of a specific web accessibility profile, (e.g., associated with a specific disability). Based on the initial input, a plurality of predefined changes may be implemented (e.g., automatically) in a group of display parameters of the website. The plurality of predefined changes may be configured to address a disability (e.g., the specific disability) associated with the selected web accessibility profile. For example, the plurality of predefined changes may accommodate needs typically associated with the disability. The accessibility GUI may present information to indicate the plurality of implemented changes in the display parameters, and thereby inform the user of the changes made. This may allow the user to accept, reject or modify one or more of the changes made, and/or to make additional changes. On receiving additional input via the accessibility GUI to make at least one alteration to at least one of the predefined changes, the predefined change may be overridden. The two-step approach provided by the accessibility GUI, of first prompting the user to select a web accessibility profile to implement a set of predefined changes (e.g., to address typical needs associated with the web accessibility profile), followed by prompting the user to modify or override one or more of the predefined changes (e.g., to address individual needs of a specific user) may enable users to personalize the display of web content to accommodate their specific needs in an efficient and convenient manner.

Figure 17:
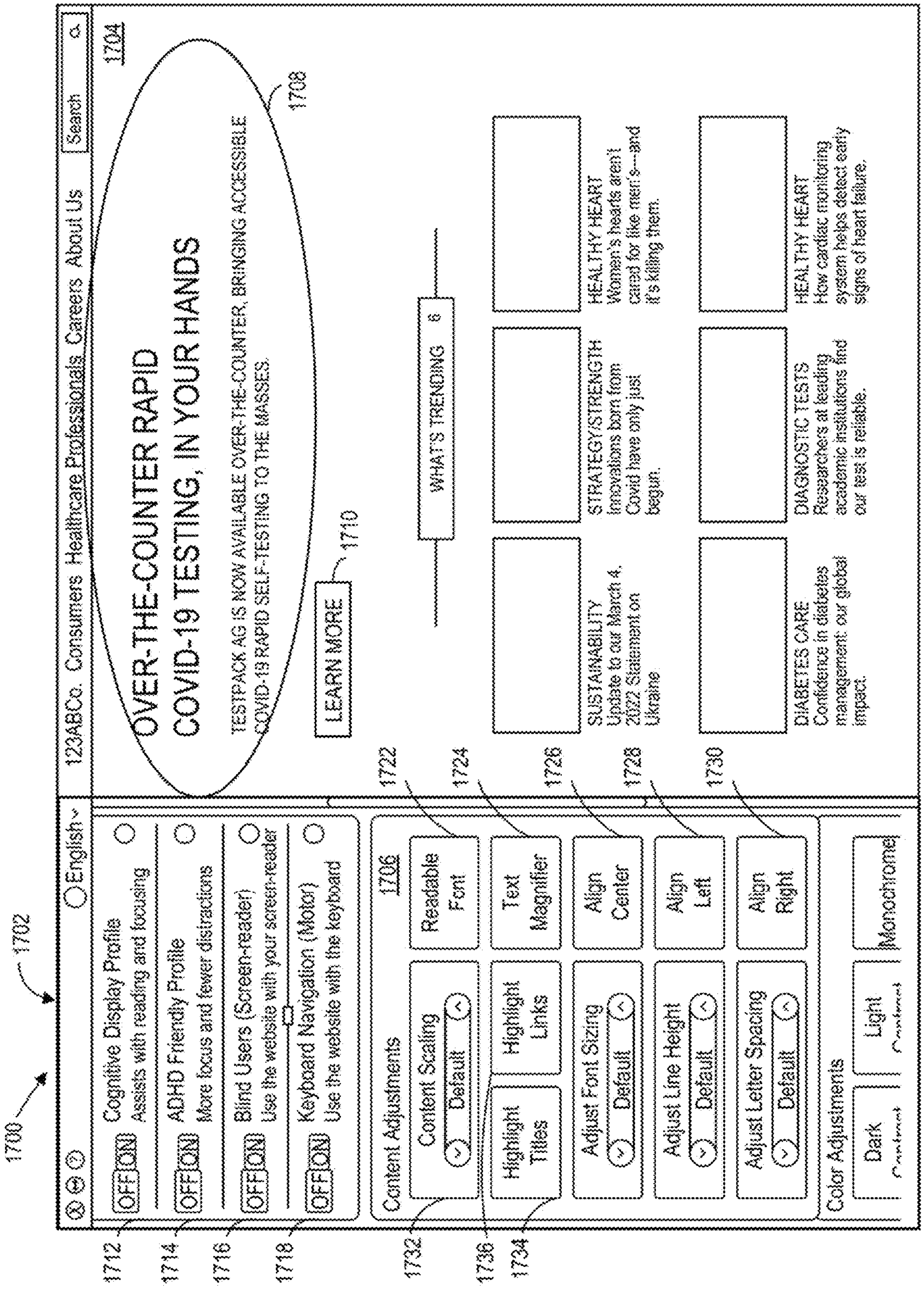
FIG. 17 illustrates an exemplary accessibility GUI displayed alongside a website, consistent with some embodiments of the present disclosure.
Figure 18:
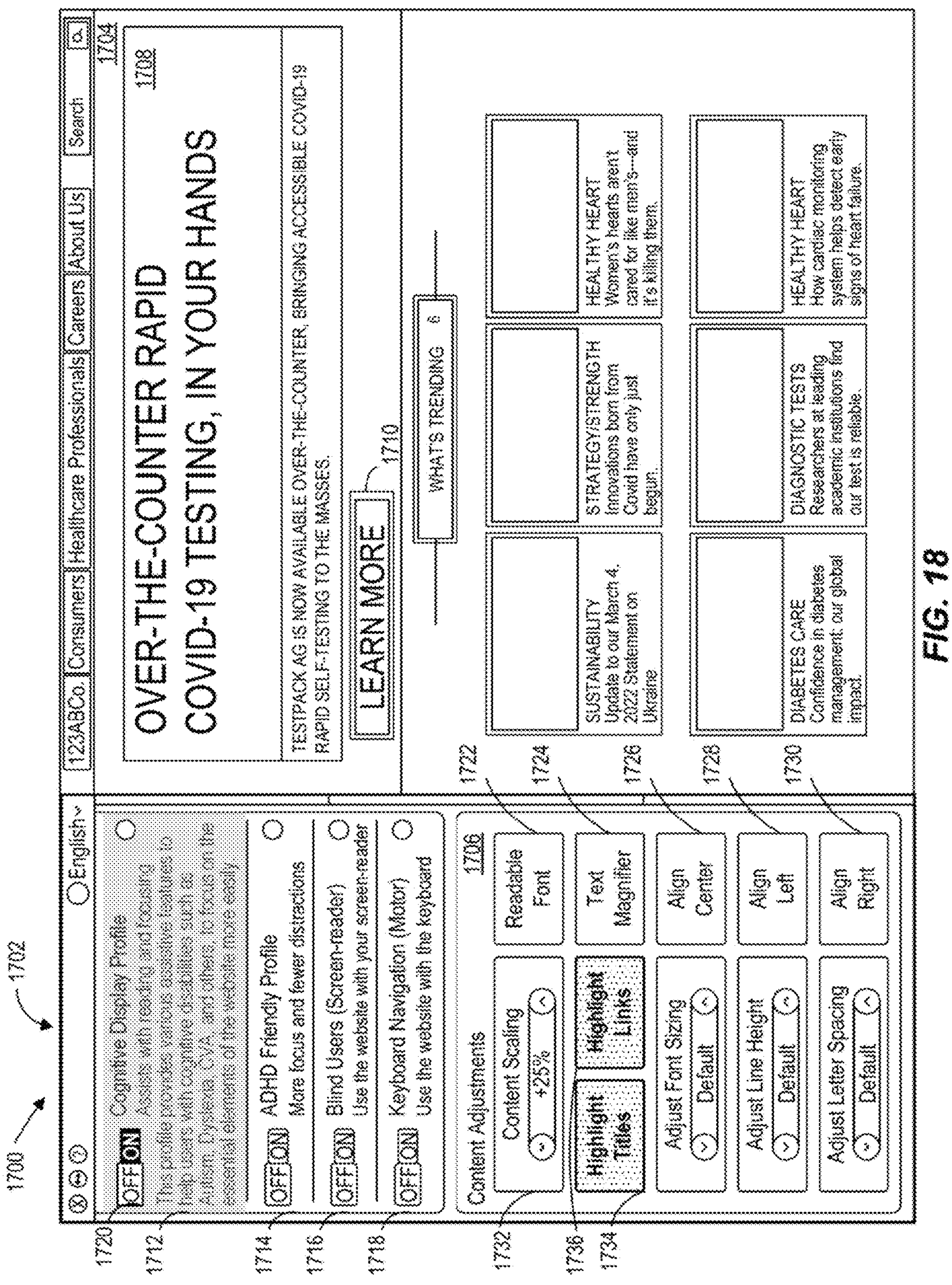
FIG. 18 illustrates the exemplary accessibility GUI of FIG. 17 after a user has selected one of a plurality of web accessibility profiles, consistent with some embodiments of the present disclosure.
Figure 19:
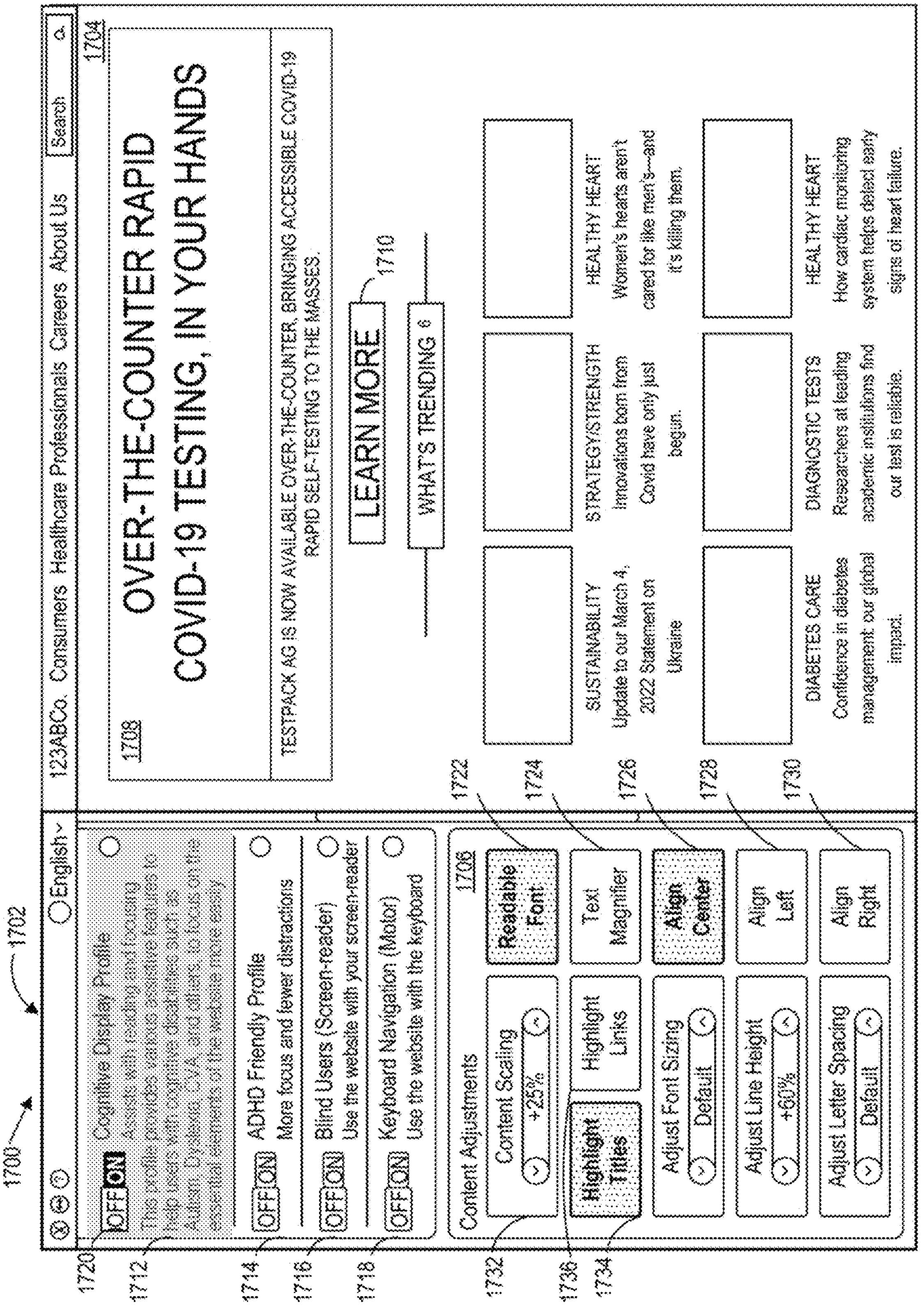
FIG. 19 illustrates the exemplary accessibility GUI of FIG. 18 after a user has selected to make an alteration to one of the predefined changes, consistent with some embodiments of the present disclosure.

In some instances, the description that follows may refer to FIGS. 17-19 which illustrate an exemplary implementation of an accessibility graphical user interface (GUI) 1702 enabling a user to customize a web accessibility profile, consistent with some disclosed embodiments. Accessibility GUI 1702 of FIGS. 17-19 is intended merely to facilitate the conceptualizing of one exemplary implementation for an accessibility GUI enabling a user to customize a web accessibility profile and does not limit the disclosure to any particular implementation.

Some embodiments involve a non-transitory computer readable medium containing instructions that when executed by at least one processor cause the at least one processor to perform operations for enabling a user to customize a web accessibility profile. The term "web accessibility profile" may be understood as described earlier. A computer program (e.g., a software application) may be provided for execution by at least one processor to enable a user to personalize (e.g., customize) a web accessibility profile. The computer program may be operable with a web browser configured to display web content according to one or more standard display settings (e.g., configured for non-disabled users). Executing the computer program may cause the at least one processor to display an accessibility GUI (e.g., alongside a website) and prompt a user to select one of multiple web accessibility profiles. Each web accessibility profile may be associated with one or more predefined (e.g., default) changes to display parameters that may override one or more of the standard display settings. The predefined changes may be configured (e.g., in advance) to address typical needs associated with disabilities corresponding to the web accessibility profile. The at least one processor may implement the predefined changes associated with a specific web accessibility profile upon selection of the specific web accessibility profile by a user. The at least one processor may allow the user to personalize the selected web accessibility profile, for example to accommodate specific needs of the user that differ from the typical needs (e.g., addressed by the predefined changes). For example, the user may select to implement additional changes not included in the predefined changes, or to modify or override any of the predefined changes.

Some embodiments involve displaying an accessibility graphical user interface (GUI) for modifying a plurality of display parameters of a website, wherein the accessibility GUI presents a plurality of web accessibility profiles associated with differing disabilities. The terms "GUI," "display parameter" and "website" may be understood as described earlier. The term "modifying a plurality of display parameters of a website" may refer to adjusting or changing multiple display characteristics of the website to alter the appearance of the website, where "display parameters" may relate to any format, feature, or characteristic for conveying information. Such display parameters may impact one or more of visual, audio, and tactile media, and may be associated with a computer interface capable of enabling user interaction or display. Examples of display parameters may include parameters relating to text (e.g., font size, type and style, line spacing and height, margin size, text alignment), parameters relating to color (e.g., saturation, brightness, contrast, background color), parameters relating to images (e.g., image size, position, hiding or showing images, halting or playing an animated video), parameters relating to audio (e.g., to mute sounds, increase or decrease volume or speed, apply filters), and any other parameters that may affect the display of content. According to some embodiments, the display parameters may also include parameters affecting the navigation of a website (e.g., cursor style and size, hover style, selection indication, link style). When a user initiates a browsing session (e.g., by causing at least one processor to execute a web browser), at least one processor (e.g., the same or different processor as the processor executing the web browser) may retrieve the accessibility GUI from a server, (e.g., an accessibility service host) and display the accessibility GUI, e.g., inside or alongside the browser window. The accessibility GUI may present multiple different web accessibility profiles, each associated with a different disability and configured to accommodate a website for the associated disability, e.g., by modifying one or more display parameters of the website. For example, selecting a blind user profile may automatically invoke a screen reader to accommodate typical blind persons, and selecting a cognitive display profile may automatically increase the content scaling to accommodate typical cognitively impaired users, thereby modifying display parameters of the website.

By way of a non-limiting example, turning to FIG. 17, an accessibility GUI 1702 may be displayed alongside a website 1704 to allow modifying one or more display parameters of website 1704. For example, processing device 210A of FIG. 2 (e.g., at least one processor) may retrieve accessibility GUI 1702 from accessibility service host 130 (FIG. 1) via communications network 140 and display accessibility GUI 1702, in response to any of users 110A, 110B, or 110C opening a web browser application on computing devices 170A, 170B, 170C, respectively, to view website 1704. Accessibility GUI 1702 may present a variety of web accessibility profiles for selection, each associated with a different disability. Selecting one of the web accessibility profiles may cause processing unit 210A to implement one or more predefined changes to one or more display parameters of website 1704. The predefined changes may address needs typical to a disability corresponding to the selected web accessibility profile.

For example, GUI 1702 may present four web accessibility profiles: a cognitive display profile 1712 associated with cognitive disabilities, an ADHD friendly profile 1714 associated with disabilities related to attention deficit and hyperactivity disorders, a blind users profile 1716 associated with blindness, and a keyboard navigation profile 1718 associated with motor impairment. It is to be noted that these profiles are intended as exemplary only, and the accessibility GUI may present a different set of web accessibility profiles, including additional and/or fewer web accessibility profiles. Processing device 210A may enable any of users 110B, 110A or 110C to customize any of the web accessibility profiles presented by GUI 170/For example, user 110B, who is cognitively impaired, may use accessibility GUI 1702 to select and customize the cognitive display profile to assist user 110B in navigating website 1704 according to the specific needs and preferences of user 1108. For example, the cognitive display profile 1712 may allow user 110B to modify display parameters of website 1704, such as the font size, font color, highlighting of titles, links, which may facilitate user 1108 in navigating website 1704.

According to some embodiments, the plurality of web accessibility profiles involve at least three of vision impairment, epilepsy, color blindness, mobility impairment, hearing difficulties, seizures, photosensitivity, cognitive impairment, or dyslexia. The accessibility GUI may provide a diverse range of web accessibility profiles to suit a wide range of disabled users, each web accessibility profile associated with a set of predefined changes to assist in adapting website to suit the needs of different categories users. Additionally, the accessibility GUI may enable users to customize any of the web accessibility profiles to personalize their interface with a website. This may enable the accessibility GUI to address a wide range of disabilities efficiently while enabling users to further personalize the display. By way of a non-limiting example, FIG. 6 illustrates an accessibility GUI presenting six different web accessibility profiles, such a Seizure Safe profile to address epilepsy, seizure, and photosensitivity, a Vision Impaired profile to address vision impairment, color blindness and/or photosensitivity, a cognitive display profile to address cognitive impairment, an ADHD Friendly profile to address dyslexia, a Blind Users profile to address blindness, and a Keyboard Navigation profile to address motor impairment. Similarly, the accessibility GUI may present a Hearing-Impaired profile to address hearing difficulties, and additional profiles to address additional disabilities. In some embodiments, the accessibility GUI may present web accessibility profiles for at least three of: of vision impairment, epilepsy, color blindness, mobility impairment, hearing difficulties, seizures, photosensitivity, cognitive impairment, or dyslexia. For example, presenting three or more profiles may provide a sufficiently diverse range of accommodations for differing disabilities without overcrowding the accessibility GUI and overwhelming disabled users with too many choices. For example, a facility serving blind and visually impaired persons may provide an accessibility GUI presenting web accessibility profiles for vision impairment, color blindness, and photosensitivity, but may omit web accessibility profiles for epilepsy, mobility impairment, hearing difficulties, and cognitive impairment to simplify the accessibility GUI, since these profiles may not be relevant to the users of the facility.

Some embodiments involve receiving initial input via the accessibility GUI indicative of a selection of a specific web accessibility profile. The term "receiving" may refer to acquiring, obtaining, retrieving, or otherwise gaining access to information, e.g., via a user interface, as described earlier. The term "input" may include any type of data provided by a user via an input device, as described earlier. The input may include text, voice, images, gestures, selection of web element, and any other format for data. For example, the accessibility GUI may display web elements, such as an interactive button, graphic, or icon, associated with each web accessibility profile. An event listener may notify the at least one processor when a specific web element associated with a web accessibility profile has been selected. As another example, the accessibility GUI may provide voice recognition and/or gesture recognition capabilities to receive voice and/or gesture inputs as a selection of a web accessibility profile, respectively. In this manner, the at least one processor may receive a first input as a selection of a specific web accessibility profile.

By way of a non-limiting example, FIG. 18 illustrates an exemplary implementation for receiving an initial input via accessibility GUI 1702 indicating a selection of a specific web accessibility profile, consistent with some disclosed embodiments. FIG. 18 illustrates accessibility GUI 1702 of FIG. 17 after a user (e.g., user 1108 of FIG. 1) has selected cognitive display profile 1712 (e.g., a specific web accessibility profile) by selecting the ON setting for a button 1720 associated with cognitive display profile 1712. User 110B may perform the selection using any suitable input interface, such as by using an electronic mouse, pen, keyboard, touch-sensitive screen (e.g., display-based input), microphone (e.g., voice-based input), a camera (e.g., facial recognition and/or gesture or motion-based input), or any other user interface means configured to receive an input from user 110B. An event listener may notify processing device 210A of the selection, thereby processing device 210A may receive the initial input via accessibility GUI 1702 indicative selection of cognitive display profile 1712.

Some embodiments involve, based on the initial input, implementing a plurality of predefined changes in a group of display parameters of the website to address a disability associated with the specific web accessibility profile. The term "implementing a plurality of predefined changes in a group of display parameters of the website" may refer to refer to modifying, replacing, substituting, or otherwise altering a rendering of one or more visual elements of the website according to one or more settings defined in advance, e.g., for the specific web accessibility profile. The term "address a disability" may refer to targeting the disability for the purpose of facilitating or assisting an individual having that disability, for example to accommodate a website for navigation by the disabled individual, as described earlier. Thus, on receiving the first input indicating the selection of a specific web accessibility profile, multiple default (e.g., predefined) changes associated with the specific web accessibility profile may be (e.g., automatically) implemented, such as to accommodate needs typical to users associated with the specific web accessibility profile. For example, a typical blind user may benefit from a screen reader and a voice-enabled interface (e.g., predefined changes to a group of display parameters). Selecting the Blind Users accessibility profile may automatically invoke the screen reader and voice-enabled interface to accommodate a typical blind user. As another example, a typical cognitively disabled person may benefit from an increase in content scaling and displaying contextual graphic images on navigation buttons. Selecting the Cognitive Display accessibility profile may automatically increase the content scaling and display descriptive graphic images to accompany text. Similarly, selecting the ADHD accessibility profile may block pop-up windows and animation videos to assist typical users with ADHD, and selecting the keyboard navigation accessibility profile may display and enable keypress sequences for navigating a website to assist typical users with motor impairment. According to some embodiments, the predefined changes for each of the web accessibility profiles may be stored at an accessibility service host with the accessibility GUI.

By way of a non-limiting example, FIGS. 17-18 together, illustrate an implementation of a plurality of predefined changes to display parameters for a website, based on the selection of a specific web accessibility profile, consistent with some disclosed embodiments. After processing device 210A (FIG. 2) receives the notification indicating the selection of cognitive display profile 1712 by user 110B (FIG. 1) (e.g., the initial input), processing device 210A may retrieve (e.g., from data structure 136) a set of predefined settings for display parameters of website 1704 (e.g., a plurality of predefined changes in display parameters of the website) corresponding to cognitive display profile 1712. Processing device 210A may implement the predefined changes on device 170B accordingly. The predefined changes may be configured to accommodate the needs of typical cognitively disabled users. For example, the default display settings for the cognitive display profile may cause the display of titles and links of website 1704 to be highlighted, and the content scaling for website 1704 to be increased by 25%. Processing device 210A may implement the predefined changes for user 1108 on the display of website 1704 on computing device 170B. For example, turning to FIG. 17 (e.g., before implementing the predefined changes) title 1708 and link 1710 of website 1704 are displayed without highlight, and the content scaling is set to default (e.g., according to the standard settings for non-disabled users). Turning to FIG. 18 (e.g., after implementing the predefined changes) title 1708 and link 1710 of website 1704 are displayed highlighted and the content scaling has been increased by 25%, in accordance with the predefined settings for the cognitive display profile.

Some embodiments involve presenting via the accessibility GUI, information indicative of the plurality of implemented changes in the plurality of display parameters associated with the specific web accessibility profile. Thus, in addition to implementing the predefined (e.g., default) changes to the display parameters of the website, thereby displaying the website with the implemented changes, information associated with the changes that were implemented may be presented to the user. This may inform the user of the changes made, e.g., in some embodiments to allow the user to decide which changes to accept, and which changes to reject and/or modify or override. For example, upon receiving the selection of one of the web accessibility profiles, a list of the implemented changes may be displayed, e.g., inside a box of the accessibility GUI. The list may be displayed in any location on the screen to accommodate the user, such as inside the accessibility GUI displayed adjacent to the website, overlaid on the website content, or in any other area of the computer display displaying the accessibility GUI and website.

By way of a non-limiting example, FIG. 18 illustrates a presentation of multiple changes to the display parameters for website 1704 implemented in response to selecting the cognitive display profile. On implementing the predefined changes for the cognitive display profile, processing device 210A (FIG. 2) may present on computing device 170B (FIG. 1) a content adjustments box 1706 listing the implemented changes. content adjustments box 1706 may inform user 110B of the changes. Content adjustments box 1706 may additionally provide user 110B with an interface to alter any of the predefined changes and implement additional changes, not included in the predefined changes. For example, content adjustment box 1706 may include one or more interfacing elements (e.g., buttons, slide bars, icons, text boxes), each associated with a different display parameter. User 1108 may select one or more of the interfacing elements to personalize the associated display parameter to suit the specific requirements of user 110B. This may allow user 1108 to accept, reject or modify any of the implemented changes, e.g., to suit the preferences of user 1108. In the non-limiting example shown, content adjustments box 1706 is displayed inside accessibility GUI 1702 and informs user 110B that the content size for website 1704 has been increased by 25% and the titles and links of website 1704 have been highlighted, corresponding to the predefined changes for the cognitive display profile (e.g., retrieved from accessibility service host 130). Additionally, content adjustment box 1706 may display settings for additional display parameters for website 1704 not included in the predefined changes for the cognitive display profile, such as buttons readable font 1722, text magnifier 1724, align center 1726, align left 1728, and align right 1730 for adjusting various display parameters.

Some embodiments involve receiving additional input via the accessibility GUI, indicative of a selection of at least one alteration to at least one of the plurality of predefined changes. For example, the information presented informing the user of the predefined changes (e.g., implemented in response to the selection of the specific web accessibility profile) may include an interface allowing the user to make additional changes or to modify (e.g., make alterations) to any of the implemented changes. The interface may include display-based elements (e.g., interactive buttons, slide bars, dials, text boxes, and the like) and non-display-based means (e.g., voice and/or gesture-based interface) as described earlier. The interface may allow the user to make alterations to one or more of the changes already implemented (e.g., the predefined changes) and/or to change other display parameters of the website not affected by the predefined changes. This capability may allow the user to personalize (e.g., customize) the display of the website to accommodate the individual needs and preferences of the user, e.g., that may not have been addressed by the predefined changes.

For example, selecting the blind user profile may cause several predefined changes to be implemented to address blindness, such as to hide some displayed content and invoke a screen reader as a substitute. However, a specific blind user (e.g., accompanied by a seeing assistant) may wish to restore at least some of the hidden content (e.g., make an alteration to one of the predefined changes). Additionally, or alternatively, the blind user may wish to increase the font size of displayed content by 20% (e.g., change a display parameter not included in the group of display parameters associated with the blind user profile). To enable this customization, the accessibility GUI may present an interface allowing the blind user to individually adjust one or more of the display parameters. At least a portion of the interface may be associated with the predefined changes for the blind user profile. For example, selecting the blind user profile may automatically invoke a microphone to detect voice commands, allowing the blind user to adjust settings for the screen reader and hidden content (e.g., the predefined changes). The blind user may request (e.g., via the microphone) to restore the hidden content and thereby alter one of the predefined changes. In this manner, the processor may receive additional input via the accessibility GUI to alter one of the predefined changes. Additionally, or alternatively, the blind user may request to increase the font size by 20% to implement a change not included in the group of predefined changes associated with the blind user profile.

By way of a non-limiting example, FIG. 19 illustrates an exemplary implementation for receiving additional input via accessibility GUI 1702 to alter one of the predefined changes, consistent with disclosed embodiments. After being informed via content adjustments box 1706 that the content size for website 1704 was increased by 25% and the titles and links of website 1704 were highlighted (e.g., the predefined changes implemented in response to selecting the cognitive display profile), user 110B (FIG. 1) may decide to accept some of the predefined changes. For example, user 1108 may decide to keep the increase in content scaling and the highlighting of the titles of website 1704 by leaving these parameters settings unchanged. However, user 110B may decide to reject the highlighting of links of website 1704 (e.g., implement an alteration to one of the predefined changes) by deselecting the highlight links button 1736. Accordingly, content adjustments box 1706 of accessibility GUI 1702 indicates the content scaling is still set to +25%, and the highlight titles button is still selected (e.g., user 1108 did not make alterations to two of the three predefined changes), but the highlight links button 1736 is now deselected (e.g., user 110B made an alteration to one of the three predefined changes). An event listener may notify processing unit 210A of the deselection of the Highlighting Links button, thereby processing unit 210A may receive additional input via accessibility GUI 1702 indicating a selection of an alteration to one or the predefined changes. Additionally, or alternatively, user 110B may change additional parameter settings, not included in the predefined changes for the cognitive display profile. For example, user 1108 may select readable font button 1722 and align center button 1726 to remove serifs and center align text content of website 1704, respectively. An event listener may notify processing unit 210A of the selection of the readable font and align center buttons and implement these changes accordingly.

Some embodiments involve overriding, in response to the additional input, at least one of the plurality of predefined changes to thereby enable customization of the selected web accessibility profile. For example, after receiving the additional input via the accessibility GUI, an alteration may be made to one of the predefined changes implemented earlier, for example to accommodate specific needs that diverge from the typical needs addressed by the predefined changes. This may allow personalizing (e.g., customizing) the display of the website to suit the individual requirement and needs of the user. Returning to the example of the blind user, on receiving the voice command to restore content hidden in response to the selection of the blind user profile, the at least one processor may restore the hidden content, thereby overriding at least one of the predefined changes associated with the blind user profile. Overriding the predefined change may help customize the blind user profile for the specific blind user, e.g., accompanied by a seeing assistant.

By way of a non-limiting example, FIG. 19 illustrates an exemplary implementation for overriding one of the predefined changes in response to the additional input to customize the web accessibility profile for the specific user, consistent with disclosed embodiments. On receiving the additional input from user 1108 (FIG. 1), e.g., as a deselection of the highlight links button 1736 in content adjustments box 1706, processing unit 210A (FIG. 2) may display link 1710 of website 1704 without highlighting, thereby overriding one of the predefined changes. However, title 1708 may still be displayed with highlighting since user 110B has not deselected the highlight title button 1734, and therefore has not requested to override this predefined change.

According to some embodiments, the additional input is indicative of a degree of adjustment to the at least one of the plurality of predefined changes. For example, some display parameters may be defined by a percent increase or decrease or as a value inside a range of possible values to indicate a degree of adjustment for the display parameters. As an example, display parameters such as color saturation and content scaling may be defined as a percent of a maximum possible value. Other display parameters, such as font size, line height, or letter spacing may be defined by a value within a range of minimum and maximum values. The additional input may therefore be a selection of a specific value, or it may involve the sliding a slider or the use of some other interface control through which the additional input is provided.

By way of a non-limiting example, turning to FIG. 18, the content scaling slide bar 1732 of content adjustments box 1706 of accessibility GUI 1702 is set to 25%, indicating a degree of adjustment to the content scaling. Adjusting the slide bar 1732 to 40% may increase the content scaling accordingly. By contrast, the highlight links button 1736 has only a binary (e.g., on/off) setting that may be set by selecting or deselecting the button, respectively.

According to some embodiments the additional input is indicative of a selection to cancel at least one of the predefined changes in the group of display parameters. For example, informing the user of the implemented predefined changes may allow a specific user to reject (e.g., cancel) one of the predefined changes, e.g., if the predefined change does not suit the specific user. For example, a user may cancel a predefined change by deselecting a button associated with the predefined change (e.g., switching the button to "OFF"), by adjusting a slide bar to revert the value of a display parameter to an original value (e.g., before the predefined change was implemented), by selecting the original value for the display parameter from a menu, by typing the original value for the display parameter into a text box, or by using any other interfacing means to cancel the predefined change (e.g., by pressing on a "Cancel Changes" button).

By way of a non-limiting example, turning to FIG. 19, the deselection of the highlight links button 1736 of content adjustments box 1706 (e.g., additional input) may indicate to processing device 210A (FIG. 2) to cancel the predefined change to highlight links, associated with the cognitive display profile. Accordingly, while link 1710 is displayed in FIG. 18 highlighted, link 1710 is displayed in FIG. 19 without highlight, e.g., the predefined change has been cancelled.

According to some embodiments, the additional input is further indicative of an additional selection of a change other than one of the predefined changes. In addition to the predefined changes associated with a given web accessibility profile, the accessibility GUI may allow users to personalize other display parameters, not included in the group of predefined changes. For example, selecting an ADHD accessibility profile may automatically cause pop-up windows and animation videos to be blocked, (e.g., predefined changes to parameter settings to address typical needs of ADHD users). However, a specific user with ADHD may suffer from poor color perception and may thus wish to alter the color saturation and color contrast settings which are not included in the predefined changes for users with ADHD. The accessibility GUI may provide the user with an interface for adjusting additional parameters other than the predefined changes, such as the color saturation and contrast.

By way of a non-limiting example, turning to FIG. 19, user 1108 (FIG. 1) has selected the readable font button 1722 and align center button 1726 of content adjustment box 1706, which were not included in the group of predefined changes for the cognitive display profile. User 1108 may thus provide additional input indicating a selection to make a change other that one of the predefined changes.

Some embodiments may involve determining, based on the additional input, a first value for a first display parameter and a second value for a second display parameter. For example, the accessibility GUI may allow a user to change multiple different display parameters. Returning the ADHD example above, after selecting the ADHD accessibility profile to implement the predefined changes, the specific user with ADHD may provide additional input via the accessibility GUI, for example to adjust the color settings to address poor color perception. The additional input may affect multiple different display parameters related to the display of color. For example, the additional input may include multiple values to update the color saturation, the color contrast, and highlight links when displaying the website.

By way of a non-limiting example, turning to FIG. 19, after selecting the cognitive display profile (e.g., the first input), user 110B (FIG. 1) may provide additional input via content adjustments box 1706 such as to deselect highlight links button 1734 and to select align center button 1726. Thus, processing unit 210 (FIG. 2) may determine to display link 1710 in website 1704 not highlighted (e.g., the first value for the first display parameter) and center aligned (e.g., the second value for the second display parameter). It is to be noted that the first and second values for the first and second display parameters may relate to the same or different display elements. For example, the user may set two setting affecting the display of the title, such as align center and highlight. Thus, the first and second values may both relate to the same display element.

According to some embodiments, the first value is a binary, and the second value defines a range value. For example, some display parameters (e.g., highlight links, highlight titles, block pop-ups) may be set as binary values, such as an ON/OFF toggle or by selecting or deselecting a button associated with a display parameter. Other display parameters may be set as a value within a range of possible values (e.g., a range value) to indicate a degree of adjustment. For example, display parameters such as content scaling, color saturation, and font size may be defined as a value or percentage within a range of possibilities. Whereas display parameters such as highlighting links and titles may take on binary (e.g., ON/OFF) values. The accessibility GUI may allow the user to adjust parameter settings that take on binary values and values within a range of values. Returning to the ADHD example above, after selecting the ADHD accessibility profile (e.g., the first input) the user with ADHD may provide additional input to (i) highlight links and (ii) increase the color saturation to 80%. The user may select a highlight links button as a binary value (e.g., ON/OFF) and may set the color saturation to 80% by maneuvering a slide bar.

By way of a non-limiting example, turning to FIG. 19, after selecting cognitive display profile 1712 (e.g., the first input), user 110B (FIG. 1) may provide additional input via content adjustments box 1706 by selecting readable fonts button 1722 (e.g., a binary value) and adjusting the slide bar of content scaling 1732 (e.g., a range value).

Some embodiments include using the initial input and the additional input for modifying a display of at least one additional website. For example, after customizing the display of a first website via the accessibility GUI, e.g., based on the first and additional inputs, when the user navigates to a second website, such as via a link on the first website, the display of the second website may be modified similarly to the modification made to the first website, e.g., based on the first and additional inputs. For example, a blind user may select the blind user profile to automatically invoke a screen reader for navigating the first website. When the blind user navigates to the second website (e.g., via a link in the first website), the screen reader may continue to be invoked for the second website in accordance with the predefined changes made for the first website. As another example, the display parameters defined by a user (e.g., via the first and additional inputs) for navigating a first website may be stored for a subsequent browsing. For example, the display parameters may be stored locally at the computer of the user for a subsequent browsing session by the user at the same computing device. Alternatively, the display parameters may be stored remotely, e.g., at an accessibility server, for a subsequent browsing session on the same or a different computing device. On initiating a new browsing session via a web browser to navigate a new website, the display parameters from the previous browsing session may be retrieved from memory and implemented for the new browsing session, e.g., to modify the display of the new website based on the first and additional inputs. The display parameters may be stored in association with the user, the computing device of the user, the web accessibility profile of the user, or any other criterion that may assist in modifying a website for a web accessibility profile.

By way of a non-limiting example, turning to FIG. 19, after selecting cognitive display profile 1712 (e.g., the first input), multiple predefined changes may be made. For example, links and titles of website 1704 may be highlighted and the content scaling may be increased by 25% as indicated by highlight titles and highlight links buttons 1734, and 1736 being highlighted (e.g., set to ON), and content scaling 1732 set to 25%. However, user 1108 (FIG. 1) may further modify display parameters by deselecting highlight links button 1736 and selecting readable font and align center buttons 1722 and 1726, respectively. The web browser may adjust the display of website 1704 on computing device 170B to reflect these modifications. The updated display settings may be stored in memory (e.g., in RAM or memory device 220A of computing device 1708 or in data structure 250B of server 136). When user 1108 presses on link 1710 (e.g., Learn More) to navigate to another website, different than website 1704, the web browser may apply the same parameter settings (e.g., retrieved from storage in memory) to display the other website. Thus, the content scaling of the other website may be increased by 25%, and the highlight titles, readable font and align center buttons 1734, 1722 and 1726 may be selected to highlight titles, change font and center align text, respectively.

Some embodiments may involve saving the display parameter settings for subsequent use by the specific user. Thus, some embodiments may involve causing storage of first data indicative of a web accessibility profile selection corresponding to the received input and causing storage of second data indicative of a profile customization selection corresponding to the received additional input. As noted, the adjustments made by a user to the predefined changes associated with a specific web accessibility profile may be stored for subsequent use. This may simplify the experience for the specific user and spare the specific user from having to repeatedly adjust the parameter settings for each session. Thus, both the web accessibility profile selected by the user (e.g., the first input) and the adjustments made by the user to the predefined changes associated with the selected web accessibility profile (e.g., the additional input) may be stored in memory (e.g., locally at the computing device used by the user, or remotely at a cloud storage facility). The first and additional input may be stored in association with a unique identifier for the user and/or optionally, the computing device of the user. On identifying the user and/or the computing device of the user during a subsequent session, the selected web accessibility profile and any modification made to predefined changes associated therewith may be retrieved and implemented.

By way of a non-limiting example, turning to FIG. 19, processing device 210A (FIG. 2) may store the selection by user 110B (FIG. 1) of the cognitive display profile (e.g., first data corresponding to the first input) and the deselection of the highlight links button and the selection of the readable font and align center buttons 1722 and 1726 (e.g., second data indicating profile customization) at data structure 250B of accessibility service host 130 or alternatively at memory device 220A of computing device 170B. The first and second data may be stored in association with a unique identifier for user 110B and/or for device 170B for subsequent retrieval and implementation.

According to some embodiments at least one of the first data and second data is stored in a computing device for displaying the website. As described earlier, a computing device may include all possible types of devices capable of exchanging data in a communications network such as the Internet. For example, some display parameter settings may be stored at a local memory device of the computing device used by the user, e.g., to navigate the website. This may be useful in situations where a user has exclusive use of the computing device but may also be useful when the computing device is shared by multiple users with similar accessibility needs. Local storage may also facilitate quick retrieval and implementation of the parameter settings. Thus, the web accessibility profile selected by the user (e.g., first data) and/or modifications made to predefined changes associated therewith (e.g., second data) may be stored at the computing device used by the user for displaying the website, e.g., to facilitate retrieval for subsequent implementation.

By way of a non-limiting example, turning to FIG. 19, processing device 210A may store the selection of the cognitive display profile (e.g., first data) and/or the deselection of the highlight links button and the selection of the readable font and align center buttons (e.g., second data) locally at computing device 170B (FIG. 1) used by user 110B to display website 1704. The display parameters may be stored in association with a unique identifier for user 110B and/or computing device 170B, e.g., to enable retrieval based on identifying user 110B and/or computing device 170B. The display parameters may be stored in RAM memory (e.g., for access during a current browsing session) or in memory device 220A (FIG. 2) of device 170B or in data structure 250A (e.g., for access during a subsequent browsing session). The display parameters may be stored in any suitable format such as in a table, as cookies (e.g., small text files), as source code instructions (e.g., for injecting into source code for a website), in a linked list, in a database (e.g., a semantic or relational database), and any other format for storing display parameters.

According to some embodiments, at least one of the first data and second data is stored on a remote server for hosting an accessibility service associated with the accessibility GUI. For example, in situations where the user does not have exclusive use of a computing device, or when the user wishes to transfer display parameters defined on one computing device to another computing device (e.g., from a desktop computer to a mobile device), it may be useful to store one or more display parameters at a cloud storage facility accessible by multiple devices via a network. This may allow the user to access the display parameters from any computing device in communication with the remote server. The display parameters may be stored in any suitable format such as in a table, as cookies (e.g., small text files), as source code instructions (e.g., for injecting into source code for a website), in a database, in a linked list, and any other format for storing display parameters.

By way of a non-limiting example, user 110B may use computing device 170B to select cognitive display profile 1720 (e.g., first data), deselect highlight links button 1736, and select readable font and align center buttons 1722 and 1726 (e.g., second data). Processing device 210A (FIG. 2) may store the selection of cognitive display profile 1720 the deselection of the highlight links button 1736 and the selection of the readable font and align center buttons 1722 and 1726 (e.g., second data) remotely at data structure 136 of Accessibility Service Host 130, in association with a unique identifier for user 110B (FIG. 1). Subsequently, user 110B may use a mobile device (not shown) different than computing device 110B to access the display parameters via communications network 140. The display parameters may be retrieved by querying data structure 136 with the unique identifier of user 110B and implemented on the mobile device for a new browsing session.

According to some embodiments the initial input and the additional input are received during a first browsing session, and the operations further include, during a second browsing session, retrieving from memory the first data and the second data; and applying the web accessibility profile selection including the profile customization selection to thereby provide a customized accessibility experience for the user during the second browsing session. The term "browsing session" may refer to a continuous period of user activity in a web browser, where a web browser is a software application for accessing digital content on the World Wide Web or on a local internet site. For example, a browsing session may last for 30 minutes, but may be shorter or longer than 30 minutes. A browsing session may be initiated by opening a web browser on a computing device. The web browser may retrieve source code for a webpage, e.g., from a remote website host, and execute the source code (e.g., on the computing device) to render the digital content of the webpage on the computing device (e.g., a first browsing session). The first browsing session may be terminated when the user closes the browser application or after a period of time that it was not used. Reopening the browser application may initiate a new, e.g., second browsing session. The second browsing session may be initiated by the same user and on the same device as the first browsing session, by the same user on a different device as the first browsing session, by a different user on the same device as the first browsing session, or by a different user on a different device as the first browsing session. One or more display parameters set during the first browsing session may be stored in memory and retrieved for the second browsing session. For example, the display parameters (e.g., the web accessibility profile customized by the additional input) may be stored in association with an identifier of the user and/or the computing device of the first browsing session. The display parameters may be retrieved for the second browsing session by querying for the identifier. The display parameters may be stored in a table, as small text files or cookies, as source code instructions for injecting into source code of a website, in a database, in a linked list, and any other format for storing display parameters.

Thus, after the user customizes the display parameters during the first browsing session, the display parameters e.g., including the selected web accessibility profile (the initial input) and additional input overriding one or more predefined changes (e.g., the second data) may be stored in memory (e.g., locally, or remotely). After the first browsing session terminates (e.g., by closing the web browser), upon initiation of the second browsing session (e.g., by opening the same or different web browser), the display parameters may be retrieved from memory. The retrieved display parameters may be applied for the second browsing session to continue to provide a customized accessibility experience for the second browsing session. For example, a first blind user may customize display parameters for a blind user profile during a first browsing session on a first computing device. The customized display parameters may be stored on the first computing device (e.g., as cookies). During a subsequent browsing session on the first computing device (e.g., by the same blind user or another blind user) the customized display parameters may be retrieved and implemented to continue providing a customized accessibility experience for the first and/or second blind users. As another example, a cognitively impaired user may customize display parameters for a cognitive display profile during a first browsing session on a desktop computer. The customized display parameters may be stored at a remote (e.g., cloud) storage device (e.g., as cookies). During a subsequent browsing session by the same cognitively impaired user on a mobile device, different than the desktop computer, the customized display parameters may be retrieved (e.g., based on the identifier of the cognitively impaired user) and implemented on the mobile device to continue providing the customized accessibility experience to the cognitively impaired user on the mobile device.

By way of a non-limiting example, turning to FIG. 19, after terminating the browsing session to navigate website 1704, processing device 110A (FIG. 2) may store the selection of the cognitive display profile (e.g., first input), the deselection of the highlight links button (e.g., second input overriding one of the predefined changes associated with the cognitive display profile) and the selection of the readable font and align center buttons (e.g., second inputs not included in the predefined changes), e.g., at computing device 170B in association with user 110B. When user 1108 initiates a new browsing session (e.g., the same user on the same computing device), processing device 110A may automatically retrieve the parameter settings from storage and implement the corresponding changes, accordingly.

According to some embodiments, during the second browsing session and before applying the web accessibility profile selection including the profile customization selection, the operations further include confirming that a user associated with the second browsing session is a same user that provided the initial input and the additional input. For example, in situations where one computing device is shared across multiple users, such as in a library, a home, a workplace, or hostel, it may be beneficial to confirm the identify of a user before implementing changes. This may prevent implementing inappropriate modifications, for example implementing changes suitable for blind users on a computing device used by a cognitively impaired user or implementing customized changes for one blind user on a computing device used by a different blind user. For example, each user may be associated with a unique identifier allowing the at least one processor to retrieve the customized settings for each specific user. The unique identifier may be based on biometric data, personal data (e.g., birthday, home address), a username, a password, a personal identity code (PIN), an email address, a phone number, a one-time password (e.g., for use with a cryptographic hash function), or any other type of uniquely identifying data. The display parameters may be stored in association with the unique identifier in a database, and retrievable by querying the database with the unique identifier. Before implementing changes associated with a specific user, the at least one processor may first confirm the identity of the specific user, to ensure that the implemented changes are suitable for the specific user. For example, the user may be prompted for a password, (e.g., a one-time password sent to a personal email address or mobile device of the user), for biometric data (e.g., as a finger press on a touch sensitive display), personal data, or any other technique for verifying the identity of the user. Similarly, an image sensor such as a camera associated with the computing device may capture one or more images of a user's face or hands, to thereby confirm the identity of the user as a basis for implementing a set of web accessibility parameters. In a similar way, voice patters or keystroke patterns of the user may be detected in order to confirm the user's identity (e.g., by comparing the patterns to prior known patterns associated with the user.

According to some embodiments, during the second browsing session and before applying the web accessibility profile selection and the profile customization selection, the operations further include avoiding application of the web accessibility profile selection and the profile customization selection when the second browsing session is associated with a second user different from the user that provided the initial input and the additional input. For example, if the current user is different than a previous user, changes associated with the previous user may not be implemented. For example, a first visually impaired user may use a computing device during a first browsing session to customize parameter settings for the visually impaired user profile. The customization may invoke the screen reader only for text content included in navigation links and titles, but not for other text displayed in the website. The customizes parameter settings for the first visually impaired user may be stored for a subsequent browsing session by the first visually impaired user. A second visually impaired user may use the same computing device during a second browsing session. However, the customized settings for the first visually impaired user may not suit the second visually impaired user who may wish to invoke the screen reader for all text content in the website. Thus, before implementing the changes associated with the first visually impaired user the identity of the current user of the computing device may be confirmed. If the current user is the second visually impaired user (e.g., different than the first visually impaired user) the implementation of the customized parameter settings may be avoided.

By way of a non-limiting example, during a first browsing session on device 170A, user 110A who is visually impaired may select a Visually Impaired profile (e.g., FIG. 6) and may further customize the Visually Impaired profile by increasing color saturation to 80%. Following the first browsing session, user 1108 who is cognitively impaired may also use device 170A for a browsing session (e.g., a second browsing session). However, the display settings defined by user 110A may not suit user 110B. For example, the increased color saturation may disturb user 110B, and user 110B may benefit by the addition of descriptive graphic images to accompany text. Processing unit 210A may detect that user 110B is different than user 110A (e.g., based on a password or biometric identification) and may thus avoid applying changes corresponding to the Visually Impaired profile and any customization to the same.

Figure 20A:
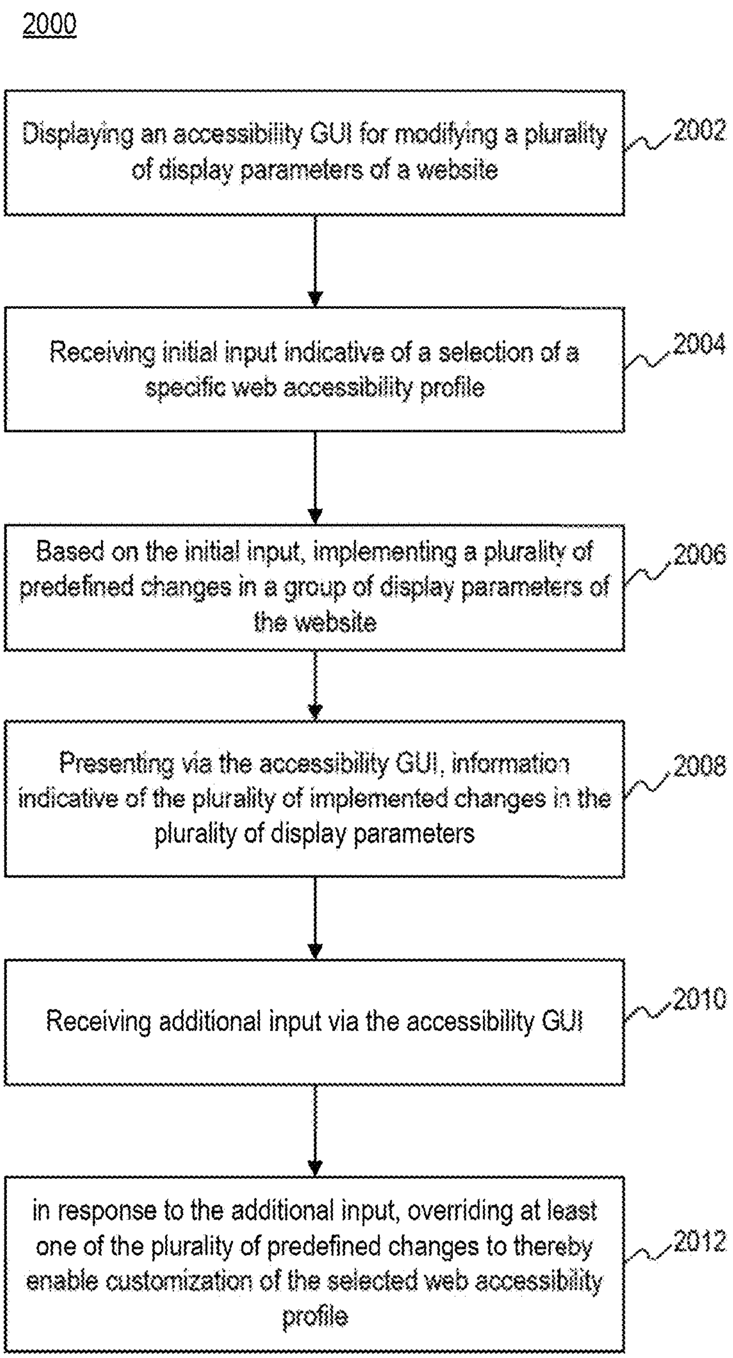
FIG. 20A illustrates a block diagram of an example process for enabling a user to customize a web accessibility profile via an exemplary content adjustments box, consistent with embodiments of the present disclosure.
Figure 20B:
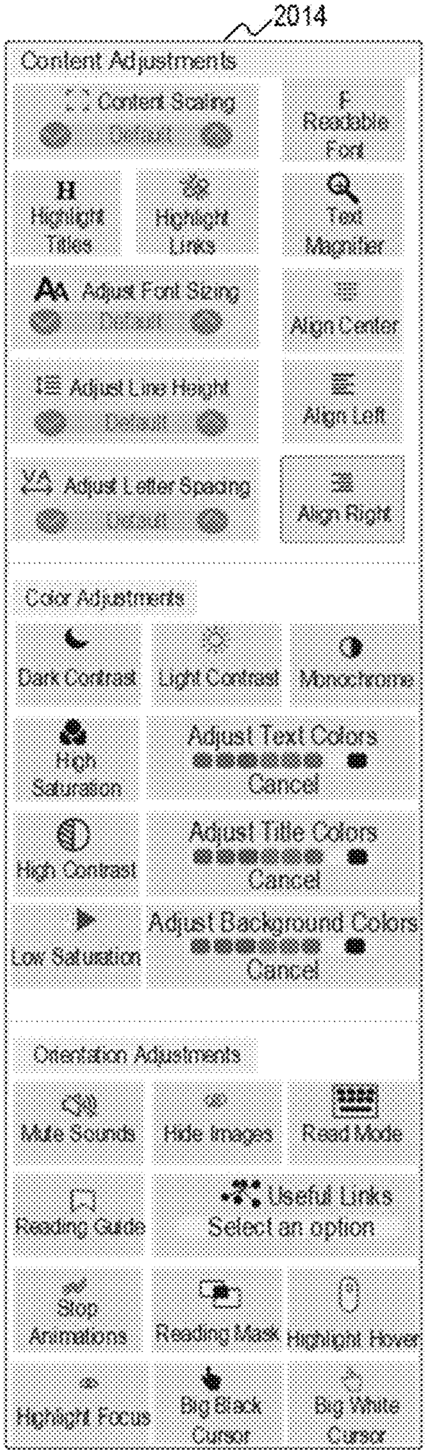
FIG. 20B illustrates another exemplary accessibility GUI, consistent with embodiments of the present disclosure.

Some embodiments involve enabling a user to customize a web accessibility profile. Such embodiments may also include displaying an accessibility graphical user interface (GUI) for modifying a plurality of display parameters of a website, wherein the accessibility GUI presents a plurality of web accessibility profiles associated with differing disabilities. Initial input may be received via the accessibility GUI indicative of a selection of a specific web accessibility profile. Based on the initial input, a plurality of predefined changes may be implemented in a group of display parameters of the website to address a disability associated with the specific web accessibility profile. Information indicative of the plurality of implemented changes in the plurality of display parameters associated with the specific web accessibility profile may be presented via the accessibility GUI. Additional input may be received via the accessibility GUI, indicative of a selection of at least one alteration to at least one of the plurality of predefined changes. In response to the additional input, at least one of the plurality of predefined changes may be overridden to thereby enable customization of the selected web accessibility profile. FIG. 20A illustrates a flowchart of an example process 2000 for enabling a user to customize a web accessibility profile via an exemplary content adjustments box 2014 illustrated in FIG. 20B, consistent with embodiments of the present disclosure. Content adjustments box 2014 may correspond to content adjustments box 1706 of FIGS. 18-19. In some embodiments, the process 2000 may be performed by at least one processor (e.g., processing device 210A of computing device 170, shown in FIG. 2) to perform operations or functions described herein. In some embodiments, some aspects of process 2000 may be implemented as software (e.g., program codes or instructions) that are stored in a memory (e.g., memory device 220A of computing device 170, shown in FIG. 2) or a non-transitory computer readable medium. In some embodiments, some aspects of the process 2000 may be implemented as hardware (e.g., a specific-purpose circuit). In some embodiments, the process 2000 may be implemented as a combination of software and hardware.

FIG. 20A includes process blocks 2002 to 2012. Process 2000 may include a step 2002, where an accessibility graphical user interface (GUI) may be displayed for modifying a plurality of display parameters of a website. The accessibility GUI may present a plurality of web accessibility profiles associated with differing disabilities. For example, turning to FIG. 17, processing device 210B of computing device 170 (FIG. 2) may display accessibility GUI 1702 on computer 170B (FIG. 1) to modify multiple display parameters of website 1704. accessibility GUI 1702 may include multiple web accessibility profiles, each associated with a different disability, such as a cognitive display profile associated with cognitive disabilities, an ADHD friendly profile associated with disabilities related to attention deficit and hyperactivity disorders, a blind users profile associated with visual impairment, and a keyboard navigation profile associated with motor impairment.

Process 2000 may include a step 2004, where initial input, indicative of a selection of a specific web accessibility profile, may be received via the accessibility GUI. By way of a non-limiting example, turning to FIG. 18, user 110B may select the cognitive display profile by clicking on a button provided by accessibility GUI 1702. An event listener may detect the selection and notify processing device 210B (FIG. 2).

Process 2000 may include a step 2006, where based on the initial input, a plurality of predefined changes in a group of display parameters of the website may be implemented to address a disability associated with the specific web accessibility profile. By way of a non-limiting example, turning to FIG. 18, based on the selection of the cognitive display profile, processing device 210B (FIG. 2) may retrieve from accessibility service host 130 (FIG. 1) a set of predefined changes associated with cognitive impairment, such as to highlight titles, links, and increase the content scaling by 25%. These predefined changes may be intended to address typical users with cognitive impairment. Processing device 210B may implement the changes to address cognitive impairment associated with the cognitive display profile. Accordingly, link 1710 and title 1708 are now displayed highlighted.

Process 2000 may include a step 2008, where information indicative of the plurality of implemented changes in the plurality of display parameters associated with the specific web accessibility profile may be presented via the accessibility GUI. By way of a non-limiting example, Content adjustment box 1214 displays information indicating settings for multiple display parameters for a website. Each web accessibility profile may be associated with a different set of predefined changes to one or more parameter settings, for example to address needs typical to a disability associated with each web accessibility profile. When a user selects a specific web accessibility profile, the predefined changes associated with the web accessibility profile may be implemented (e.g., automatically). In addition, Content adjustment box 1214 may be displayed to allow the user to fine tune any of the settings for the display parameters, including overriding one or more of the predefined settings, or defining settings for other display parameters. As another non-limiting example, turning to FIG. 18, processing device 210B (FIG. 2) may display information indicating the implemented changes in content adjustments box 1706 of accessibility GUI 1702. Accordingly, the highlight titles and highlight links buttons are shown as selected and the content scaling slide bar shows an increase of 25%, corresponding to the changes implemented based on the predefined changes for the cognitive display profile.

Process 2000 may include a step 2010, where additional input may be received via the accessibility GUI, indicative of a selection of at least one alteration to at least one of the plurality of predefined changes. By way of a non-limiting example, turning to FIG. 19, user 110B has deselected the highlight links button of content adjustments box 1706. An even listener may notify processing device 210B of the deselection (e.g., additional input) indicating a selection to make an alteration to at least one of the predefined changes.

Process 2000 may include a step 2012, where in response to the additional input, at least one of the plurality of predefined changes may be overridden to thereby enable customization of the selected web accessibility profile. By way of a non-limiting example, turning to FIG. 19, in response to the deselection of the highlight links button of content adjustments box 1706 (e.g., the additional input), processing device 210B may override the predefined setting to highlight the links. Accordingly, website 1704 is displayed with the links not highlighted, while the titles remain highlighted, and the content scaling remains at +25%.

Some embodiments may involve, when the initial input indicates that the selected web accessibility profile is a vision impairment profile, the plurality of predefined changes include increasing content scaling and increasing display intensity, and the additional input is configured to customize the vision impairment profile to address specific user needs. The term "vision impairment profile" may be designed for disabilities such as degrading eyesight, tunnel vision, cataract, glaucoma, and others, as described earlier. For example, increasing content scaling and increasing display intensity may address needs typically associated with vision impairment. Thus, the predefined changes associated with the vision impairment profile may automatically implement changes to accommodate typical vision impaired users. However, vision impairment may vary widely between different users. For example, some users may have only mild vision impairment, requiring only a few display adjustments, whereas other users may have more severe vision impairment, requiring significant display adjustments. Thus, the degree of visual impairment may impact the degree of adjustment needed. Accordingly, after automatically implementing the predefined changes associated with vision impairment, the accessibility GUI may allow a specific visually impaired user to customize the vision impairment profile. A specific user with mild vision impairment may make mild adjustments to customize the vision impairment profile, and a specific user with more severe vision impairment may make more significant adjustments to customize the vision impairment profile.

Some embodiments may involve, when the initial input indicates that the selected web accessibility profile is a cognitive disability profile, the plurality of predefined changes include highlighting titles and actionable objects on the website, and the additional input is configured to customize the cognitive disability profile to address specific user needs. The term "cognitive disability profile" may be designed to help users with cognitive disabilities such as autism, dyslexia, CVA, and others, as described earlier. For example, highlighting titles and actionable objects on the website may address needs typically associated with cognitive impairment. Thus, the predefined changes associated with the cognitive impairment profile may automatically implement changes to accommodate typical cognitively impaired users. However, cognitive impairment may vary widely between different users. For example, users with only mild cognitive impairment may require only a few display adjustments, whereas users with more severe cognitive impairment may require more significant display adjustments. Thus, the degree of cognitive impairment may impact the degree of adjustment needed. Accordingly, after automatically implementing the predefined changes associated with cognitive impairment, the accessibility GUI may allow a specific cognitive impaired user to customize the cognitive impairment profile. A specific user with mild cognitive impairment may make mild adjustments to customize the cognitive impairment profile, and a specific user with more severe cognitive impairment may make more significant adjustments, accordingly.

Some embodiments may involve, when the initial input indicates that the selected web accessibility profile is an epilepsy-safe profile, the plurality of predefined changes include decreasing display intensity and limiting animation movement on a display, and the additional input is configured to customize the epilepsy-safe profile to address specific user needs. The term "epilepsy-safe profile" may correspond to a seizure-safe profile, as described earlier. For example, decreasing display intensity and limiting animation movement on a display may address needs typically associated with epilepsy. Thus, the predefined changes associated with the epilepsy-safe profile may automatically implement changes to accommodate typical users with epilepsy. However, epilepsy may vary widely between different users. For example, users with mild epilepsy may require only a few display adjustments, whereas users with more severe epilepsy may require more significant display adjustments. Thus, the degree of epilepsy may impact the degree of adjustment needed. Accordingly, after automatically implementing the predefined changes associated with epilepsy, the accessibility GUI may allow a specific user with epilepsy to customize the epilepsy-safe profile. A specific user with mild epilepsy may make mild adjustments to customize the epilepsy-safe profile, and a specific user with more severe epilepsy may make more significant adjustments, accordingly.

Some embodiments may involve when the initial input indicates that the selected web accessibility profile is an ADHD friendly profile, the plurality of predefined changes include increasing content scaling and limiting animation movement on a display, and the additional input is configured to customize the ADHD friendly profile to address specific user needs. For example, increasing content scaling and limiting animation movement on a display may address needs typically associated with ADHD. Thus, the predefined changes associated with the ADHD friendly profile may automatically implement changes to accommodate typical users with ADHD. However, ADHD may vary widely between different users. For example, users with mild ADHD may require only a few display adjustments, whereas users with more severe ADHD may require more significant display adjustments. Thus, the degree of ADHD may impact the degree of adjustment needed. Accordingly, after automatically implementing the predefined changes associated with ADHD, the accessibility GUI may allow a specific user with ADHD to customize the ADHD-friendly profile. A specific user with mild ADHD may make mild adjustments to customize the ADHD-friendly profile, and a specific user with more severe ADHD may make more significant adjustments, accordingly.

Some embodiments involve a system for enabling a user to customize a web accessibility profile. The system may include a memory configured to store values of various website display parameters associated with a plurality of web accessibility profiles, and at least one processor. The processor may be configured to: display an accessibility graphical user interface (GUI) for modifying a plurality of display parameters of a website, wherein the accessibility GUI presents a plurality of web accessibility profiles associated with differing disabilities; receive initial input via the accessibility GUI indicative of a selection of a specific web accessibility profile; based on the initial input, implement a plurality of predefined changes in a group of display parameters of the website to address a disability associated with the specific web accessibility profile; present via the accessibility GUI, information indicative of the plurality of implemented changes in the plurality of display parameters associated with the specific web accessibility profile; receive additional input via the accessibility GUI, indicative of a selection of at least one alteration to at least one of the plurality of predefined changes; and in response to the additional input, override at least one of the plurality of predefined changes to thereby enable customization of the selected web accessibility profile.

Some disclosed embodiments may involve systems, methods, and computer-readable media for providing an accessibility GUI that, following a selection of an epilepsy safe profile, automatically alters a group of default display parameters. The epilepsy-safe profile may be designed to eliminate the risk of seizures that result from flashing or blinking animations and risky color combinations.

Some disclosed embodiments may involve systems, methods, and computer-readable media for providing an accessibility GUI that, following a selection of a vision impairment profile, automatically alters a group of default display parameters. The vision impairment profile may be designed for disabilities such as degrading eyesight, tunnel vision, cataract, glaucoma, and others.

Some disclosed embodiments involve systems, methods, and computer-readable media for providing an accessibility GUI that, following a selection of a cognitive disability profile, automatically alters a group of default display parameters. The cognitive display profile may be designed to help users with cognitive disabilities such autism, dyslexia, CVA, and others, to focus on the essential elements more easily.

Some disclosed embodiments may involve systems, methods, and computer-readable media for providing an accessibility GUI that, following a selection of an ADHD friendly profile, automatically alters a group of default display parameters. The ADHD friendly profile may be designed to reduce distractions and noise. Doing so may help people with ADHD and neurodevelopmental disorders browse, read, and focus on essential elements more easily.

Figure 21:
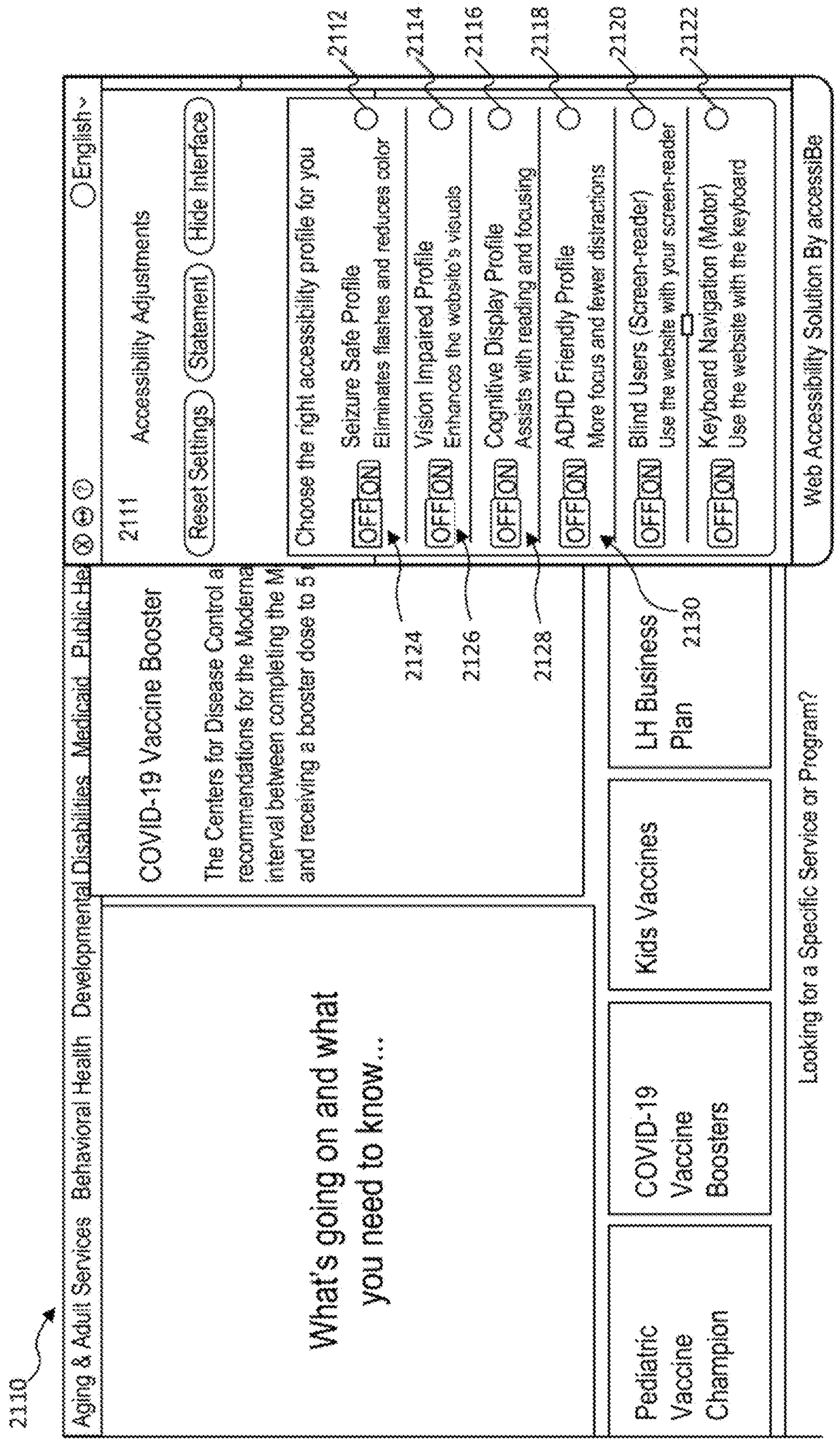
FIG. 21 is an example of a website presented with default website display parameters, consistent with some embodiments of the present disclosure.

Some embodiments include a non-transitory computer readable medium containing instructions that when executed by at least one processor cause the at least one processor to perform operations for altering default display parameters to conform with a neurodevelopmental disorder, epilepsy, visual impairment, and/or cognitive disability profile. Default website display parameters may include limits, characteristics, variables, constraints, elements, or attributes that are preselected or adopted by a computer program or other mechanism when no alternative is specified by the user or programmer. For example, a default website display parameter may include the size of the font that is automatically displayed on the website. As another example, a default website display parameter may include the size of the window that is automatically displayed on the website. In another example, a default website parameter may include the color theme that is automatically applied to the website. FIG. 21 is an example of a website 2110 presented with default website display parameters, consistent with some embodiments of the present disclosure. In the default view, website 2110 is presented with no modifications to the default website display parameters. Altering default website display parameters may include replacing, varying, exchanging, shifting, or in any other way changing the default website display parameters. For example, altering default website display parameters may include replacing a color image with a black and white image on a website display.

Conforming with a neurodevelopmental disorder profile may include changing or modifying certain website display parameters to match neurodevelopmental disorder-friendly website display parameters, reducing the amount or impact of certain website display parameters that are not desirable for users with a neurodevelopmental disorder, or in any other way changing a website to make the website more similar to a neurodevelopmental disorder profile. For example, conforming with a neurodevelopmental disorder profile may include increasing content scaling on a website to match a content scaling parameter of a neurodevelopmental disorder profile. In some embodiments, the neurodevelopmental disorder includes at least one of: attention-deficit/hyperactivity disorder (ADHD), autism, learning disabilities, intellectual disability, conduct disorders, or cerebral palsy. It may be desirable to implement predefined templates to conform with the needs of users with such disorders because these types of disorders may make websites more difficult for these users to navigate and understand.

An epilepsy-safe profile may include any profile that may be beneficial for or compatible with individuals that suffer from epilepsy. Individuals with photosensitive epilepsy may experience seizures triggers by displays that flicker, flash, or blink, especially with flashing that has a high intensity and is within certain frequency ranges. This is particularly a problem with the use of animated GIFs and videos in websites. Thus, an epilepsy-safe profile may refer to a profile that reduces or avoids any of these aspects of websites. In one example, an epilepsy profile may include a profile that does not contain any content that flashes more than three times in any one second period. A flash may include a sudden brief burst of an image, video, light, or color. In another example, an epilepsy-safe profile may include any content that does not flash below certain flash thresholds, or certain red flash thresholds. A flash threshold may include a maximum number, frequency, magnitude, or intensity of flashes associated with an epilepsy-safe profile. Other examples of an epilepsy-safe profile include a profile that includes one or more of reducing contrast for any flashing content, avoiding fully saturated red colors for any flashing content, reducing the number of flashes, preventing flashing content from flashing before it begins, slowing down content to avoid rapid flashes, freezing an image momentarily when the image is configured to have a certain number of flashes in one second, reducing the contrast ratio when there are a certain number of flashes in one second, and providing a warning if certain website content is not safe for individuals with epilepsy. Conforming with an epilepsy-safe profile may include changing or modifying certain website display parameters to match epilepsy-safe website display parameters, reducing the amount or impact of certain website display parameters that are not epilepsy-safe, or in any other way changing a website to make the website more similar to an epilepsy-safe profile. For example, conforming with an epilepsy-safe profile may include changing the color of a video on a website to match a video color parameter of an epilepsy-safe profile. In another example, conforming with an epilepsy-safe profile may include changing the color of text on a website to reduce contrast.

Conforming with a visual impairment profile may include changing or modifying certain website display parameters to match visual impairment-friendly website display parameters, reducing the amount or impact of certain website display parameters that are not desirable for visually impaired users, or in any other way changing a website to make the website more similar to a visual impairment profile. For example, conforming with a visual impairment profile may include increasing the size of an image on a website to match an image size parameter of a visual impairment profile. In another example, conforming with a visual impairment profile may include providing audio descriptions of a video on the website.

Conforming with a cognitive disability profile may include changing or modifying certain website display parameters to match cognitive disability-friendly website display parameters, reducing the amount or impact of certain website display parameters that are not desirable for cognitively disabled users, or in any other way changing a website to make the website more similar to a cognitive disability profile. For example, conforming with a cognitive disability profile may include increasing content scaling on a website to match a content scaling parameter of a cognitive disability profile. In another example, conforming with a cognitive disability profile may include highlighting titles depicted on the website.

Some embodiments include obtaining an indication that a user of a website has a neurodevelopmental disorder, epilepsy, visual impairment, and/or cognitive disability. An indication that a user of a website is has a neurodevelopmental disorder, epilepsy, visual impairment, and/or cognitive disability may include a signal, warning, notification, alarm, user input, sensor output, alert, or any other sign that a user of a website has a neurodevelopmental disorder, epilepsy, visual impairment, and/or cognitive disability. Obtaining an indication that a user of a website has a neurodevelopmental disorder, epilepsy, visual impairment, and/or cognitive disability may include receiving an indication that a user of a website has a neurodevelopmental disorder, epilepsy, visual impairment, and/or cognitive disability from any source, including the at least one processor, an external device, input from a cookie, input from the user, or input from another individual.

In some examples, obtaining an indication that a user of a has a neurodevelopmental disorder may include receiving a signal from an external device capable of detecting whether a user has a neurodevelopmental disorder, such as a Neuropsychiatric EEG-Based Assessment Aid (NEBA) System. In other examples, obtaining an indication that a user of a website has a neurodevelopmental disorder may include receiving input from either the user or another individual that the user has a neurodevelopmental disorder. For example, obtaining an indication that a user of a website has a neurodevelopmental disorder may include a user input from the user in the form of clicking a button on a website to indicate that the user has a neurodevelopmental disorder. As another example, obtaining an indication that a user of a website has a neurodevelopmental disorder may include a signal from a NEBA device communicating that the that the user has a neurodevelopmental disorder.

In some examples, obtaining an indication that a user of a website has epilepsy may include receiving a signal from an external device capable of detecting whether a user has epilepsy, including one or more of a sensor (such as an EEG sensor) or an epilepsy monitor. In other examples, obtaining an indication that a user of a website has epilepsy may include receiving input from either the user or another individual that the user has epilepsy. For example, obtaining an indication that a user of a website has epilepsy may include a user input from the user in the form of clicking a button on a website to indicate that the user has epilepsy. As another example, obtaining an indication that a user of a website has epilepsy may include a signal from an epilepsy monitor communicating that the that the user has epilepsy.

In some examples, obtaining an indication that a user of a website is visually impaired may include receiving a signal from an external device capable of detecting whether a user is visually impaired, such as a glaucoma monitor. In other examples, obtaining an indication that a user of a website is visually impaired may include receiving input from either the user or another individual that the user is visually impaired. For example, obtaining an indication that a user of a website is visually impaired may include a user input from the user in the form of clicking a button on a website to indicate that the user is visually impaired. As another example, obtaining an indication that a user of a website is visually impaired may include a signal from a glaucoma monitor communicating that the that the user is visually impaired.

In some examples, obtaining an indication that a user has a cognitive disability may include receiving a signal from an external device capable of detecting whether a user has a cognitive disability, such as an EEG. In other examples, obtaining an indication that a user of a website has a cognitive disability may include receiving input from either the user or another individual that the user has a cognitive disability. For example, obtaining an indication that a user of a website has a cognitive disability may include a user input from the user in the form of clicking a button on a website to indicate that the user has a cognitive disability. As another example, obtaining an indication that a user of a website has a cognitive disability may include a signal from an EEG sensor communicating that the that the user has a cognitive disability.

In some embodiments, the indication that the user has a neurodevelopmental disorder, epilepsy, visual impairment, and/or cognitive disability is received via an accessibility graphical user interface (GUI) associated with the website. It may be desirable to provide the indication that the user has a neurodevelopmental disorder, epilepsy, visual impairment, and/or cognitive disability via an accessibility graphical user interface (GUI) associated with the website so that a user can decide if and when a neurodevelopmental disorder, epilepsy, visual impairment, and/or cognitive disability profile should be used. In one example, the indication that the user has a neurodevelopmental disorder, epilepsy, visual impairment, and/or cognitive disability may be received when the user clicks on an accessibility icon associated with a neurodevelopmental disorder, epilepsy, visual impairment, and/or cognitive disability shown, for example, at the top, bottom, sides, or any other portion of the website. In another example, the indication that the user has a neurodevelopmental disorder, epilepsy, visual impairment, and/or cognitive disability may be received when the user types a command indicating that the user has a neurodevelopmental disorder, epilepsy, visual impairment, and/or cognitive disability into a window presented on the website.

In some embodiments, the indication reflects a user selection of the neurodevelopmental disorder, epilepsy, visual impairment, and/or cognitive disability profile out of a plurality of web accessibility profiles presented in the accessibility GUI. It may be desirable to include the neurodevelopmental disorder, epilepsy, visual impairment, and/or cognitive disability profile in a plurality of web accessibility profiles presented in the accessibility GUI so that a user may select one or more web accessibility profiles that align with the user's specific condition. In one example, the indication may include a user clicking on a neurodevelopmental disorder, epilepsy, visual impairment, and/or cognitive disability profile out of a plurality of web accessibility profiles presented as a list in an accessibility GUI. In another example, the indication may include a user selection of more than one web accessibility profile by the user clicking on a neurodevelopmental disorder, epilepsy, visual impairment, and/or cognitive disability profile and one or more other web accessibility profiles out of a plurality of web accessibility profiles presented as a list in an accessibility GUI.

In some embodiments, the plurality of web accessibility profiles includes at least two of: an epilepsy-safe profile, a visual impairment profile, a cognitive disability profile, and a neurodevelopmental disorder profile. It may be desirable for the plurality of web accessibility profiles displayed in an accessibility GUI to include some of the more well-known impairments. For example, the list of accessibility profiles included in the accessibility GUI may include at least two of: an epilepsy-safe profile, a visual impairment profile, a cognitive disability profile, and a neurodevelopmental disorder profile. Although only four impairment profiles hare discussed above by way of example, it is contemplated that the list of accessibility profiles may include any number of accessibility profiles. This may allow users with common impairments that affect their ability to view and interact with a website by selecting one or more profiles that best align with the user's needs.

In one example, the plurality of web accessibility profiles includes a neurodevelopmental disorder profile and an epilepsy-safe profile. In another example, the plurality of web accessibility profiles includes a neurodevelopmental disorder profile, a visual impairment profile, and an epilepsy-safe profile.

In one example, the plurality of web accessibility profiles includes an epilepsy-safe profile and a visual impairment profile. In another example, the plurality of web accessibility profiles includes an epilepsy-safe profile, a profile for a first type of cognitive disability, and a profile for a second type of cognitive disability.

In one example, the plurality of web accessibility profiles includes a visual impairment profile and an epilepsy-safe profile. In another example, the plurality of web accessibility profiles includes a visual impairment profile, a profile for a first type of cognitive disability, and a profile for a second type of cognitive disability.

In one example, the plurality of web accessibility profiles includes a cognitive disability profile and an epilepsy-safe profile. In another example, the plurality of web accessibility profiles includes a cognitive disability, a visual impairment profile, and an epilepsy-safe profile.

For example, as shown in FIG. 21, website 2110 may be presented with a plurality of web accessibility profiles as part of an accessibility GUI. As illustrated in FIG. 21, accessibility GUI 2111 may include a seizure safe profile 2112, a vision impaired profile 2114, a cognitive display profile 2116, an ADHD friendly profile 2118, a profile for blind users including a screen-reader 2120, and a profile for keyboard navigation for users with motor impairments 2122.

Figure 22:
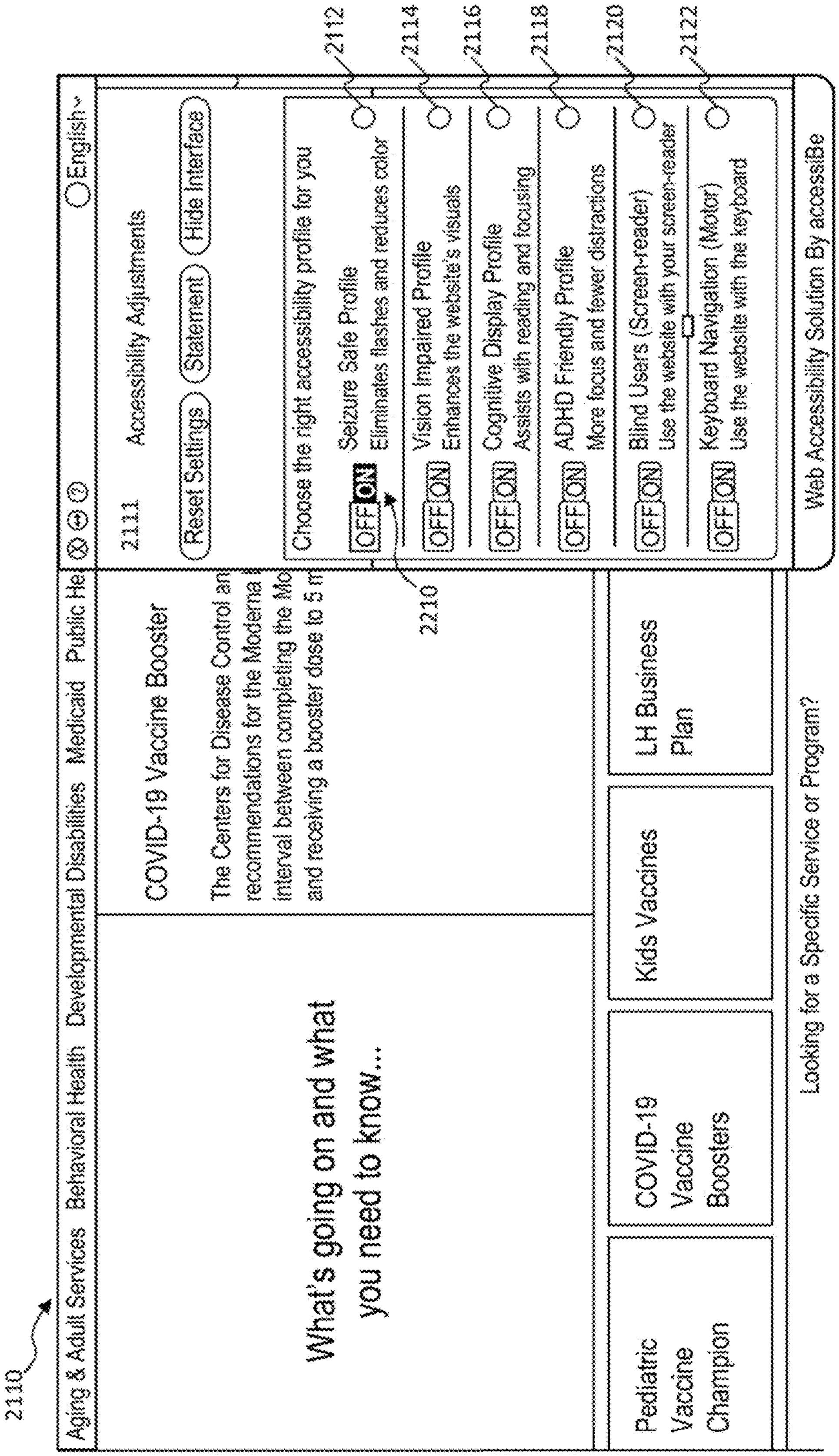
FIG. 22 is an example of a website presented with website display parameters corresponding to an epilepsy-safe profile, consistent with some embodiments of the present disclosure.

In FIG. 21, epilepsy-safe profile 2112 is shown to not be selected, as indicated by the OFF indicator 2124. FIG. 22 is an example of a website presented with website display parameters corresponding to an epilepsy-safe profile, consistent with some embodiments of the present disclosure. As an example, in FIG. 22, the user has selected the epilepsy-safe profile 2112, as indicated by the ON indicator 2210.

Figure 25:
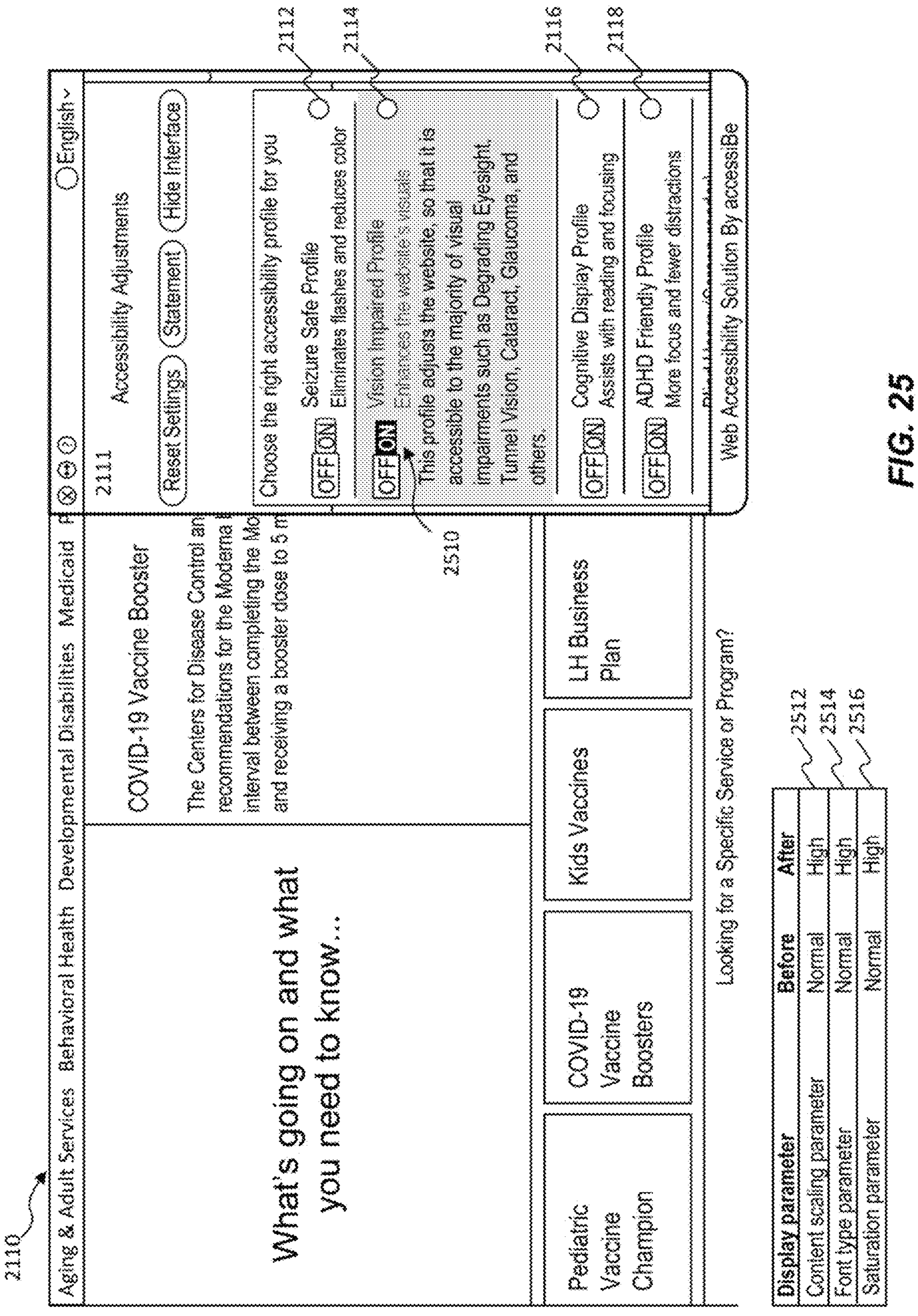
FIG. 25 is an exemplary screenshot of a website presented with website display parameters corresponding to a visual impairment profile, consistent with some embodiments of the present disclosure.

In FIG. 21, vision impaired profile 2114 is shown to not be selected, as indicated by the OFF indicator 2126. FIG. 25 is an example of a website presented with website display parameters corresponding to a vision impaired profile, consistent with some embodiments of the present disclosure. As an example, in FIG. 25, the user has selected the vision impaired profile 2114, as indicated by the ON indicator 2510.

Figure 28:
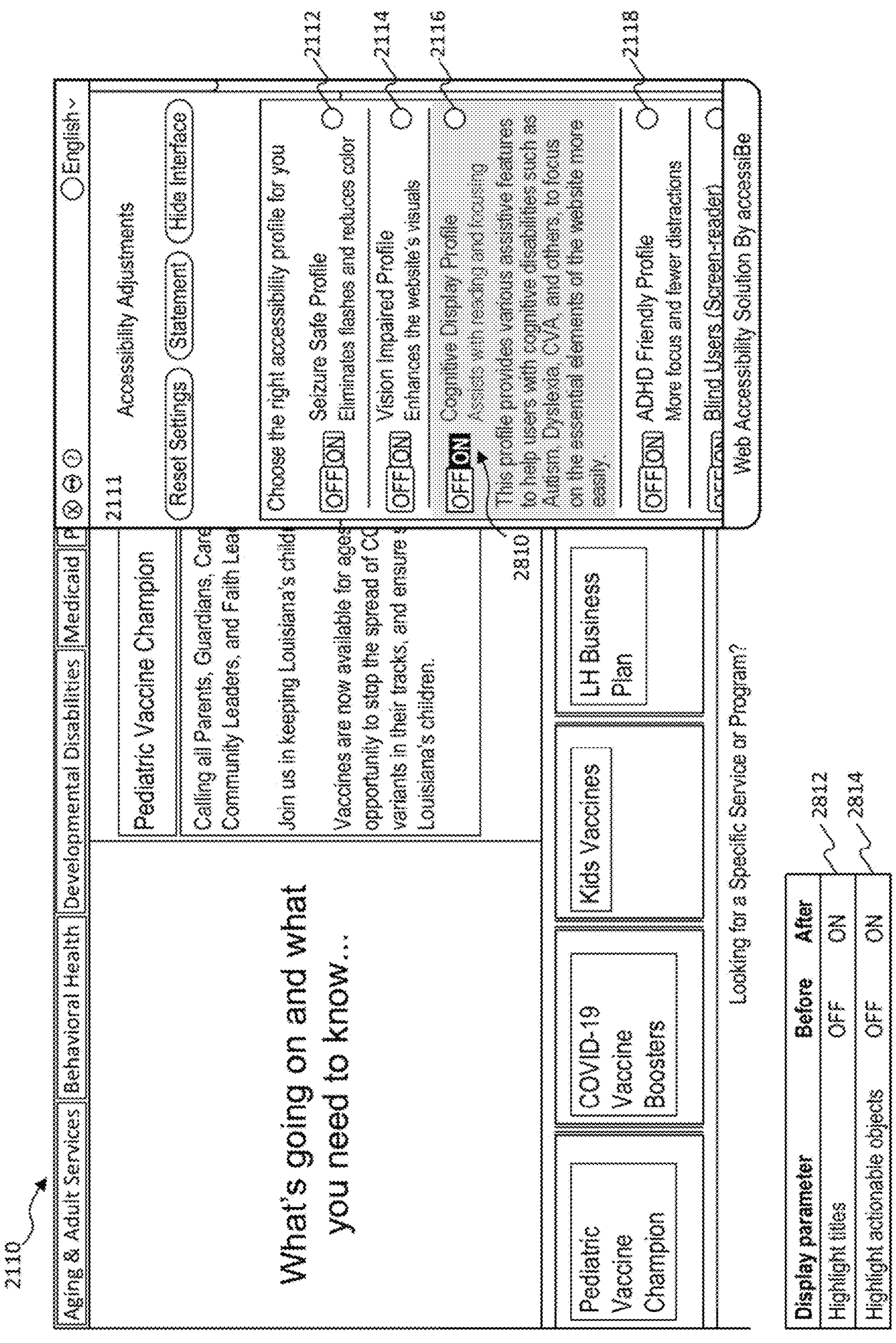
FIG. 28 is an example of a website presented with website display parameters corresponding to a cognitive display profile, consistent with some embodiments of the present disclosure.

In FIG. 21, cognitive display profile 2116 is shown to not be selected, as indicated by the OFF indicator 2126. FIG. 28 is an example of a website presented with website display parameters corresponding to a cognitive display profile, consistent with some embodiments of the present disclosure. As an example, in FIG. 28, the user has selected the cognitive display profile 2116, as indicated by the ON indicator 2810.

Figure 31:
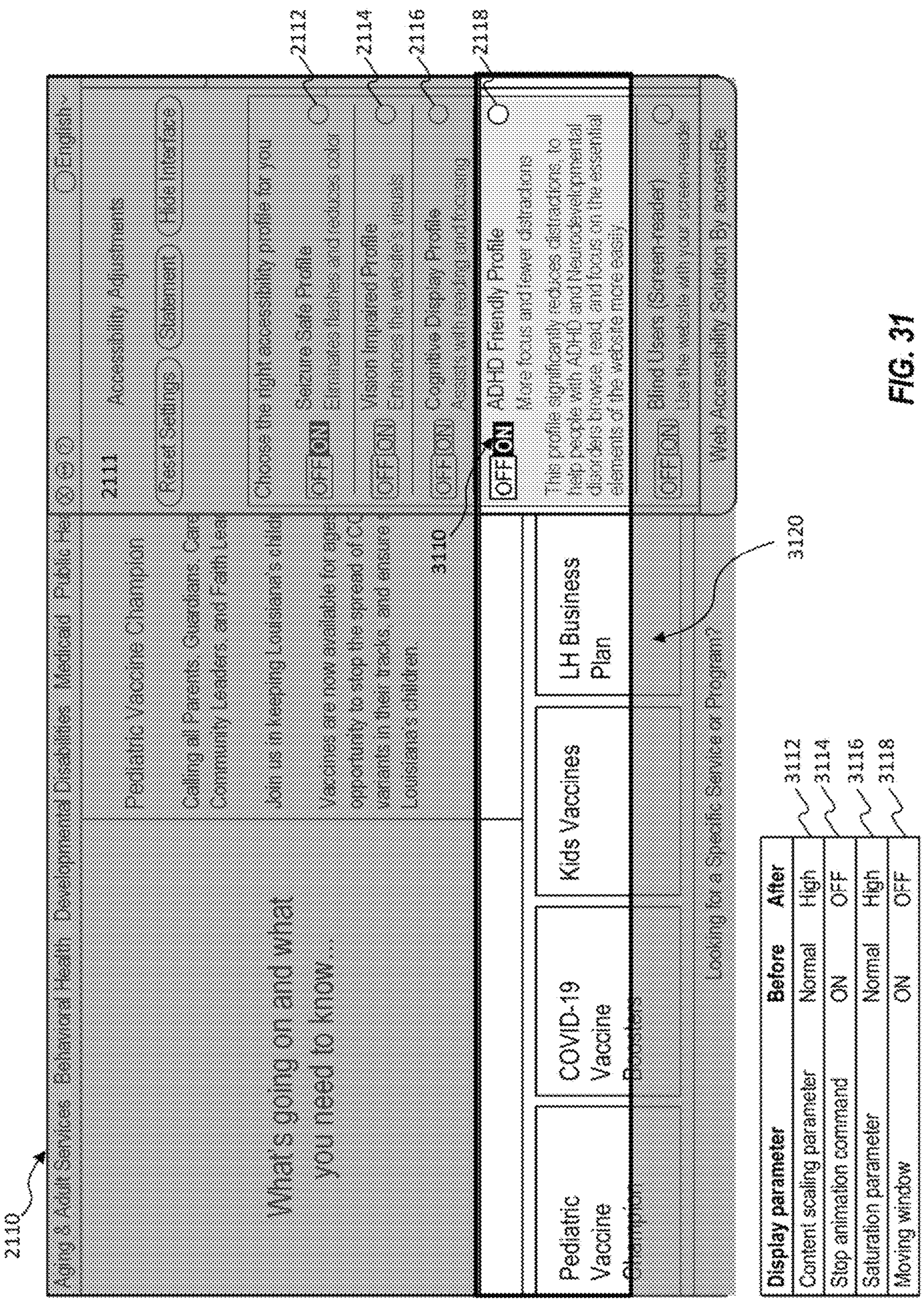
FIG. 31 is an example of a website presented with website display parameters corresponding to a neurodevelopmental disorder profile, consistent with some embodiments of the present disclosure.

In FIG. 21, ADHD Friendly profile 2118 is shown to not be selected, as indicated by the OFF indicator 2130. FIG. 31 is an example of a website presented with website display parameters corresponding to a neurodevelopmental disorder profile, consistent with some embodiments of the present disclosure. As an example, in FIG. 28, the user has selected the ADHD friendly profile 2118, as indicated by the ON indicator 3110.

In some embodiments, the indication that the user has a neurodevelopmental disorder, epilepsy, visual impairment, and/or cognitive disability is determined based on data stored on the computing device. It may be desirable to determine whether a user has a neurodevelopmental disorder, epilepsy, visual impairment, and/or cognitive disability based on data associated with the indication stored on the computing device. Different types of computing devices may be used with the systems, methods, and non-transitory computer readable media disclosed herein, such as computers, mobile phones, laptops, tablets, smart phones, smart watches, smart glasses or other computing devices capable of accessing a website. By doing so, a new determination of the user's neurodevelopmental disorder, epilepsy, visual impairment, and/or cognitive disability status may not need to be performed for every use. The indication that the user has a neurodevelopmental disorder, epilepsy, visual impairment, and/or cognitive disability may be stored in association with an identifier of the user on a computing device associated with the user. In one example, the indication that the user has a neurodevelopmental disorder, epilepsy, visual impairment, and/or cognitive disability may be determined based on cookies stored on the computing device. In another example, the indication that the user has a neurodevelopmental disorder, epilepsy, visual impairment, and/or cognitive disability may be determined based on browsing history stored on the computing device. In yet another example, the indication that the user has a neurodevelopmental disorder, epilepsy, visual impairment, and/or cognitive disability may be determined based on a user profile stored on the computing device.

In some embodiments, the indication that the user has a neurodevelopmental disorder, epilepsy, visual impairment, and/or cognitive disability is determined based on data stored on a remote server. It may be desirable to determine whether a user has a neurodevelopmental disorder, epilepsy, visual impairment, and/or cognitive disability based on data associated with the indication stored on a remote server. Doing so may help the computing device access information from remote locations, such as a hospital or a home. Doing so may also help a user to access the indication using a computing device different from a computing device that the user may have been using during a previous browsing session. A remote server may include any type of server that provides services to remotely connected users over a network or the Internet. In one example, the indication that the user has a neurodevelopmental disorder, epilepsy, visual impairment, and/or cognitive disability is determined based on data stored on a computer in another building that is not connected to the same local area network as the computing device. In another example, the indication that the user has a neurodevelopmental disorder, epilepsy, visual impairment, and/or cognitive disability is determined based on data stored on a cloud. A cloud may include a virtual computer server that has resources accessible to users remotely over a network, such as the internet.

Based on the obtained indication, some disclosed embodiments include implementing a predefined template to alter multiple default website display parameters to conform with needs of the user with the neurodevelopmental disorder, epilepsy, visual impairment, and/or cognitive disability. A predefined template may include a guide, arrangement, instruction, or any other model of one or more website default display parameters. A predefined template may include a set value for one or more of a plurality of website display parameters, such that using the predefined template for different websites may result in the same changes to the same website display parameters of the different websites. As an example, a predefined template may include providing for a font size of 20 pt and pausing all moving content on a website. In this example, when the predefined template is applied to different websites, each of the different websites may present content with a font size of 20 pt and all moving content on each website may be paused. Implementing a predefined template to alter multiple website default display parameters to conform with needs of the user with the neurodevelopmental disorder, epilepsy, visual impairment, and/or cognitive disability may include changing or replacing two or more website default display parameters so that those parameters match the website display parameters of the predefined template.

For example, if a predefined template includes increasing the content scaling by two and limiting moving images on a website, implementing the predefined template may include increasing the content scaling by two and limiting moving images on the website.

For example, if a predefined template includes providing for a font size of 20 and pausing all moving content on a website, implementing the predefined template may include changing the font of the website to 20 and pausing all moving content on the website.

For example, if a predefined template includes providing for a font size of 20 and doubling the size of all images on a website, implementing the predefined template may include changing the font of the website to 20 and doubling the size of all images on the website.

In some instances, implementing a predefined template to alter multiple website default display parameters to conform with needs of the user with the neurodevelopmental disorder, epilepsy, visual impairment, and/or cognitive disability may include changing all of the website default display parameters. In other instances, implementing a predefined template to alter multiple website default display parameters to conform with needs of the user with the neurodevelopmental disorder, epilepsy, visual impairment, and/or cognitive disability may include changing only some of the website default display parameters.

In some embodiments, the predefined template is associated with a general profile of a neurodevelopmental disorder and values of the multiple default website display parameters are determined based on a Web Content Accessibility Guideline.

A profile may include one or more of features, characteristics, aspects, attributes, components, and styles associated with a topic. For example, a profile may include a characterization of certain templates that are appropriate for an individual with a neurodevelopmental disorder, epilepsy, visual impairment, and/or cognitive disability. In another example, a profile may include templates that are appropriate for use with a mobile device. A general profile of an individual with a neurodevelopmental disorder, epilepsy, visual impairment, and/or cognitive disability may include a profile that affects or concerns all or most individuals with the neurodevelopmental disorder, epilepsy, visual impairment, and/or cognitive disability. As such, a general profile of an individual with a neurodevelopmental disorder, epilepsy, visual impairment, and/or cognitive disability may include website display parameters that may benefit all or most individuals with the neurodevelopmental disorder, epilepsy, visual impairment, and/or cognitive disability. It may be desirable for the predefined template to be associated with a general profile of an individual with a neurodevelopmental disorder, epilepsy, visual impairment, and/or cognitive disability to reduce processing load and improve efficiency by not requiring a separate profile for each individual with a neurodevelopmental disorder, epilepsy, visual impairment, and/or cognitive disability who accesses the website.

When using a general profile of an individual with a neurodevelopmental disorder, values of the multiple default website display parameters may be determined based on Web Content Accessibility Guidelines (WCAG), such as WCAG 2.1. For example, the predefined template may be associated with a general profile of an individual with a neurodevelopmental disorder to double the spacing between sentences in text on the website.

In some embodiments, the predefined template is associated with a general profile of an epileptic individual. As an example, the predefined template may be associated with a general profile of an epileptic individual to pause all animations including flashing images.

In some embodiments, the predefined template is associated with a general visually impaired individual profile. When using a general visually impaired individual profile, values of the multiple default website display parameters may be determined based on Web Content Accessibility Guidelines (WCAG), such as WCAG 2.1. For example, the predefined template may be associated with a general visually impaired individual profile to resize text to 200 percent.

In some embodiments, the predefined template is associated with a general profile of an individual with cognitive disability. When using a general profile of an individual with cognitive disability, values of the multiple default website display parameters may be determined based on Web Content Accessibility Guidelines (WCAG), such as WCAG 2.1. For example, the predefined template may be associated with a general profile of an individual with cognitive disability to double the spacing between sentences in text on the website.

In some embodiments, the predefined template is associated with a customized profile of the user with the neurodevelopmental disorder, epilepsy, visual impairment, and/or cognitive disability and values of the multiple default website display parameters are determined based on previous user interactions with an accessibility graphical user interface (GUI). A customized profile may include a profile that is specific to an individual user with a neurodevelopmental disorder, epilepsy, visual impairment, and/or cognitive disability. It may be desirable for the predefined template to be associated with a customized profile of the user with the neurodevelopmental disorder, epilepsy, visual impairment, and/or cognitive disability so that a user is presented with a display that is personalized to that user's needs, as opposed to users in a general population with the neurodevelopmental disorder, epilepsy, visual impairment, and/or cognitive disability.

For instance, a customized profile may be desirable in situations where one user with a neurodevelopmental disorder requires more spacing between letters than the general population with a neurodevelopmental disorder. As an example, the predefined template may be associated with a customized profile of a user with a neurodevelopmental disorder, who requires a letter spacing that is double the size of the font in order to read and comprehend the text. In this example, values of default website display parameters such as a letter spacing parameter are determined based on the user's previous interactions with the accessibility GUI. In an example customized profile, values of the multiple default website display parameters may be determined based on previous user interactions with an accessibility GUI, such as values of website display parameter modifications that were previously requested by the user. These previous user interactions may include any aspect of the interactions, such as duration, frequency, or type of interaction. For example, the processor may determine that the user has adjusted letter spacing to be double the size of the font for every previous session. Based on this determination, the letter spacing parameter associated with the customized profile of the user with a neurodevelopmental disorder may be configured to set the letter spacing to be double the size of the font.

In other instances, a customized profile may be desirable in situations where one epileptic user is more sensitive to certain types or frequencies of flashing than the general epileptic population. As an example, the predefined template may be associated with a customized profile of the epileptic user that is only susceptible to seizures when faced with more than six flashing red images in a second. In this example, values of default website display parameters such as initiating a stop command when a video contains more than six flashing red images in a second and greying out red-colored content are determined based on the user's previous user with the accessibility GUI. A stop command may include any instruction in the website code that instructs a movie or animation on the website to pause or stop on a particular frame, rather than continuing to the end of the movie or animation or cycling endlessly, as described herein. In an example customized profile, values of the multiple default website display parameters may be determined based on previous user interactions with an accessibility GUI, such as values of website display parameter modifications that were previously requested by the user. These previous user interactions may include any aspect of the interactions, such as duration, frequency, or type of interaction. For example, the processor may determine that the user has adjusted the font size to a specific value, such as 20 pt, for every previous session. Based on this determination, the font associated with the customized profile of the epileptic user may be set at 20 pt.

In other instances, a customized profile may be desirable in situations where one visually impaired user requires a larger text size than the general visually impaired population. As an example, the predefined template may be associated with a customized profile of a visually impaired user, who requires text to be resized to 300 percent to read the text. In this example, values of default website display parameters such as text resizing percentage are determined based on the user's previous interactions with the accessibility GUI. In an example customized profile, values of the multiple default website display parameters may be determined based on previous user interactions with an accessibility GUI, such as values of website display parameter modifications that were previously requested by the user. These previous user interactions may include any aspect of the interactions, such as duration, frequency, or type of interaction. For example, the processor may determine that the user has adjusted the font to be resized to a specific percentage, such as 350 percent, for every previous session. Based on this determination, the font associated with the customized profile of the visually impaired user may be resized to 350 percent.

In other instances, a customized profile may be desirable in situations where one cognitively disabled user requires more highlighting of titles than the general cognitively disabled population. As an example, the predefined template may be associated with a customized profile of a cognitively disabled user, who requires both titles and subtitles to be highlighted in order to read and comprehend the text. In this example, values of default website display parameters such as text highlighting are determined based on the user's previous interactions with the accessibility GUI. In an example customized profile, values of the multiple default website display parameters may be determined based on previous user interactions with an accessibility GUI, such as values of website display parameter modifications that were previously requested by the user. These previous user interactions may include any aspect of the interactions, such as duration, frequency, or type of interaction. For example, the processor may determine that the user has adjusted both titles and subtitles to be bolded for every previous session. Based on this determination, the highlighting associated with the customized profile of the cognitively disabled user may be configured to bold both titles and subtitles.

Implementing the predefined template may include adjusting a content scaling parameter in website code on a user session basis to increase content scaling; executing a stop animation command in the website code on a user session basis to limit movement on a display; and at least one of: adjusting a saturation parameter in the website code on a user session basis to increase display intensity; adjusting a font type parameter in the website code on a user session basis to cause a readability increase; adjusting a font size parameter in the website code on a user session basis to modify font scaling; adjusting a line height parameter in the website code on a user session basis to increase spaces between text lines; adjusting a letter spacing parameter in the website code on a user session basis to modify spaces between letters text; and adjusting text color parameter in the website code on a user session basis to modify a contrast between text and background.

Adjusting a content scaling parameter in website code on a user session basis to increase content scaling may be desirable to improve content visibility, since individuals with a neurodevelopmental disorder may require larger scaling to perceive and understand content. A content scaling parameter may include a number, percent, decimal, ratio, or any other manner of making graduated changes to the presentation of any content, such as text, images, or videos, on the website. For example, adjusting a content scaling parameter in website code on a user session basis to increase content scaling may include doubling the size of all images on the website. As another example, as illustrated in FIG. 31, implementing the predefined template may include changing a content scaling parameter 3112 from normal to high.

Executing a stop animation command in website code on a user session basis to limit movement on a display may include executing any instruction in the website code that instructs a movie or animation on the website to pause or stop on a particular frame, rather than continuing to the end of the movie or animation or cycling endlessly. A stop animation command may be targeted towards a specific type of animation or may be used to stop all types of animation on a website. For example, a stop animation command may instruct a website to stop all animation on a website. As another example, a stop animation command may instruct a website to stop only animation with flashes on a website. Limiting movement on a display may include stopping, pausing, slowing down, or in any other way restricting motion on a display. For individuals with a neurodevelopmental disorder, moving images such as decorative animations impair recall and are a source of extraneous cognitive load. It can be more difficult for users to read, comprehend, or remember the information they've read, if the content features animations that increase their cognitive load. Thus, it may be desirable to reduce cognitive load by limiting movement on a display. For example, limiting movement on a display may include pausing a GIF. As another example, limiting movement on a display may include slowing down a GIF to reduce cognitive load. As another example, as illustrated in FIG. 31, implementing the predefined template may include changing a stop animation command parameter 3114 from ON to OFF.

Adjusting a saturation parameter in the website code on a user session basis to increase display intensity may be desirable to make certain content stand out from other content for a user with a neurodevelopmental disorder who may not be able to distinguish between all of the content. A saturation parameter may include any measure of the intensity of color in an image. 100% saturation may mean there is no addition of gray to the color. In this case, the color may be completely pure. At the other extreme, a color with 0% saturation may appear as a medium gray. The more saturated (closer to 100%) a color is, the more vivid or brighter it may appear. Desaturated colors, on the other hand, may appear duller. For example, adjusting a saturation parameter in the website code on a user session basis to increase display intensity may include changing the saturation of an image from 50% to 70% to make the image look more vivid. As another example, as illustrated in FIG. 31, implementing the predefined template includes changing a saturation parameter 3116 from normal to high.

Adjusting a font type parameter in the website code on a user session basis to cause a readability increase may be desirable to allow a user with a neurodevelopmental disorder to better read text. A font type parameter may include any attribute of a set of printed letters, numbers, or other symbols of the same style. For example, adjusting a font type parameter in the website code on a user session basis to cause a readability increase may include changing text from Edwardian Script style to Arial style, to make the text easier to read.

Adjusting a font size parameter in the website code on a user session basis to increase font scaling may be desirable to allow a user with a neurodevelopmental disorder to better read text on the website. A font size parameter may include a height, width, length, thickness, or any other measure of the dimensions of the text. For example, adjusting a font size parameter in the website code on a user session basis to increase font scaling may include increasing the font size from 8 pt to 12 pt.

Adjusting a line height parameter in the website code on a user session basis to increase spaces between text lines may be desirable to make the text easier to read for a user with a neurodevelopmental disorder. A line height parameter may include any measure of a distance between two or more lines of text, such as a number, length, or percentage. In some instances, the line height parameter may be the same for all font sizes. In other instances, the line height parameter may be relative to the font size. For example, adjusting a line height parameter in the website code on a user session basis to increase spaces between text lines may include increasing the line height from 150% of the font size to 200% of the font size.

Adjusting a letter spacing parameter in the website code on a user session basis to increase spaces between letters may be desirable to make the text easier to read for a user with a neurodevelopmental disorder. A letter spacing parameter may include any measure of a distance between two or letters, such as a number, length, or percentage. In some instances, the letter spacing parameter may be the same for all font sizes. In other instances, the letter spacing parameter may be relative to the font size. For example, adjusting a letter spacing parameter in the website code on a user session basis to increase spaces between letters may include increasing the letter spacing from 150% of the font size to 200% of the font size.

Adjusting a text color parameter in the website code on a user session basis to increase a contrast between text and background may be desirable make the text easier to read for a user with a neurodevelopmental disorder who may not be able to distinguish certain text from the background. A text color parameter may include any measure of the light reflected by an object, such as hue, saturation, and brightness. For example, adjusting a text color parameter in the website code on a user session basis to increase a contrast between text and background may include changing grey text against a black background to white text.

Website code may include any code that is used to structure a web page or its content, such as HTML, Java, JavaScript, or CSS. A user session basis may refer to a specific user session. Limiting website operations on a user session basis may be desirable to prevent uniform alteration of default website display parameters for all users, whether or not a user has a neurodevelopmental disorder, epilepsy, visual impairment, and/or cognitive disability. Thus, a user who has a neurodevelopmental disorder, epilepsy, visual impairment, and/or cognitive disability may view and interact with a website using a neurodevelopmental disorder, epilepsy, visual impairment, and/or cognitive disability profile, while a user that does not have a neurodevelopmental disorder, epilepsy, visual impairment, and/or cognitive disability may view and interact with that same website in a different user session without adjustments for a neurodevelopmental disorder, epilepsy, visual impairment, and/or cognitive disability. Limiting website operations on a user session basis may also be desirable to allow the same user to choose different disability profiles, or even no disability profile, for different sessions. For example, adjusting a website display parameter in website code on a user session basis may include executing that website code command only when a user who has a neurodevelopmental disorder, epilepsy, visual impairment, and/or cognitive disability is using the website. In this example, the website code execution is stopped once that user stops using the website and another user starts using the website.

Implementing the predefined template may include adjusting a content scaling parameter in website code on a user session basis to increase content scaling; executing a stop animation command in the website code on a user session basis to limit movement on a display; and at least one of the other adjustments described herein. For example, implementing the predefined template may include doubling the size of all images on the website, pausing a GIF, and changing the saturation of an image from 50% to 70%. In another example, implementing the predefined template may include doubling the size of all images on the website, pausing a GIF, changing the saturation of an image from 50% to 70%, and changing grey text against a black background to white text.

Implementing the predefined template may include executing a stop animation command in website code on a user session basis to limit movement on a display. A stop animation command in website code may include any instruction in the website code that instructs a movie or animation on the website to pause or stop on a particular frame, rather than continuing to the end of the movie or animation or cycling endlessly. A stop animation command may be targeted towards a specific type of animation or may be used to stop all types of animation on a website. For example, a stop animation command may instruct a website to stop all animation on a website. As another example, a stop animation command may instruct a website to stop only animation with flashes on a website. For example, executing a stop animation command in website code on a user session basis may include executing that command only when a user who has epilepsy is using the website, and stopping the execution once that user stops using the website and another user starts using the website. Limiting movement on a display may include stopping, pausing, slowing down, or in any other way restricting motion on a display. For individuals with epilepsy, flashing lights or images may trigger seizures. Thus, it may be desirable to reduce or eliminate such flashing by limiting movement on a display. For example, limiting movement on a display may include pausing a video containing flashing images. As another example, limiting movement on a display may include slowing down a video containing flashing images to reduce the frequency of flashing. For example, as illustrated in FIG. 22, implementing the predefined template includes changing a stop activation command 2212 from ON to OFF.

In some embodiments, limiting the movement on the display includes preventing blinking animation. Blinking animation may involve a movie, GIF, or any other moving image that includes an image being flashed more than once. It may be desirable to prevent blinking animation to prevent seizures, since individuals with photosensitive epilepsy may experience seizures triggered by displays that flicker, flash, blink, or present any other sudden brief burst of an image, video, light, or color. For example, limiting the movement on the display may include preventing a GIF from playing if that GIF contains a blinking animation, such as flashing lights.

In some embodiments, limiting the movement on the display includes altering animations on the website such that the altered animations have a frame speed of no greater than three frames per second. Frame speed may include the frequency or rate at which consecutive images or frames are displayed. It may be desirable to limit an amount of movement on the display by decreasing the frame speed to no greater than three frames per second to prevent seizures, since a greater frame speed may trigger a seizure in individuals with epilepsy, particularly photosensitive epilepsy. For example, limiting the movement on the display may include altering animations on the website such that the altered animations have a frame speed of two frames per second.

Implementing the predefined template may include adjusting a value of at least one web display parameter. Adjusting a value of at least one web display parameter may include increasing, decreasing, changing, replacing, or in any other way modifying a value of the at least one web display parameter. Implementing the predefined template by adjusting a value of at least one web display parameter may be desirable to effect change in the website at a more granular level, rather than making large changes across an entire website. For example, adjusting a value of at least one web display parameter may include changing the display of red-colored content to black or white. For example, as illustrated in FIG. 22, adjusting a value of at least one web display parameter includes changing a saturation parameter 2214 from normal to low.

Implementing the predefined template may include at least two of: adjusting a content scaling parameter in website code on a user session basis to increase content scaling; adjusting a font type parameter in the website code on a user session basis to cause a readability increase; adjusting a saturation parameter in the website code on a user session basis to increase display intensity; adjusting a font size parameter in the website code on a user session basis to increase font scaling; adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background.

Adjusting a content scaling parameter in website code on a user session basis to increase content scaling may be desirable to improve content visibility, since visually impaired individuals may require larger scaling to see content clearly. A content scaling parameter may include a number, percent, decimal, ratio, or any other manner of making graduated changes to the presentation of any content, such as text, images, or videos, on the website. For example, adjusting a content scaling parameter in website code on a user session basis to increase content scaling may include doubling the size of all images on the website. As another example, as illustrated in FIG. 25, implementing the predefined template includes changing a content scaling parameter 2512 from normal to high.

Adjusting a font type parameter in the website code on a user session basis to cause a readability increase may be desirable to allow a visually impaired user to better read text. A font type parameter may include any attribute of a set of printed letters, numbers, or other symbols of the same style. For example, adjusting a font type parameter in the website code on a user session basis to cause a readability increase may include changing text from Edwardian Script style to Arial style, to make the text easier to read. As another example, as illustrated in FIG. 25, implementing the predefined template includes changing a font type parameter 2514 from normal to high.

Adjusting a saturation parameter in the website code on a user session basis to increase display intensity may be desirable to make certain content stand out from other content for a visually impaired user who may not be able to distinguish between all of the content. A saturation parameter may include any measure of the intensity of color in an image. 100% saturation may mean there is no addition of gray to the color. In this case, the color may be completely pure. At the other extreme, a color with 0% saturation may appear as a medium gray. The more saturated (closer to 100%) a color is, the more vivid or brighter it may appear. Desaturated colors, on the other hand, may appear duller. For example, adjusting a saturation parameter in the website code on a user session basis to increase display intensity may include changing the saturation of an image from 50% to 70% to make the image look more vivid. As another example, as illustrated in FIG. 25, implementing the predefined template includes changing a saturation parameter 2516 from normal to high.

Adjusting a font size parameter in the website code on a user session basis to increase font scaling may be desirable to allow visually impaired user to better read text on the website. A font size parameter may include a height, width, length, thickness, or any other measure of the dimensions of the text. For example, adjusting a font type parameter in the website code on a user session basis to increase font scaling may include increasing the font size from 8 pt to 12 pt.

Adjusting a line height parameter in the website code on a user session basis to increase spaces between text lines may be desirable to make the text easier to read for visually impaired users. A line height parameter may include any measure of a distance between two or more lines of text, such as a number, length, or percentage. In some instances, the line height parameter may be the same for all font sizes. In other instances, the line height parameter may be relative to the font size. For example, adjusting a line height parameter in the website code on a user session basis to increase spaces between text lines may include increasing the line height from 150% of the font size to 200% of the font size.

Adjusting a letter spacing parameter in the website code on a user session basis to increase spaces between letters may be desirable to make the text easier to read for visually impaired users. A letter spacing parameter may include any measure of a distance between two or letters, such as a number, length, or percentage. In some instances, the letter spacing parameter may be the same for all font sizes. In other instances, the letter spacing parameter may be relative to the font size. For example, adjusting a letter spacing parameter in the website code on a user session basis to increase spaces between letters may include increasing the letter spacing from 150% of the font size to 200% of the font size.

Adjusting a text color parameter in the website code on a user session basis to increase a contrast between text and background may be desirable make the text easier to read for visually impaired users who may not be able to distinguish certain text from the background. A text color parameter may include any measure of the light reflected by an object, such as hue, saturation, and brightness. For example, adjusting a text color parameter in the website code on a user session basis to increase a contrast between text and background may include changing grey text against a black background to white text.

Implementing the predefined template may include at least two of the adjustments disclosed herein. For example, implementing the predefined template may include changing text from Edwardian Script style to Arial style and increasing the font size from 8 pt to 12 pt, to make the text easier to read. In another example, implementing the predefined template may include increasing the line height from 150% of the font size to 200% of the font size and changing grey text against a black background to white text. In yet another example, implementing the predefined template may include increasing the letter spacing from 150% of the font size to 200% of the font size and changing the saturation of an image from 50% to 70% to make the image look more vivid.

In some embodiments, implementing the predefined template associated with the visual impairment profile includes executing at least three of: adjusting a content scaling parameter in website code on a user session basis to increase content scaling; adjusting a font type parameter in the website code on a user session basis to cause a readability increase; adjusting a saturation parameter in the website code on a user session basis to increase display intensity; adjusting a font size parameter in the website code on a user session basis to increase font scaling; adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background. For example, implementing the predefined template may include changing text from Edwardian Script style to Arial style, increasing the font size from 8 pt to 12 pt, to make the text easier to read, and changing grey text against a black background to white text.

In some embodiments, implementing the predefined template associated with the visual impairment profile includes executing at least four of: adjusting a content scaling parameter in website code on a user session basis to increase content scaling; adjusting a font type parameter in the website code on a user session basis to cause a readability increase; adjusting a saturation parameter in the website code on a user session basis to increase display intensity; adjusting a font size parameter in the website code on a user session basis to increase font scaling; adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background. For example, implementing the predefined template may include increasing the letter spacing from 150% of the font size to 200% of the font size, changing the saturation of an image from 50% to 70% to make the image look more vivid, increasing the font size from 8 pt to 12 pt, to make the text easier to read, and changing grey text against a black background to white text.

In some embodiments, implementing the predefined template associated with the visual impairment profile further includes executing at least one of: adjusting a content scaling parameter in website code on a user session basis to increase content scaling; adjusting a font type parameter in the website code on a user session basis to cause a readability increase; adjusting a saturation parameter in the website code on a user session basis to increase display intensity; and adjusting a font size parameter in the website code on a user session basis to increase font scaling; and executing at least one of: adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background. For example, implementing the predefined template may include doubling the size of all images on the website and increasing the line height from 150% of the font size to 200% of the font size.

In some embodiments, implementing the predefined template associated with the visual impairment profile further includes executing at least two of: adjusting a content scaling parameter in website code on a user session basis to increase content scaling; adjusting a font type parameter in the website code on a user session basis to cause a readability increase; adjusting a saturation parameter in the website code on a user session basis to increase display intensity; and adjusting a font size parameter in the website code on a user session basis to increase font scaling; and executing at least one of: adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background. For example, implementing the predefined template may include doubling the size of all images on the website, increasing the font size from 8 pt to 12 pt, and increasing the line height from 150% of the font size to 200% of the font size.

Implementing the predefined template may include at least two of: executing a highlighting titles command in website code on a user session basis to highlight titles depicted on the website; executing a highlighting actionable objects command in website code on a user session basis to highlight actionable objects depicted on the website; adjusting a content scaling parameter in website code on a user session basis to increase content scaling; and executing a stop animation command in website code on a user session basis to limit movement on a display.

Executing a highlighting titles command in website code on a user session basis to highlight titles depicted on the website may be desirable to emphasize the context of long passages of text, which may be difficult for an individual with a cognitive disability to comprehend. A highlighting titles command may include any instruction in the website code that instructs the processor to accent, embolden, accentuate, feature, call attention to, spotlight, or in any other way emphasize a title in the website. Non-limiting examples of highlighting titles may include underlining, coloring, resizing, bolding, and italicizing titles. A title may include any descriptive name, phrase, or sentence, such as a banner, caption, subtitle, heading, subheading, or headline. For example, executing a highlighting titles command may include changing the font of titles to bold. In another example, executing a highlighting titles command may include increasing the size (e.g., doubling) of titles. As another example, as illustrated in FIG. 28, implementing the predefined template includes changing a highlight titles command 2812 from ON to OFF.

Executing a highlighting actionable objects command in website code on a user session basis to highlight actionable objects depicted on the website may be desirable to make the actionable objects more accessible for users with cognitive disabilities. An actionable object may include one or more of an activatable button, hyperlink, a picklist, a field to be filled-out, links, menus, dropdowns, combination boxes, URLs, or any other website element seeking a user's input or interaction. For example, users with cognitive disabilities may have difficulty identifying actionable objects and/or may struggle with cognitive fatigue when completing complex, multi-stage processes such as filling out forms, entering data correctly or finding the content or feature that they need. Such users may need support to minimize errors and complete their task through the use of highlighted actionable objects. In some instances, users with cognitive disabilities may need clear literal language and may not understand metaphors or non-literal text and new icons. For such users, highlighting actionable objects may help them understand which objects are actionable and which are not when the distinction is not readily obvious. A highlighting actionable objects command may include any instruction in the website code that instructs the processor to accent, accentuate, feature, call attention to, spotlight, or in any other way emphasize an actionable object in the website. Non-limiting examples of highlighting actionable objects may include underlining, coloring, resizing, bolding, and italicizing actionable objects. In a first instance, if actionable items are not already identified or recognized, code running on a processor may scan the website or a page thereof to find the actionable items. For example, actionable items usually contain telltale signs such as embedded links or input fields. Code running on a processor may find such telltales signs to identify the actionable items. In some instances, the actionable items may be preidentified. Thus, in some instances, executing an actionable items command may include identifying the actionable items, and in other instances, identification may not be part of the execution. For example, executing a highlighting actionable objects command may include emphasizing buttons, such as by changing the coloring of all buttons in the website to a noticeable color such as red. In another example, executing a highlighting actionable objects command may include underlining, bolding and/or increasing font size (e.g., doubling the size) of links on the website. As another example, as illustrated in FIG. 28, implementing the predefined template may include changing a highlight actionable objects command 2814 from ON to OFF.

In some embodiments, highlighting titles or actionable objects includes applying at least one of: framing, changing colors, adding shading, adding a pattern, changing font size, changing style, adding outlines, or adding an icon. Framing may include incorporating a border, enclosure, outline, shell, box, line, or any other structure to surround or enclose a title or actionable object. For example, highlighting a title may include placing a dark border around the title. As another example, highlighting an actionable object may include placing a box around a button. Changing colors may include any modification of an intensity, glow, saturation, tint, or any other attribute of a hue of a title or actionable object. For example, highlighting a title may include changing the color of a title to red. As another example, highlighting an actionable object may include changing the color of a button to green. Adding shading may include modifying the color or intensity of a color of a title or actionable item. For example, highlighting a title may include increasing the intensity of red hues in a mildly red title. As another example, highlighting an actionable object may include increasing the intensity of green hues in a mildly green button. Adding a pattern may include incorporating any repeated design into a title or actionable object, such as a dotted pattern or a striped pattern. For example, highlighting a title may include providing a dotted pattern within the text of the title. As another example, highlighting an actionable object may include providing a striped pattern within a button. Changing font size may include increasing or decreasing any dimension of the text of a title or actionable object. For example, highlighting a title may include doubling font size. As another example, highlighting an actionable object may include tripling the font of the text within a button. Changing style may include modifying any distinctive visual attribute of the title or actionable attribute, such as bolding, italicizing, or underlining. For example, highlighting a title may include bolding the title. As another example, highlighting an actionable object may include italicizing the text within a button. Adding outlines may include incorporating a line or set of lines enclosing or indicating the shape of a title or actionable object. For example, highlighting a title may include adding a line around the shape of the title. As another example, highlighting an actionable object may include adding a dotted line around a button. Adding an icon may include incorporating a picture, image, symbol, sign, or any other representation associated with a title or actionable object. For example, highlighting a title may include adding a star next to a title. As another example, highlighting an actionable object may include adding a check mark inside a button.

Adjusting a content scaling parameter in website code on a user session basis to increase content scaling may be desirable to improve content visibility, since cognitively disabled individuals may require larger scaling to perceiving and understand content. A content scaling parameter may include a number, percent, decimal, ratio, or any other manner of making graduated changes to the presentation of any content, such as text, images, or videos, on the website. For example, adjusting a content scaling parameter in website code on a user session basis to increase content scaling may include doubling the size of all images on the website.

Executing a stop animation command in website code on a user session basis to limit movement on a display may include executing any instruction in the website code that instructs a movie or animation on the website to pause or stop on a particular frame, rather than continuing to the end of the movie or animation or cycling endlessly. A stop animation command may be targeted towards a specific type of animation or may be used to stop all types of animation on a website. For example, a stop animation command may instruct a website to stop all animation on a website. By way of non-limiting examples, animation types that may be subject to a stop animation command may include videos, user interface animations, animated icons, animated titles, infographics, presentations, broadcast graphics, and/or GIFs. As another example, a stop animation command may instruct a website to stop only animation with flashes on a website. Limiting movement on a display may include stopping, pausing, slowing down, or in any other way restricting motion on a display. For individuals with a cognitive disability, moving images such as decorative animations impair recall and are a source of extraneous cognitive load. It can be more difficult for users to read, comprehend, or remember the information they've read, if the content features animations that increase their cognitive load. Thus, it may be desirable to reduce cognitive load by limiting movement on a display. In a first instance, if animations are not already identified or recognized, code running on a processor may scan the website or a page thereof to find the animations. For example, actionable items usually contain telltale signs such as successive frame changes, successive changes in display intensity, movement of text or graphical elements, or instructions for accomplishing any of the forgoing. Code running on a processor may find such telltales signs to identify the animations. In some instances, the animations may be preidentified. Thus, in some instances, executing a stop animation command may include identifying the animations, and in other instances, identification may not be part of the execution. A stop animation command may completely stop, pause, or slow a successive display of frames. For example, limiting movement on a display may include pausing a GIF. As another example, limiting movement on a display may include slowing down a GIF to reduce cognitive load.

Implementing the predefined template may include at least two of the adjustments disclosed herein. For example, implementing the predefined template may include changing the font of titles to bold and pausing a GIF. In another example, implementing the predefined template may include changing the coloring of all buttons in the website to red and doubling the size of all images on the website. In yet another example, implementing the predefined template may include underlining and doubling the size of all links on the website, and slowing down a GIF.

In some embodiments, implementing the predefined template may be configured to impact presentation of content on a computing device of the user with the neurodevelopmental disorder without impacting presentation of content on other computing devices of other simultaneous users of the website.

Executing the stop animation command and adjusting the value of the at least one web display parameter may be configured to impact presentation of content on a computing device of the user with the epileptic disability without impacting presentation of content on other computing devices of other simultaneous viewers of the website.

In some embodiments, implementing the predefined template is configured to impact presentation of content on a computing device of the visually impaired user without impacting presentation of content on other computing devices of other simultaneous users of the website.

There may be more than one user accessing the same website. For example, there may be two users, only one of whom has a neurodevelopmental disorder, epilepsy, visual impairment, and/or cognitive disability. Each may be accessing the website via their respective computing devices. In such situations, the website may be presented to the user with the neurodevelopmental disorder, epilepsy, visual impairment, and/or cognitive disability by modifying the display parameters associated with the website on the computing device of that user. However, the parameters on the computing device of the other user may not be altered. Thus, the presentation of the website to the second user, who does not have a neurodevelopmental disorder, epilepsy, visual impairment, and/or cognitive disability may not be impacted.

For example, implementing the predefined template may include doubling the size of all images on the website, pausing a GIF, and changing the saturation of an image from 50% to 70% on the computing device of the user with the neurodevelopmental disorder. In this example, the images and GIFs on the other computing devices of other simultaneous viewers of the website may be presented without a change in scaling, saturation, or pausing.

In another example, a video containing flashing images may be paused and red-colored content may be changed to black or white on the computing device of the user with the epileptic disability. In this example, the video containing flashing images and the red-colored content on the other computing devices of other simultaneous viewers of the website may be maintained.

In another example, text size and image size may be doubled on the computing device of the user with the visual impairment. In this example, the text and images on the other computing devices of other simultaneous viewers of the website may be presented without doubling in size.

In another example, implementing the predefined template may include changing the coloring of all buttons in the website to red and doubling the size of all images on the computing device of the user with the cognitive disability. In this example, the buttons and images on the other computing devices of other simultaneous viewers of the website may be presented without changing their color or size.

Some embodiments include selecting the predefined template out of a plurality of predefined templates based on a type of computing device used by the user with the neurodevelopmental disorder, epilepsy, visual impairment, and/or cognitive disability. Different types of computing devices may be used with the systems, methods, and non-transitory computer readable media disclosed herein, Such computing devices may include, for example, computers, mobile phones, tablets, laptops, smart watches, smart glasses, or other types of devices capable of accessing websites or other content. It may be desirable to provide different types of presentations on the different devices because computing devices vary in size, computing power, audio and visual capabilities, and/or availability of certain types of software.

For example, a plurality of predefined templates may include a first predefined template with a low content scaling parameter and a second predefined template with a high content scaling parameter. The type of the computing device used by the user with the neurodevelopmental disorder may be determined by the processor or based on an input by the user. In some instances, the processor may determine that a computer is being used based on receiving an indication from the computer regarding its device specifications. In other instances, the processor may determine that a mobile phone is being used based on the selection of a button by the user. In one example, the content may be scaled by a factor of four when displayed on desktop computers and the content may be scaled by a factor of two when displayed on mobile devices, such as smartphones.

In another example, the first title on the website may have a font size of 14 pt when displayed on desktop computers and font size of 8 pt when displayed on mobile devices, such as smartphones. In another example, an entire article may be displayed on desktop computers, while only a portion of the article may be displayed on mobile devices, such as smartphones.

In another example, the title may be bolded when displayed on desktop computers and italicized when displayed on mobile devices, such as smartphones.

In some embodiments, implementing the predefined template further includes introducing a window movable on a display of the website together with the adjustment of the content scaling parameter, the execution of the stop animation command, and the adjustment of the saturation parameter. A window may include a box, rectangle, square, circle, or any other enclosed, bounded, defined or specified shape or area presented on the display. A movable window may include a window that is movable along any of its dimensions, including on either the horizontal or vertical axis. In some instances, the movable window may also be moved along one or more of its edges, sides, points, or corners. Using a movable window may be desirable to focus the attention of a user with a neurodevelopmental disorder, since such individuals may find it difficult to focus on a specific part of the website. As an example, as illustrated in FIG. 31, implementing the predefined template includes introducing a window 3120 that is movable on the display of the website. The window may be moved based on one or more inputs, including inputs from devices such as a mouse or keyboard. For example, the movable window may move in conjunction with scrolling the screen using a mouse. As another example, the movable window may move in conjunction with the movement of the mouse without clicking. In another example, the movable window may move in conjunction with the movement of the mouse when the mouse is clicked and dragged. In yet another example, the movable window may move in conjunction with the user pressing any of the up, down, right, or left arrows on a keyboard.

In some embodiments, a presentation relation between information outside the window and information inside the window is set to focus user attention on information within the window. A presentation relation may include a ratio, parameter, percent, or any other relationship between information outside the window and information inside the window. For example, a presentation relation may include decreasing the opacity of information outside the window in relation to the opacity of information inside the window. As another example, a presentation relation may include increasing a font size of information inside the window in relation to the font of the information outside the window (e.g., doubling the font size inside as compared to outside). It may be desirable to use a presentation relation to focus user attention to standardize the way that information is highlighted within the window as opposed to outside the window throughout the website. Returning to the example above, a presentation relation may include decreasing the opacity of information outside the window in relation to the opacity of information inside the window by a factor of two. In this example, the presentation relation may decrease the opacity by a factor of two regardless of where the window is moved on the display of the website. This may limit confusion for a user with a neurodevelopmental disorder by restricting an amount that the display changes when the window is moved to another position on the display of the website.

In some embodiments, the window follows eye movement of the user. Eye movement of the user may include saccades, smooth pursuit movements, vergence movements, vestibulo-ocular movements, or any other motion of one or both of the user's eyes. Eye movement may be determined using head-stabilized eye tracking, remote eye tracking, mobile eye tracking, integrated or embedded eye tracking systems, or any other device capable of detecting or measuring the movement of one or both of the user's eyes. For example, eye movement may be determined using the EyeLink® 1000 Plus system. As another example, eye movement may be determined using a camera and IR source positioned near the computer. In another example, eye movement may be determined using a camera or a mirror positioned in the visual path of one or both eyes, and an additional camera that records the scene or field of view. In yet another example, eye movement may be determined using an augmented reality or virtual reality headset. It may be desirable for the window to follow the user's eye movement so that a user with a neurodevelopmental disorder is not faced with the additional cognitive load of moving the window with an input device such as a mouse or keyboard. For example, a camera and IR source positioned near the computer may be used to determine that the user is moving their eyes in smooth pursuit in a downward direction. Based on this determination, the window may move down the display of the website in conjunction with the user's eye movement.

In some embodiments, a size of the window is adjustable. It may be desirable to use an adjustable window size so that the user can modify the amount of information that they need to focus on. The size of the window may be adjustable along any dimension, including height, width, and length. For example, a user with a neurodevelopmental disorder may be presented with a window having a height of two inches. The user may determine that the size of the window causes too much information to be focused on in the window. Thus, the user may adjust the size of the window to have a height of one inch. In this example, less information is highlighted in the window, which may make it easier for the user with the neurodevelopmental disorder to comprehend the information inside the window.

In some embodiments, a specific one of the multiple default website display parameters has a range value, and the predefined template includes a specific value for the specific default website display parameter. A range value may include a value that may vary within an upper and lower limit of values. Providing a range of values for a display parameter may allow the website to be optimized for the general population. However, a particular user may prefer to use a specific value for a display parameter. A predefined template for that user may include a specific value of the display parameter that may be selected from the range of values specified for that display parameter. For example, a font parameter for a website may have a range value between 8 pt font and 20 pt font. This range of font sizes may be optimized for the general population, allowing different users to view the website using their preferred font size. For example, younger users might prefer a smaller font size while older users might prefer a larger font size. In this example, a predefined template may include a specific value of 18 pt for the font parameter, for example for an older user, so that the text on the website is visible to that user. Alternatively, a predefined template for general users may have a specific value of 12 pt for the font parameter to allow the general population to view the website with a font size of 12 pt.

In some embodiments, implementing the predefined template associated with the epilepsy-safe profile further includes adjusting the saturation parameter in the website code to cause a decrease in color intensity of at least one actionable object, at least one image, and at least one title. The saturation parameter may include any parameter associated with the intensity of color in an image. Color intensity may include any measure of the brightness or dullness of any color in an image. An actionable object may include any object whose properties may be changed. For example, an actionable object may include a button that a user may click to change the color of its display. A title may include any text on the website describing another object or text on the website. It may be desirable to adjust the saturation parameter in the website code to cause a decrease in color intensity of at least one actionable object, at least one image, and at least one title to prevent seizures, since epileptic individuals may experience seizures at certain color intensities. For example, implementing the predefined template associated with the epilepsy-safe profile may further include adjusting the saturation parameter in the website code to cause a decrease in intensity of the color red of a button, a picture, and the title of that picture.

In some embodiments, adjusting the value of the at least one web display parameter includes adjusting a saturation parameter in the website code on a user session basis to decrease color intensity; adjusting a content scaling parameter in website code on a user session basis to modify content scaling; adjusting a font type parameter in the website code on a user session basis to cause a readability increase; adjusting a font size parameter in the website code on a user session basis to modify font scaling; adjusting a line height parameter in the website code on a user session basis to modify spaces between text lines; adjusting a letter spacing parameter in the website code on a user session basis to modify spaces between letters text; and adjusting a text color parameter in the website code on a user session basis to modify a contrast between text and background. Adjusting a saturation parameter in the website code on a user session basis to decrease color intensity may be desirable to prevent seizures, since epileptic individuals may experience seizures at certain color intensities. For example, adjusting a saturation parameter in the website code on a user session basis to decrease color intensity may include decreasing the intensity of a red color on the website. Adjusting a content scaling parameter in website code on a user session basis to modify content scaling may be desirable to prevent seizures, since epileptic individuals may experience seizures when presented with larger flashing images, as opposed to smaller ones. For example, adjusting a content scaling parameter in website code on a user session basis to modify content scaling may include decreasing the size of animated GIFs. Adjusting a font type parameter in the website code on a user session basis to cause a readability increase may be desirable to allow an epileptic user to better read text without triggering a seizure. For example, adjusting a font type parameter in the website code on a user session basis to cause a readability increase may include changing red font to black font. Adjusting a font size parameter in the website code on a user session basis to modify font scaling may be desirable to allow an epileptic user to better read text on the website even if other components are sized down to prevent triggering a seizure. For example, adjusting a font type parameter in the website code on a user session basis to modify font scaling may include increasing the font size from 8 pt to 12 pt. Adjusting a line height parameter in the website code on a user session basis to modify spaces between text lines may be desirable to present a uniform line height for epileptic users. For example, adjusting a line height parameter in the website code on a user session basis to modify spaces between text lines may include modifying varying line heights in the website to conform to a single line height throughout the website. Adjusting a letter spacing parameter in the website code on a user session basis to modify spaces between letters text may be desirable to present a uniform letter spacing for epileptic users. For example, adjusting a letter spacing parameter in the website code on a user session basis to modify spaces between letters text may include modifying varying letter spacing in the website to conform to a single letter spacing throughout the website. Adjusting a text color parameter in the website code on a user session basis to modify a contrast between text and background may be desirable to prevent seizures, since epileptic individuals may experience seizures when presented with higher-contrast content. For example, adjusting text color parameter in the website code on a user session basis to modify a contrast between text and background may include reducing a contrast between text and background. Adjusting the at least one web display parameter as disclosed herein may be performed only in a session associated with an epileptic user. The adjustment may not be performed with a different user that does not have epilepsy. By doing so, each user would be presented a website suitable to their particular needs.

In some embodiments, the operations further include identifying in a website code tagged titles; and identifying on a page of the website elements used as titles but untagged as titles; wherein highlighting titles includes highlighting the tagged titles and the elements used as titles. Tagged titles in a website code may include text that is labeled as a title in the website code. For example, when using HTML website code, the <title> tag defines the title of the document. Elements used as titles but untagged as titles may include identifying text in the website that is not labeled as a title in the website code. For example, a block of text may be preceded by a descriptive phrase, acting as a title, even though that phrase itself is not defined using the <title> tag in the HTML code. Other non-exhaustive examples of website portions used as titles but untagged as titles may include those that are in larger font, bolded, underlined, italicized, located at the top of the page. Highlighting both the tagged titles and the elements used as titles may be desirable to ensure that a cognitively disabled user more clearly understands the context of the displayed text, whether or not the website code labels a certain portion of text as a title. For example, a website may include a first title "Subject A" describing portion A of the text and a second title "Subject B" describing portion B of the text. In the HTML website code, only the first title "Subject A" may be tagged as a title with a <title> tag. In this example, it may be desirable to highlight not only first title "Subject A," but also second title "Subject B" because they both provide context that a cognitively disabled user may need to comprehend respective portions A and B of the text. Thus, in this example, highlighting titles may include doubling the size of both first title "Subject A" and second title "Subject B."

In some embodiments, the operations further include identifying in a website code tagged actionable objects; and identifying on the page of the website elements used as actionable objects but untagged as actionable objects; wherein highlighting actionable objects includes highlighting the tagged actionable objects and the elements used as actionable objects. Tagged actionable objects in a website code may include any actionable object that is labeled as an actionable object in the website code. For example, when using HTML website code, the <link> tag defines an object that is a link to an external resource. As another example, when using HTML website code, the <button> tag defines an object that is a pressable link. Elements used as actionable objects but untagged as actionable objects may include any actionable object in the website that is not labeled as an actionable object in the website code. For example, a link may act as a button since it is pressable, even though that link itself is not defined using the <button> tag in the HTML code. Highlighting both the tagged actionable objects and the elements used as actionable objects may be desirable to ensure that a cognitively disabled user more clearly understands which objects are actionable, whether or not the website code labels a certain portion of text as an actionable object. For example, a website may include a link and a button, both of which are pressable. In the HTML website code, only the button may be tagged as a button with a <button> tag. In this example, it may be desirable to highlight not only the button, but also the link because they both provide pressable objects that may not be readily apparent to a cognitively disabled user. Thus, in this example, highlighting actionable objects may include doubling the size of both the link and the button. In another example, a website may include a menu that is not tagged as an actionable object in the website code. In this example, the menu may still be used as an actionable item since a user is able to interact with the menu. Therefore, highlighting actionable objects may include also highlighting the menu, for example, by presenting a box around the menu.

In some embodiments, operations include using artificial intelligence (AI) to identify titles and actionable objects in the website code; and implementing the predefined template includes highlighting the titles and actionable objects. AI may include any application of computer science dealing with the simulation of intelligent behavior in computers. In some embodiments, machine learning algorithms (also referred to as machine learning models) may be trained using training examples. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include one or more images, and the inferred output may include a classification of an item depicted in the images or whether the images are associated with motion or animation. In yet another example, a trained machine learning algorithm may include a regression model, the input may include one or more images, and the inferred output may include an inferred value for an item depicted in the images (such as a characterization of motion in the images). In an additional example, a trained machine learning algorithm may include an image segmentation model, the input may include images, and the inferred output may include a segmentation of the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Using AI to identify titles and actionable objects in the website code may be desirable to enable the processor to identify titles and actionable objects more easily and accurately without human intervention. Using AI to identify titles and actionable objects in the website code may include implementing an artificial neural network algorithm on the processor to identify tags corresponding to titles and actionable objects. For example, the neural network may be trained to identify specific HTML tags such as <title> and <button>. The neural network may be trained with example sets including text identified as titles or buttons and associated website code. Then, the trained model may be configured to identify the titles and buttons when presented with the website code or the text. In this example, implementing the predefined template may include doubling the size of the website content that is labeled using the tags <title> and <button>, as identified by the trained neural network.

In some embodiments, the operations further include using image processing and a neural network to identify in a website code first elements used as titles but untagged as titles and second elements used as actionable objects but untagged as actionable objects; and implementing the predefined template includes highlighting the first elements and the second elements. Image processing may include any use of a computer to process images through an algorithm, such as object detection. A neural network may include any computational model that consists of several processing elements that receive inputs and deliver outputs based on their predefined activation functions, such as a long short-term memory (LSTM) neural network. Using image processing and a neural network to identify such elements may be desirable to identify specific objects and text within a website as a title or actionable object more easily and accurately without human intervention. For example, an image processing algorithm may be used to detect titles by searching the website for images of a word or phrase that precedes a large block of text. Other non-exhaustive examples of title-detection using an image processing algorithm include searching for images of a word or phrase in large font, different font, bolded font, italicized font, underlined font, or in a different-colored font. The image processing algorithm may be used to detect actionable objects by searching the website for images of shapes, colors, fonts, styles, and other characteristics of actionable objects, such as buttons, menus, links, and other interactive objects. For example, the image processing algorithm may be used to detect actionable objects, such as buttons, by searching the website for images of a colored, geometric shape. A neural network, such as a LSTM model, may be trained to identify the titles and buttons based on the detection of objects and/or text by the image processing algorithm. In this example, implementing the predefined template may include doubling the size of the titles and buttons identified by the LTSM model. While doubling the size is disclosed in this example, any manner of highlighting may be performed, as disclosed herein.

Some embodiments include a method for altering website default display parameters to conform with a neurodevelopmental disorder profile. The method may include obtaining an indication that a user of a website has a neurodevelopmental disorder; and based on the obtained indication, implementing a predefined template to alter multiple website default display parameters to conform with needs of the user with the neurodevelopmental disorder, wherein the predefined template includes: adjusting a content scaling parameter in website code on a user session basis to increase content scaling; executing a stop animation command in the website code on a user session basis to limit movement on a display; and at least one of: adjusting a saturation parameter in the website code on a user session basis to increase display intensity; adjusting a font type parameter in the website code on a user session basis to cause a readability increase; adjusting a font size parameter in the website code on a user session basis to modify font scaling; adjusting a line height parameter in the website code on a user session basis to increase spaces between text lines; adjusting a letter spacing parameter in the website code on a user session basis to modify spaces between letters text; and adjusting text color parameter in the website code on a user session basis to modify a contrast between text and background. Implementing the predefined template may be configured to impact presentation of content on a computing device of the user with the neurodevelopmental disorder without impacting presentation of content on other computing devices of other simultaneous viewers of the website.

Figure 33A:
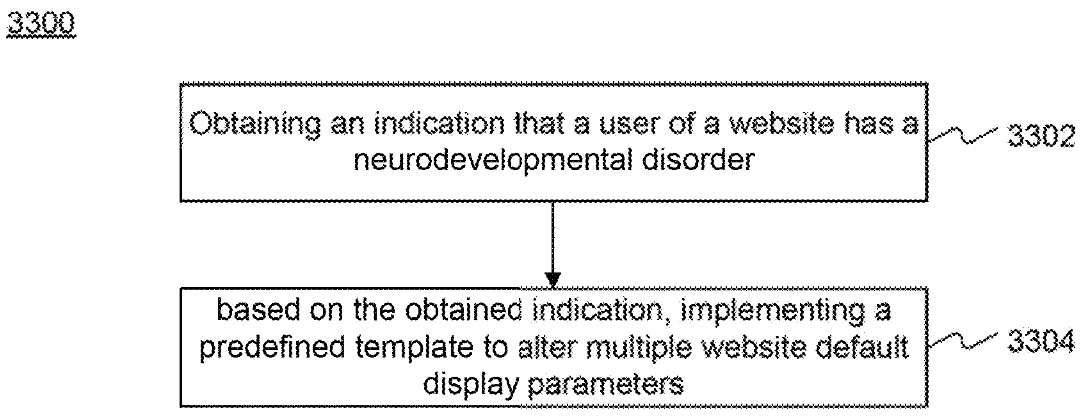
FIG. 33A illustrates a flowchart of a method for altering website default display parameters to conform with a neurodevelopmental disorder profile, consistent with some embodiments of the present disclosure.

FIG. 33A illustrates a flowchart of a method 3300 for altering website default display parameters to conform with a neurodevelopmental disorder profile, consistent with some embodiments of the present disclosure. Method 3300 includes step 3302 of obtaining an indication that a user of a website has a neurodevelopmental disorder. The indication may be obtained as described earlier. Method 3300 further include step 3304 implementing a predefined template to alter multiple default website display parameters to conform with needs of the user with the neurodevelopmental disorder. The implementation may occur as described earlier.

Figure 33B:
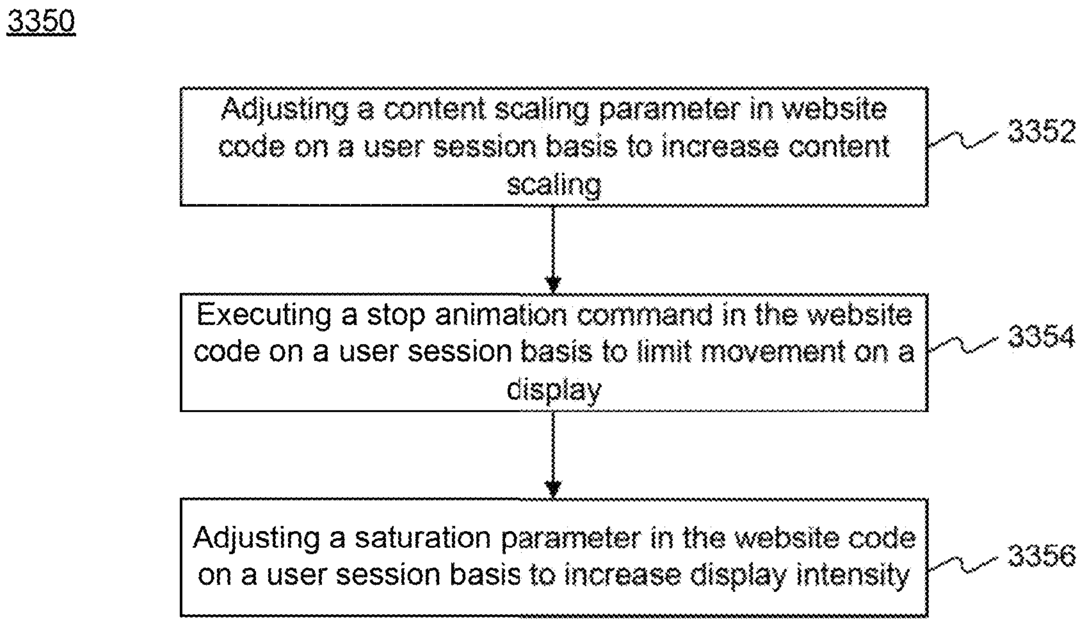
FIG. 33B illustrates a flowchart of an exemplary method of implementing the predefined template for a user with the neurodevelopmental disorder.

FIG. 33B illustrates a flowchart of an exemplary method 3350 of implementing the predefined template for a user with the neurodevelopmental disorder. As described in more detail earlier, method 3350 includes step 3352 of adjusting a content scaling parameter in website code on a user session basis to increase content scaling. Method 3350 includes step 3354 of executing a stop animation command in the website code on a user session basis to limit movement on a display, as described earlier. Method 3350 further includes step 3356 of adjusting a saturation parameter in the website code on a user session basis to increase display intensity as described earlier.

In some embodiments, the predefined template is implemented in response to receipt of a first input from the user with the neurodevelopmental disorder, and wherein the method further includes, after implementing the predefined template, receiving a second input from the user; and based on the second input, additionally adjusting the content scaling parameter to address specific needs of the user with the neurodevelopmental disorder. Receiving a first input and receiving a second input from the user with the neurodevelopmental disorder may be desirable to allow for continued adjustment of website content based on user needs. Implementing the predefined template in response to receipt of a first input may include altering default website display parameters in response to a user input, such as clicking or typing. Additionally adjusting the content scaling parameter to address specific needs of the user with the neurodevelopmental disorder based on the second input may be desirable to allow a user to change the display of the website to meet additional needs as a result of their neurodevelopmental disorder, or other needs unrelated to their neurodevelopmental disorder. For example, implementing the predefined template may include doubling a content scaling parameter following a first input in the form of a user clicking on an option for a neurodevelopmental disorder profile from the accessibility GUI. In this example, additionally adjusting the content scaling parameter may include further increasing (e.g., tripling) the content scaling parameter following a second input in the form of the user selecting a content scaling value from a drop-down menu, so that the user with the neurodevelopmental disorder can better comprehend the content on the website.

In some embodiments, the predefined template is implemented in response to receipt of a first input from the user with the neurodevelopmental disorder, and wherein the method further includes, after implementing the predefined template, receiving a second input from the user; and based on the second input, adjusting at least one website display parameter other than the content scaling parameter to address specific needs of the user with the neurodevelopmental disorder. Receiving a first input and receiving a second input from the user with the neurodevelopmental disorder may be desirable to allow for continued adjustment of website content based on user needs. At least one website display parameter in this context may be any website display parameter that differs from the content scaling parameter that is altered when the predefined template is implemented in response to the receipt of the first input from the user with the neurodevelopmental disorder. For example, the at least one website display parameter adjusted based on the second input may include limiting movement on a display by executing a stop animation command. Adjusting at least one website display parameter other than the content scaling parameter to address specific needs of the user with the neurodevelopmental disorder based on the second input may be desirable to allow a user to change the display of the website to meet additional needs as a result of their neurodevelopmental disorder, or other needs unrelated to their neurodevelopmental disorder. For example, implementing the predefined template may include doubling a content scaling parameter following a first input in the form of a user clicking on an option for a neurodevelopmental disorder profile from the accessibility GUI. In this example, adjusting at least one website display parameter other than the content scaling parameter may include pausing all moving images on the website following a second input in the form of a user selecting an option to pause moving content from a drop-down menu, so that it is easier for the user with the neurodevelopmental disorder to comprehend the text without becoming distracted.

In some embodiments, the predefined template is implemented in response to receipt of a first input from the user with the neurodevelopmental disorder, and wherein the method further includes, after implementing the predefined template, receiving a second input from the user indicating that the user with the neurodevelopmental disorder has an additional disability; and based on the second input, adjusting at least one website display parameter to conform with needs of the neurodevelopmental disorder and the additional disability. Receiving a first input and receiving a second input from the user with the neurodevelopmental disorder may be desirable to allow for continued adjustment of website content based on user needs. Adjusting at least one website display parameter to conform with needs of the neurodevelopmental disorder and the additional disability based on the second input from the user with the neurodevelopmental disorder indicating that the user with the neurodevelopmental disorder has an additional disability may be desirable to allow a user to change the display of the website to meet other needs related to an additional impairment status. An additional disability may include any other physical or mental condition that limits a person's movements, senses, or activities. Examples of additional disabilities may include epilepsy, visual impairment, and cognitive impairment. In one example, the user with the neurodevelopmental disorder may also have a visual impairment. In another example, the user with the neurodevelopmental disorder may also have epilepsy. For example, implementing the predefined template may include doubling a content scaling parameter following a first input in the form of a user clicking on an option for a neurodevelopmental disorder profile from the accessibility GUI. In this example, the user with the neurodevelopmental disorder may enter a second input indicating that the user with the neurodevelopmental disorder also has epilepsy by additionally clicking on an option for a seizure safe profile from the accessibility GUI, whereby moving images such as GIFs may be paused to prevent seizures.

In some embodiments, the predefined template is implemented in response to receipt of a first input from the user with the neurodevelopmental disorder, and wherein the method further includes, after implementing the predefined template, receiving a second input from the user; and based on the second input, cause a display of the website to revert to a default presentation mode. Receiving a first input and receiving a second input from the user with the neurodevelopmental disorder may be desirable to allow for continued adjustment of website content based on user needs. Causing a display of the website to revert to a default presentation mode based on the second input may be desirable if the user does not want to view the website in a neurodevelopmental disorder mode. For example, after implementing the predefined template, a user may realize that they do not require the neurodevelopmental disorder modifications on that particular website, depending on the extent and nature of the user's individual neurodevelopmental disorder. In this example, the second input may cause a display of the website to revert to a default presentation mode so that the user can view and interact with the website without any restrictions. In one example, implementing the predefined template may include doubling a content scaling parameter. In this example, the user may realize that they do not require the content to be scaled to such an extent to comprehend the information on the website. This user may click on a button on the website to revert to the default presentation mode the original content scaling.

Figure 32:
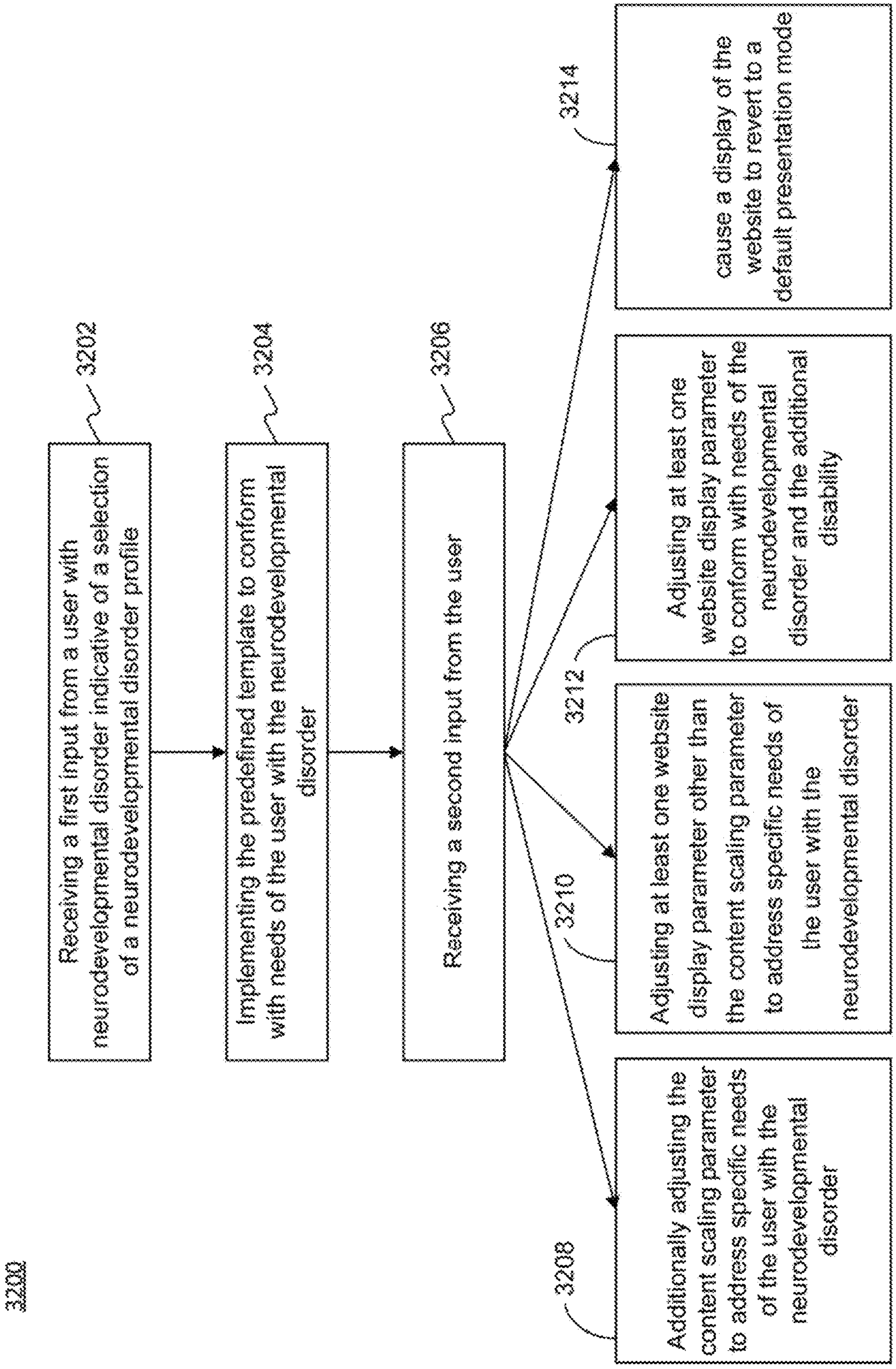
FIG. 32 illustrates a flowchart of alternative responses to a second input from a user with the neurodevelopmental disorder, consistent with some embodiments of the present disclosure.

FIG. 32 illustrates a flowchart 3200 of alternative responses to a second input from a user with a neurodevelopmental disorder, consistent with some embodiments of the present disclosure, including step 3202 of receiving a first input from a user with a neurodevelopmental disorder indicative of a selection of a neurodevelopmental disorder profile. Such a selection may occur as described earlier. Method 3200 also includes step 3204 of implementing the predefined template to conform with the needs of the user with a neurodevelopmental disorder, as described earlier. At step 3206 a second input is received from the user with a neurodevelopmental disorder. As with the first input, the second input may occur as described earlier. At step 3208 the content scaling parameter may be additionally adjusted to address specific needs of the user with a neurodevelopmental disorder, and at step 3210 includes adjusting at least one website display parameter other than the content scaling parameter included in the predefined template to address specific needs of the user with a neurodevelopmental disorder. At step 3212 at least one website display parameter is adjusted to conform with needs of the neurodevelopmental disorder and the additional disability when the second input from the user with a neurodevelopmental disorder indicates that the user with a neurodevelopmental disorder has an additional disability. Such adjustments at steps 3208, 3210, and 33212 may occur as described earlier. At step 3214 a display of the website is caused to revert to a default presentation mode, as described earlier.

Disclosed embodiments include a method for alternating default website display parameters to conform with an epilepsy-safe profile. The method may include obtaining an indication that a user of a website has epilepsy; and based on the obtained indication, implementing a predefined template to alter multiple website default display parameters to conform with needs of the epileptic user. Implementing the predefined template may include executing a stop animation command in website code on a user session basis to limit movement on a display; and adjusting a value of at least one web display parameter. Executing the stop animation command and adjusting the value of the at least one web display parameter may be configured to impact presentation of content on a computing device of the user with the epileptic disability without impacting presentation of content on other computing devices of other simultaneous viewers of the website.

Figure 24A:
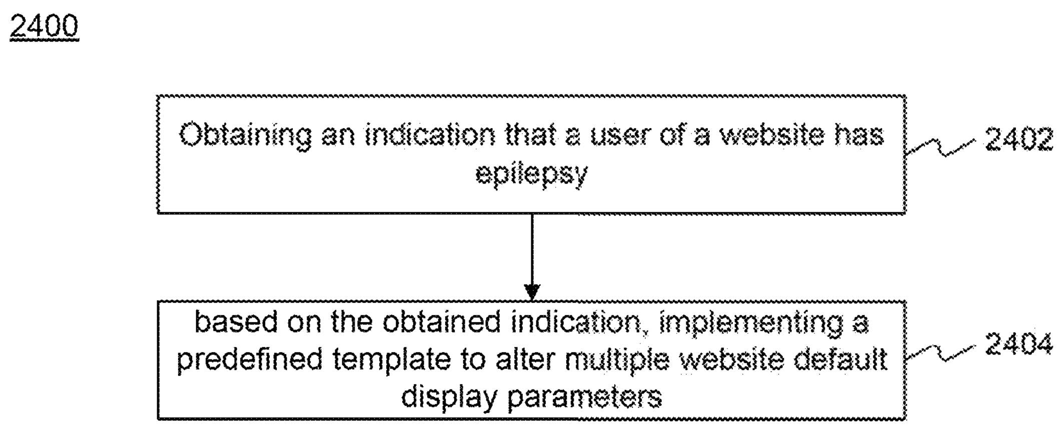
FIG. 24A illustrates a flowchart of a method for altering default website display parameters to conform with an epilepsy-safe profile, consistent with some embodiments of the present disclosure.
Figure 24B:
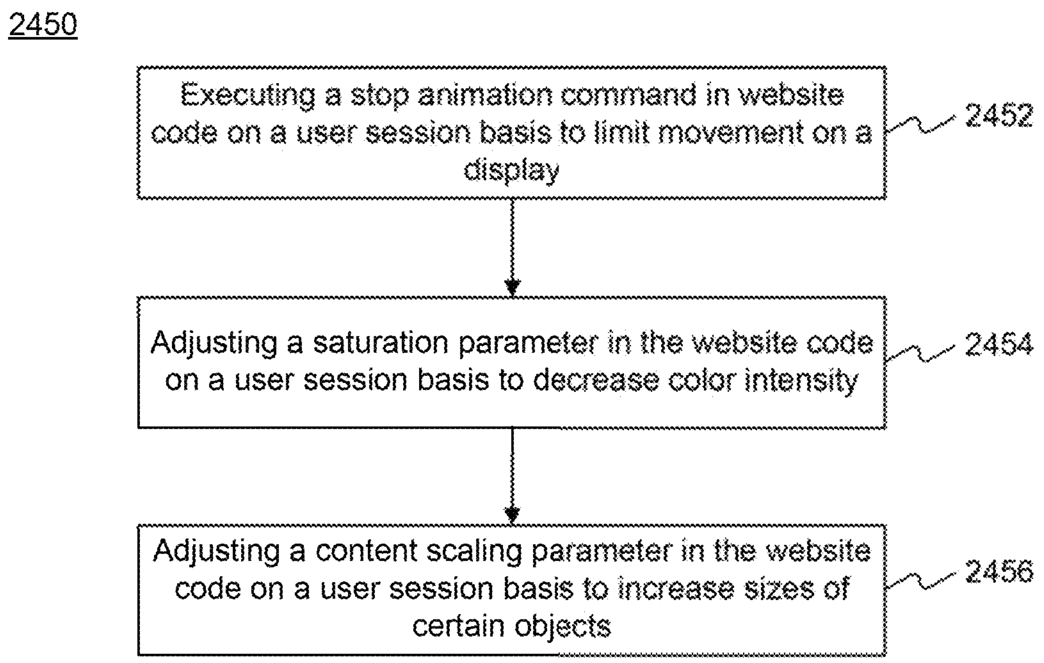
FIG. 24B illustrates a flowchart of an exemplary method of implementing the predefined template for an epileptic user, consistent with some embodiments of the present disclosure.

FIG. 24A illustrates a flowchart of a method 2400 for alternating default website display parameters to conform with an epilepsy-safe profile, consistent with some embodiments of the present disclosure. Method 2400 may include step 2402 of obtaining an indication that a user of a website has epilepsy. Method 2400 may include step 2404 of based on the obtained indication, implementing a predefined template to alter multiple website default display parameters to conform with needs of the epileptic user. FIG. 24B illustrates a flowchart of an exemplary method 2450 of implementing the predefined template for an epileptic user. Method 2450 may include step 2452 of executing a stop animation command in website code on a user session basis to limit movement on a display. Method 2450 may include step 2454 of adjusting a saturation parameter in the website code on a user session basis to decrease color intensity. Method 2450 may include step 2456 of adjusting a content scaling parameter in the website code on a user session basis to increase sizes of certain objects.

In some embodiments, the execution of the stop animation command and the adjustment of the value of the at least one web display parameter are implemented in response to receipt of a first input from the epileptic user, and wherein the method further includes, after implementing the predefined template, receiving a second input from the epileptic user; and based on the second input, additionally adjusting the value of the at least one web display parameter to address specific needs of the epileptic user. Receiving a first input indicative of a selection of an epilepsy-safe profile and receiving a second input may be desirable to allow for continued adjustment of website content based on user needs. Additionally adjusting the value of the at least one web display parameter to address specific needs of the epileptic user based on the second input may be desirable to allow a user to change the display of the website to meet additional needs as a result of their epileptic status, or other needs unrelated to their epileptic status. For example, adjusting at least one web display parameter following the receipt of the first input may include increasing the size of the font on the website from 12 pt to 14 pt following a first input in the form of a user clicking on an option for an epilepsy-safe profile from the accessibility GUI. In this example, the additionally adjusting the value of the at least one web display parameter may include increasing the size of the font from 14 pt to 16 pt following a second input in the form of a user selecting a font size from a drop-down menu, so that the epileptic user can better read the text on the website.

In some embodiments, the execution of the stop animation command and the adjustment of the value of the at least one web display parameter are implemented in response to receipt of a first input from the epileptic user, and wherein the method further includes, after implementing the predefined template, receiving a second input from the epileptic user; and based on the second input, adjusting a value of a website display parameter other than the at least one web display parameter to address specific needs of the epileptic user. Receiving a first input indicative of a selection of an epilepsy-safe profile and receiving a second input may be desirable to allow for continued adjustment of website content based on user needs. A website display parameter in this context may be any website display parameter that differs from the at least one web display parameter. For example, when the at least one web display parameter includes a font size, the website display parameter may include a font color. Adjusting a value of a website display parameter other than the at least one web display parameter to address specific needs of the epileptic user based on the second input may be desirable to allow a user to change the display of the website to meet additional needs as a result of their epileptic status, or other needs unrelated to their epileptic status. For example, adjusting at least one web display parameter following the receipt of the first input may include increasing the size of the font on the website from 12 pt to 14 pt following a first input in the form of a user clicking on an option for an epilepsy-safe profile from the accessibility GUI. In this example, adjusting a value of a website display parameter other than the at least one web display parameter may include changing a color of the text from gray to black following a second input in the form of a user selecting a font color from a drop-down menu so that it is easier for the epileptic user to read the text.

In some embodiments, the execution of the stop animation command and the adjustment of the value of the at least one web display parameter are implemented in response to receipt of a first input from the epileptic user, and wherein the method further includes, after implementing the predefined template, receiving a second input from the epileptic user indicating that the epileptic user has an additional disability; and based on the second input, adjusting an additional website display parameter to conform with needs of the epilepsy and the additional disability. Receiving a first input indicative of a selection of an epilepsy-safe profile and receiving a second input may be desirable to allow for continued adjustment of website content based on user needs. Adjusting an additional website display parameter to conform with needs of the epilepsy and the additional disability based on the second input from the epileptic user indicating that the epileptic user has an additional disability may be desirable to allow a user to change the display of the website to meet other needs related to an additional impairment status. For example, adjusting at least one web display parameter following the receipt of the first input may include increasing the size of the font on the website from 12 pt to 14 pt following a first input in the form of a user clicking on an option for an epilepsy-safe profile from the accessibility GUI. In this example, the epileptic user may enter a second input indicating that the epileptic user also has a vision impairment by additionally clicking on an option for a vision impairment profile from the accessibility GUI, whereby a contrast between the text and the background may be increased in order to make the text more distinct to the visually-impaired user.

In some embodiments, the execution of the stop animation command and the adjustment of the value of the at least one web display parameter are implemented in response to receipt of a first input from the epileptic user, and wherein the method further includes, after implementing the predefined template, receiving a second input from the epileptic user; and based on the second input, causing a display of the website to revert to a default presentation mode. Receiving a first input indicative of a selection of an epilepsy-safe profile and receiving a second input may be desirable to allow for continued adjustment of website content based on user needs. Causing a display of the website to revert to a default presentation mode based on the second input may be desirable if the user does not want to view the website in an epilepsy-safe mode. For example, after implementing the predefined template, a user may realize that they do not require the epilepsy-safe modifications on that particular website, depending on the extent and nature of the user's individual epileptic status. In this example, the second input may cause a display of the website to revert to a default presentation mode so that the user can view and interact with the website without any restrictions.

Figure 23:
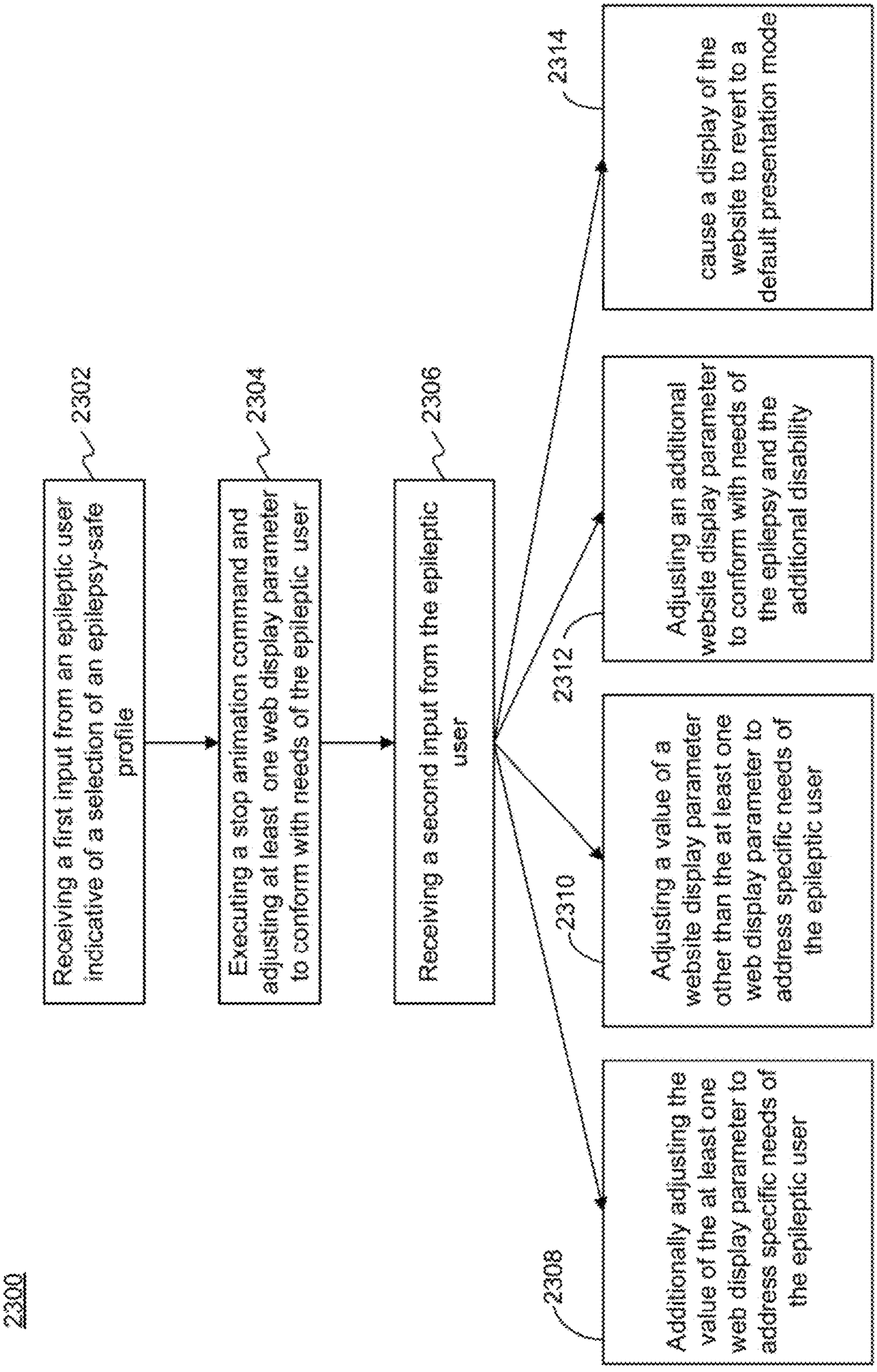
FIG. 23 illustrates a flowchart of alternative responses to a second input from an epileptic user, consistent with some embodiments of the present disclosure.

FIG. 23 illustrates a flowchart 2300 of alternative responses to a second input from the epileptic user, consistent with some embodiments of the present disclosure. Method 2300 may include a step 2302 of receiving a first input from an epileptic user indicative of a selection of an epilepsy-safe profile, as described earlier. Method 2300 may include a step 2304 of executing a stop animation command and adjusting at least one web display parameter to conform with needs of the epileptic user, as described earlier. Method 2300 may include a step 2306 of receiving a second input from the epileptic user, as described earlier. Method 2300 may include a step 2308 of additionally adjusting the value of the at least one web display parameter to address specific needs of the epileptic user, as described earlier. Method 2300 may include a step of 2310 of adjusting a value of a website display parameter other than the at least one web display parameter to address specific needs of the epileptic user, as described earlier. Method 2300 may include a step 2312 of adjusting an additional website display parameter to conform with needs of the epilepsy and the additional disability when the second input from the epileptic user indicates that the epileptic user has an additional disability, as described earlier. Method 2300 may include a step 2314 of causing a display of the website to revert to a default presentation mode, as described earlier.

Disclosed embodiments include a method for alternating website default display parameters to conform with a visual impairment profile. The method may include obtaining an indication that a user of a website is visually impaired; and based on the obtained indication, implementing a predefined template to alter multiple default website display parameters to conform with needs of the visually impaired user, wherein implementing the predefined template includes at least two of: adjusting a content scaling parameter in website code on a user session basis to increase content scaling; adjusting a font type parameter in the website code on a user session basis to cause a readability increase; adjusting a saturation parameter in the website code on a user session basis to increase display intensity; adjusting a font size parameter in the website code on a user session basis to increase font scaling; adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background. Implementing the predefined template may be configured to impact presentation of content on a computing device of the visually impaired user without impacting presentation of content on other computing devices of other simultaneous users of the website.

Figure 27A:
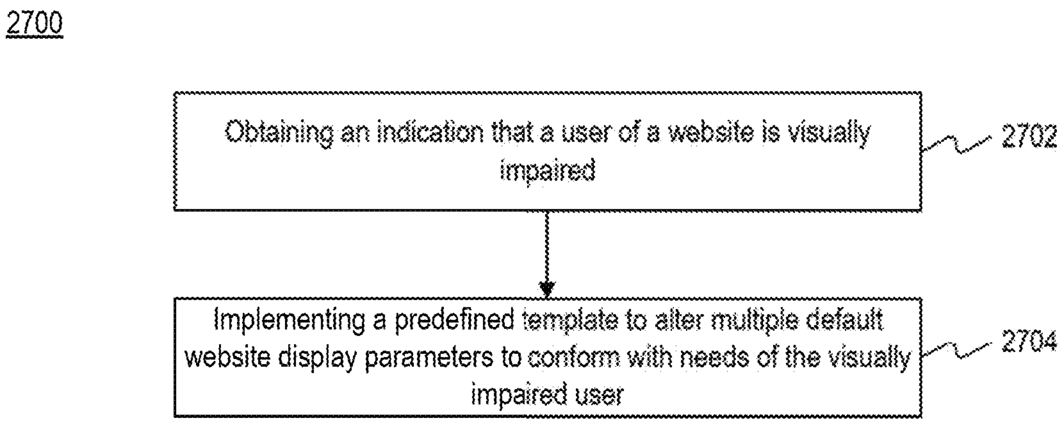
FIG. 27A illustrates a flowchart of a method for altering website default display parameters to conform with a visual impairment profile, consistent with some embodiments of the present disclosure.
Figure 27B:
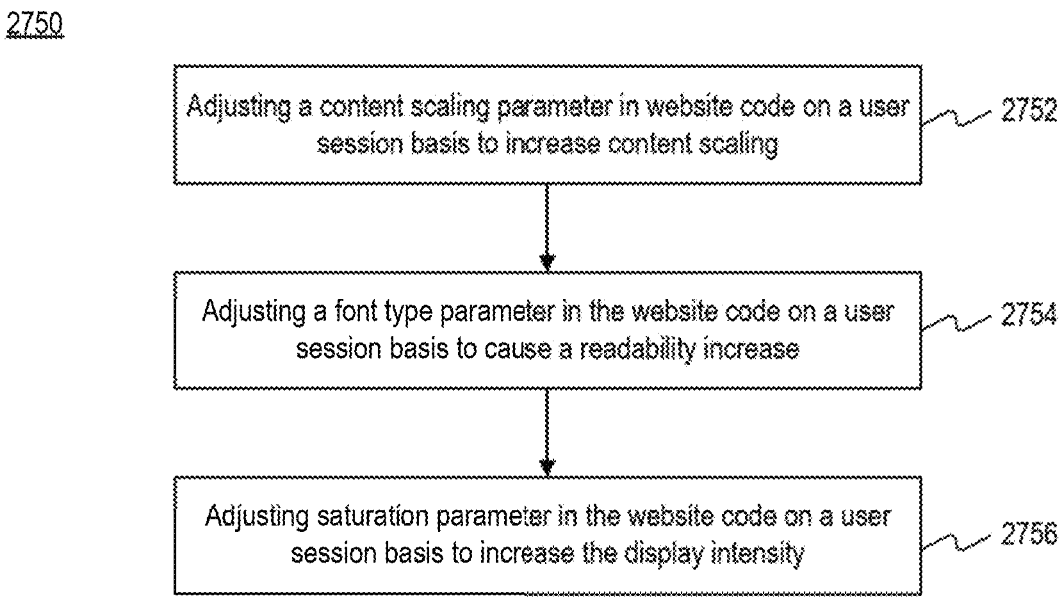
FIG. 27B illustrates a flowchart of an exemplary method of implementing the predefined template for a visually impaired user.

FIG. 27A illustrates a flowchart of a method 2700 for alternating website default display parameters to conform with a visual impairment profile, consistent with some embodiments of the present disclosure. Method 2700 may include step 2702 of obtaining an indication that a user of a website is visually impaired, as described earlier. Method 2700 may include step 2704 of based on the obtained indication, implementing a predefined template to alter multiple default website display parameters to conform with needs of the visually impaired user, as described earlier. FIG. 27B illustrates a flowchart of an exemplary method 2750 of implementing the predefined template for a visually impaired user. Method 2750 may include step 2752 of adjusting a content scaling parameter in website code on a user session basis to increase content scaling, as described earlier. Method 2750 may include step 2754 of adjusting a font type parameter in the website code on a user session basis to cause a readability increase, as described earlier. Method 2750 may include step 2756 of adjusting a saturation parameter in the website code on a user session basis to increase display intensity, as described earlier.

In some embodiments, the predefined template is implemented in response to receipt of a first input from the visually impaired user, and after implementing the predefined template that caused an adjustment to a website display parameter, receiving a second input from the visually impaired user, and based on the second input, additionally adjusting the website display parameter to address specific needs of the visually impaired user. Receiving a first input and receiving a second input from the visually impaired user may be desirable to allow for continued adjustment of website content based on user needs. Implementing the predefined template in response to receipt of a first input may include altering default website display parameters in response to a user input, such as clicking or typing. Additionally adjusting the website display parameter to address specific needs of the visually impaired user based on the second input may be desirable to allow a user to change the display of the website to meet additional needs as a result of their visual impairment, or other needs unrelated to their visual impairment. For example, implementing the predefined template may include increasing the size of the font on the website from 12 pt to 14 pt following a first input in the form of a user clicking on an option for a visual impairment profile from the accessibility GUI. In this example, additionally adjusting website display parameter may include increasing the size of the font from 14 pt to 16 pt following a second input in the form of a user selecting a font size from a drop-down menu, so that the visually impaired user can better read the text on the website.

In some embodiments, the predefined template is implemented in response to receipt of a first input from the visually impaired user, and after implementing the predefined template that caused an adjustment to a website display parameter, receiving a second input from the visually impaired user, and based on the second input, adjusting a second website display parameter other than the website display parameter to address specific needs of the visually impaired user. Receiving a first input and receiving a second input from the visually impaired user may be desirable to allow for continued adjustment of website content based on user needs. A second display parameter in this context may be any website display parameter that differs from the website display parameter that is not already altered based when the predefined template is implemented in response to the receipt of the first input from the visually impaired user. For example, when the website display parameter includes a font size parameter, the second website display parameter may include a text color parameter. Adjusting a second website display parameter other than the website display parameter to address specific needs of the visually impaired user based on the second input may be desirable to allow a user to change the display of the website to meet additional needs as a result of their visual impairment, or other needs unrelated to their visual impairment. For example, implementing the predefined template may include increasing the size of the font on the website from 12 pt to 14 pt following a first input in the form of a user clicking on an option for a visual impairment profile from the accessibility GUI. In this example, adjusting a second website display parameter other than the website display parameter may include changing a color of the text from gray to black following a second input in the form of a user selecting a font color from a drop-down menu so that it is easier for the visually impaired user to read the text.

In some embodiments, the predefined template is implemented in response to receipt of a first input from the visually impaired user, and after implementing the predefined template, receiving a second input from the visually impaired user indicating that the visually impaired user has an additional disability, and based on the second input, adjusting at least one website display parameter to conform with needs of the visual impairment and the additional disability. Receiving a first input and receiving a second input from the visually impaired user may be desirable to allow for continued adjustment of website content based on user needs. Adjusting at least one website display parameter to conform with needs of the visual impairment and the additional disability based on the second input from the visually impaired user indicating that the visually impaired user has an additional disability may be desirable to allow a user to change the display of the website to meet other needs related to an additional impairment status. An additional disability may include any other physical or mental condition that limits a person's movements, senses, or activities. Examples of additional disabilities may include epilepsy, cognitive disabilities, and ADHD. In one example, the visually impaired user may also have ADHD. In another example, the visually impaired user may also have epilepsy. For example, implementing the predefined template may include increasing the size of the font on the website from 12 pt to 14 pt following a first input in the form of a user clicking on an option for a visual impairment profile from the accessibility GUI. In this example, the visually impaired user may enter a second input indicating that the visually impaired user also has epilepsy by additionally clicking on an option for a seizure safe profile from the accessibility GUI, whereby moving images such as GIFs may be paused to prevent seizures.

In some embodiments, the predefined template is implemented in response to receipt of a first input from the visually impaired user, and after implementing the adjustment, receiving a second input from the visually impaired user, and based on the second input, causing a display of the website to revert to a default presentation mode. Receiving a first input and receiving a second input from the visually impaired user may be desirable to allow for continued adjustment of website content based on user needs. Causing a display of the website to revert to a default presentation mode based on the second input may be desirable if the user does not want to view the website in a visual impairment mode. For example, after implementing the predefined template, a user may realize that they do not require the visual impairment modifications on that particular website, depending on the extent and nature of the user's individual visual impairment. In this example, the second input may cause a display of the website to revert to a default presentation mode so that the user can view and interact with the website without any restrictions. In one example, implementing the predefined template may include increasing the size of the font from 12 pt to 20 pt. In this example, the user may realize that they do not require 20 pt font to read the text clearly. This user may click on a button on the website to revert to the default presentation mode including 12 pt. in another example, implementing the predefined template may include doubling the size of images on the website. In this example, the user may realize that they do not require the images to be larger than their original size to view them clearly. This user may click on a button on the website to revert to the default presentation mode without the images doubled in size.

Figure 26:
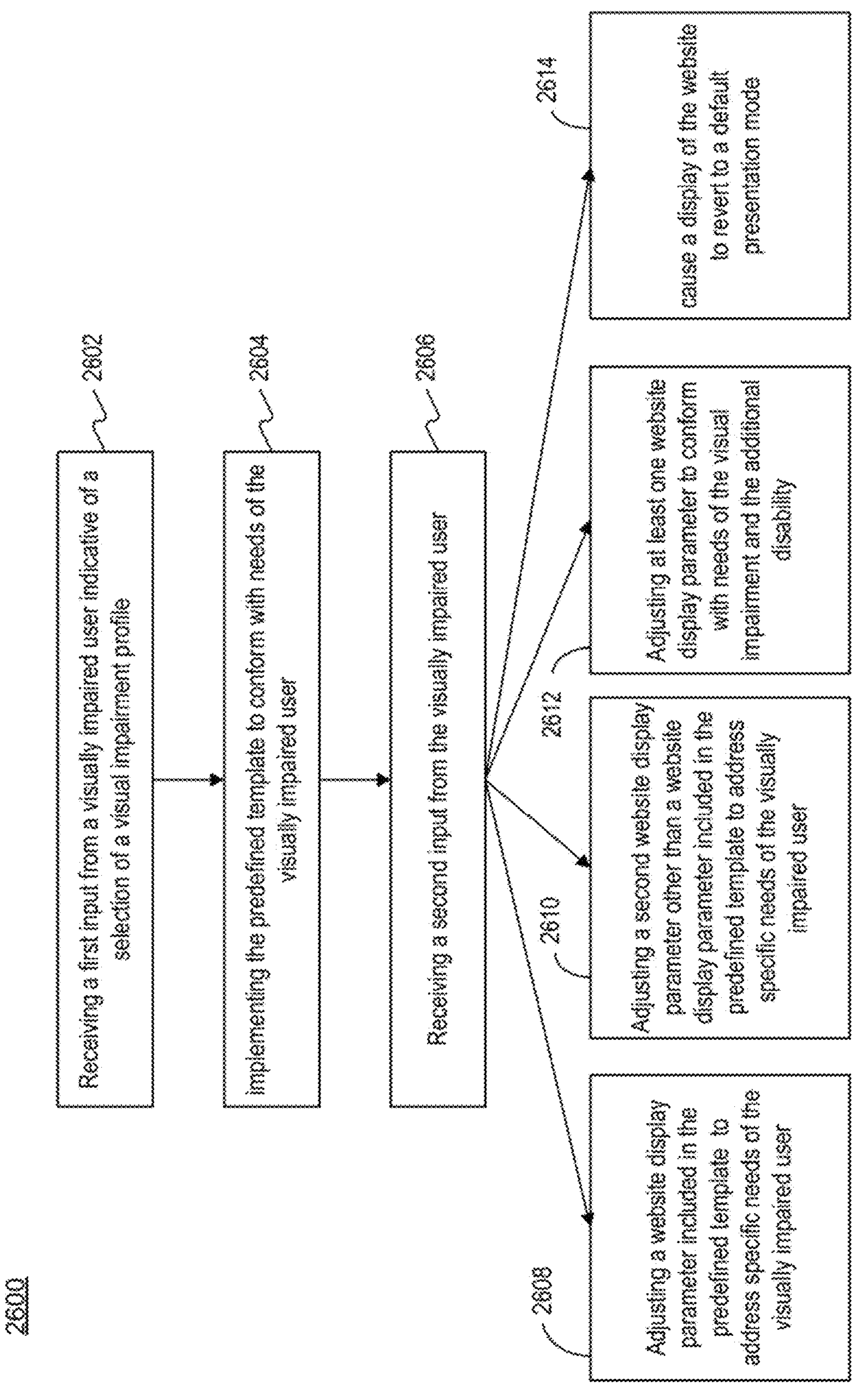
FIG. 26 illustrates a flowchart of alternative responses to a second input from the visually impaired user, consistent with some embodiments of the present disclosure.

FIG. 26 illustrates a flowchart 2600 of alternative responses to a second input from the visually impaired user, consistent with some embodiments of the present disclosure. Method 2600 may include a step 2602 of receiving a first input from a visually impaired user indicative of a selection of a visual impairment profile. Method 2600 may include a step 2604 of implementing the predefined template to conform with the needs of the visually impaired user. Method 2600 may include a step 2606 of receiving a second input from the visually impaired user. Method 2600 may include a step 2608 of changing a website display parameter included in the predefined template to address specific needs of the visually impaired user. Method 2600 may include a step of 2610 of adjusting a second website display parameter other than a website display parameter included in the predefined template to address specific needs of the visually impaired user. Method 2600 may include a step 2612 of adjusting at least one website display parameter to conform with needs of the visual impairment and the additional disability when the second input from the visually impaired user indicates that the visually impaired user has an additional disability. Method 2600 may include a step 2614 of causing a display of the website to revert to a default presentation mode.

Some disclosed embodiments involve altering website default display parameters to conform with a cognitive disability profile. Such embodiments further include obtaining an indication that a user of a website has a cognitive disability; and based on the obtained indication, implementing a predefined template to alter multiple website default display parameters to conform with needs of the cognitively disabled user, wherein implementing the predefined template includes at least two of: executing a highlighting titles command in website code on a user session basis to highlight titles depicted on the website; executing a highlighting actionable objects command in website code on a user session basis to highlight actionable objects depicted on the website; adjusting a content scaling parameter in website code on a user session basis to increase content scaling; and executing a stop animation command in website code on a user session basis to limit movement on a display. Implementing the predefined template may be configured to impact presentation of content on a computing device of the user with the cognitive disability without impacting on other computing devices display to other simultaneous viewers of the website.

Figure 30A:
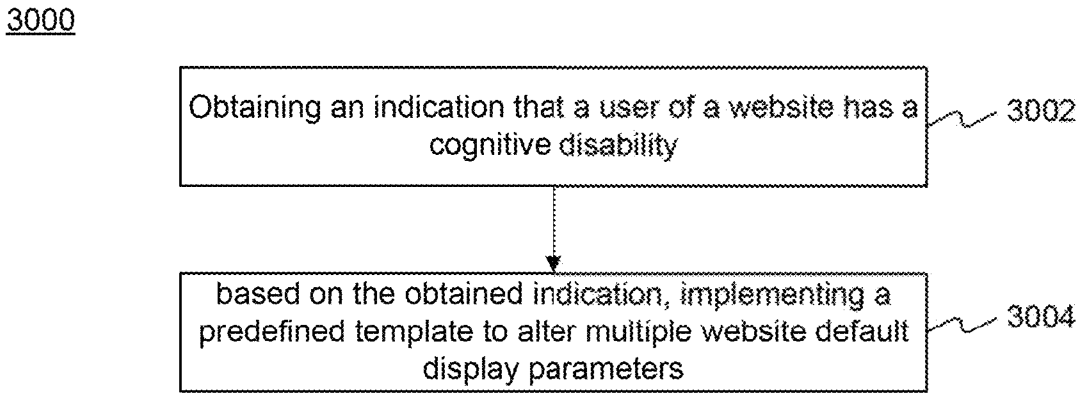
FIG. 30A illustrates a flowchart of a method for altering website default display parameters to conform with a cognitive disability profile, consistent with some embodiments of the present disclosure.

FIG. 30A illustrates a flowchart of a method 3000 for altering website default display parameters to conform with a cognitive disability profile, consistent with some embodiments of the present disclosure, including step 3002 of obtaining an indication that a user of a website has a cognitive disability, as described earlier. Step 3004 includes, implementing a predefined template to alter multiple default website display parameters to conform with needs of the cognitively disabled user, as described earlier.

Figure 30B:
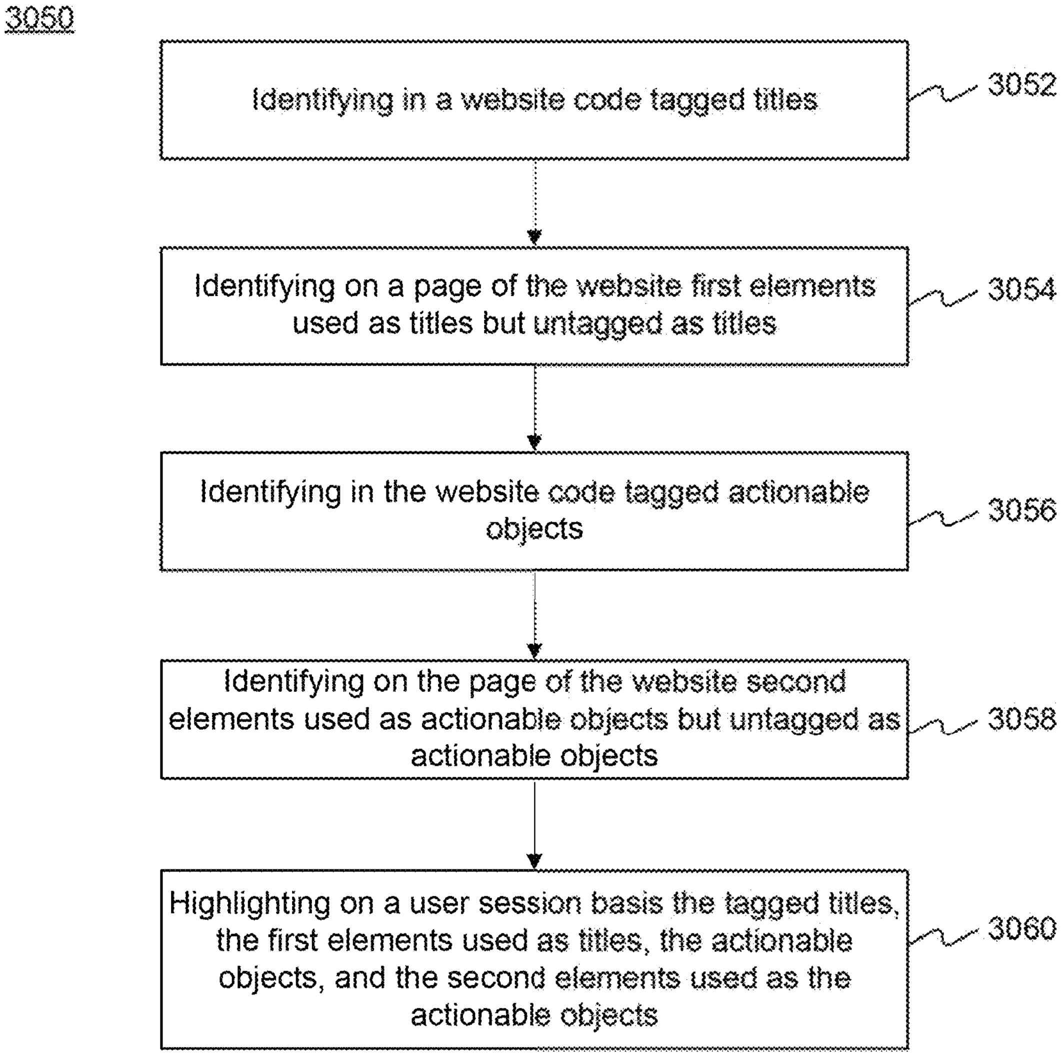
FIG. 30B illustrates a flowchart of an exemplary method of implementing the predefined template for a cognitively disabled user.

FIG. 30B illustrates a flowchart of an exemplary method 3050 of implementing the predefined template for a cognitively disabled user. As described earlier, in step 3052, tagged titles are identified in website code. Method 3050 may include step 3054 of identifying on a page of the website first elements used as titles but untagged as titles, as described earlier. Method 3050 may include step 3056 of identifying in the website code tagged actionable objects, as described earlier. Method 3050 may include step 3058 of identifying on the page of the website second elements used as actionable objects but untagged as actionable objects, as described earlier. Method 3050 may include step 3060 of highlighting on a user session basis the tagged titles, the first elements used as titles, the actionable objects, and the second elements used as the actionable objects, as described earlier.

In some embodiments, the predefined template is implemented in response to receipt of a first input from the cognitively disabled user, and wherein the operations further include, after implementing the predefined template that caused an adjustment of a website display parameter, receiving a second input from the cognitively disabled user, and based on the second input, changing the website display parameter to address specific needs of the cognitively disabled user. Receiving a first input and receiving a second input from the cognitively disabled user may be desirable to allow for continued adjustment of website content based on user needs. As described earlier, implementing the predefined template in response to receipt of a first input may include altering default website display parameters in response to a user input, such as clicking or typing. Changing the website display parameter to address specific needs of the cognitively disabled user based on the second input may be desirable to allow a user to change the display of the website to meet additional needs as a result of their cognitive disability, or other needs unrelated to their cognitive disability, as described earlier. For example, implementing the predefined template may include doubling a content scaling parameter following a first input in the form of a user clicking on an option for a cognitive disability profile from the accessibility GUI. In this example, changing the website display parameter may include tripling the content scaling parameter following a second input in the form of a user selecting a content scaling value from a drop-down menu, so that the cognitively disabled user can better comprehend the content on the website.

In some embodiments, the predefined template is implemented in response to receipt of a first input from the cognitively disabled user, and wherein the operations further include, after implementing the predefined template that caused an adjustment of a website display parameter, receiving a second input from the cognitively disabled user, and based on the second input, adjusting at least one website display parameter other than the website display parameter to address specific needs of the cognitively disabled user. Receiving a first input and receiving a second input from the cognitively disabled user may be desirable to allow for continued adjustment of website content based on user needs. At least one website display parameter in this context may be any website display parameter that differs from a website display parameter that is not already altered when the predefined template is implemented in response to the receipt of the first input from the cognitively disabled user. For example, when the website display parameter includes a content scaling parameter, the at least one website display parameter adjusted based on the second input may include limiting movement on a display by executing a stop animation command. Adjusting at least one website display parameter other than the website display parameter to address specific needs of the cognitively disabled user based on the second input may be desirable to allow a user to change the display of the website to meet additional needs as a result of their cognitive disability, or other needs unrelated to their cognitive disability. For example, implementing the predefined template may include doubling a content scaling parameter following a first input in the form of a user clicking on an option for a cognitive disability profile from the accessibility GUI. In this example, adjusting at least one website display parameter other than the website display parameter may include pausing all moving images on the website following a second input in the form of a user selecting an option to pause moving content from a drop-down menu, so that it is easier for the cognitively disabled user to comprehend the text without becoming distraction.

In some embodiments, the predefined template is implemented in response to receipt of a first input from the cognitively disabled user, and wherein the operations further include, after implementing the predefined template, receiving a second input from the cognitively disabled user indicating that the cognitively disabled user has an additional disability, and based on the second input, adjusting at least one website display parameter to conform with needs of the cognitive disability and the additional disability. Receiving a first input and receiving a second input from the cognitively disabled user may be desirable to allow for continued adjustment of website content based on user needs. Adjusting at least one website display parameter to conform with needs of the cognitive disability and the additional disability based on the second input from the cognitively disabled user indicating that the cognitively disabled user has an additional disability may be desirable to allow a user to change the display of the website to meet other needs related to an additional impairment status. An additional disability may include any other physical or mental condition that limits a person's movements, senses, or activities. Examples of additional disabilities may include epilepsy, visual impairment, and ADHD. In one example, the cognitively disabled user may also have a visual impairment. In another example, the cognitively disabled user may also have epilepsy. For example, implementing the predefined template may include doubling a content scaling parameter following a first input in the form of a user clicking on an option for a cognitive disability profile from the accessibility GUI. In this example, the cognitively disabled user may enter a second input indicating that the cognitively disabled user also has epilepsy by additionally clicking on an option for a seizure safe profile from the accessibility GUI, whereby moving images such as GIFs may be paused to prevent seizures.

In some embodiments, the predefined template is implemented in response to receipt of a first input from the cognitively disabled user, and wherein the operations further include, after implementing the predefined template, receiving a second input from the cognitively disabled user, and based on the second input, cause a display of the website to revert to a default presentation mode. Receiving a first input and receiving a second input from the cognitively disabled user may be desirable to allow for continued adjustment of website content based on user needs. Causing a display of the website to revert to a default presentation mode based on the second input may be desirable if the user does not want to view the website in a cognitive disability mode. For example, after implementing the predefined template, a user may realize that they do not require the cognitive disability modifications on that particular website, depending on the extent and nature of the user's individual cognitive disability. In this example, the second input may cause a display of the website to revert to a default presentation mode so that the user can view and interact with the website without any restrictions. In one example, implementing the predefined template may include doubling a content scaling parameter. In this example, the user may realize that they do not require the content to be scaled to such an extent to comprehend the information on the website. This user may click on a button on the website to revert to the default presentation mode the original content scaling.

Figure 29:
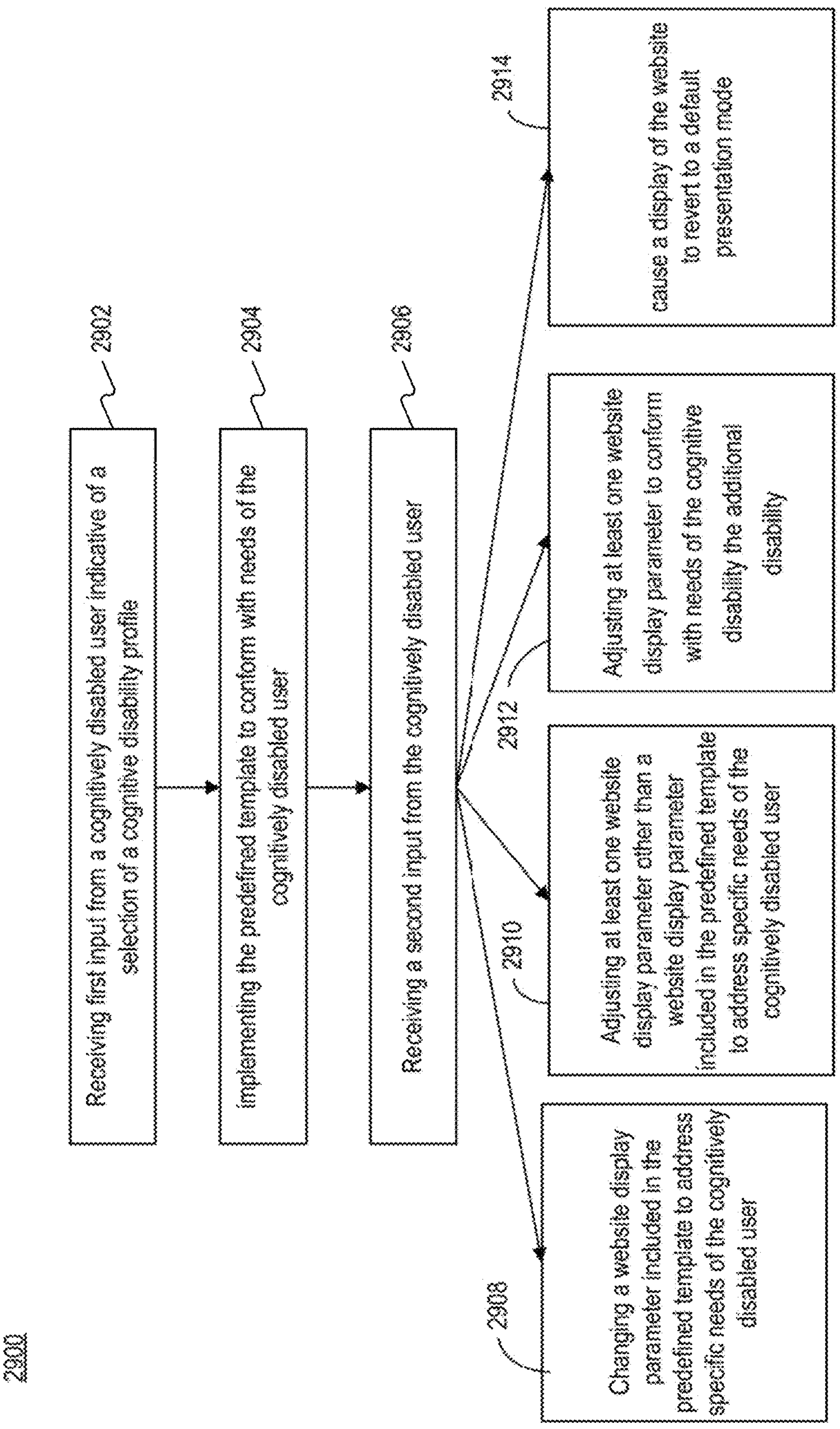
FIG. 29 illustrates a flowchart of alternative responses to a second input from the cognitively disabled user, consistent with some embodiments of the present disclosure.

FIG. 29 illustrates a flowchart 2900 of alternative responses to a second input from the cognitively disabled user, consistent with some embodiments of the present disclosure. Method 2900 may include a step 2902 of receiving a first input from a cognitively disabled user indicative of a selection of a cognitive disability profile. Method 2900 may include a step 2904 of implementing the predefined template to conform with the needs of the cognitively disabled user. Method 2900 may include a step 2906 of receiving a second input from the cognitively disabled user. Method 2900 may include a step 2908 of changing a website display parameter included in the predefined template to address specific needs of the cognitively disabled user. Method 2900 may include a step of 2910 of adjusting at least one website display parameter other than a website display parameter included in the predefined template to address specific needs of the cognitively disabled user. Method 2900 may include a step 2912 of adjusting at least one website display parameter to conform with needs of the cognitive disability and the additional disability when the second input from the cognitively disabled user indicates that the cognitively disabled user has an additional disability. Method 2900 may include a step 2914 of causing a display of the website to revert to a default presentation mode.

Some embodiments include a system for altering default display parameters to conform with a neurodevelopmental disorder profile. The system may include a memory configured to store values of various website display parameters associated with a plurality of web accessibility profiles; and at least one processor configured to: obtain an indication that a user of a website has a neurodevelopmental disorder; and based on the obtained indication, implement a predefined template to alter multiple website default display parameters to conform with needs of the user with the neurodevelopmental disorder, wherein the predefined template includes: adjusting a content scaling parameter in website code on a user session basis to increase content scaling; executing a stop animation command in the website code on a user session basis to limit movement on a display; and at least one of: adjusting a saturation parameter in the website code on a user session basis to increase display intensity; adjusting a font type parameter in the website code on a user session basis to cause a readability increase; adjusting a font size parameter in the website code on a user session basis to modify font scaling; adjusting a line height parameter in the website code on a user session basis to increase spaces between text lines; adjusting a letter spacing parameter in the website code on a user session basis to modify spaces between letters text; and adjusting text color parameter in the website code on a user session basis to modify a contrast between text and background. Implementing the predefined template may be configured to impact presentation of content on a computing device of the user with the neurodevelopmental disorder without impacting presentation of content on other computing devices of other simultaneous viewers of the website. The elements of the system were described earlier in the context of the methods described herein, and to avoid unnecessary repetition, are not repeated.

Disclosed embodiments include a system for alternating default website display parameters to conform with an epilepsy-safe profile. The system may include at least one processor configured to: obtain an indication that a user of a website has epilepsy; and based on the obtained indication, implement a predefined template to alter multiple website default display parameters to conform with needs of the epileptic user, wherein implementing the predefined template includes: executing a stop animation command in website code on a user session basis to limit movement on a display; and adjusting a value of at least one web display parameter; wherein executing the stop animation command and adjusting the value of the at least one web display parameter is configured to impact presentation of content on a computing device of the user with the epileptic disability without impacting presentation of content on other computing devices of other simultaneous viewers of the website.

Disclosed embodiments include a system for alternating default website display parameters to conform with a visual impairment profile. The system may include at least one processor configured to: obtain an indication that a user of a website is visually impaired; and based on the obtained indication, implement a predefined template to alter multiple default website display parameters to conform with needs of the visually impaired user, wherein implementing the predefined template includes at least two of: adjusting a content scaling parameter in website code on a user session basis to increase content scaling; adjusting a font type parameter in the website code on a user session basis to cause a readability increase; adjusting a saturation parameter in the website code on a user session basis to increase display intensity; adjusting a font size parameter in the website code on a user session basis to increase font scaling; adjusting a line height parameter in the website code on a user session basis to increase spaces between text lines; adjusting a letter spacing parameter in the website code on a user session basis to increase spaces between letters text; and adjusting a text color parameter in the website code on a user session basis to increase a contrast between text and background; wherein implementing the predefined template is configured to impact presentation of content on a computing device of the visually impaired user without impacting presentation of content on other computing devices of other simultaneous users of the website.

Disclosed embodiments include a system for altering default display parameters to conform with a cognitive disability profile. The system may include at least one processor configured to: obtain an indication that a user of a website has a cognitive disability; and based on the obtained indication, implement a predefined template to alter multiple website default display parameters to conform with needs of the cognitively disabled user, wherein implementing the predefined template includes at least two of: executing a highlighting titles command in website code on a user session basis to highlight titles depicted on the website; executing a highlighting actionable objects command in website code on a user session basis to highlight actionable objects depicted on the website; adjusting a content scaling parameter in website code on a user session basis to increase content scaling; and executing a stop animation command in website code on a user session basis to limit movement on a display; wherein implementing the predefined template is configured to impact presentation of content on a computing device of the user with the cognitive disability without impacting on other computing devices display to other simultaneous viewers of the website.

Improving the accessibility of website for disabled individuals may require making modifications to the website code. For example, screen readers are commonly used by blind or visually impaired persons navigating a website. As another example, screen readers may be used in areas of poor reception or low bandwidth as a substitute for loading visual content. A screen reader may audibly present content that is otherwise only presented visually, allowing users to consume visual content audibly. However, to audibly present the web elements of a website a screen reader may require accompanying descriptive text. The description that follows relates to altering website code to conform with a screen reader profile.

In some embodiments, the altered website code may be stored at a website host, such that the altered website code may be available to users requesting to navigate the website. In some embodiments, the altered website code may be stored locally on a specific device associated with screen reader usage. A software application may be provided to detect screen reader usage for navigating and consuming website content on a specific device. For example, a user selecting a web accessibility profile associated with the screen reader (e.g., the Screen Reader profile) may indicate screen reader usage. Based on the indication, a predefined template may be implemented to make multiple changes to the website code for conforming the website code with accessibility needs. For example, the website code may be updated to conform with the needs of blind users using a screen reader. Multiple elements may be identified in the website code corresponding to objects for displaying on the website. For example, the website code may include references to image, text, and video content and any other visually presentable content. Accessibility information may be determined for at least some of the objects displayed on the website. For example, accessibility information may be determined based on context, via a textual analysis, via an image analysis of text, and/or via an analysis of image content associated with the website. The website code may then be updated based on the accessibility information. The updates may be configured to only change an audible presentation of the website. For example, the updates may be applicable to a screen reader invoked on a specific computing device, while not impacting a simultaneous rendering of the website on a different computing device. For example, the updates may be added as alternate text to references of images. A web browser running on a first computing device associated with screen reader usage may provide the alternate text to the screen reader for recitation. However, a web browser running on a different computing device not associated with screen reader usage may ignore the alternate text and merely display the images.

Figure 34:
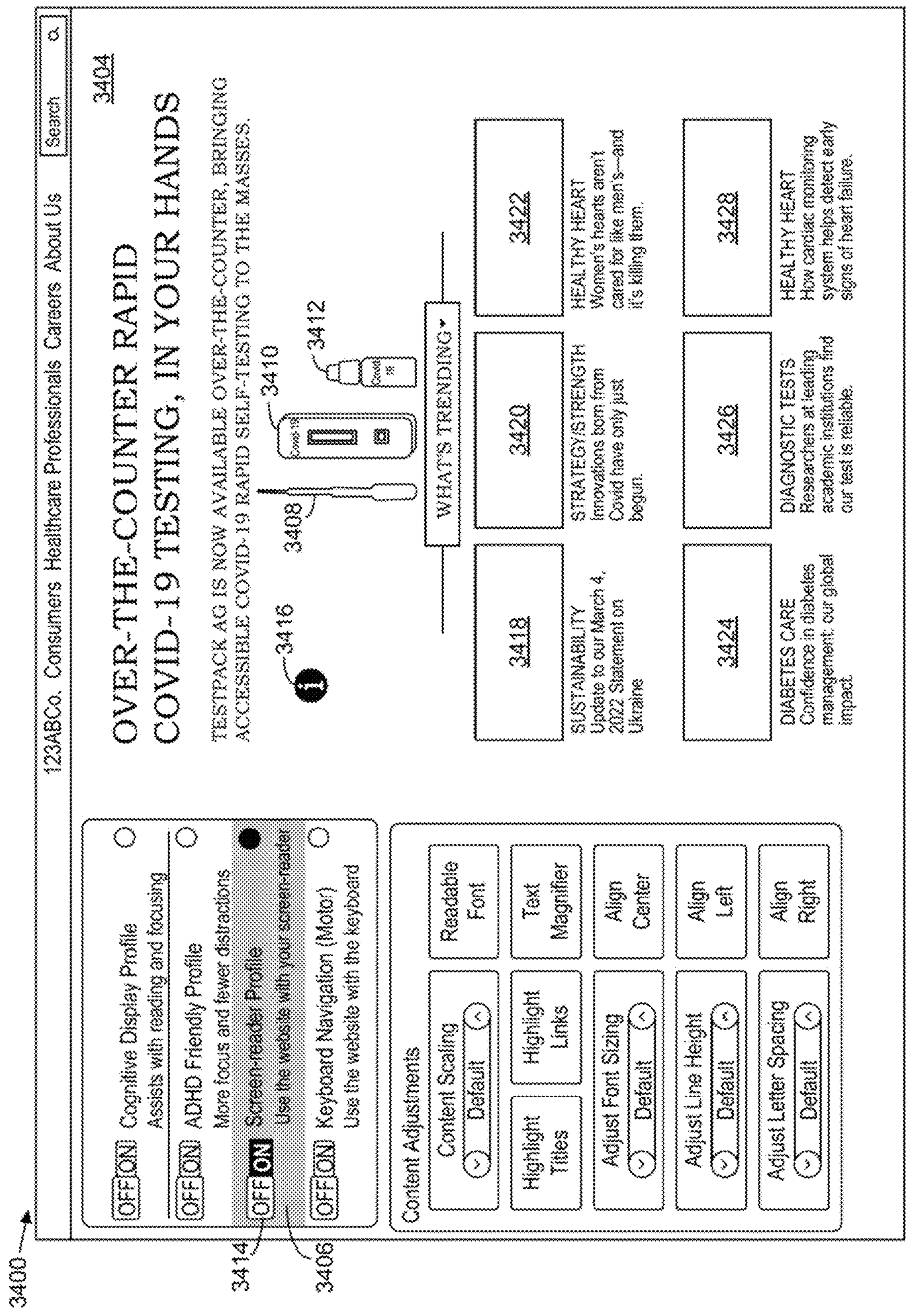
FIG. 34 illustrates an exemplary accessibility GUI displayed alongside a website, consistent with some embodiments of the present disclosure.
Figure 35A:
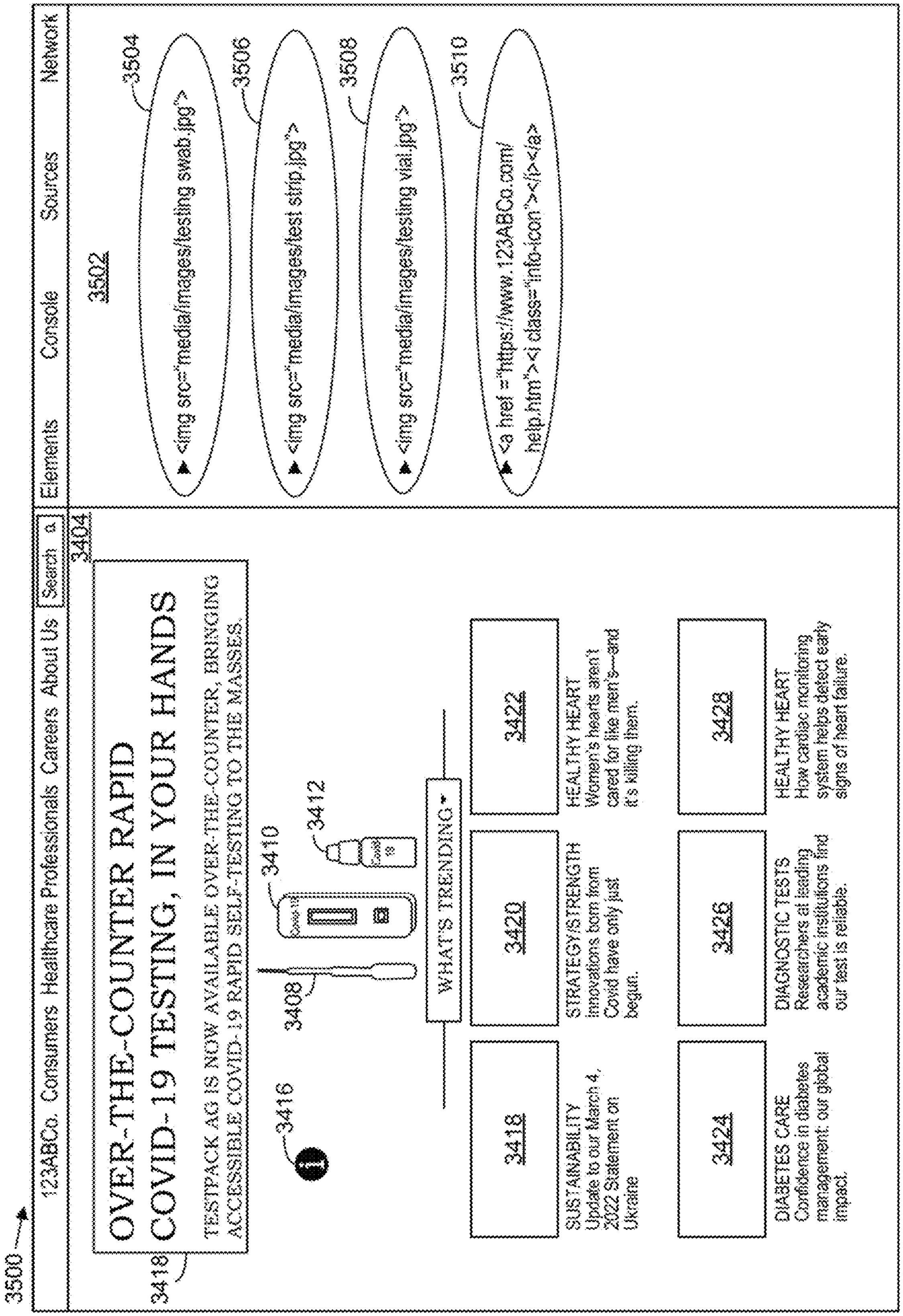
FIG. 35A illustrates an exemplary portion of website code for the website of FIG. 34, consistent with some embodiments of the present disclosure.
Figure 35B:
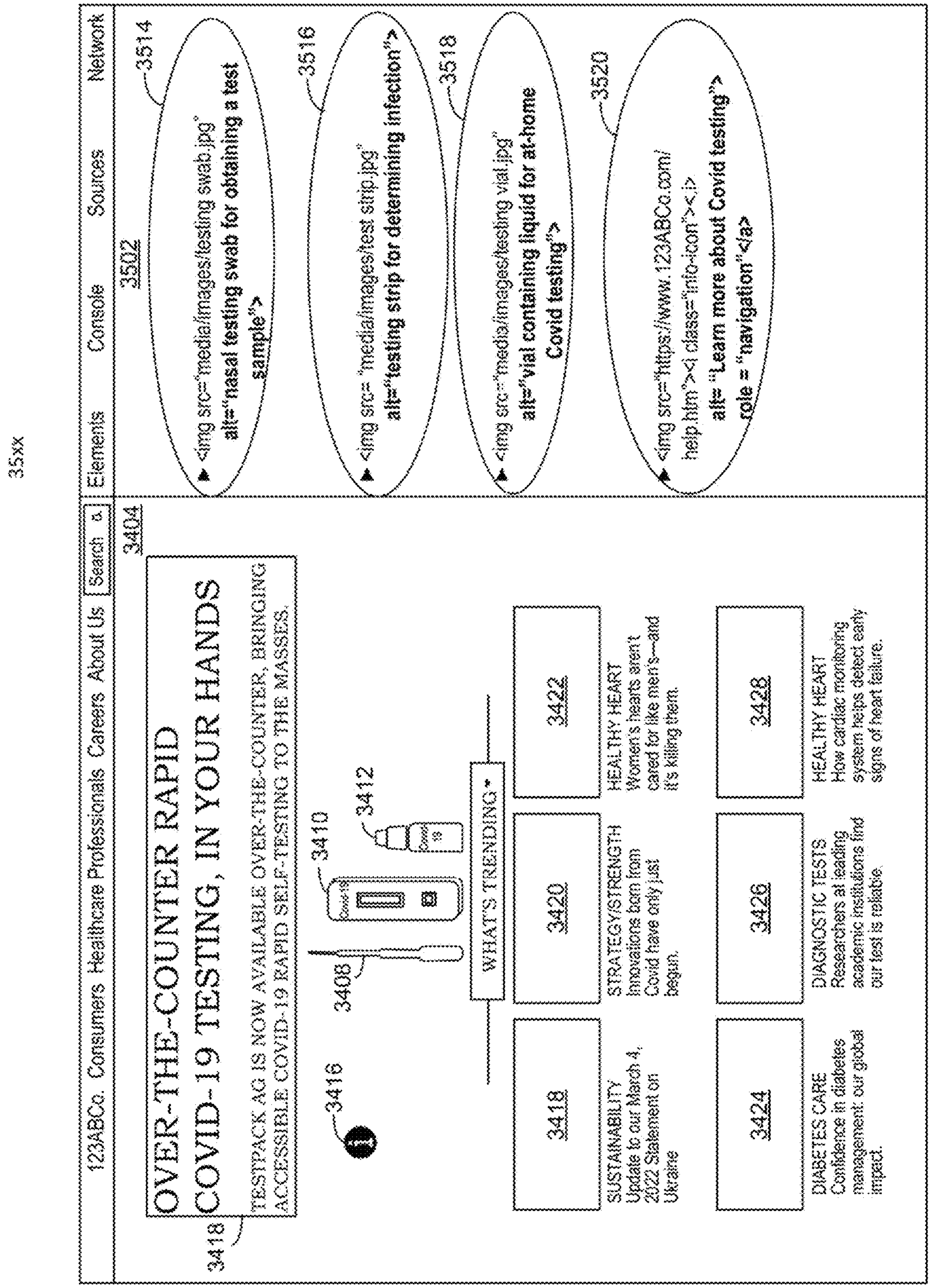
FIG. 35B illustrates an exemplary updated portion of website code for the website of FIG. 34 after altering the website code to conform with a screen reader profile, consistent with some embodiments of the present disclosure.

In some instances, the description that follows may refer to FIGS. 34, 35A, and 35B which illustrate an exemplary implementation for altering website code of a website to conform with a screen reader profile, consistent with some disclosed embodiments. FIGS. 34, 35A, and 35B are intended merely to facilitate the conceptualizing of one exemplary implementation for altering website code to conform with a screen reader profile and does not limit the disclosure to any particular implementation.

Some embodiments involve a non-transitory computer readable medium containing instructions that when executed by at least one processor cause the at least one processor to perform operations for altering website code to conform with a screen reader profile. The term "non-transitory computer-readable medium" may include any medium capable of storing data in any memory in a way that may be read by any computing device with a processor to carry out methods or any other instructions stored in the memory, as described earlier. The term "instructions" may refer to program code instructions (e.g., a first set of computer code instructions) that may be executed by a computer processor. The instructions may be written in any type of computer programming language, such as an interpretive language (e.g., scripting languages such as HTML and JavaScript), a procedural or functional language (e.g., C or Pascal that may be compiled for converting to executable code), object-oriented programming language (e.g., Java or Python), logical programming language (e.g., Prolog or Answer Set Programming), or any other programming language. In some embodiments, the instructions may implement methods associated with machine learning, deep learning, artificial intelligence, digital image processing, optimization algorithms, and any other computer processing technique. The term "website" may refer to any public, private, or semi-private web property including a collection of content to be presented to the public or to a limited audience, as described earlier. The term "website code" may include software, firmware, and/or microcode, and may refer to programs, routines, functions, classes, data structures, and/or objects, as described earlier. In other words, the website code may include a second set of computer code instructions, different than the first set of computer code instructions. Executing the website code on a computing device via a web browser application may render digital content of the website on the computing device. The term "altering website code" may refer to adding, removing, editing, or modifying one or more instructions of the website code, a parameter, variable, and/or value referred to or used by the website code. For example, the first set of computer code instructions may alter the website code such that executing the altered website code via the web browser results in a different user experience than executing the original (e.g., unaltered) website code. The term "screen reader" may refer to a software application that translates textual and/or graphical information displayed on a screen (e.g., visual media) and present it to a user as audio media, e.g., using synthesized speech, as described earlier. The term "Screen Reader profile" may refer to a predefined set of parameter settings, instructions or definitions that may affect a user experience via a screen reader.

Thus, executing the first set of program code instructions (e.g., of the disclosed embodiments) may cause alterations to a second set of program code instructions (e.g., the website code). The alterations to the website code may adapt the (e.g., original, unaltered) website code for a screen reader. For example, executing the original website code via a conventional web browser may cause a visual rendering of the content of the website, such as a visual presentation of images and/or text on a computer display. While visual rendering of content may be suitable for visually abled users, a visual format may be less suitable for users associated with a Screen Reader profile, such as blind users, visually impaired users, or users having poor reception (e.g., in area of low communications bandwidth). To accommodate users associated with the Screen Reader profile, the disclosed alterations to the website code may facilitate the screen reader in producing an audio rendering of the content of the website. For example, text content may be converted to an audio format via a speech synthesizer configured with the screen reader. However, converting non-text content to an audio format, such as graphic content including images, may require additional processing, such as alterations to the website code, for example to add descriptive terms or phrases for the screen reader to recite.

By way of a non-limiting example, FIG. 34 illustrates an exemplary interface 3400 including an accessibility GUI 3402 presented with a website 3404 (e.g., a home page for the website). Accessibility GUI 3402 may present multiple web accessibility profiles, each associated with a differing disability and configured to adapt website 3404 for users with corresponding disabilities. In particular, accessibility GUI 3402 may include a Screen Reader profile 3406 configured to address needs of users benefiting from a screen reader when navigating website 3406. For example, website 3404 may include source code instructions (e.g., HTML, CSS and JavaScript) that when executed by processing device 210A (FIG. 2) of computing device 170A (FIG. 1), may cause a visual rendering of images 3408, 3410, and 3412 on display 180A of computing device 170A. However, visually impaired user 110A may struggle to consume a visually rendering of images 3408, 3410, and 3412, and may thus benefit from an audio rendering of images 3408, 3410, and 3412 via the screen reader. Selecting Screen Reader profile 3406 may cause an execution of a software application (e.g., computer code instructions) that modifies (e.g., makes alterations) the website code of website 3404 to enable an audio rendering of images 3408, 3410, and 3412, and thereby cause the website code to conform with screen reader profile 3406.

Some embodiments involve obtaining an indication of screen reader usage to navigate and consume website content on a specific device. "Obtaining" may occur in any manner where an indication is received in a way that is detectable by or understandable to a processor. An indication may include one or more of a signal, cue, communication, token, cookie, command, user input, or other information conveying screen reader usage. The term "navigate" may refer to the act of proceeding or flowing from one section of web content (e.g., the navigation source) to another (e.g., the navigation targe). Website navigation may begin from any website source and flow to any website target. Thus, a user may navigate from one website to a different website, from a page of a website to a different page of the same website, or from a section on a page of a website to a different section on the same page of the same website. Additionally, or alternatively, website navigation may begin from one software application (e.g., a browser application) and proceed to a different software application (e.g., an email, messaging or phone client). Website navigation may be enabled via links displayed at the navigation source of a website. The link function may be a pointer that takes a user from the navigation source to the navigation target upon selecting the link (e.g., via an electronic mouse, keyboard press, electronic pen, touching a touch-sensitive screen, voice command, gesture or eye tracking, or any other selection technique). Links may be defined in the website code using identifying labels or tags, for example within the HTML elements <a> and </a>, using the "href" attribute to define a hyperlink pointing to the navigation target. For example, the HTML instruction "<a href=navigation target>LABEL</a>" may cause a web browser to display the word "LABEL" on the website, such that selecting the "LABEL" web element causes the web browser to display content referenced by the hyperlink defined by navigation target. The term "consume" may refer to acquiring website content, for example by reading text content, seeing color, format, image and video content, hearing audio content, feeling tactile content via haptic interaction, and/or any other method of receiving information from a website. A screen reader may assist users facing challenges in any of navigating and/or consuming website content, for example due to reading disabilities or vision impairment. For example, to assist in website navigation, the screen reader may recite a text describing the content, context, subject, or purpose of the navigation target associated with a link on the website. Similarly, to assist a user in consuming content presented by a website, the screen reader may recite a text describing an image, a color, a position, a size, or a format of content, or any other visual characteristic of the content. The screen reader may be invoked on the specific device of a particular user to assist the particular user navigate and consume website content on the specific computing device.

The indication of screen usage may be obtained for example upon detecting the installation of a screen reader on a computing device and/or in association with a particular user, upon invocation of the screen reader on the computing device and/or in association with the user, based on a history of previous screen reader usage on the computing device and/or in association with the user, based on a history of queries associated with screen reader usage, or any other indication of screen reader usage. For example, according to some embodiments, obtaining the indication of screen reader usage occurs based on input from an accessibility graphical user interface (GUI) associated with the website. The term "accessibility GUI" may refer to an interface that allows users to customize website display parameters through graphical elements or links, as described earlier. Upon selection of a Screen Reader profile of the accessibility GUI, an event listener associated with the Screen Reader profile may notify a processor (e.g., of the specific device or a different computing device) of the selection, thereby obtaining an indication of screen reader usage to navigate and consume website content on a specific device. The selection of the Screen Reader profile may be performed using any suitable input interface technique, such as via a keyboard, touch on a touch sensitive screen, electronic mouse or pen, voice command, gesture recognition, eye tracking, and any other input interface method.

By way of a non-limiting example, turning to FIG. 34, accessibility GUI 3402 may include Screen Reader profile 3406. Screen Reader profile 3406 may adapt website 3404 for use with a screen reader assisting a user (e.g., user 110A of FIG. 1) in navigating and consuming the content of website 3404 on a specific device (e.g., computing device 170A), for example by audibly presenting content of website 3404 that is otherwise presented only visually. User 110A may select Screen Reader profile 3406 using any suitable technique, such as by uttering a voice command into a microphone configured with computing device 170A, typing on a braille keyboard configured with input interface 240 (FIG. 2), or any other input technique. In the exemplary implementation shown in FIG. 34, the selection of Screen Reader profile 3406 is indicated by the "ON" status of button 3414 of Screen Reader profile 3406. An event listener (e.g., integrated with a web browser configured to display accessibility GUI 3402 alongside website 3404) may detect the selection of Screen Reader profile 3406 and notify processing device 210A (FIG. 2). Processing device 210A may thus obtain an indication of screen reader usage for navigating and consuming website content, for example to allow visually impaired user 110A to navigate website 3404 via links 3416 to 3428 and consume the digital content of images 3408, 3410, 3412.

According to some embodiments, obtaining the indication of screen reader usage occurs based on detection of a predefined sequence of keystrokes. The term "predefined sequence of keystrokes" may refer to a particular order of selections of keys of a keyboard interface configured with a computing device, e.g., by pressing a mechanical keyboard (e.g., a braille keyboard), touching a keyboard displayed on a touch sensitive display, selection of keys via gesture recognition, eye tracking, voice command, or any other key selection technique. For example, a particular sequence of keystrokes may be associated with opening a browsing application, e.g., to navigate and consume website content. Examples of predefined sequences of keystrokes include Ctrl+A (e.g., to save a document), Ctrl+C (e.g., to copy data to a clipboard in memory), and Ctrl+V (e.g., to paste data copied to a clipboard in memory). Additionally, or alternatively, a particular sequence of keystrokes may be associated with opening a website. The website may be a generic website or a particular website assisting individuals who may benefit from improved website accessibility (e.g., to navigate and consume website content). As another example, a particular sequence of keystrokes may be defined in advance (e.g., as a keyboard shortcut) to invoke a screen reader on a computing device, e.g., via an accessibility option of a settings menu for the computing device. The predefined sequence of keystrokes may be stored in a memory (e.g., associated with a local or remote computing device) to allow comparing a detected sequence of keystrokes with the predefined sequence and the indication of screen reader usage may be obtained based on the comparison.

By way of a non-limiting example, processing device 210A (FIG. 2) of computing device 170A (FIG. 1) may detect a sequence of key selections by user 110A on a braille keyboard configured with input interface 240, for example to display website 3404 (FIG. 34). Processing device 210A of computing device 170A may compare the detected sequence with a predefined sequence of keystrokes associated with screen reader usage and stored in memory device 220A. Based on the comparison, processing device 210A may determine that the detected sequence matches the predefined sequence retrieved from memory device 220A, thereby obtaining the indication of screen reader usage.

According to some embodiments, obtaining the indication of screen reader usage occurs based on detection of a voice command. For example, the voice command may be received via a microphone and voice-user interface (VUI) configured on a computing device. The VUI may include voice recognition software to discern words or terms for invoking a screen reader. For example, a particular expression (e.g., including one or more words and/or commands) may be associated with opening a browsing application, (e.g., to navigate and consume website content), with opening a website (e.g., a generic website or a particular website assisting individuals benefiting from improved website accessibility), with invoking a screen reader, or with any other indication of screen reader usage. The particular expression may be stored in a memory (e.g., associated with a local or remote computing device) to allow comparing a detected expression (e.g., via the VUI) with the particular expression to thereby obtain the indication of screen reader usage.

By way of a non-limiting example, processing device 210A (FIG. 2) of computing device 170A (FIG. 1) may detect a voice command (e.g., "screen reader") via a microphone configured with input interface 240. Processing device 210A may analyze the voice command via a VUI configured with computing device 170A and determine a request to invoke a screen reader, thereby obtaining an indication for screen reader usage.

According to some embodiments, obtaining the indication of screen reader usage occurs based on data retrieved from the computing device. For example, installation of a screen reader in a memory of a computing device may indicate screen reader usage. Upon opening a browser or website on a computing device, the browser and/or website may query the memory of the computing device to detect installation of the screen reader. The response to the query (e.g., data retrieved from the computing device) may indicate screen reader usage. As another example, a history or pattern of prior screen reader usage may be stored in a memory of the computing device. The prior screen reader usage may be associated with a history (e.g., a browsing history) associated with the computing device, and/or with a specific account or specific user. When a session is initiated on the computing device (e.g., via a browser), the history (e.g., data) may be retrieved from the memory of the computing device to determine the prior screen reader usage, thereby obtaining the indication.

By way of a non-limiting example, processing device 210A (FIG. 2) of computing device 170A (FIG. 1) may store in memory device 220A a screen reader application, e.g., in association with user 110A. When user 110A initiates a session on computing device 170A (e.g., a browsing session), processing device 210A may identify user 110A in association with the screen reader application stored in local memory device 220A, thereby obtaining the indication.

According to some embodiments, obtaining the indication of screen reader usage occurs based on data retrieved from a remote server. For example, a history or pattern of prior screen reader usage may be stored at a cloud storage facility associated with a remote server. The prior screen reader usage may be associated with a previous session (e.g., a browsing history) of a specific user, a specific account, and/or a specific computing device. When a new session (e.g., browsing session) is initiated, the history (e.g., data) may be retrieved from the remote server to determine the prior screen reader usage, thereby obtaining the indication. According to some embodiments, the remote server may be an accessibility server configured to facilitate accessibility to consume content and navigate websites.

By way of a non-limiting example, a history of screen reader usage associated with user 110A (FIG. 1) may be stored at data structure 136 of accessibility host 130 via network 140. When user 110A initiates a session (e.g., on computing device 170A), server 133 of accessibility host 130 may identify user 110A and retrieve the history of screen reader usage (e.g., data) from data structure 136. Server 133 of accessibility host 130 may provide the data as an indication of screen reader usage to processing device 210A of computing device 170A via network 140. For example, based on the indication, if computing device 170A does not have a screen reader installed, processing device 210A may automatically install a screen reader on computing device 170A for user 110A.

Some embodiments involve, based on the obtained indication, implementing a predefined template to make multiple changes to the website code to conform with accessibility needs. The term "predefine template" may refer to one or more of a series of changes defined in advance to adapt one or more websites to accommodates needs of a specific disability in a manner that is uniform and consistent across multiple pages of a single website or multiple websites. Implementing the predefined template may provide multiple benefits. For example, the predefined template may facilitate in automating the accommodation of web content for a specific disability, allowing to universally accommodate many webpages and/or website. In addition, the predefined template may ensure that the accommodations are applied consistently and uniformly, allowing disabled users to adapt to the accommodations easily and efficiently. In some embodiments the predefined template may be implemented across a bundle of webpages and/or websites. For example, the template may be implemented across multiple webpages included in a single website (e.g., under the same domain address) or linked to another website (e.g., associated with a different domain address), and navigable from each other via links included therein. Implementing the template across an entire bundle of linked webpages may facilitate a user in web navigation. The term "make multiple changes to the website code" may refer to adding, removing, editing, and/or modifying one or more instructions of the website code, or one or more parameters, variables, or values referred to or used by the website code. The changes may be made to any portion of the website code, such as to a main section, a function, a procedure, a declaration, a definition, a reference (e.g., to an internal or external library), metadata associated with the website code, comments associated with the website code, a CSS, HTML, JavaScript, Java or Python file associated with the website code, and/or any other piece of information that may affect the rendering of the website content via the web browser on a specific device. The term "conform with accessibility needs" may refer to accommodating the website code to suit needs associated with a specific accessibility profile, for example, by ensuring that the website code allows a user associated with the screen reader profile to navigate and consume any content of the website. Thus, the multiple changes to the website code may allow the screen reader to audibly present visual content, and to audibly present information (e.g., topic, content, context, purpose, role) about the navigation targets associated with any links of the website.

By way of a non-limiting example, turning to FIG. 35A, an interface 3500 is shown displaying website 3404 of FIG. 34 and a corresponding source code window 3502 for website 3404. Source code window 3502 contains (e.g., at least) elements 3504, 3506, 3508 (e.g., website code) for displaying images 3408, 3410, and 3412, respectively, and element 3510 for displaying link 3416 on website 3404. Elements 3504, 3506, and 3508 include location information for retrieving images 3408, 3410, and 3412, e.g., to visually render images 3408, 3410, and 3412, e.g., on display 180A of device 170A for user 110A (FIG. 1) but lack descriptive text that may be recited by a screen reader to allow visually impaired user 110A to consume the visual content of images 3408, 3410, and 3412 as audio content. Similarly, element 3510 includes a hyperlink to allow navigating to a different webpage from the homepage of website 3404 (e.g., by selecting link 3416) but lacks descriptive text that may be recited by a screen reader to assist user 110A in deciding if content presented via the navigation target associated with link 3416 is relevant. Thus, visually impaired, user 110A may fail to fully navigate and consume the content of website 3504, e.g., rendered according to elements 3504, 3506, 3508, and 3510. To facilitate user 110A in navigating and consuming the content of website 3404, processing device 210A (FIG. 2) of computing device 170A may make changes to the website code according to the predefined template. For example, the predefined template may call for the addition of descriptive text to elements 3504, 3506, 3508, 3510, e.g., inside an "alt" attribute, to conform with the accessibility needs of visually impaired users. For example, the added text may allow user 110A to consume the visual content of images 3408, 3410, and 3412 as audio content, and may further allow user 110A to decide if to navigate to another webpage via link 3416.

According to some embodiments, implementing the predefined template includes identifying in the website code a plurality of elements corresponding to multiple objects displayed on the website. The term "elements" may refer to any content defined in the website code, e.g., for presenting on a website. For example, an HTML document may define multiple web elements delineated between a start tag (e.g., "<tag>") and an end tag (e.g., "</tag>"). Each web element may be associated with an object of the website, and may defined characteristics for rendering the object, such as display characteristics, audio characteristics, haptic characteristics, and any other characteristic of the element. Identifying elements may occur in any manner resulting in recognition of associated objects. The template itself may be implemented by running code associated with the predefined template. The term "objects displayed on the website" may refer to content presented on the website corresponding to each element, for example links, images, tables, paragraphs, forms, fields, text boxes, buttons, video, menus, pop-up windows, lists, regions of a webpage or website, margins, and/or any other content that may be presented via the website. The website code may define elements, such that when a web browser executes (or interprets) the element, the object corresponding to the element is presented according to element definition. For example, the website code may include an element (e.g., HTML source code element) for a navigation link (e.g., a corresponding object). The element may be identifiable (e.g., via a parser) as corresponding to a navigation link object by the <a> and </a> tags surrounding the HTML element definition (e.g., as opposed to a different type of object, such as an image). The HTML element definition may include characteristics for presenting the object (e.g., position, format, size, color, shape, accompanying text, highlight, select status), e.g., via the web browser. As another example, the website code may include an HTML source code element to display an image object on the website. The element may be identifiable as corresponding to an image object by the <img src=" . . . "> tag included in the HTML element definition. Thus, to conform the website code to accessibility needs, web elements (e.g., in the website code) corresponding to objects presented by the website, may be identified. It is to be noted that the HTML examples given are intended merely to conceptualize elements and corresponding objects and do not limit the disclosure to any specific implementation. For example, elements may be defined using other languages, such as XML, JavaScript, Java Applets, Java, Objective-J, PHP, Adobe Flash, or any other language or specification for defining elements.

By way of a non-limiting example, FIG. 35A illustrates elements 3504, 3506, 3508 (e.g., HTML image definitions) corresponding to images 3408, 3410, and 3412 (e.g., image objects), respectively, and element 3510 (e.g., HTML link definition) corresponding to link 3416 (e.g., a link object) of website 3404. For example, image 3408 may visually present a testing swab, image 3410 may present a testing strip, and image 3412 may present a vial containing liquid for performing a rapid Covid-19 testing, and link 3416 may allow navigating to a different webpage or website to obtain additional information about Covid-19 testing. A parser configured with a software application executed by processing device 210A (FIG. 2) may scan the website code for website 3404 and identify elements 3504, 3506, 3508 as corresponding to images 3408, 3410, and 3412, respectively, e.g., by the <img src=" . . . "> tag included in the element definition. The parser may additionally identify element 3510 as corresponding to link 3416, e.g., by the <a> and </a> tags included in the element definition. In this manner, processing device 110A may identify multiple elements (e.g., HTML elements) corresponding to multiple object (e.g., images and links) displayed on website 3404.

According to some embodiments, implementing the predefined template includes determining accessibility information for at least some of the multiple objects displayed on the website. The term "accessibility information" may refer to descriptive terms, words, labels, tags, or phrases associated with one or more objects presented by a website. For example, accessibility information associated with visual content, such as an image object, may be used by a screen reader to substitute a visual presentation of the visual content with an audible presentation. The audible presentation of visual content may make a website more accessible, such as visually impaired users, or users who choose to turn off the display of image content, for example due to low communication bandwidth (e.g., to allow a webpage to load faster) or to address other disabilities (e.g., AHDH, epilepsy, seizure). As another example, accessibility information may facilitate in rendering elements that serve a function but are not tagged as such, such as a text displayed as a title but not tagged as a title, or an actionable object (e.g., a clickable button) not tagged as an actionable object, as described earlier. For example, accessibility information may be included in an element as alternative text, for example via the HTML tag "alt." Thus, after identifying elements in the website code corresponding to multiple objects of the website, a parser may further analyze each identified element to determine if accompanying accessibility information is included in the definition for the element.

By way of a non-limiting example, FIG. 35A illustrates an exemplary of implementation for determining accessibility information for objects displayed on a website, consistent with some disclosed embodiments. For example, upon identifying elements 3504, 3506, 3508 and 3510 corresponding to images 3408, 3410, and 3412, and link 3416 respectively, processing device 210A (FIG. 2) may further analyze elements 3504, 3506, 3508 and 3510 to identify any descriptive text include in therein that may be used to determine the accessibility information. For example, elements 3504, 3506, 3508 and 3510 lack alternative text (e.g., as an "alt" tag followed by one or more terms, words, or phrases for recitation by a screen reader). Processing device 210A may thus determine that the accessibility of website 3404 may be improved for use with a screen reader. To remedy this, processing device 110A may determine accessibility information for each of elements 3504, 3506, 3508 and 3510, e.g., to include as alternate text for recitation by the screen reader. The accessibility information may assist user 110A in consuming the content of images 3408, 3410, and 3412, and in navigating to a different website or webpage via link 3416, thereby improving the accessibility of website 3404 for user 110A. Processing device 210A may determine accessibility information using any suitable technique, such as by performing a textual analysis of the website code of website 3404, for example by analyzing source code instructions, metadata, tags, labels, comments, descriptive terms (e.g., for use by a search engine), prominently displayed text, such as headings, links, or titles, and any other textual analysis for determining accessibility information. For example, elements 3504, 3506, 3508 and 3510 include descriptive file names for images 3408, 3410, and 3412, respectively, such as "testing swab" for image 3408 (e.g., illustrating a testing swab), "test strip" for image 3410 (e.g., illustrating a test strip), and "testing vial" for image 3412 (e.g., illustrating a vial containing liquid) that may be used to determine accessibility information. Additionally, or alternatively processing device 210A may retrieve and analyze images 3408, 3410, and 3412 (e.g., via an image processing or pattern recognition algorithm) to determine accessibility information. Additionally, or alternatively processing device 210A may analyze text displayed in proximity to images 3408, 3410, and 3412. Similarly, processor 210A may analyze element 3510 to determine accessibility information for link 3416, such as the name of the icon (e.g., "info-icon") referenced in link 3416, and/or any text displayed in proximity to link 3416.

According to some embodiments, implementing the predefined template includes updating the website code based on the determined accessibility information. The term "updating the website code" may refer to adding, removing, modifying, or otherwise changing the website code. For example, the website code may be updated such that executing (or interpreting) the updated website code (e.g., via a web browser) may produce a different user experience, such as a different rendering or presentation of the content of the website. Thus, the determined accessibility information may be used to modify the website code such that executing (or interpreting) the modified (e.g., updated) website code causes a different rendering of the content of the website to make the website more accessible. For example, executing the updated website code on a computing device configured with a screen reader may produce an audible presentation of visual content that was not producible via the original (e.g., not updated) website code.

By way of a non-limiting example, FIGS. 35A-35B illustrates an exemplary of implementation of updating website code based on the determined accessibility information, consistent with some disclosed embodiments. Upon determining accessibility information for website 3404, for example "testing swab" of element 3504 corresponding to image 3408, "test strip" of element 3506 corresponding to for image 3410, "testing vial" of element 3508 corresponding to image 3412, and "info-icon" of element 3510 corresponding to link 3416, together with prominent keywords, such as "Covid-19" and "testing" appearing twice in title 3418, processing device 210A may update website 3404 based on the determined accessibility information. Thus, processing device 210A may generate alterative text for elements 3504, 3506, 3508 and 3510, (e.g., based on the template) to generate updated elements 3514, 3516, 3518 and 3520, respectively. Thus, updated element 3514 may include alternative text "nasal testing swab for obtaining a test sample" corresponding to image 3408 of a testing swab; updated element 3516 may include alternative text "test strip for determining infection" corresponding to image 3410 of a test strip; updated element 3518 may include alternative text "vial containing liquid for at-home testing" corresponding to image 3412 of a testing vial; and updated element 3520 may include alternative text "Learn more about Covid testing" corresponding to link 3416. According to some embodiments, processing device 210A may store the updated website code at website host 120 such that the updated website code may be subsequently served to multiple users, such as via any of computing devices 170A, 170B, and 170C for users 110A, 110B, and 110C, respectively.

According to some embodiments, processor 210A may navigate (e.g., via a web crawler) to the navigation targeted referenced by link 3416 and similarly update the website code for the navigation target to make the content provided by the navigation target similarly accessible.

According to some embodiments, updating the website code changes an audible presentation of the website via the screen reader on the specific device without impacting simultaneous display of the website content on other computing devices. The term "audible presentation" may refer to a rendering of audio content, e.g., via a speaker. For example, audio content such as sound alerts, music, and speech may be audibly presented to a user via a speaker. As another example, a screen reader may produce an audible presentation of non-audio content (e.g., visual content such as text and images) by reciting alternative text describing the non-audio content via speaker. The term "simultaneous display of the website content on other computing devices" may refer to a concurrent serving (e.g., by a website host) and display (e.g., via a browser application) of the website content on multiple computing devices via a communications network. Thus, multiple computing devices (e.g., located in multiple separate locations) may access the content of the website at the same time, for example by simultaneously retrieving the website code from the website host and executing the website code locally. The term "without impacting the simultaneous display of the website content" may refer to the updated code not affecting a concurrent display of the website content on computing devices not associated with screen reader usage, such that a user viewing the website content on a computing device that has not invoked the screen reader may be indifferent to the updating. Thus, the updated website code may simultaneously execute differently on different devices, depending on screen reader usage. For example, executing the updated website code on a first computing device that has invoked the screen reader (e.g., in response to selecting a Screen Reader profile) may produce an audible presentation of visual content. However, simultaneously executing the updated website code on a second computing device that has not invoked the screen reader may display the visual content and result in a substantially similar user experience as executing the original website code (e.g., before implementing the updates via the template).

By way of a non-limiting example, users 110A and 110B (shown in FIG. 1) may simultaneously request to access the content of website 3404 (shown in FIG. 34). In response to the requests, website host 120 may simultaneously serve via network 140 the updated website code for website 3404 to each of computing devices 170A and 170B (corresponding to users 110A and 1108, respectively), where the updated website code includes updated elements 3514, 3516, 3518 and 3520 corresponding to images 3408, 3410, 3412, and link 3416, respectively. Computing devices 170A and 170B may each simultaneously execute the website code to provide the content of website to users 110A and 1108, respectively. However, user 110A may have selected Screen Reader profile 3406 (e.g., associated with screen reader usage) to invoke a screen reader configured with computing device 170A, whereas user 110B may not have selected any accessibility profile at all, and thus has not invoked a screen reader. A browser configured with computing device 170A may interpret updated elements 3514, 3516, 3518 and 3520 and notify the screen reader of the alternative text included therein. Accordingly, the rendering of website 3404 on computing device 170A may include an audible description via recitation of the alternative text for images 3408, 3410, 3412, and link 3416 to user 110A. However, concurrent with the rendering of website 3404 on computing device 170A (e.g., including the audible presentation of images 3408, 3410, 3412, and link 3416), a browser configured with computing device 170B may execute and/or interpret updated elements 3514, 3516, 3518 and 3520 to display website 3404 with only a visual representation of images 3408, 3410, 3412, and link 3416 in a manner that is substantially similar to the display of images 3408, 3410, 3412, and link 3416 on computing device 170A using the original website code (e.g., before implementing the updates). Thus, user 110B may be indifferent to the updates made to the website code, and the audible presentation of images 3408, 3410, 3412, and link 3416 on computing device 110A may not impact the simultaneous visual presentation of images 3408, 3410, 3412, and link 3416 on computing device 110B.

According to some embodiments, the operations further include using artificial intelligence (AI) to identify in the website code the plurality of elements and applying a plurality of rules for updating the website code. The term "artificial intelligence" may include one or more machine (e.g., computer) processes based on rationality or reasoning. The processes may include reasoned decision making, knowledge representation, planning, learning, natural language processing, perception, and the manipulation of objects (e.g., robotics). AI techniques may include optimization algorithms and heuristics, formal logic, neural networks, statistical and probabilistic methods, and applications from economics, psychology, linguistics, mathematics, and philosophy. The term "rules" may include inference rules, reasoning rules, logical rules, rules targeting optimization, rules targeting efficiency, and any other rules that may facilitate in automating the updating of website code (e.g., via a machine). Thus, AI techniques may be applied to facilitate in identifying the elements of the website code, and additionally to determine rules to automatically modify (e.g., update) the website code to accommodate accessibility needs associated with screen reader usage. In some embodiments, one or more of the AI techniques (e.g., for detecting the elements and/or updating the website code) may be applied by a dedicated computing device, such as an AI server accessible via a network. In some embodiments, one or more of the AI techniques (e.g., for detecting the elements and/or updating the website code) may be applied by a local computing device, e.g., displaying a website to a user.

By way of a non-limiting example, server 133 of accessibility service host 130 (FIG. 1) may include hardware and software for performing AI operations to analyze website code. When user 110A requests to open website 3404 (FIG. 34) on computing device 110A, processor 210A of computing device 110A may notify server 133 of the request via network 140. In response to the notification, server 133 may retrieve the website code of website 3404 from website host 120 via network 140, and perform one or more AI operations to identify elements 3504, 3506, 3508, and 3510 (FIG. 35) of the website code of website 3404. Server 144 may apply one or more rules, such as inference rules, to update the website code and convert elements 3504, 3506, 3508, and 3510 to updated elements 3514, 3516, 3518, and 3520, respectively.

According to some embodiments, the operations further include using image processing and a neural network to identify contextual information reflective of a purpose of each of the plurality of elements and using the contextual information to determine the accessibility information. The term "image processing" may include the application of mathematical convolutions, Fourier transforms, statistical correlations, edge detection, pattern recognition, color analysis, and any other computing technique to analyze digital images. The term "contextual information" may include information relating one or more pixels or clusters of pixels (e.g., a neighborhood of pixels, or a pattern formed by pixels) in a digital image with other pixels or clusters of pixels, either in the same digital image, a different digital image, or in a database of pixel clusters. The relation between the pixels or clusters thereof may be based on spatial and/or spectral (e.g., color) information, statistical correlation, Bayesian dependency, and/or any other technique to determine a relationship 7 between one or more pixels or clusters of pixels. Additionally, or alternatively, the contextual information may include information associated with text displayed prominently in a website, in proximity to one or more images, in the metadata of the website, or any other text that may be associated with images displayed on a website. A "neural network" may refer to a connected mesh (e.g., network) of artificial neurons (e.g., digitally synthesized neuron units) intended to mimic the interconnectivity of neurons in a biological brain (e.g., human or other). The processing performed by the aggregate of the neurons in a neural network may mimic a learning process for artificial intelligence, for example by determining relationships and associations between images, text, and any other content of the website. Thus, visual content (e.g., images) associated with the identified elements of the website code may be retrieved (e.g., via addresses or locations included in the identified elements) and undergo image processing techniques and/or analysis by a neural network to determine contextual information. The contextual information may be used to determine a meaning, objective, or function for each of the elements, for example in conveying the website content for consumption by a user. The contextual information may thus reflect a purpose of each of the identified elements, for example in conveying the website content. The contextual information may be used to determine the accessibility information, e.g., to facilitate the conveying of the website content to users associated with screen reader usage.

By way of a non-limiting example, when upon receiving a request from user 110A (FIG. 1) to open website 3404 (FIG. 34), server 133 (FIG. 1) of accessibility host 130 may retrieve from website host 120 images 3408, 3410, and 3410 referenced via elements 3514, 3516, and 3518, respectively, of the website code for website 3404. Similarly, server 133 may retrieve from website host 120 the icon displayed with link 3416 and referenced by element 3520 of the website code for website 3404. Server 133 may use a neural network and one or more image processing techniques on the retrieved images and icon to identify contextual information. For example, the image processing may associate image 3408 with a testing swab, image 3410 with a test strip, and image 3412 with a vial of liquid (e.g., contextual information). The neural network may determine that images 3408, 3410, and 3412 are intended to illustrate the components included in a rapid test for Covid-19, for example based on a textual analysis of website 3440 (e.g., a purpose of each element). Similarly, image processing may associate the icon of link 3416 with an information sign (e.g., contextual information) and the neural network may determine that the icon of link 3416 navigates to a webpage or website providing additional information about rapid testing for Covid-19 (e.g., the purpose of the element). Server 133 may use the identified contextual information and purpose of the elements to determine accessibility information for each, to allow a screen reader to audibly convey the visual content of images 3408, 3410, 3412 and link 3416 to user 110A.

According to some embodiments, the determined accessibility information includes at least one Accessible Rich Internet Applications (ARIA) attribute for at least one element in the website code. The term "ARIA" may refer to a standardized set of roles, states, or attributes that may be defined to make web content and applications more accessible, e.g., to people with disabilities, as described earlier. Thus, for at least one of the identified elements in the website code, the determined accessibility information may include an attribute that complies with a technical specification associated with an ARIA set of standards. For example, the at least one ARIA attribute includes at least one of a role, a state, or a property for the at least one element in the website code. For example, the ARIA role may define a purpose of a web element (e.g., a checkbox, menu, header, navigation), an ARIA state may define a current mode of an interactive web element (e.g., selected, hidden, highlighted), and an ARIA property may define the relationship of a web element with other web elements of the website (e.g., descendant, labelled by). ARIA attributes may be defined in a standardized manner that may be executed or interpreted uniformly across a variety of browser applications.

By way of a non-limiting example, FIG. 35B illustrates an exemplary implementation of an element in the website code for website 3404 including an ARIA attribute. Updated element 3520 corresponding to link 3516 includes an ARIA attribute for the role of element 3520 as a navigation link (e.g., role="navigation"). A screen reader configured with computing device 170A (FIG. 1) may user the ARIA attribute to audibly present element 3520 to user 110A.

According to some embodiments, the determined accessibility information includes description of images depicted on the website. The term "description of images" may refer to terms, words or expressions that replicate or characterize visual information embedded in an image, for example to allow expressing the visual information via a non-visual medium, such as words expressed by a screen reader, or sounds expressed via a speaker. For example, the description may include colors, sizes, proportions, contexts, and positions of features included in the image (e.g., a large shiny ball held by a small child), and relationships between the different features of the image (e.g., girl picking a flower), actions or movement conveyed in the image (e.g., large furry dog running down a hill), sounds alluded to in the image (e.g., lighting cracking the sky), textures expressed in the image (e.g., ragged rock overhanging a smooth surface of a lake), and any other description that may express visual information of the image using a non-visual media. According to some embodiments, the description of images depicted on the website contains information directed to the blind to thereby describe images in words. For example, the description may tell a story or narrative in words that corresponds to the story or narrative told visually by the image allowing a blind person to understand the information in the image without seeing the image. For example, a web element for an image of a dog jumping to greet a child may include the description "dog jumping to greet child." A blind user wishing to consume the content of the image may receive an audible description of the image via a screen reader reciting the accessibility information added to the web element for the image. As another example, a web element for a navigation link for receiving additional information about dogs may include the description "select this to learn more about dogs." A visually impaired user wishing to learn more about dogs may be assisted in navigating via the link using a screen reader reciting the description added to the web element as accessibility information.

By way of a non-limiting example, elements 3514, 3516, and 3518 of FIG. 35B include the descriptive phrases "nasal testing swab for obtaining a test sample", "test strip for determining infection", and "vial containing liquid for at-home testing", corresponding to images 3408, 3410, and 3412, respectively. User 110A (FIG. 1), who is visually impaired, wishing to consume the visual content of images 3408, 3410, and 3412 may use a screen reader to recite the respective descriptive phrases to consume the visual content as audio content.

According to some embodiments, the determined accessibility information includes screen reader text to assist in performing one or more actions available on the website. For example, a website may include one or more active elements allowing users to interact with the website, such as navigation links (e.g., for navigating to a different location on the webpage or to a different webpage or website), buttons, menus, checkboxes, and fields for providing input to the website or receiving a response from the website, and any other web element allowing to interact with the website. A non-visually impaired user may interact with the website by targeting the position on a computer display where an interactive element is displayed. For example, a button may be selected by touching a touch-sensitive screen at the location where the button is displayed. However, a visually impaired user may face difficulty in locating the element for the purpose of interacting with the website and may thus be assisted by the screen reader for this purpose. Accordingly, the accessibility information may include text directed to the screen reader (e.g., screen reader text) that allows the user to target one or more elements of the website for the purpose of interacting with the website. The screen reader text may be indicated by an "alt" tag. The accessibility information may thus include descriptive words, terms, or phrases to explain the interactive capability for a web element, e.g., to allow visually impaired or blind users to perform one or more actions available on the website, and thereby interact with the website. For example, a website for a clothing outlet may include a button to add a size large cotton sweater to a shopping cart. A visually abled user may add the sweater to her shopping cart by clicking the location of the screen where the button is displayed via an electronic mouse. To assist a visually impaired user who cannot locate the button on the screen, the accessibility information for the button may include screen reader text that causes the screen reader to recite ("if you want to add a size large cotton sweater to your shopping cart, please say YES, otherwise say NO"). When the visually impaired user answers YES (e.g., via a microphone), the sweater may be added to the visually impaired user's shopping cart.

By way of a non-limiting example, element 3520 (FIG. 35B) of the website code for website 3404, corresponding to link 3416 includes the attributes 'alt="Learn more about Covid testing" ', and 'role="navigation". A screen reader assisting user 110A (FIG. 1) to navigate website 3404 may recite the text included inside the 'alt' and 'role' attributes to facilitate user 110A in navigating website 3404.

Figure 36A:
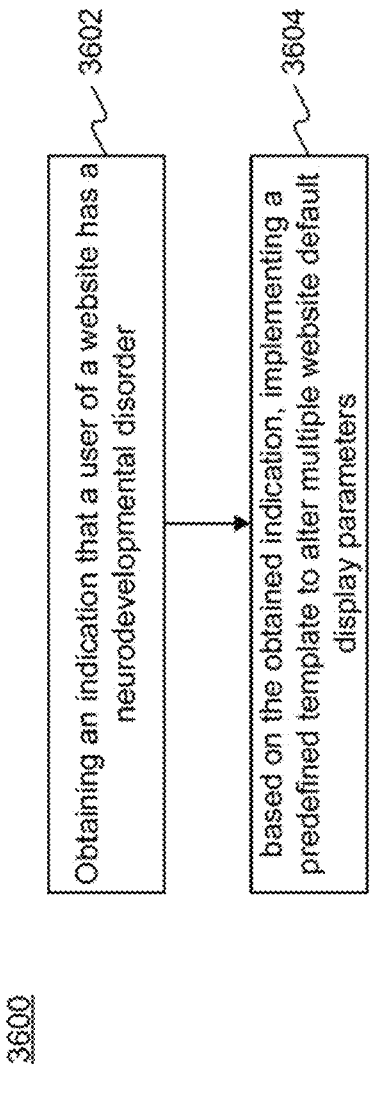
FIG. 36A illustrates a flowchart of a method for altering website code to conform with a screen reader profile, consistent with some embodiments of the present disclosure.
Figure 36B:
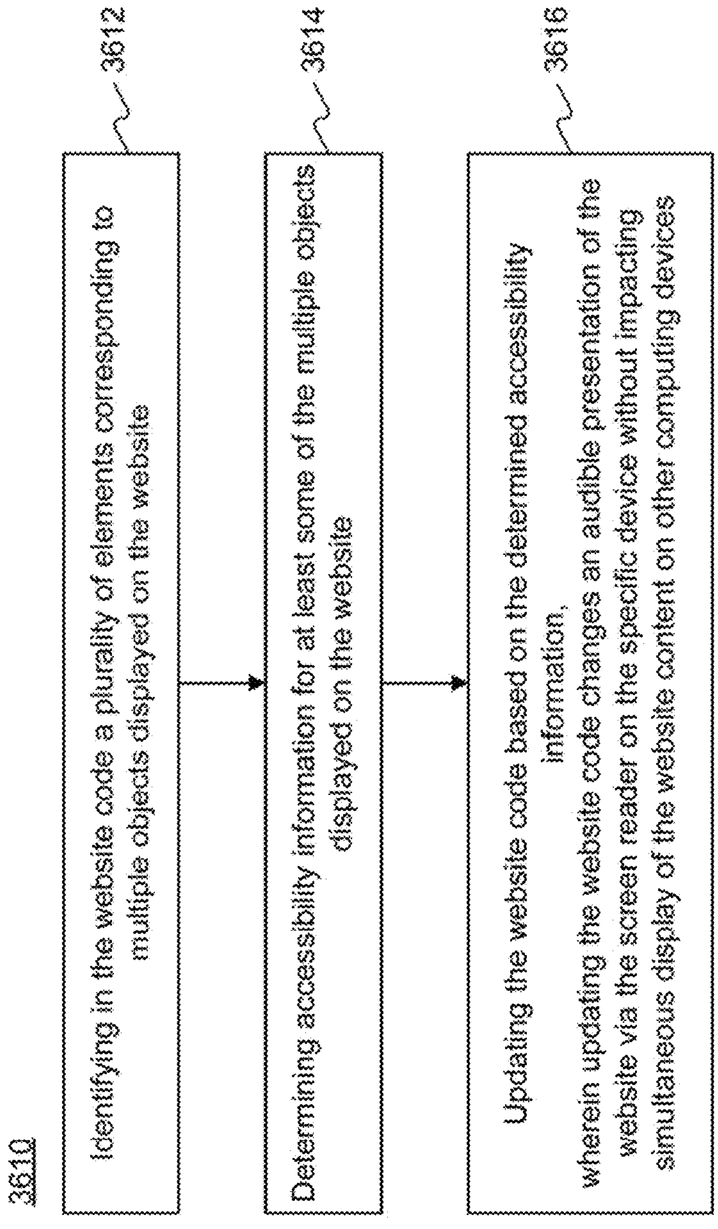
FIG. 36B illustrates a flowchart of an exemplary method of implementing the predefined template for a screen reader profile.

FIGS. 36A-36B, together, illustrates a block diagram of example processes 3600 and 3610, respectively, for altering website code to conform with a screen reader profile, consistent with embodiments of the present disclosure. In some embodiments, processes 3600 and 3610 may be performed by at least one processor (e.g., processing device 210A of computing device 170, shown in FIG. 2) to perform operations or functions described herein. In some embodiments, some aspects of processes 3600 and 3610 may be implemented as software (e.g., program codes or instructions) that are stored in a memory (e.g., memory device 220A of computing device 170, shown in FIG. 2) or a non-transitory computer readable medium. In some embodiments, some aspects of processes 3600 and 3610 may be implemented as hardware (e.g., a specific-purpose circuit). In some embodiments, process 3600 and 3610 may be implemented as a combination of software and hardware.

Referring to FIG. 36A, process 3600 may include a step 3602 where an indication of screen reader usage to navigate and consume website content on a specific device may be obtained. For example, the screen reader usage may be based on invoking a screen reader during a current browsing session, a history of previous screen reader usage (e.g., associated with a specific user and/or a specific device), a search history for screen reader use, a selection of a Screen Reader profile from an accessibility GUI, or any other indication of screen reader usage. The screen reader usage may be associated with a visually impaired user, a visually sensitive user, a blind user, a user having poor reception or low bandwidth, or any other reason for screen reader usage.

For example, and as described earlier, turning to FIG. 34, user 110A (FIG. 1) may select Screen Reader profile 3406 of accessibility GUI 3402 to navigate and consume content of website 3404 displayed via a browser on computing device 170A. An event listener configured with the browser may detect the selection and notify processing device 210A (FIG. 2) of computing device 170A. Processing device 210A may notify server 133 of accessibility host 130 via network 140, thereby obtaining the indication.

Process 3600 may include a step 3604 where, based on the obtained indication, a predefined template may be implemented to make multiple changes to the website code to conform with accessibility needs. For example, the template may be retrieved from a memory associated with an accessibility service host. The template may define updates that may be made to website code in a uniform and universal manner, e.g., to ensure consistent updates across multiple webpages and/or websites. The updates may be defined to accommodate the needs of a disability associated with a specific disability profile (e.g., a Screen Reader profile). In some embodiments, the template may include a directive to apply the template to the website code of any website and/or webpage navigable from the website.

For example, and as described earlier, turning to FIG. 35B, server 133 of accessibility host 130 may retrieve the website code for website 3404 from website host 120 via network 140. Server 133 may implement a predefined template (e.g., stored at data structure 136) to make multiple changes to the website code for website 3404 to conform with accessibility needs, e.g., associated with screen reader usage. For example, server 133 may modify elements 3504, 3506, 3508, and 3510 of the website code for website 3404, corresponding to objects 3408, 3410, 3412 and 3416, respectively, displayed on website 3404, to produce updated elements 3514, 3516, 3518, and 3520, respectively. Updated elements 3514, 3516, 3518, and 3520 still correspond to objects 3408, 3410, 3412 and 3416, respectively displayed on website 3404, and additionally include descriptive text to conform with accessibility needs associated with screen reader usage.

Referring to FIG. 36B, process 3610 may include a step 3612 where implementing the predefined template may include: identifying in the website code a plurality of elements corresponding to multiple objects displayed on the website. For example, a parser may scan the website code (e.g., including metadata, and/or comments embedded therein) of the website, or may scan website code of pages and/or website navigable from the website for words, terms or phrases that may identify elements corresponding to objects. Additionally, or alternatively, techniques such as artificial intelligence, deep learning, machine learning may be applied (e.g., to the website code for the website or another webpage or website navigable from the website) to identify the elements of the website code. For example, a website code definition for a button, a header and a link may be identified by a parser corresponding to button, header and links objects displayed on the website.

For example, and as described earlier, turning to FIG. 35B, implementing the predefine template may cause server 133 of accessibility host 130 (FIG. 1) to analyze the website code for website 3404 and identify elements 3504, 3506, 3508, and 3510, corresponding to objects 3408, 3410, 3412 and 3416, respectively, displayed on website 3404.

Process 3600 may include a step 3614 where implementing the predefined template may include: determining accessibility information for at least some of the multiple objects displayed on the website. For example, a parser may scan the website code of an element identified earlier (e.g., corresponding to an object on the website) or an element related to the element identified earlier, for terms, phrases, or words that may identify accessibility information associated with the object. Additionally, or alternatively, techniques such as artificial intelligence, deep learning, machine learning, image processing (e.g., pattern recognition, edge recognition, clustering) may be applied (e.g., to the website code for the website or another webpage or website navigable from the website) to identify accessibility information associated with the object. For example, an element in the website code for a button may include the text “Learn More about Covid-19” for displaying on the button object on the website, and the text may be used as contextual information. As another example, a button element in the website code may include no descriptive text, but a paragraph element in the website code displayed adjacent to the button may include the text “Learn More about Covid-19”. The text displayed adjacent to the button may be used as contextual information for the button.

For example, and as described earlier, turning to FIG. 35B, implementing the predefine template may cause server 133 of accessibility host 130 (FIG. 1) to determine accessibility information for objects 3408, 3410, 3412 and 3416 displayed on website 3404. The accessibility information may be determined using any suitable technique, such as artificial intelligence, machine learning, digital image processing, and any other technique for determining accessibility information.

Process 3600 may include a step 3616 where implementing the predefined template may include: updating the website code based on the determined accessibility information. Consistent with some embodiments, updating the website code may change an audible presentation of the website via the screen reader on the specific device without impacting simultaneous display of the website content on other computing devices. For example, the updates to the website code may add descriptive text for recitation by a screen reader and/or sounds that may be played by a speaker and thereby change the audible presentation of the website. The updates may be made to the website such that the updates may be relevant only to a screen reader and may be ignored when rendering the website on a computing device that does not have a screen reader invoked or installed thereon. Thus, rendering of the website on a first device with a screen reader may not affect a simultaneous rendering of the website on a second device without a screen reader.

For example, and as described earlier, turning to FIG. 35B, implementing the predefine template may cause server 133 of accessibility host 130 (FIG. 1) to update elements 3504, 3506, 3508, and 3510 of the website code for website 3404 based on the accessibility information determined above, and produce updated elements 3514, 3516, 3518, and 3520 correspond to objects 3408, 3410, 3412 and 3416, respectively, displayed on website 3404. The updated website code for website 3404 may be received via network 140 by computing device 170A (FIG. 1). Computing device 170A may invoke a screen reader in response to user 110A selecting Screen Reader Profile 3406 of accessibility GUI 3402. Processing device 210A (FIG. 2) of computing device 170A may execute the updated website code, including updated elements 3514, 3516, 3518, and 3520, to cause an audible presentation of objects 3408, 3410, 3412 and 3416, respectively, where executing the original website code (e.g., including original elements 3504, 3506, 3508, and 3510) produced only a visual presentation of objects 3408, 3410, 3412 and 3416, respectively. The updated website code thus changes an audible presentation of website 3404 at computing device 170A. Concurrent (e.g., simultaneous) with executing the website code at computing device 170A, computing device 170B may receive the updated code for website 3404 via network 140. Computing device 170A does not have a screen reader installed and/or invoked for presenting website 3404. Thus, executing the updated website code (e.g., including updated elements 3514, 3516, 3518, and 3520) causes a visual presentation of objects 3408, 3410, 3412 and 3416, respectively, that is substantially like the visual presentation of objects 3408, 3410, 3412 and 3416 that would be produced by executing the original (e.g., not updated) website code for website 3404. The updates made to the website code thus do not impact the simultaneous display of the website content (e.g., objects 3408, 3410, 3412 and 3416) on other computing devices (e.g., computing device 170B).

According to some embodiments, updating the website code includes associating the plurality of elements with attributes for enabling interaction with the multiple objects displayed on the website. For example, before updating the website code, an object may be accessible to visually abled users who may interact with the object by selecting the object upon locating the object displayed on the website. However, the object may not be accessible to users who have difficulty locating the object (e.g., blind or visually impaired users, photo sensitive users, users with poor reception or bandwidth), and thus may not be able to interact with the object. Updating the website code may add text and/or sounds as attributes to the element associated with the object. A screen reader may recite the text and a speaker may play the sound, allowing such users to interact with the object.

For example, and as described earlier, turning to FIG. 35B, updated elements 3514, 3516, 3518, and 3520 of the website code for website 3404 include attributes with descriptive text that may be audibly presented to user 110A (FIG. 1) by a screen reader. Consequently, user 110A, who is visually impaired, may interact with corresponding images 3408, 3410, 3412 and link 3416 displayed on website 3404.

According to some embodiments, an interaction with at least one of the multiple objects displayed on the website includes navigating to the at least one object and providing an audible description of the at least one object. For example, a screen reader may audibly describe a website to a user by reciting text descripting of each object of the website. For example, the screen reader may advance through a plurality of objects of a website by navigating a tree (e.g., a DOM tree) defining a hierarchy for the objects of the website, to ensure that each object is audibly described to the user.

For example, and as described earlier, turning to FIG. 35B, a screen reader configured with computing device 170A (FIG. 1) may sequentially focus on each of images 3408, 3410, 3412 and link 3416 (e.g., navigate to each object) and audibly describe images 3408, 3410, 3412 and link 3416 to user 110A based on the accessibility information added to updated elements 3514, 3516, 3518, and 3520, respectively.

According to some embodiments, an interaction with at least one of the multiple objects displayed on the website includes executing a function associating with the at least one object. For example, some objects may cause actions to be performed upon selecting the object (e.g., playing a song, or adding an item to a shopping cart). The actions may be defined as functions inside the website code, such that selecting the object causes the corresponding function (e.g., to play the song or to add the item to the shopping cart) to be executed.

For example, and as described earlier, turning to FIG. 35B, upon hearing the audible description for link 3416, user 110A (FIG. 1) may select link 3416 (e.g., via a voice command) and navigate to another webpage providing additional information on testing for Covid-19, thereby interacting with link 3416 by executing a navigation function associated with link 3416.

According to some embodiments, the determined attributes enable the user to interact with the multiple objects displayed on the website using predefined keystrokes. For example, the updates to the website code may add attributes to objects to accommodate the website for use with a non-visual interface with as a braille keyboard. For example, a first keystroke sequence may be defined to play a song and a second keystroke sequence may be defined to halt the playing of the song.

For example, and as described earlier, turning to FIG. 35B, user 110A (FIG. 1) may have access to a braille keyboard configured with input interface 240 of computing device 170A. Upon executing the updated website code for website 3404, a screen reader configured with computing device 170A may audibly present the description for images 3408, 3410, and 3412 (e.g., included in the "alt" attributes) and the description for link 3416 (e.g., included in the "alt" and "role" attributes). User 110A may use a first predefined keystroke on the braille keyboard to cause the screen reader to repeat the audio presentation of images 3408, 3410, and 3412, and may user a second predefined keystroke on the braille keyboard to navigate via link 3416.

According to some embodiments, the attributes enable the user to interact with the multiple objects displayed on the website using predefined hand gestures. For example, for example, the updates to the website code may add attributes to objects to accommodate the website code for use with a non-visual interface such as gesture recognition software operative with a camera. For example, a first hand gesture may be defined to navigate to the bottom of the website and a second hand gesture may be defined to return to the top of the website.

For example, and as described earlier, turning to FIG. 35B, computer 170A (FIG. 1) may be configured with a camera and gesture recognition software integrated with input interface 240 of computing device 170A. Upon executing the updated website code for website 3404, a screen reader configured with computing device 170A may audibly present the description for images 3408, 3410, and 3412 (e.g., included in the "alt" attributes) and the description for link 3416 (e.g., included in the "alt" and "role" attributes). User 110A may use a first hand gesture to cause the screen reader to repeat the audio presentation of images 3408, 3410, and 3412, and may use a second hand gesture to navigate via link 3416.

A user with disabilities may search for information using a search engine and receive results tailored to the user's specific disabilities. The search results may include one or more websites and the websites may be categorized based on a level of accessibility of the websites. The search results may be presented to the user based on the categorization that accounts for the level of accessibility. For example, websites that may be more accessible may be displayed at the top of the list of search results, while websites that may be less accessible may be displayed towards the bottom of the list of search results.

Some disclosed embodiments involve providing search results to client-side computing devices. A client may create a search on a computing device to obtain an output. A client may create a search query by providing a term to a search engine to obtain results related to that term. A term may be a single word or a string of words. Search results may include a list, catalog, index, table, or any other type of output created by search engines in response to the term. For example, a client may provide the term "restaurant" to a search engine. In response, the search engine may provide a list of restaurants to the client. A search engine may be a program that searches for and identifies items in a database that correspond to keywords or characters specified by the client. For example, a search engine may be Google, Yahoo!, Bing, or any other type of program capable of searching for information in response to a search query. A search engine may display results on a client-side computing device. A client-side computing device may include a computing device used by the client. A client may be a user of a search engine or any other person. A client-side computing device may include a laptop, tablet, phone, desktop computer, hand-held computer, smartphone, smartwatch, smart glasses, or any other type of computing device capable of receiving a search query and performing a search using a search engine.

Some disclosed embodiments involve receiving information categorizing a plurality of websites. Search results may include an output, for example, a list of websites, a link to a list of websites, and/or text defining a category of websites. The websites may be grouped or categorized together based on information associated with or included in the websites. The information may include, for example, text, images, sounds, audio, videos, or other types of digital content present on a website. Each website from the plurality of websites may be assigned a category based on the information associated with or included in the website. It is also contemplated that some websites may be included in more than one grouping and, therefore, may be assigned more than one category. The information categorizing a plurality of websites may be received by a client-side computing device, a host computer, a server, a network, or any other type of device used to receive information. Such information may be received from a website, a server, a network, a computer, or any other type of device used to send information.

By way of example, websites including audio information may be grouped together and may be assigned a category "audio." As another example, websites including color may be grouped together and may be assigned a category "color." As another example, websites including videos may be grouped together and may be assigned a category "video." By way of another example, a website that includes audio information and color images may be included in the group of websites that have audio and also in the group of websites that have color images. In this case, the website that includes audio information and color images may be assigned two categories "audio" and "color." In some exemplary embodiments, the list of websites may be ranked based on the information. For example, websites with audio may be ranked higher than websites with text. In some exemplary embodiments, websites may be categorized alphabetically, in chronological order, by popularity, or by any other type of organization method. By way of another example, websites may be categorized by subject matter. For example, in response to a search request for "shoes," shoe vendors may be grouped together in a shoe shopping group, and shoe manufacturers may be grouped separately in a manufacturers group. Similarly, a "shoe" search may result in separate groupings for men's, women's, and children's shoes.

Some disclosed embodiments involve storing in at least one data structure the information categorizing the plurality of websites. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, a data structure may be owned or operated by the same or different entities. Thus, the term "data structure" as used herein in the singular is inclusive of plural data structures.

The stored data may relate to websites and the websites may be categorized based on the stored information, as discussed above. For example, a link to each website may be stored in the data structure in association with the one or more categories assigned to that website. It is contemplated that other methods of associating the categories with the respective websites (e.g., relational tables, or linked tables) may be employed when storing the information categorizing the plurality of websites. It is also contemplated that in some embodiments the list of websites may be indexed using the one or more categories as a way of storing the information categorizing the plurality of websites.

Some disclosed embodiments involve receiving information indicating a level of accessibility for each of the plurality of websites. A level of accessibility may refer to a degree to which a website address needs of persons with disabilities. For example, if a website only addresses some disabilities, the level of accessibility might be indicated as low. If a website addresses all common disabilities, the degree of accessibility might be indicated as high. Similarly, within particular disabilities, access levels can range. Websites with more effective tools for addressing a particular disability may receive a ranking level higher than those with lesser effective tools. A ranking system for a level of accessibility may be based on discrete levels of accessibility (e.g., low, mid-low, medium, mid-high, high), or may be based on a continuous ranking (e.g., scale of 1-10). Information indicating a level of accessibility may be received in a data structure, as described earlier. The information may be derived through manual or automated reviews of the websites.

By way of more specific non-limiting examples, certain websites may be easier to navigate relative to other websites, particularly for users with disabilities. A website may be deemed accessible if all types of users (e.g., those with disability and those without disability) can navigate and use the website. Additionally, or alternatively, a website may be deemed partially accessible if only some types of users can navigate and use the website. Additionally, or alternatively, a website may not be accessible at all if no users can navigate or use the website. Websites may have different levels of accessibility based on what types of users can navigate and use a website. For example, a website that may be useable by all types of users may have a high level of accessibility. As another example, a website that may be usable by only some type of users may have a medium level of accessibility. As another example, a website that may not be usable by any user may have no level of accessibility. Information relating to a website may include the level of accessibility of the website. Information relating to the level of accessibility of a website may be received by a client-side computing device from a website. The client-side computing device may use machine learning models to determine what type of information may be available on a website to determine the level of accessibility. For example, a machine learning model may determine that a website contains audio. The model may determine that the presence of audio indicates the website is accessible to visually impaired users. As another example, a client-side computing device may use algorithms to determine the level of accessibility. For example, an algorithm may determine that a website contains contrasting colors. The algorithm may determine that the presence of contrasting colors indicates the website is accessible to colorblind users. Alternatively, or additionally, a separate computing device may contain a machine learning model or algorithm to determine the level of accessibility of a website and the separate computing device may transmit the information to a client-side computing device.

In some embodiments, the level of accessibility is reflective of whether each website is disability accessible or disability non-accessible. As discussed previously, a correlation may exist between the level of accessibility assigned to a website and the actual accessibility of the website. Thus, the level of accessibility may be said to reflect whether a website is disability accessible or disability non-accessible. A website that is disability accessible may be coded to include features making it accessible to a user with a particular disability or to different users with differing disabilities. For example, a website may be coded such that it includes a font type that individuals with cognitive disabilities find it easy to read and a font size that individuals with visual impairment find it easy to read. In general, a disability accessible website is one that follows a web accessibility standard (e.g., WCAG 2.1). A website that is disability non-accessible may be coded in a manner that it lacks features that may make it accessible to a user having any disability A level of accessibility may describe whether the website is accessible to users with disabilities. Users with disabilities may be unable to navigate certain websites based on the nature of the disability. For example, a user with epilepsy may be unable to navigate a website with flashing colors. As another example, a user who is visually impaired may be unable to navigate a website that does not contain any audio. As another example, a user who is colorblind may be unable to navigate a website with certain colors. A website with a high level of accessibility may be accessible to users with different types of disabilities. An accessible website may be one that complies with a web standard (e.g., Web Content Accessibility Guidelines (WCAG) 2.1). For example, a website that provides visual and audio cues may have a high level of accessibility since a user who is visually impaired and a user who is hearing impaired may be able to navigate the website. Therefore, the website may be disability accessible. As another example, a website that provides only text content may have a low level of accessibility since a user who is visually impaired may not be able to navigate the website. Therefore, the website may be disability non-accessible.

In some embodiments, the level of accessibility includes a composite score associated with a disability accessibility compliancy ranking. A website may be ranked based on a plurality of criteria to determine how accessible a website is to user's with different disabilities. A score may be assigned to the website for each of the criteria on which the website is evaluated. A composite score may be determined for the website based on the individual scores assigned for the different criteria. The criteria may include, for example, how many different types of users can navigate the website, how many different types of disabilities the website accommodates, how many colors the website uses, how many audio cues the website uses, or any other type of criteria that determines how well the website accommodates one or more types of disability. A composite score may use all, some, or one of these criterion to determine which websites are the most accessible. A composite score may be calculated as a sum, an average, a median, a maximum, or minimum value, or some other statistical or mathematical calculation. For example, a website that is accessible to visually impaired users may have a medium composite score, while a website that is accessibly to visually and hearing-impaired users may have a high composite score. A composite score may relate to a disability accessibility compliancy ranking. A disability accessibility compliancy ranking may indicate how many different users with different types of disabilities are able to navigate a website. A disability accessibility compliancy ranking may be determined by a web standard, such as WCAG. For example, a WCAG Level A ranking may be given to websites that use color. As another example, a WCAG Level AA ranking may be given to websites that uses color and has contrast between the colors used. A composite score may be determined based off the criteria described above and/or a disability compliancy ranking.

Some disclosed embodiments involve storing in the at least one data structure the information indicating the level of accessibility. Information related to the level of accessibility of a website may be received and stored in a data structure in order to retrieve the information at a later time. The information may be a composite score, disability compliancy ranking, a level of accessibility or any other type of information. The information may be stored in a table, as an index, in association with the website, as a link, in a lookup table, or by another other storage means.

Some disclosed embodiments involve receiving a search query from a particular client-side computing device. As defined above, a client may use a computing device to create a search. A search may use a search query. A search query may include a phrase or keyword combination a user may enter into a search engine provided by the client-side computing device. A search query may include a single word or a group of words. Additionally, or alternatively, a search query may include numbers, marks, symbols, images, or any other type of character. A client may enter a search query into a client-side computing device in order to obtain search results. Thus, for example, the search query may be received at a server from the client-side device. The search query may be received over a network, such as the internet. Alternatively, the search query may be received on the client-side following user input on the client side. In this alternative, processing of the query, on whole or in part may occur on the client side.

Some disclosed embodiments involve performing a look up in the data structure for websites associated with the search query. Performing a look up may involve using the search query to interrogate a data structure. As discussed, in some disclosed embodiments the data structure stores information related to websites. When a user enters a search query, the query term or terms may be compared to stored information to find websites that are associated with the search query. Websites that are associated with the search query may include websites that contain the exact word, that contain words used in the search query, that use similar words to the search query, or that are otherwise associable with the search query (e.g., artificial intelligence may associate with certain combinations of words). Additionally, or alternatively, websites that are associated with the search query may include websites that contain portions of the word or words used in the search query, or some combination of the words used in the search query. In some embodiments, the search engine may also search for websites based on synonyms or other words related to the word or words in the search query. For example, a user may search for "restaurants." In response to the search query, the search engine may retrieve, from the data structure, a list of websites that contain information about restaurants. As another example, a user may search for "doctors near me." In response to the search query, the search engine may retrieve, from the data structure, a list of websites that contain information about doctors near the user's location.

Some disclosed embodiments involve presenting on the particular client-side computing device website search results, wherein the website search results include links to websites matching the search query and wherein the website search results are presented in a preferential manner that takes into account the level of accessibility of the plurality of websites. Presenting may include sending electronic signals to the client-side computing device to cause an associated presentation on a display associated with the client-side computing device. For example, signals sent to a client-side computing device may result in display of website search results relating to the search query. Websites that may be associated with the search query, as described above, may be presented as website search results. The website search results may display the websites in a horizontal list, a vertical list, a numbered list, a bulleted list, a cloud, or any other type of display format capable of displaying an ordered or ranked set of search results. The list may include links to the websites. A link may be an HTML object that allows a user to click on the object and be taken to a website associated with the link. A link may include words, numbers, characters, or other types of symbols. Within the list, the search results may be presented in a specific order based on the level of accessibility of the website. For example, a website that may have a high level of accessibility may be higher up on the list than a website that has a low level of accessibility. As another example, a website that may be accessible to a visually and hearing-impaired user may be higher up on the list than a website that is only accessible to visually impaired users. It is also contemplated that in addition to the position of the website in the list, a website having a higher level of accessibility may be displayed in larger font size, in a different color, with highlighting, or with other visual or audio cues to indicate that the website has a higher level of accessibility relative to other websites in the search results.

Figure 37:
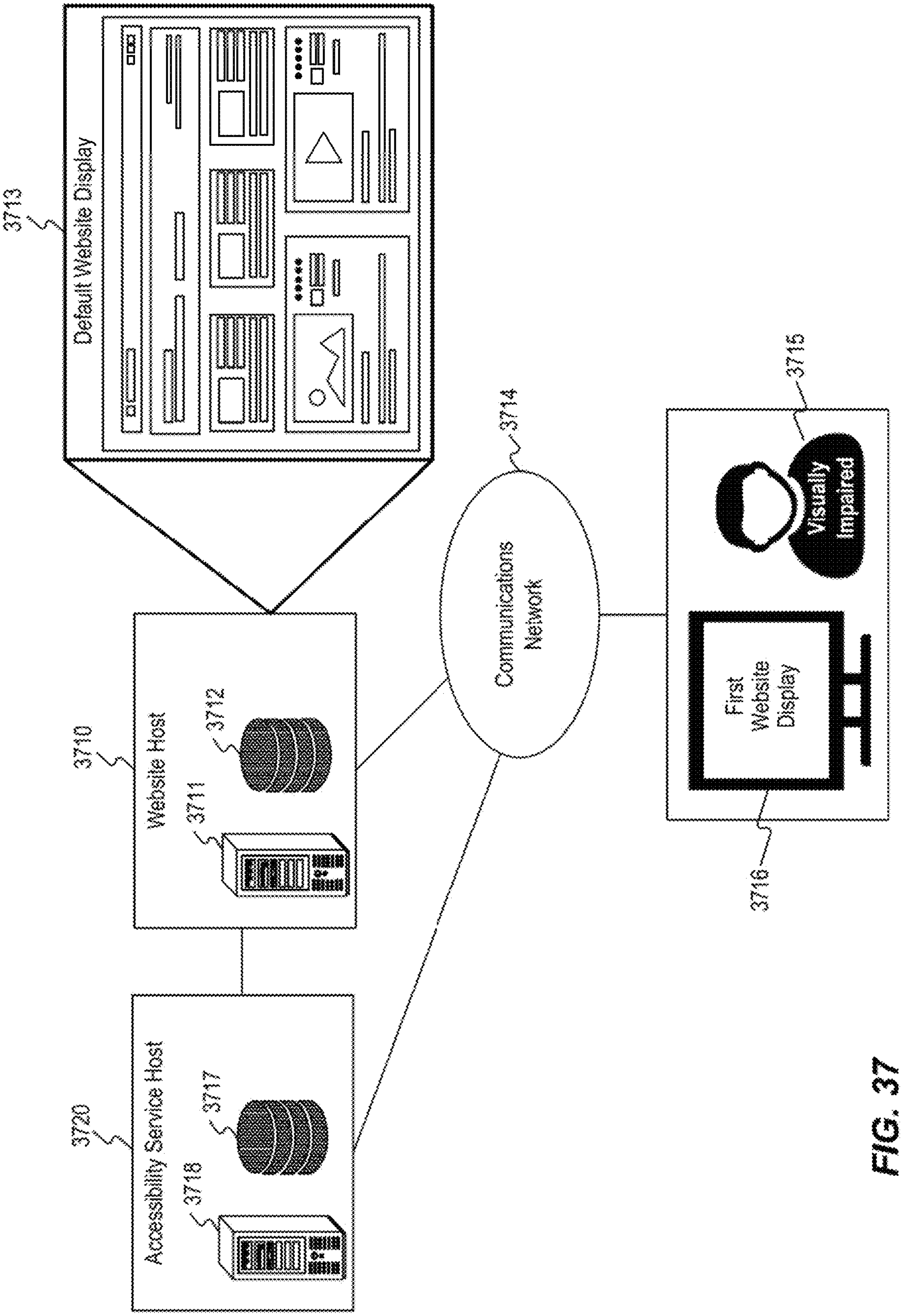
FIG. 37 illustrates an example of a visually impaired user performing a search query and an accessible website being displayed to the user, consistent with some embodiments of the present disclosure.

By way of example, FIG. 37 illustrates an example of a visually impaired user performing a search query and an accessible website being displayed to the user. For example, as illustrated in FIG. 37, system 3720 may include a website host 3710 communicating with an accessibility service host 3719 over communications network 3714. The accessibility service host 3719 and the website host may include servers 3718 and 3711 and data structures 3717 and 3712. The accessibility service host 3719 may obtain default website display 3713 from website host 3710 and store default website display 3713 in data structure 3717. A visually impaired user 3715 may run a search query on client-side computing deice 3716. Accessibility service host 3719 may perform a look up in data structure 3717 for default website displays 3713 associated with the search query. Accessibility service host 3719 may determine which default website displays 3713 may be accessible to visually impaired user 3715. Accessibility service host 3719 may communicate only default website displays 3713 that are also visually impaired accessible websites to client-side computing device 3716, based on the user's disability.

In some embodiments, presenting the website search results in a preferential manner includes providing an indication of website search results associated with disability accessible websites. Accessible websites responsive to the search query may be presented in a specific way. The preferential manner may include an indication that shows the website is disability accessible. The indication may include a position, color, tag, presentation format, order, notation, audible indication, visual indication, or any other types of indication to distinguish a website that is disability accessible from websites that are disability accessible to a smaller degree or not at all. Disability non-accessible websites may not include an indication. Providing such an indication may allow a user to determine which websites are disability accessible and which websites are disability non-accessible. Providing an indication may include displaying the indication on a presentation on a display associated with the client-side computing device. For example, a disability accessible website may be positioned near the top of the search result display, while a disability non-accessible website may be positioned towards the bottom of the search result display. As another example, a disability accessible website may include a check-mark tag, while a disability non-accessible website may include an "x" tag.

In some embodiments, providing an indication includes presenting visual indicators associated with first website search results identifying accessible websites, the visual indicators distinguishing the first website search results from second website search results identifying non-accessible websites. In some embodiments, the indication described above may include a visual indicator. A visual indicator may include color, text, position, icons, or any other type of visual marker. In some embodiments, a visual indicator may only be associated with accessible websites. The search results described above may include disability accessible and disability non-accessible websites. The accessible websites may be presented as a group of first search results and the non-accessible websites may be presented as a group of second search results so a user may be able to differentiate between accessible and non-accessible websites. For example, disability accessible websites may be grouped into first website search results and disability non-accessible websites may be grouped into second website search results. A visual indicator may be used to distinguish the accessible websites from the non-accessible websites. For example, accessible websites may be colored blue and non-accessible websites may be colored black. As another example, accessible websites may be in 20 pt. font while non-accessible websites may be in 12 pt. font.

In some embodiments, presenting the website search results in a preferential manner includes ordering the website search results based at least in part on the level of accessibility of the plurality of websites. Website search results may be displayed to a user in many different ways. A preferential manner may include listing the websites based on the websites level of accessibility. A website with a higher level of accessibility may be listed higher (e.g., near a top of the list of websites) than a website with a lower level of accessibility. For example, a website with visual and audio cues may be ordered higher (e.g., near a top of the list of websites) than a website with only visual cues. As another example, a website with visual cues may be ordered higher (e.g., near a top of the list of websites) than a website with no cues.

In some embodiments, ordering the website search results includes prioritizing website search results associated with accessible websites such that first website search results associated with accessible websites are presented ahead of second website search results associated with non-accessible websites. As described above, accessible websites may be presented as a group of first search results and the non-accessible websites may be presented as a group of second search results. The search results may be presented as a list, such as a numbered, ordered, bulleted, alphabetical, or any other type of list or presentation style. The first group of website search results (e.g., results including disability accessible websites) may be presented before the second group of website search results (e.g., results including disability non-accessible websites). For example, the search results may be presented as a numbered list and the first group of search results may be identified with numbers that are smaller while the second group of search results may be identified with numbers that are larger than the numbers used to identify the first group of search results. As another example, the search results may be presented as a bulleted list and the first search results may appear above the second search results.

In some embodiments, presenting the website search results in a preferential manner includes presenting, in an accessible manner, first website search results associated with accessible websites and second website search results associated with non-accessible websites. Website search results may also be provided to a user in an accessible manner. An accessible manner may be a manner that complies with a web standard, e.g., Web Content Accessibility Guidelines (WCAG) 2.1. Providing search results in an accessible manner may include providing audio, providing color contrast, providing sign language interpretation for audio or video content, removing flashing visual media, or by using other types of accessible means for displaying the websites or the links to the websites. For example, a user may be visually impaired, and the website search results may be displayed with audio options for the user to be read the search results. As another example, a user may be color blind, and the website search results may be displayed with a color contrast.

In some embodiments, in response to an indication that a user is visually impaired, presenting website search results in an accessible manner includes providing an audible presentation of text descriptive of the website search results and providing an audible presentation of textual description of an image associated with the website search results. A user may indicate that they have a certain disability by clicking a button, using specific presentation styles, using a profile associated with their account, or by other means. A response may include the presentation of the website search results changing based on the indication. For example, a user may click a button that says "Visual" to indicate the user is visually impaired. As another example, a user may enlarge the text of a page to indicate the user is visually impaired. As another example, a user may indicate in their profile that they are hearing impaired. The website search results may be displayed in an accessible manner based on the indication.

For example, the user may indicate they are visually impaired, and the website search results may include a way for the text of the results to be presented audibly. Website search results may include images, text, colors, or other visual elements. Accessible search results may include an audio presentation of the images, text, color, or other visual elements of the search results.

Some embodiments include determining that a user of the particular client-side computing device is associated with a particular disability, and wherein presenting the website search results emphasizes websites with accessibility conforming to the particular disability. Determining may include deciding that a user of a client-side computing device may have a disability. For example, a user may be visually impaired, hearing impaired, have epilepsy, or may have another type of disability. A particular disability of a user may be determined, as described below, based on a user profile, the type of search engine the user selects, the search query the user performs, the type of software the user utilizes, or through other means. Certain websites may be more accessible to users with a specific disability. For example, a website having enlarged text may be accessible to a visually impaired user. As another example, a website having contrasting colors may be accessible to a colorblind user. As another example, a website may have audio and may be accessible to a visually impaired user but not accessible to a hearing-impaired user. A user may run a search query and the website search results may be ranked based on the user's disability. For example, the website search results may display websites that are accessible to a colorblind person if a user is colorblind. As another example, the website search results may display websites that are accessible to a visually impaired person if the user is visually impaired.

In some embodiments, the determination that the user is associated with a particular disability is based on a user profile stored in memory. A user of a client-side computing device may create a profile on the device that may be stored in the memory of the device. The profile may include information such as a name of the user, a disability of the user, website preferences of the user, or any other user information. A user may run a search query and the website search results may be displayed to the user based on the disability information stored in the user's profile. For example, a user may indicate in their profile that the user is visually impaired. Based on the user profile, instead of presenting all the websites in the website search results, only websites that are accessible to visually impaired users may be presented to the user.

In some embodiments, the determination that the user is associated with a particular disability is based on the search query. A user of a client-side computing device may run a search query that indicates the user's disability. The search query may indicate the user's disability based on the term or terms the user uses in the search query. For example, a user may search for "car dealership hearing impaired" indicating that the user is hearing impaired. Based on the search query, instead of presenting all the websites associated with the terms car dealership, only car dealership websites that are accessible to hearing impaired users may be presented to the user. As another example, a user may search for "eye doctors near me," indicating that the user is visually impaired. Based on the search query, instead of presenting all the websites in the website search results, only websites that are accessible to visually impaired users may be presented to the user In some embodiments, the determination that the user is associated with a particular disability is based on a user selection to invoke a dedicated accessible search engine. A user using a client-side computing device to run a search query may have the option to pick from different search engines. For example, a user may run a search on Google, Yahoo!, Bing, accessFind, or any other type of search engine. Some search engines may be disability accessible. A user may choose to run a search on a search engine that is disability accessible. The user's selection may indicate that the user has a particular disability. For example, a user may select the search engine accessFind to run a search query. Selection of the accessFind search engine may indicate that the user wishes to search for only visually impaired accessible websites. Selection of the accessFind search engine may indicate that the user is visually impaired.

In some embodiments, the determination that the user is associated with a particular disability is based on detection of software running on the particular client-side computing device. A user may use software to aid in creating a search query. Software may include speech to text, text to speech, screen reader, accessibility browser extension, keyboard and mouse alternatives, screen magnification, optical character recognition, braille display, eye tracking, or other types of software. The type of software used to generate the search query may indicate the disability of a user. For example, a user may use a speech to text software to generate the search query. Use of the speech to text software may indicate the user is visually impaired. As another example, the user may use a screen reader to generate the search query. Use of the screen reader may indicate the user is hearing impaired.

Some embodiments include obtaining an indication that a user of the particular client-side computing device has a particular disability; and presenting the website search results in a preferential manner that addresses the particular disability. Obtaining may include receiving an indication that a user may have a specific disability. The website search results may be presented to the user in a manner that takes into account that disability. For example, a user may be visually impaired, and the website search results may be presented in a manner that lists the visually impaired accessible websites above non-visually impaired accessible websites. A website that includes a text to audio converter may be a visually impaired accessible website and may be listed higher than a website that does not include a text to audio converter. As another example, a user may be hearing impaired, and the website search results may be presented in a manner that lists the hearing-impaired accessible websites above non-hearing impaired accessible websites. A website that includes images may be a hearing-impaired accessible website and may be listed higher than a website that does not include images.

In some embodiments, the indication that the user of particular client-side computing device has a particular disability is based on an input from an accessibility graphical user interface (GUI). Input from an accessibility GUI may include text, sounds, speech, hand gestures, body gestures, or tactile information. An input from an accessibility GUI may correlate to a particular disability. For example, a user may provide an input by clicking on a speaker icon for the text to be converted to audio. The input may indicate that the user is visually impaired, and the website search results may be presented in a manner that lists the visually impaired accessible websites above non-visually impaired accessible websites. A website that contains audio may be a visually impaired accessible website and may be listed higher than a website that does not contain audio. As another example, a user may provide an input by clicking on an option to change the color of the text. The input may indicate that the user is color blind, and the website search results may be presented in a manner that lists the colorblind accessible websites above non-colorblind accessible websites. A website that includes contrasting colors may be a hearing-impaired accessible website and may be listed higher than a website that does not include contrasting colors.

Figure 38:
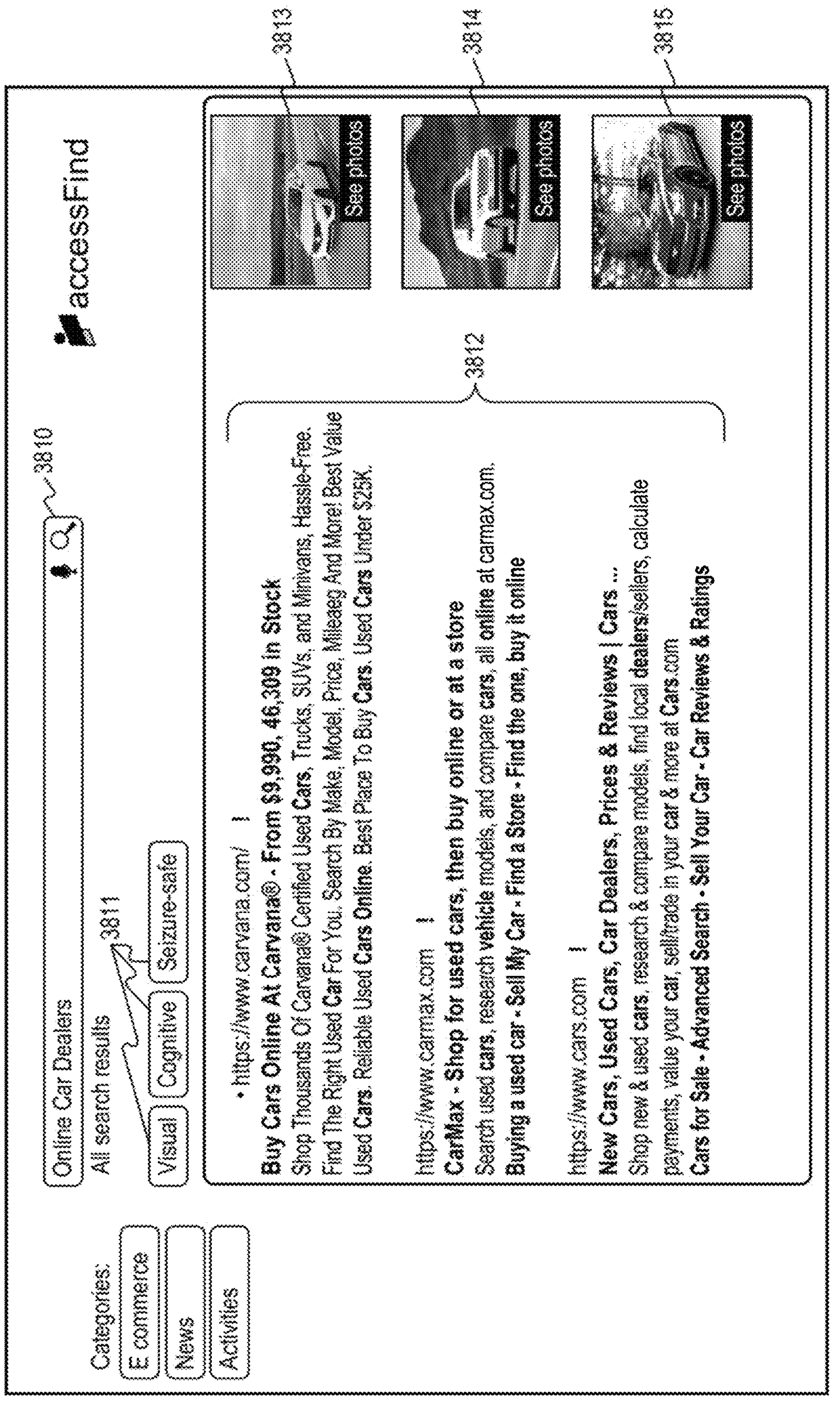
FIG. 38 illustrates an example of website search results with an input option for a user to indicate that the user has a particular disability, consistent with some embodiments of the present disclosure.

By way of example, FIG. 38 illustrates an example of website search results with an input option for a user to indicate that the user has a particular disability. As illustrated in FIG. 38, a user may enter terms into a search query box 3810. For example, a user may enter the search query “Online Car Dealers” in the search query box 3810. In response to the search query, website search results 3812 may be presented to a user with associated images 3813-3815. For example, as illustrated in FIG. 38, the website search results 3812 may include a listing of car dealers in response to the search query “Online Car Dealers.” The results may also be accompanied by images of cars as shown in images 3813-3815. A user may use an input 3811 to indicate the user has a particular disability. In response, the website search results 3812 may be presented to the user based on the indication. For example, if the user selects “Visual”, the website search results may be rearranged so only websites that may be accessible by a visually impaired user may be presented.

In some embodiments, presenting the website search results in a preferential manner that addresses the particular disability includes presenting the website search results in a format addressing the particular disability by altering default display parameters to conform with an accessibility profile associated with the particular disability. An accessibility profile may include information on a particular disability of a user. Website search results may be displayed, using default display parameters, to a user who does not have an accessibility profile. In some embodiments, when a user has an associated accessibility profile, the display parameters may be adjusted based on the user’s associated accessibility profile. By way of example, display parameters of website search results may include color, text, images, sound, size, or any other parameter. For example, a user may have a seizure safe accessibility profile and the display parameters of the website search results may be adjusted to exclude flashing lights and/or videos. As another example, a user may have a vision impaired profile and the display parameters of the website search results may be adjusted to play audio of the text of the search results.

In some embodiments, presenting the website search results in a preferential manner that addresses the particular disability includes displaying first search results of websites accessible to the particular disability and omitting second search results of websites non-accessible to the particular disability. For example, a user may enter term or terms in a search query and multiple websites may match the search results. A user who may have a particular disability may only wish to view the website search results that include websites accessible to that particular disability. The website search results may be displayed to the user so only the websites that are accessible to the user’s disability are displayed to the user. For example, a user may be visually impaired. A user may run a search, and only websites that are accessible to visually impaired users may be presented to the user. Websites that are presented to the user may include websites with audio. As another example, a user may be colorblind. A user may run a search, and only websites that are accessible to colorblind users may be presented to the user. Websites that are presented to the user may include websites having content in contrasting colors.

In some embodiments, presenting the website search results in a preferential manner includes presenting website search results of accessible websites ahead of website search results of non-accessible websites. For example, a user may enter term or terms in a search query and multiple websites may match the search results. A user who may have a particular disability may wish to view website search results that include websites accessible to the particular disability before viewing websites that are not accessibly to the particular disability. The website search results obtained in response to the search query may be displayed to the user, so the accessible websites are presented before (e.g., nearer the top of the list of websites) the non-accessible websites. For example, a user may be visually impaired. A user may run a search, and websites that are accessible to visually impaired users may be presented to the user ahead of websites that are non-accessible to visually impaired users. For example, the search may contain ten websites. Four of those websites may be accessible to visually impaired users. The four websites that may be accessible to visually impaired users may be shown ahead of the remaining six websites that are not accessible to visually impaired users. As another example, a user may be colorblind. A user may run a search, and websites that are accessible to colorblind users may be presented to the user ahead of websites that are non-accessible to colorblind users. For example, the search may contain five websites. Three of those websites may be accessible to colorblind users. The three websites that may be accessible to colorblind users may be shown ahead of the remaining two websites that are not accessible to colorblind users.

Figure 39:
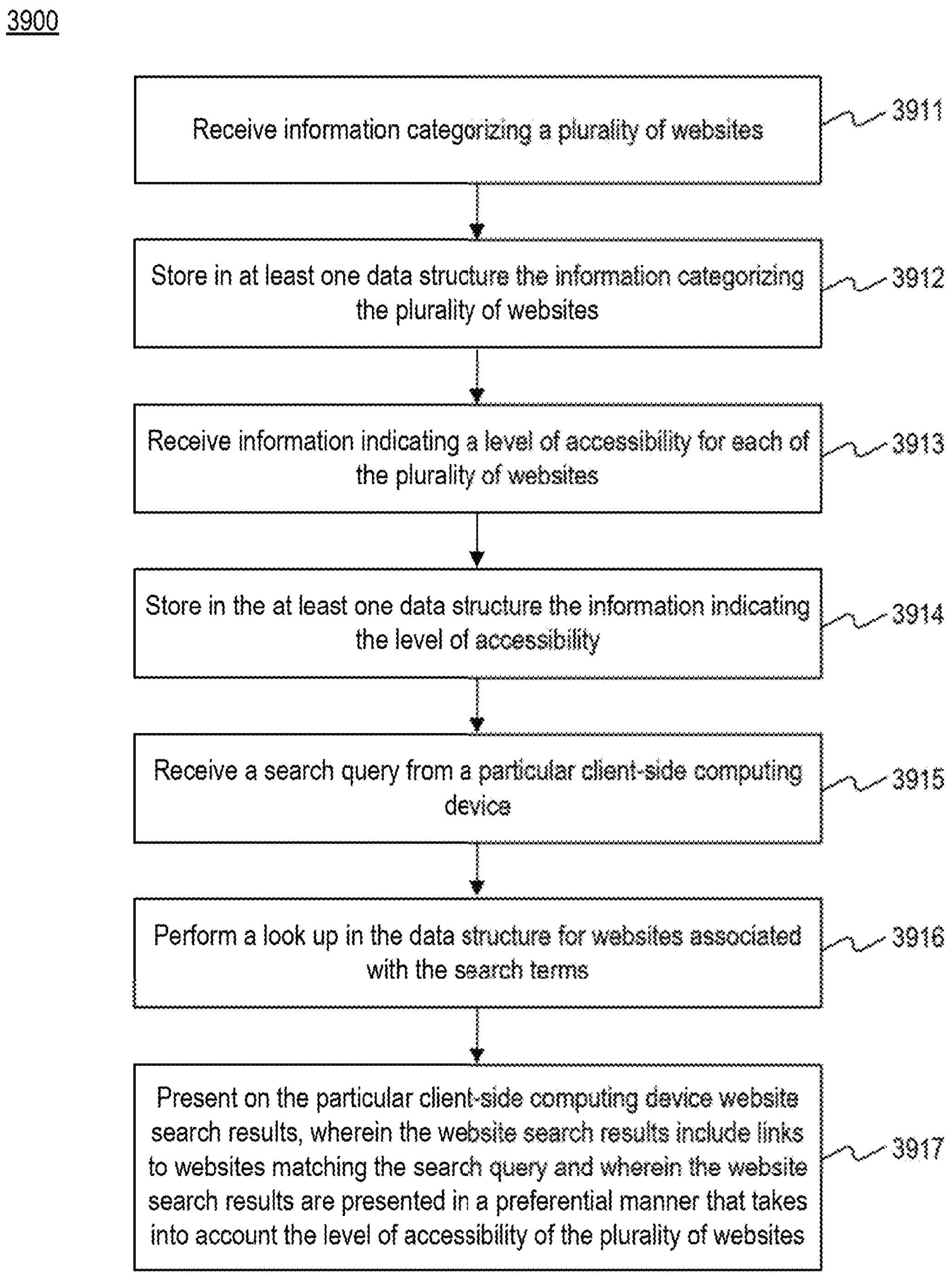
FIG. 39 illustrates a flow chart of an exemplary method that may be executed by a processor to perform operations for sharing virtual content.

FIG. 39 illustrates a flow chart of an exemplary method 3910 that may be executed by a processor to perform operations for providing search results to client-side computing devices. Method 3910 may include a step 3911 of receiving information categorizing a plurality of websites. Method 3910 may also include a step 3912 of storing in at least one data structure the information categorizing the plurality of websites. Further, method 3910 may include a step 3913 of receiving information indicating a level of accessibility for each of the plurality of websites. Method 3910 may also include a step 3914 of storing in the at least one data structure the information indicating the level of accessibility. Further method 3910 may also include a step 3915 of receiving a search query from a particular client-side computing device. Method 3910 may include a step 3916 of performing a look up in the data structure for websites associated with the search terms. Method 3910 may include a step 3917 of presenting on the particular client-side computing device website search results, wherein the website search results include links to websites matching the search query and wherein the website search results are presented in a preferential manner that takes into account the level of accessibility of the plurality of websites.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer readable medium containing instructions that when executed by at least one processor cause the at least one processor to perform operations for providing search results to client-side computing devices, the operations comprising:

using at least one processor to parse source code of a plurality of websites, the parsed source code identifying a plurality of elements corresponding to objects including at least one image and at least one embedded link;

executing, using the at least one processor, machine learning for analyzing each of the plurality of elements to determine whether accompanying accessibility information is included in associated element definitions;

using the at least one processor to determine based on the analysis of the parsed source code, a level of accessibility associated with each of the plurality of websites, wherein the level of accessibility includes a composite score associated with a disability accessibility compliancy ranking;

storing in the at least one data structure the composite score indicating the level of accessibility associated with each of the plurality of websites;

receiving a search query from a particular client-side computing device;

performing a look up in the at least one data structure for websites associated with the search query; and presenting on the particular client-side computing device website search results, wherein the website search results include links to search result websites, from the plurality of websites, matching the search query, and wherein each link to each of the search result websites includes a hyperlink defined in website code configured to cause a web browser to navigate to an associated website upon link selection, and wherein the website search results are presented in a preferential manner that takes into account, based on the composite score, the level of accessibility of the search result websites by listing the website search results based on the level of accessibility determined by the composite score.

2. The non-transitory computer readable medium of claim 1, wherein the level of accessibility is reflective of whether each website is disability accessible or disability non-accessible.

3. The non-transitory computer readable medium of claim 1, wherein presenting the website search results in a preferential manner includes providing an indication of website search results associated with disability accessible websites.

4. The non-transitory computer readable medium of claim 3, wherein providing an indication includes presenting visual indicators associated with first website search results identifying accessible websites, the visual indicators distinguishing the first website search results from second website search results identifying non-accessible websites.

5. The non-transitory computer readable medium of claim 1, wherein presenting the website search results in a preferential manner includes ordering the website search results based at least in part on the level of accessibility of the plurality of websites.

6. The non-transitory computer readable medium of claim 5, wherein ordering the website search results includes prioritizing website search results associated with accessible websites such that first website search results associated with accessible websites are presented ahead of second website search results associated with non-accessible websites.

7. The non-transitory computer readable medium of claim 1, wherein presenting the website search results in a preferential manner includes presenting, in an accessible manner, first website search results associated with accessible websites and second website search results associated with non-accessible websites.

8. The non-transitory computer readable medium of claim 7, wherein in response to an indication that a user is visually impaired, presenting website search results in an accessible manner includes providing an audible presentation of text descriptive of the website search results and providing an audible presentation of textual description of an image associated with the website search results.

9. The non-transitory computer readable medium of claim 1, wherein the operations include determining that a user of the particular client-side computing device is associated with a particular disability, and wherein presenting the website search results emphasizes websites with accessibility conforming to the particular disability.

10. The non-transitory computer readable medium of claim 9, wherein the determination that the user is associated with a particular disability is based on a user profile stored in memory.

11. The non-transitory computer readable medium of claim 9, wherein the determination that the user is associated with a particular disability is based on the search query.

12. The non-transitory computer readable medium of claim 9, wherein the determination that the user is associated with a particular disability is based on a user selection to invoke a dedicated accessible search engine.

13. The non-transitory computer readable medium of claim 9, wherein the determination that the user is associated with a particular disability is based on detection of software running on the particular client-side computing device.

14. A method for providing accessible search results to client-side computing devices of disabled users, the method comprising:

using at least one processor to parse source code of a plurality of websites, the parsed source code identifying a plurality of elements corresponding to objects including at least one image and at least one embedded link;

executing, using the at least one processor, machine learning for analyzing each of the plurality of elements to determine whether accompanying accessibility information is included in associated element definitions;

using the at least one processor to determine based on the analysis of the parsed source code, a level of accessibility associated with each of the plurality of websites, wherein the level of accessibility includes a composite score associated with a disability accessibility compliancy ranking;

storing in the at least one data structure the composite score indicating the level of accessibility associated with each of the plurality of websites;

receiving a search query from a particular client-side computing device;

performing a look up in the at least one data structure for websites associated with the search query; and presenting on the particular client-side computing device website search results, wherein the website search results include links to search result websites, from the plurality of websites, matching the search query, and wherein each link to each of the search result websites includes a hyperlink defined in website code configured to cause a web browser to navigate to an associated website upon link selection, and wherein the website search results are presented in a preferential manner that takes into account, based on the composite score, the level of accessibility of the search result websites by listing the website search results based on the level of accessibility determined by the composite score.

15. The method of claim 14, further comprising:

obtaining an indication that a user of the particular client-side computing device has a particular disability; and presenting the website search results in a preferential manner that addresses the particular disability.

16. The method of claim 15, wherein the indication that the user of particular client-side computing device has a particular disability is based on an input from an accessibility graphical user interface (GUI).

17. The method of claim 15, wherein presenting the website search results in a preferential manner that addresses the particular disability includes presenting the website search results in a format addressing the particular disability by altering default display parameters to conform with an accessibility profile associated with the particular disability.

18. The method of claim 15, wherein presenting the website search results in a preferential manner that addresses the particular disability includes displaying first search results of websites accessible to the particular disability and omitting second search results of websites non-accessible to the particular disability.

19. The method of claim 15, wherein presenting the website search results in a preferential manner includes presenting website search results of accessible websites ahead of website search results of non-accessible websites.

* * * * *